(12) United States Patent
Michalakis et al.

(10) Patent No.: US 12,502,438 B2
(45) Date of Patent: Dec. 23, 2025

(54) OPTIMIZED ACCEPTOR SPLICE SITE MODULE FOR BIOLOGICAL AND BIOTECHNOLOGICAL APPLICATIONS

(71) Applicant: VIGENERON GMBH, Planegg (DE)

(72) Inventors: Stylianos Michalakis, Munich (DE); Martin Biel, Starnberg (DE); Elvir Becirovic, Munich (DE)

(73) Assignee: Vigeneron GmbH, Planegg (DE)

( * ) Notice: Subject to any disclaimer, the term of this patent is extended or adjusted under 35 U.S.C. 154(b) by 1061 days.

(21) Appl. No.: 17/415,643

(22) PCT Filed: Dec. 19, 2019

(86) PCT No.: PCT/EP2019/086454
§ 371 (c)(1),
(2) Date: Jun. 17, 2021

(87) PCT Pub. No.: WO2020/127831
PCT Pub. Date: Jun. 25, 2020

(65) Prior Publication Data
US 2022/0160898 A1     May 26, 2022

(30) Foreign Application Priority Data
Dec. 20, 2018   (EP) .................................. 18214415

(51) Int. Cl.
| | |
|---|---|
| *A61K 48/00* | (2006.01) |
| *A61K 35/76* | (2015.01) |
| *A61P 27/02* | (2006.01) |
| *C12N 15/10* | (2006.01) |
| *C12N 15/113* | (2010.01) |
| *C12N 15/86* | (2006.01) |

(52) U.S. Cl.
CPC ........... *A61K 48/0066* (2013.01); *A61K 35/76* (2013.01); *A61P 27/02* (2018.01); *C12N 15/102* (2013.01); *C12N 15/113* (2013.01); *C12N 15/86* (2013.01); *C12N 2320/33* (2013.01); *C12N 2750/14143* (2013.01)

(58) Field of Classification Search
CPC .............. C12N 2320/33; C12N 15/113; C12N 15/102; C12N 2840/44; C12N 2840/445; A16K 48/0066
USPC ...................... 435/6.1, 91.1, 91.31, 455, 458; 514/44 A, 44 R; 536/23.1, 24.5
See application file for complete search history.

(56) References Cited

U.S. PATENT DOCUMENTS

2002/0193580 A1 * 12/2002 Mitchell ................ C12N 15/85
536/23.1

FOREIGN PATENT DOCUMENTS

| | | | |
|---|---|---|---|
| JP | 2005518211 A | 6/2005 | |
| JP | 2009000120 A | 1/2009 | |
| WO | 2000031236 A2 | 6/2000 | |
| WO | 2000056910 A1 | 9/2000 | |
| WO | 03072739 A2 | 9/2003 | |
| WO | 2014170480 A1 | 10/2014 | |
| WO | WO2017108931 A1 * | 6/2017 | ............. A61K 48/00 |
| WO | 2019076856 A1 | 4/2019 | |

OTHER PUBLICATIONS

Hiller M, Huse K, Szafranski K, Jahn N, Hampe J, Schreiber S, Backofen R, Platzer M. Widespread occurrence of alternative splicing at NAGNAG acceptors contributes to proteome plasticity. Nat Genet. Dec. 2004;36(12):1255-7. (Year: 2004).*

(Continued)

*Primary Examiner* — Jane J Zara
(74) *Attorney, Agent, or Firm* — McNeill PLLC

(57) ABSTRACT

The present invention relates to an acceptor splice region, as well as uses and applications thereof.

23 Claims, 37 Drawing Sheets
Specification includes a Sequence Listing.

(56) References Cited

OTHER PUBLICATIONS

Hiller M, Zhang Z, Backofen R, Stamm S. Pre-mRNA secondary structures influence exon recognition. PLoS Genet. Nov. 2007;3(11):e204. doi: 10.1371/journal.pgen.0030204. PMID: 18020710; PMCID: PMC2077896. (Year: 2007).*

Roberts et al (Nature Reviews: Drug Discovery, vol. 19, pp. 673-694 (2020)) (Year: 2020).*

Damase et al (Frontiers in Bioengineering and Biotech., vol. 9, article 628137, pp. 1-24 (2021)) (Year: 2021).*

Bretschneider et al., "COSSMO: predicting competitive alternative splice site selection using deep learning", Bioinformatics, 34, pp. i429-i437 (2018).

McClements et al., "Adeno-associated Virus (AAV) Dual Vector Strategies for Gene Therapy Encoding Large Transgenes", Yale Journal of Biology and Medicine, 90, pp. 611-623 (2017).

Moore, M., "Intron recognition comes of AGe", Nature Structural Biology, 7(1), pp. 14-16 (Jan. 2000).

Notification of Transmittal of the International Search Report and the Written Opinion of the International Searching Authority, or the Declaration, International Search Report and Written Opinion issued in International Application No. PCT/EP2019/086454, on Feb. 24, 2020 (16 pages).

Riedmayr et al., "Enigmatic rhodopsin mutation creates an exceptionally strong splice acceptor site", Human Molecular Genetics, 00(00), pp. 1-10 (2019).

Trapani et al., "Effective delivery of large genes to the retina by dual AAV vectors", EMBO Molecular Medicine, 6(2), pp. 194-211 (Dec. 16, 2013).

Riedmayr, Lisa Maria et al., "mRNA trans-splicing dual AAV vectors for (epi)genome editing and gene therapy", Supplementary Information, Nature Communications (2023) 14:6578, 48 pages.

Riedmayr, Lisa Maria et al., "mRNAtrans-splicing dual AAV vectors for (epi)genome editing and gene therapy", Nature Communications (2023) 14:6578, 14 pages.

Schon, Christian et al., "Retinal gene delivery by adeno-associated virus (AAV) vectors: Strategies and applications", European Journal of Pharmaceutics and Biopharmaceutics, (2015) 95: 343-352.

* cited by examiner

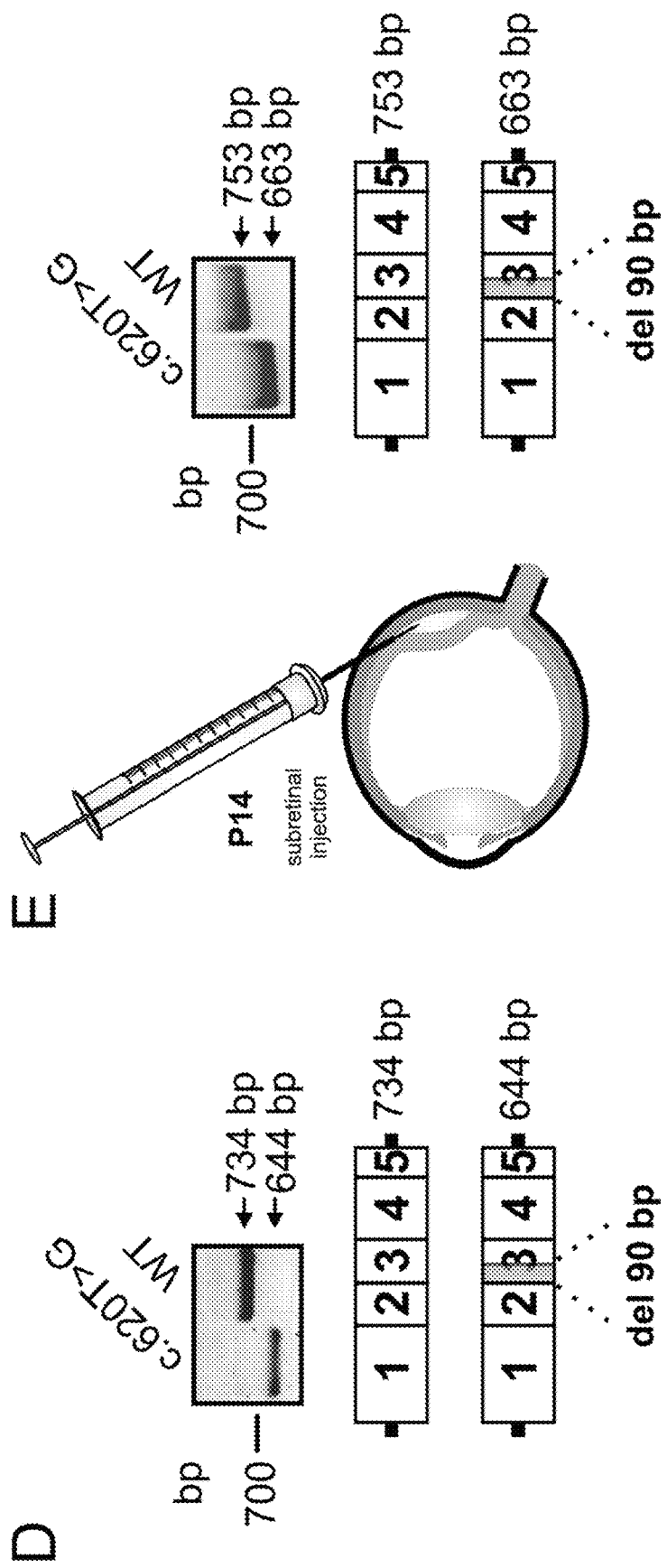
Figure 1 (cont')

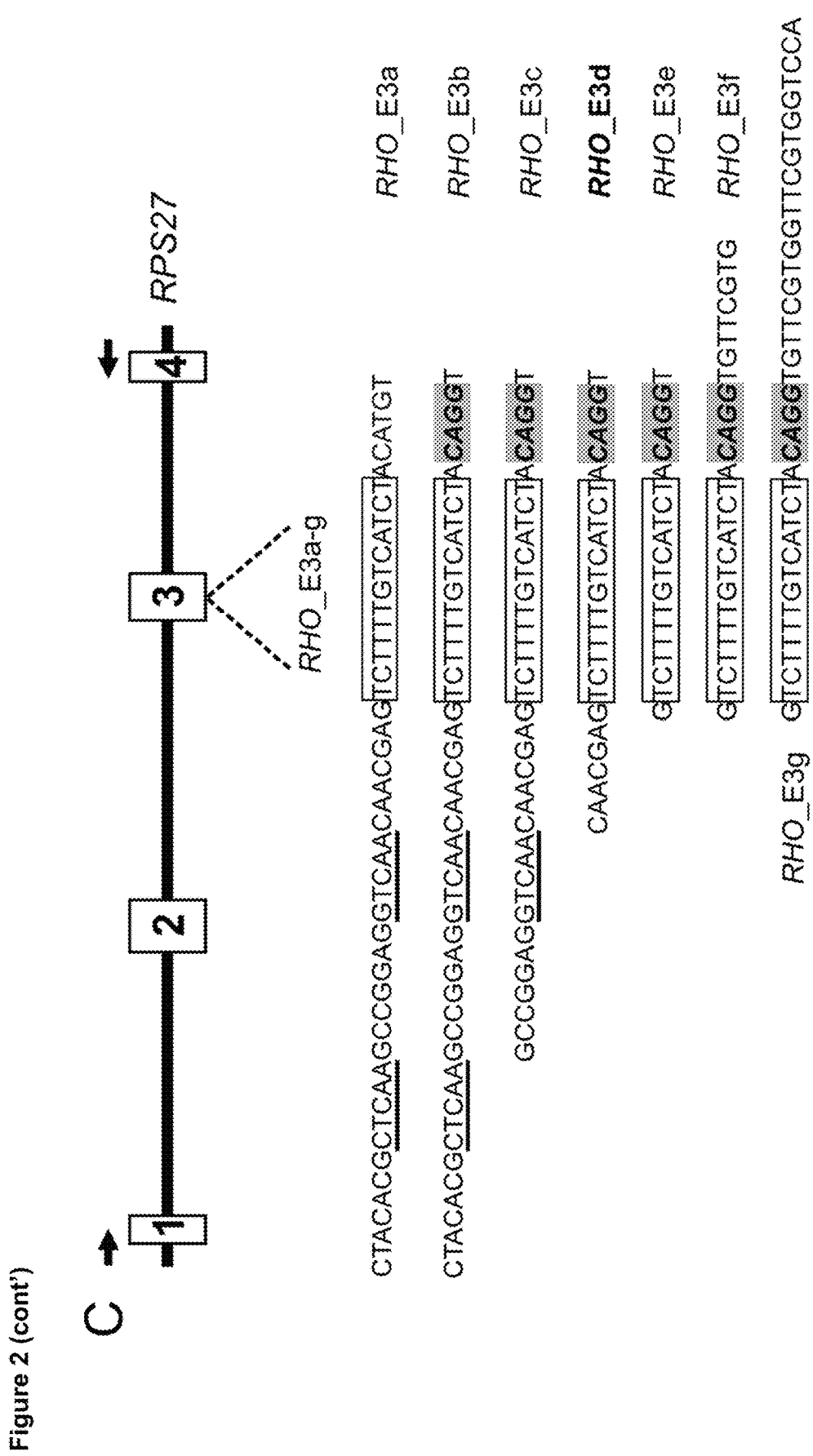
Figure 2 (cont')

Figure 2 (cont')

Figure 3
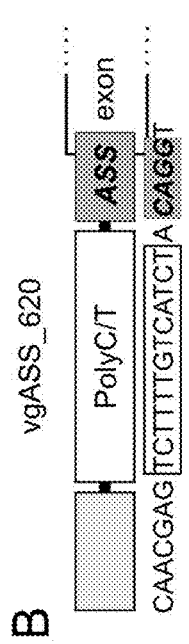
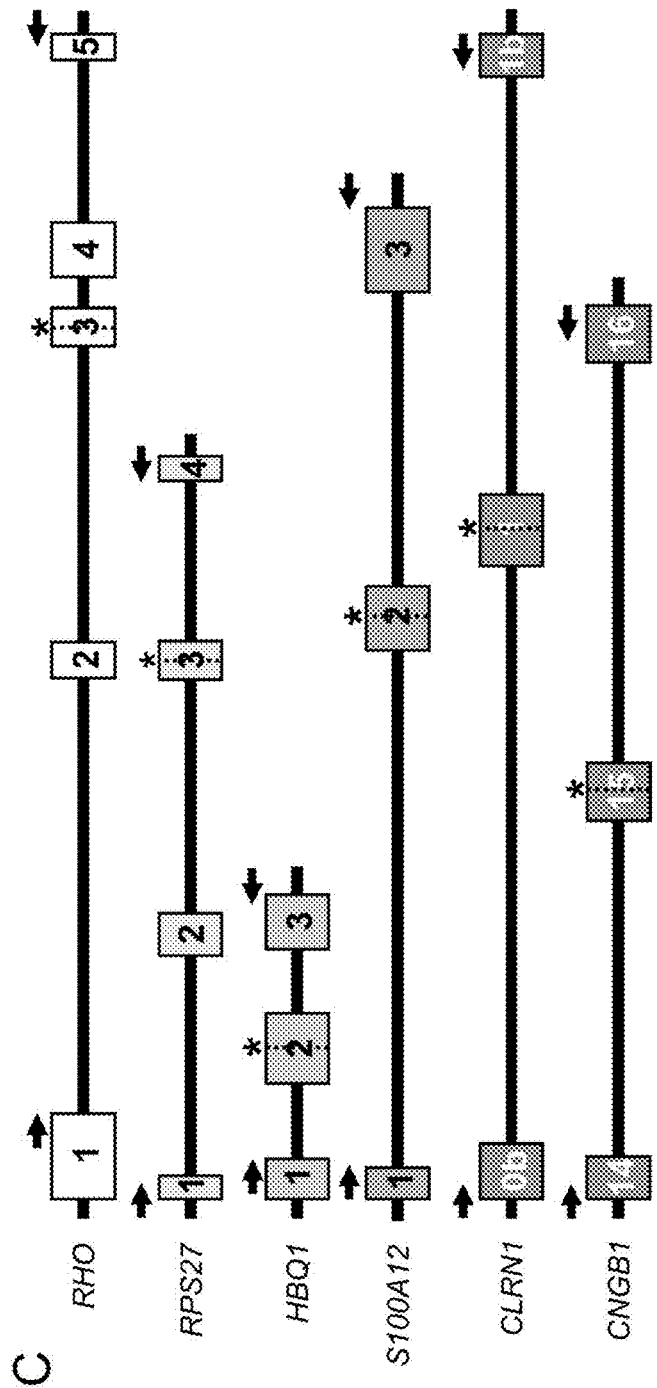

Figure 3 (cont')

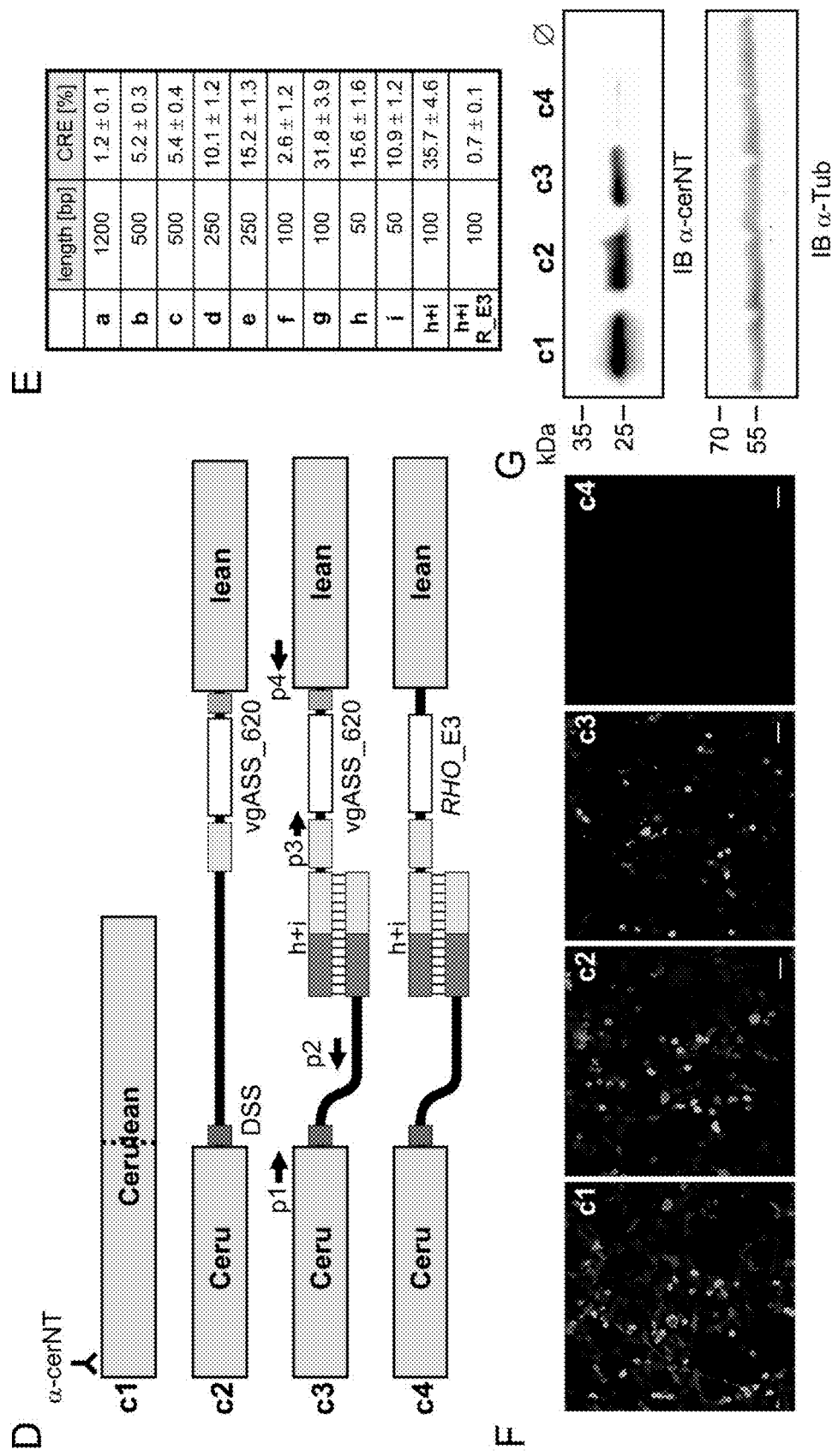
Figure 4 (cont')

Figure 5

Dual AAV comprising the 5' coding sequence of ABCA4 (SEQ ID NO: 19):

```
CTGCGCGCTCGCTCGCTCACTGAGGCCGCCCGGGCAAAGCCCGGGCGTCGGGCGACCTTTGGTCGCCC
GGCCTCAGTGAGCGAGCGAGCGCGCAGAGAGGGAGTGGCCAACTCCATCACTAGGGGTTCCTtgtagt
taatgattaacccgccatgctacttatctacgtagccatgctctaggaagatcggaattcgcccttaa
gggcgcgccgtttaaatagctagcGACATTGATTATTGACTAGTTATTAATAGTAATCAATTACGGGG
TCATTAGTTCATAGCCCATATATGGAGTTCCGCGTTACATAACTTACGGTAAATGGCCCGCCTGGCTG
ACCGCCCAACGACCCCCGCCCATTGACGTCAATAATGACGTATGTTCCCATAGTAACGCCAATAGGGA
CTTTCCATTGACGTCAATGGGTGGAGTATTTACGGTAAACTGCCCACTTGGCAGTACATCAAGTGTAT
CATATGCCAAGTACGCCCCCTATTGACGTCAATGACGGTAAATGGCCCGCCTGGCATTATGCCCAGTA
CATGACCTTATGGGACTTTCCTACTTGGCAGTACATCTACGTATTAGTCATCGCTATTACCATGGTGA
TGCGGTTTTGGCAGTACATCAATGGGCGTGGATAGCGGTTTGACTCACGGGGATTTCCAAGTCTCCAC
CCCATTGACGTCAATGGGAGTTTGTTTTGGCACCAAAATCAACGGGACTTTCCAAAATGTCGTAACAA
CTCCGCCCCATTGACGCAAATGGGCGGTAGGCGTGTACGGTGGGAGGTCTATATAAGCAGAGCTggta
ccaccggtgccaccATGGGCTTCGTGAGACAGATACAGCTTTTGCTCTGGAAGAACTGGACCCTGCGG
AAAAGGCAAAAGATTCGCTTTGTGGTGGAACTCGTGTGGCCTTTATCTTTATTTCTGGTCTTGATCTG
GTTAAGGAATGCCAACCCACTCTACAGCCATCATGAATGCCATTTCCCCAACAAGGCGATGCCCTCAG
CAGGAATGCTGCCGTGGCTCCAGGGGATCTTCTGCAATGTGAACAATCCCTGTTTTCAAAGCCCCACC
CCAGGAGAATCTCCTGGAATTGTGTCAAACTATAACAACTCCATCTTGGCAAGGGTATATCGAGATTT
TCAAGAACTCCTCATGAATGCACCAGAGAGCCAGCACCTTGGCCGTATTTGGACAGAGCTACACATCT
TGTCCCAATTCATGGACACCCTCCGGACTCACCCGGAGAGAATTGCAGGAAGAGGAATACGAATAAGG
GATATCTTGAAAGATGAAGAAACACTGACACTATTTCTCATTAAAAACATCGGCCTGTCTGACTCAGT
GGTCTACCTTCTGATCAACTCTCAAGTCCGTCCAGAGCAGTTCGCTCATGGAGTCCCGGACCTGGCGC
TGAAGGACATCGCCTGCAGCGAGGCCCTCCTGGAGCGCTTCATCATCTTCAGCCAGAGACGCGGGGCA
AAGACGGTGCGCTATGCCCTGTGCTCCCTCTCCCAGGGCACCCTACAGTGGATAGAAGACACTCTGTA
TGCCAACGTGGACTTCTTCAAGCTCTTCCGTGTGCTTCCCACACTCCTAGACAGCCGTTCTCAAGGTA
TCAATCTGAGATCTTGGGGAGGAATATTATCTGATATGTCACCAAGAATTCAAGAGTTTATCCATCGG
CCGAGTATGCAGGACTTGCTGTGGGTGACCAGGCCCCTCATGCAGAATGGTGGTCCAGAGACCTTTAC
AAAGCTGATGGGCATCCTGTCTGACCTCCTGTGTGGCTACCCCGAGGGAGGTGGCTCTCGGGTGCTCT
CCTTCAACTGGTATGAAGACAATAACTATAAGGCCTTTCTGGGGATTGACTCCACAAGGAAGGATCCT
ATCTATTCTTATGACAGAAGAACAACATCCTTTTGTAATGCATTGATCCAGAGCCTGGAGTCAAATCC
TTTAACCAAAATCGCTTGGAGGGCGGCAAAGCCTTTGCTGATGGGAAAAATCCTGTACACTCCTGATT
CACCTGCAGCACGAAGGATACTGAAGAATGCCAACTCAACTTTTGAAGAACTGGAACACGTTAGGAAG
TTGGTCAAAGCCTGGGAAGAAGTAGGGCCCCAGATCTGGTACTTCTTTGACAACAGCACACAGATGAA
CATGATCAGAGATACCCTGGGGAACCCAACAGTAAAAGACTTTTTGAATAGGCAGCTTGGTGAAGAAG
GTATTACTGCTGAAGCCATCCTAAACTTCCTCTACAAGGGCCCTCGGGAAAGCCAGGCTGACACATG
GCCAACTTCGACTGGAGGGACATATTTAACATCACTGATCGCACCCTCCGCCTGGTCAATCAATACCT
GGAGTGCTTGGTCCTGGATAAGTTTGAAAGCTACAATGATGAAACTCAGCTCACCCAACGTGCCCTCT
CTCTACTGGAGGAAAACATGTTCTGGGCCGGAGTGGTATTCCCTGACATGTATCCCTGGACCAGCTCT
CTACCACCCCACGTGAAGTATAAGATCCGAATGGACATAGACGTGGTGGAGAAAACCAATAAGATTAA
```

Figure 5 (cont')

```
AGACAGGTATTGGGATTCTGGTCCCAGAGCTGATCCCGTGGAAGATTTCCGGTACATCTGGGGCGGGT
TTGCCTATCTGCAGGACATGGTTGAACAGGGGATCACAAGGAGCCAGGTGCAGGCGGAGGCTCCAGTT
GGAATCTACCTCCAGCAGATGCCCTACCCCTGCTTCGTGGACGATTCTTTCATGATCATCCTGAACCG
CTGTTTCCCTATCTTCATGGTGCTGGCATGGATCTACTCTGTCTCCATGACTGTGAAGAGCATCGTCT
TGGAGAAGGAGTTGCGACTGAAGGAGACCTTGAAAAATCAGGGTGTCTCCAATGCAGTGATTTGGTGT
ACCTGGTTCCTGGACAGCTTCTCCATCATGTCGATGAGCATCTTCCTCCTGACGATATTCATCATGCA
TGGAAGAATCCTACATTACAGCGACCCATTCATCCTCTTCCTGTTCTTGTTGGCTTTCTCCACTGCCA
CCATCATGCTGTGCTTTCTGCTCAGCACCTTCTTCTCCAAGGCCAGTCTGGCAGCAGCCTGTAGTGGT
GTCATCTATTTCACCCTCTACCTGCCACACATCCTGTGCTTCGCCTGGCAGGACCGCATGACCGCTGA
GCTGAAGAAGGCTGTGAGCTTACTGTCTCCGGTGGCATTTGGATTTGGCACTGAGTACCTGGTTCGCT
TTGAAGAGCAAGGCCTGGGCTGCAGTGGAGCAACATCGGGAACAGTCCCACGGAAGGGGACGAATTC
AGCTTCCTGCTGTCCATGCAGATGATGCTCCTTGATGCTGCTGTCTATGGCTTACTCGCTTGGTACCT
TGATCAGGTGTTTCCAGGAGACTATGGAACCCCACTTCCTTGGTACTTTCTTCTACAAGAGTCGTATT
GGCTTGGCGGTGAAGGGTGTTCAACCAGAGAAGAAAGAGCCCTGGAAAAGACCGAGCCCCTAACAGAG
GAAACGGAGGATCCAGAGCACCCAGAAGGAATACACGACTCCTTCTTTGAACGTGAGCATCCAGGGTG
GGTTCCTGGGGTATGCGTGAAGAATCTGGTAAAGATTTTTGAGCCCTGTGGCCGGCCAGCTGTGGACC
GTCTGAACATCACCTTCTACGAGAACCAGATCACCGCATTCCTGGGCCACAATGGAGCTGGGAAAACC
ACCACCTTGTCCATCCTGACGGGTCTGTTGCCACCAACCTCTGGGACTGTGCTCGTTGGGGGAAGGGA
CATTGAAACCAGCCTGGATGCAGTCCGGCAGAGCCTTGGCATGTGTCCACAGCACAACATCCTGTTCC
ACCACCTCACGGTGGCTGAGCACATGCTGTTCTATGCCCAGCTGAAAGGAAAGTCCCAGGAGGAGGCC
CAGCTGGAGATGGAAGCCATGTTGGAGGACACAGGCCTCCACCACAAGCGGAATGAAGAGGCTCAGGA
CCTATCAGGTGGCATGCAGAGAAAGCTGTCGGTTGCCATTGCCTTTGTGGGAGATGCC*AAGgtaag*gg
cactgagcagaagggaagaagctccgggggctcttttgtagggtaagcttAGTGCATCAAGGCGATCAC
ATCAGTGAAAAAAAGCCAGACAGGCGGTTAAACCAACGCAGATTAAACAGCAGGATGCAAAAATTCGC
AGGTGGTCAGATGaagcttattctcgagttaagggcgaattcccgattaggatcttcctagagcatgg
ctacgtagataagtagcatggcgggttaatcattaactacaAGGAACCCCTAGTGATGGAGTTGGCCA
CTCCCTCTCTGCGCGCTCGCTCGCTCACTGAGGCCGGGCGACCAAAGGTCGCCCGACGCCCGGGCTTT
GCCCGGGCGGCCTCAGTGAGCGAGCGAGCGCGCAG
```

Figure 6

Dual AAV comprising the 3' coding sequence of ABCA4 (SEQ ID NO:20):

```
CTGCGCGCTCGCTCGCTCACTGAGGCCGCCCGGGCAAAGCCCGGGCGTCGGGCGACCTTTGGTCGCCC
GGCCTCAGTGAGCGAGCGAGCGCGCAGAGAGGGAGTGGCCAACTCCATCACTAGGGGTTCCTtgtagt
taatgattaacccgccatgctacttatctacgtagccatgctctaggaagatcggaattcgcccttaa
gggcgcgccgtttaaatagctagcGACATTGATTATTGACTAGTTATTAATAGTAATCAATTACGGGG
TCATTAGTTCATAGCCCATATATGGAGTTCCGCGTTACATAACTTACGGTAAATGGCCCGCCTGGCTG
ACCGCCCAACGACCCCCGCCCATTGACGTCAATAATGACGTATGTTCCCATAGTAACGCCAATAGGGA
CTTTCCATTGACGTCAATGGGTGGAGTATTTACGGTAAACTGCCCACTTGGCAGTACATCAAGTGTAT
CATATGCCAAGTACGCCCCCTATTGACGTCAATGACGGTAAATGGCCCGCCTGGCATTATGCCCAGTA
CATGACCTTATGGGACTTTCCTACTTGGCAGTACATCTACGTATTAGTCATCGCTATTACCATGGTGA
TGCGGTTTTGGCAGTACATCAATGGGCGTGGATAGCGGTTTGACTCACGGGGATTTCCAAGTCTCCAC
CCCATTGACGTCAATGGGAGTTTGTTTTGGCACCAAAATCAACGGGACTTTCCAAAATGTCGTAACAA
CTCCGCCCCATTGACGCAAATGGGCGGTAGGCGTGTACGGTGGGAGGTCTATATAAGCAGAGCTggta
ccaccggtagaaagcttCATCTGACCACCTGCGAATTTTTGCATCCTGCTGTTTAATCTGCGTTGGTT
TAACCGCCTGTCTGGCTTTTTTTCACTGATGTGATCGCCTTGATGCACTaagcttCAACGAGTCTTTT
GTCATCTACAGGTGGTGATTCTGGACGAACCCACCTCTGGGGTGGACCCTTACTCGAGACGCTCAATC
TGGGATCTGCTCCTGAAGTATCGCTCAGGCAGAACCATCATCATGTCCACTCACCACATGGACGAGGC
CGACCTCCTTGGGGACCGCATTGCCATCATTGCCCAGGGAAGGCTCTACTGCTCAGGCACCCCACTCT
TCCTGAAGAACTGCTTTGGCACAGGCTTGTACTTAACCTTGGTGCGCAAGATGAAAAACATCCAGAGC
CAAAGGAAAGGCAGTGAGGGGACCTGCAGCTGCTCGTCTAAGGGTTTCTCCACCACGTGTCCAGCCCA
CGTCGATGACCTAACTCCAGAACAAGTCCTGGATGGGGATGTAAATGAGCTGATGGATGTAGTTCTCC
ACCATGTTCCAGAGGCAAAGCTGGTGGAGTGCATTGGTCAAGAACTTATCTTCCTTCTTCCAAATAAG
AACTTCAAGCACAGAGCATATGCCAGCCTTTTCAGAGAGCTGGAGGAGACGCTGGCTGACCTTGGTCT
CAGCAGTTTTGGAATTTCTGACACTCCCCTGGAAGAGATTTTTCTGAAGGTCACGGAGGATTCTGATT
CAGGACCTCTGTTTGCGGGTGGCGCTCAGCAGAAAAGAGAAAACGTCAACCCCCGACACCCCTGCTTG
GGTCCCAGAGAGAAGGCTGGACAGACACCCCAGGACTCCAATGTCTGCTCCCCAGGGGCGCCGGCTGC
TCACCCAGAGGGCCAGCCTCCCCCAGAGCCAGAGTGCCCAGGCCCGCAGCTCAACACGGGGACACAGC
TGGTCCTCCAGCATGTGCAGGCGCTGCTGGTCAAGAGATTCCAACACACCATCCGCAGCCACAAGGAC
TTCCTGGCGCAGATCGTGCTCCCGGCTACCTTTGTGTTTTGGCTCTGATGCTTTCTATTGTTATCCC
TCCTTTTGGCGAATACCCCGCTTTGACCCTTCACCCCTGGATATATGGGCAGCAGTACACCTTCTTCA
GCATGGATGAACCAGGCAGTGAGCAGTTCACGGTACTTGCAGACGTCCTCCTGAATAAGCCAGGCTTT
GGCAACCGCTGCCTGAAGGAAGGGTGGCTTCCGGAGTACCCTGTGGCAACTCAACACCCTGGAAGAC
TCCTTCTGTGTCCCCAAACATCACCCAGCTGTTCCAGAAGCAGAAATGGACACAGGTCAACCCTTCAC
CATCCTGCAGGTGCAGCACCAGGGAGAAGCTCACCATGCTGCCAGAGTGCCCCGAGGGTGCCGGGGGC
CTCCCGCCCCCCAGAGAACACAGCGCAGCACGGAAATTCTACAAGACCTGACGGACAGGAACATCTC
CGACTTCTTGGTAAAAACGTATCCTGCTCTTATAAGAAGCAGCTTAAAGAGCAAATTCTGGGTCAATG
AACAGAGGTATGGAGGAATTTCCATTGGAGGAAAGCTCCCAGTCGTCCCCATCACGGGGGAAGCACTT
```

Figure 6 (cont')

```
GTTGGGTTTTTAAGCGACCTTGGCCGGATCATGAATGTGAGCGGGGGCCCTATCACTAGAGAGGCCTC
TAAAGAAATACCTGATTTCCTTAAACATCTAGAAACTGAAGACAACATTAAGGTGTGGTTTAATAACA
AAGGCTGGCATGCCCTGGTCAGCTTTCTCAATGTGGCCCACAACGCCATCTTACGGGCCAGCCTGCCT
AAGGACAGGAGCCCCGAGGAGTATGGAATCACCGTCATTAGCCAACCCCTGAACCTGACCAAGGAGCA
GCTCTCAGAGATTACAGTGCTGACCACTTCAGTGGATGCTGTGGTTGCCATCTGCGTGATTTCTCCA
TGTCCTTCGTCCCAGCCAGCTTTGTCCTTTATTTGATCCAGGAGCGGGTGAACAAATCCAAGCACCTC
CAGTTTATCAGTGGAGTGAGCCCCACCACCTACTGGGTGACCAACTTCCTCTGGGACATCATGAATTA
TTCCGTGAGTGCTGGGCTGGTGGTGGGCATCTTCATCGGGTTTCAGAAGAAAGCCTACACTTCTCCAG
AAAACCTTCCTGCCCTTGTGGCACTGCTCCTGCTGTATGGATGGGCGGTCATTCCCATGATGTACCCA
GCATCCTTCCTGTTTGATGTCCCCAGCACAGCCTATGTGGCTTTATCTTGTGCTAATCTGTTCATCGG
CATCAACAGCAGTGCTATTACCTTCATCTTGGAATTATTTGAGAATAACCGGACGCTGCTCAGGTTCA
ACGCCGTGCTGAGGAAGCTGCTCATTGTCTTCCCCACTTCTGCCTGGGCCGGGGCCTCATTGACCTT
GCACTGAGCCAGGCTGTGACAGATGTCTATGCCCGGTTTGGTGAGGAGCACTCTGCAAATCCGTTCCA
CTGGGACCTGATTGGGAAGAACCTGTTTGCCATGGTGGTGGAAGGGGTGGTGTACTTCCTCCTGACCC
TGCTGGTCCAGCGCCACTTCTTCCTCTCCCAATGGATTGCCGAGCCCACTAAGGAGCCCATTGTTGAT
GAAGATGATGATGTGGCTGAAGAAAGACAAAGAATTATTACTGGTGGAAATAAAACTGACATCTTAAG
GCTACATGAACTAACCAAGATTTATCCAGGCACCTCCAGCCCAGCAGTGGACAGGCTGTGTGTCGGAG
TTCGCCCTGGAGAGTGCTTTGGCCTCCTGGGAGTGAATGGTGCCGGCAAAACAACCACATTCAAGATG
CTCACTGGGGACACCACAGTGACCTCAGGGGATGCCACCGTAGCAGGCAAGAGTATTTTAACCAATAT
TTCTGAAGTCCATCAAAATATGGGCTACTGTCCTCAGTTTGATGCAATTGATGAGCTGCTCACAGGAC
GAGAACATCTTTACCTTTATGCCCGGCTTCGAGGTGTACCAGCAGAAGAAATCGAAAAGGTTGCAAAC
TGGAGTATTAAGAGCCTGGGCCTGACTGTCTACGCCGACTGCCTGGCTGGCACGTACAGTGGGGGCAA
CAAGCGGAAACTCTCCACAGCCATCGCACTCATTGGCTGCCCACCGCTGGTGCTGCTGGATGAGCCCA
CCACAGGGATGGACCCCCAGGCACGCCGCATGCTGTGGAACGTCATCGTGAGCATCATCAGAGAAGGG
AGGGCTGTGGTCCTCACATCCCACAGCATGGAAGAATGTGAGGCACTGTGTACCCGGCTGGCCATCAT
GGTAAAGGGCGCCTTTCGATGTATGGGCACCATTCAGCATCTCAAGTCCAAATTTGGAGATGGCTATA
TCGTCACAATGAAGATCAAATCCCCGAAGGACGACCTGCTTCCTGACCTGAACCCTGTGGAGCAGTTC
TTCCAGGGGAACTTCCCAGGCAGTGTGCAGAGGGAGAGGCACTACAACATGCTCCAGTTCCAGGTCTC
CTCCTCCTCCCTGGCGAGGATCTTCCAGCTCCTCCTCTCCCACAAGGACAGCCTGCTCATCGAGGAGT
ACTCAGTCACACAGACCCACACTGGACCAGGTGTTTGTAAATTTTGCTAAACAGCAGACTGAAAGTCAT
GACCTCCCTCTGCACCCTCGAGCTGCTGGAGCCAGTCGACAAGCCCAGGACTGAgtcgacgcggccgc
GCAGTGAAAAAAATGCTTTATTTGTGAAATTTGTGATGCTATTGCTTTATTTGTAACCATTATAAGCT
GCAATAAACAAGTTctcgagttaagggcgaattcccgattaggatcttcctagagcatggctacgtag
ataagtagcatggcgggttaatcattaactacaAGGAACCCCTAGTGATGGAGTTGGCCACTCCCTCT
CTGCGCGCTCGCTCGCTCACTGAGGCCGGGCGACCAAAGGTCGCCCGACGCCCGGGCTTTGCCCGGGC
GGCCTCAGTGAGCGAGCGAGCGCGCAG
```

Figure 7

Dual AAV comprising the 5' coding sequence of ABCA4 (SEQ ID NO: 21):

CTGCGCGCTCGCTCGCTCACTGAGGCCGCCCGGGCAAAGCCCGGGCGTCGGGCGACCTTTGGTCGCCC
GGCCTCAGTGAGCGAGCGAGCGCGCAGAGAGGGAGTGGCCAACTCCATCACTAGGGGTTCCTtgtagt
taatgattaacccgccatgctacttatctacgtagccatgctctaggaagatcggaattcgcccttaa
gggcgcgccgtttaaatagctagcAAAAGACTAAAAGAGGGAGGGATCACTTCAGATCTGCCGAGTGA
GTCGATTGGACTTAAAGGGCCAGTCAAACCCTGACTGCCGGCTCATGGCAGGCTCTTGCCGAGGACAA
ATGCCCAGCCTATATTTATGCAAAGAGATTTTGTTCCAAACTTAAGGTCAAAGATACCTAAAGACATC
CCCCTCAGGAACCCCTCTCATGGAGGAGAGTGCCTGAGGGTCTTGGTTTCCCATTGCATCCCCCACCT
CAATTTCCCTGGTGCCCAGCCACTTGTGTCTTTAGGGTTCTCTTTCTCTCCATAAAAGGGAGCCAACA
CAGTGTCGGCCTCCTCTCCCCAACTAAGGGCTTATGTGTAATTAAAAGGGATTATGCTTTGAAGGGGA
AAAGTAGCCTTTAATCACCAGGAGAAGGACACAGCGTCCGGAGCCAGAGGCGCTCTTAACGGCGTTTA
TGTCCTTTGCTGTCTGAGGGGCCTCAGCTCTGACCAATCTGGTCTTCGTGTGGTCATTAGCGGTACCg
gtaccaccggtgccaccATGGGCTTCGTGAGACAGATACAGCTTTTGCTCTGGAAGAACTGGACCCTG
CGGAAAAGGCAAAAGATTCGCTTTGTGGTGGAACTCGTGTGGCCTTTATCTTTATTTCTGGTCTTGAT
CTGGTTAAGGAATGCCAACCCACTCTACAGCCATCATGAATGCCATTTCCCCAACAAGGCGATGCCCT
CAGCAGGAATGCTGCCGTGGCTCCAGGGGATCTTCTGCAATGTGAACAATCCCTGTTTTCAAAGCCCC
ACCCCAGGAGAATCTCCTGGAATTGTGTCAAACTATAACAACTCCATCTTGGCAAGGGTATATCGAGA
TTTTCAAGAACTCCTCATGAATGCACCAGAGAGCCAGCACCTTGGCCGTATTTGGACAGAGCTACACA
TCTTGTCCCAATTCATGGACACCCTCCGGACTCACCCGGAGAGAATTGCAGGAAGAGGAATACGAATA
AGGGATATCTTGAAAGATGAAGAAACACTGACACTATTTCTCATTAAAAACATCGGCCTGTCTGACTC
AGTGGTCTACCTTCTGATCAACTCTCAAGTCCGTCCAGAGCAGTTCGCTCATGGAGTCCCGGACCTGG
CGCTGAAGGACATCGCCTGCAGCGAGGCCCTCCTGGAGCGCTTCATCATCTTCAGCCAGAGACGCGGG
GCAAAGACGGTGCGCTATGCCCTGTGCTCCCTCTCCCAGGGCACCCTACAGTGGATAGAAGACACTCT
GTATGCCAACGTGGACTTCTTCAAGCTCTTCCGTGTGCTTCCCACACTCCTAGACAGCCGTTCTCAAG
GTATCAATCTGAGATCTTGGGGAGGAATATTATCTGATATGTCACCAAGAATTCAAGAGTTTATCCAT
CGGCCGAGTATGCAGGACTTGCTGTGGGTGACCAGGCCCCTCATGCAGAATGGTGGTCCAGAGACCTT
TACAAAGCTGATGGGCATCCTGTCTGACCTCCTGTGTGGCTACCCCGAGGGAGGTGGCTCTCGGGTGC
TCTCCTTCAACTGGTATGAAGACAATAACTATAAGGCCTTTCTGGGGATTGACTCCACAAGGAAGGAT
CCTATCTATTCTTATGACAGAAGAACAACATCCTTTTGTAATGCATTGATCCAGAGCCTGGAGTCAAA
TCCTTTAACCAAAATCGCTTGGAGGGCGGCAAAGCCTTTGCTGATGGGAAAAATCCTGTACACTCCTG
ATTCACCTGCAGCACGAAGGATACTGAAGAATGCCAACTCAACTTTTGAAGAACTGGAACACGTTAGG
AAGTTGGTCAAAGCCTGGGAAGAAGTAGGGCCCCAGATCTGGTACTTCTTTGACAACAGCACACAGAT
GAACATGATCAGAGATACCCTGGGGAACCCAACAGTAAAAGACTTTTTGAATAGGCAGCTTGGTGAAG
AAGGTATTACTGCTGAAGCCATCCTAAACTTCCTCTACAAGGGCCCTCGGGAAAGCCAGGCTGACGAC
ATGGCCAACTTCGACTGGAGGGACATATTTAACATCACTGATCGCACCCTCCGCCTGGTCAATCAATA
CCTGGAGTGCTTGGTCCTGGATAAGTTTGAAAGCTACAATGATGAAACTCAGCTCACCCAACGTGCCC
TCTCTCTACTGGAGGAAAACATGTTCTGGGCCGGAGTGGTATTCCCTGACATGTATCCCTGGACCAGC
TCTCTACCACCCCACGTGAAGTATAAGATCCGAATGGACATAGACGTGGTGGAGAAAACCAATAAGAT
TAAAGACAGGTATTGGGATTCTGGTCCCAGAGCTGATCCCGTGGAAGATTTCCGGTACATCTGGGGCG

Figure 7 (cont'):

```
GGTTTGCCTATCTGCAGGACATGGTTGAACAGGGGATCACAAGGAGCCAGGTGCAGGCGGAGGCTCCA
GTTGGAATCTACCTCCAGCAGATGCCCTACCCCTGCTTCGTGGACGATTCTTTCATGATCATCCTGAA
CCGCTGTTTCCCTATCTTCATGGTGCTGGCATGGATCTACTCTGTCTCCATGACTGTGAAGAGCATCG
TCTTGGAGAAGGAGTTGCGACTGAAGGAGACCTTGAAAAATCAGGGTGTCTCCAATGCAGTGATTTGG
TGTACCTGGTTCCTGGACAGCTTCTCCATCATGTCGATGAGCATCTTCCTCCTGACGATATTCATCAT
GCATGGAAGAATCCTACATTACAGCGACCCATTCATCCTCTTCCTGTTCTTGTTGGCTTTCTCCACTG
CCACCATCATGCTGTGCTTTCTGCTCAGCACCTTCTTCTCCAAGGCCAGTCTGGCAGCAGCCTGTAGT
GGTGTCATCTATTTCACCCTCTACCTGCCACACATCCTGTGCTTCGCCTGGCAGGACCGCATGACCGC
TGAGCTGAAGAAGGCTGTGAGCTTACTGTCTCCGGTGGCATTTGGATTTGGCACTGAGTACCTGGTTC
GCTTTGAAGAGCAAGGCCTGGGGCTGCAGTGGAGCAACATCGGGAACAGTCCCACGGAAGGGGACGAA
TTCAGCTTCCTGCTGTCCATGCAGATGATGCTCCTTGATGCTGCTGTCTATGGCTTACTCGCTTGGTA
CCTTGATCAGGTGTTTCCAGGAGACTATGGAACCCCACTTCCTTGGTACTTTCTTCTACAAGAGTCGT
ATTGGCTTGGCGGTGAAGGGTGTTCAACCAGAGAAGAAAGAGCCCTGGAAAAGACCGAGCCCCTAACA
GAGGAAACGGAGGATCCAGAGCACCCAGAAGGAATACACGACTCCTTCTTTGAACGTGAGCATCCAGG
GTGGGTTCCTGGGGTATGCGTGAAGAATCTGGTAAAGATTTTTGAGCCCTGTGGCCGGCCAGCTGTGG
ACCGTCTGAACATCACCTTCTACGAGAACCAGATCACCGCATTCCTGGGCCACAATGGAGCTGGGAAA
ACCACCACCTTGTCCATCCTGACGGGTCTGTTGCCACCAACCTCTGGGACTGTGCTCGTTGGGGGAAG
GGACATTGAAACCAGCCTGGATGCAGTCCGGCAGAGCCTTGGCATGTGTCCACAGCACAACATCCTGT
TCCACCACCTCACGGTGGCTGAGCACATGCTGTTCTATGCCCAGCTGAAAGGAAAGTCCCAGGAGGAG
GCCCAGCTGGAGATGGAAGCCATGTTGGAGGACACAGGCCTCCACCACAAGCGGAATGAAGAGGCTCA
GGACCTATCAGGTGGCATGCAGAGAAAGCTGTCGGTTGCCATTGCCTTTGTGGGAGATGCCAAGgtaa
gggcactgagcagaagggaagaagctccgggggctctttgtagggtaagcttAGTGCATCAAGGCGAT
CACATCAGTGAAAAAAAGCCAGACAGGCGGTTAAACCAACGCAGATTAAACAGCAGGATGCAAAAATT
CGCAGGTGGTCAGATGaagcttattctcgagttaagggcgaattcccgattaggatcttcctagagca
tggctacgtagataagtagcatggcgggttaatcattaactacaAGGAACCCCTAGTGATGGAGTTGG
CCACTCCCTCTCTGCGCGCTCGCTCGCTCACTGAGGCCGGGCGACCAAAGGTCGCCCGACGCCCGGGC
TTTGCCCGGGCGGCCTCAGTGAGCGAGCGAGCGCGCAG
```

Figure 8

Dual AAV comprising the 3' coding sequence of ABCA4 (SEQ ID NO: 22):

```
CTGCGCGCTCGCTCGCTCACTGAGGCCGCCCGGGCAAAGCCCGGGCGTCGGGCGACCTTTGGTCGCCC
GGCCTCAGTGAGCGAGCGAGCGCGCAGAGAGGGAGTGGCCAACTCCATCACTAGGGGTTCCTtgtagt
taatgattaacccgccatgctacttatctacgtagccatgctctaggaagatcggaattcgcccttaa
gggcgcgccgtttaaatagctagcAAAAGACTAAAAGAGGGAGGGATCACTTCAGATCTGCCGAGTGA
GTCGATTGGACTTAAAGGGCCAGTCAAACCCTGACTGCCGGCTCATGGCAGGCTCTTGCCGAGGACAA
ATGCCCAGCCTATATTTATGCAAAGAGATTTTGTTCCAAACTTAAGGTCAAAGATACCTAAAGACATC
CCCCTCAGGAACCCCTCTCATGGAGGAGAGTGCCTGAGGGTCTTGGTTTCCCATTGCATCCCCCACCT
CAATTTCCCTGGTGCCCAGCCACTTGTGTCTTTAGGGTTCTCTTTCTCTCCATAAAAGGGAGCCAACA
CAGTGTCGGCCTCCTCTCCCCAACTAAGGGCTTATGTGTAATTAAAAGGGATTATGCTTTGAAGGGGA
AAAGTAGCCTTTAATCACCAGGAGAAGGACACAGCGTCCGGAGCCAGAGGCGCTCTTAACGGCGTTTA
TGTCCTTTGCTGTCTGAGGGGCCTCAGCTCTGACCAATCTGGTCTTCGTGTGGTCATTAGCGGTACCg
gtaccaccggtagaaagcttCATCTGACCACCTGCGAATTTTTGCATCCTGCTGTTTAATCTGCGTTG
GTTTAACCGCCTGTCTGGCTTTTTTTCACTGATGTGATCGCCTTGATGCACTaagcttCAACGAGTCT
TTTGTCATCTACAGGTGGTGATTCTGGACGAACCCACCTCTGGGGTGGACCCTTACTCGAGACGCTCA
ATCTGGGATCTGCTCCTGAAGTATCGCTCAGGCAGAACCATCATCATGTCCACTCACCACATGGACGA
GGCCGACCTCCTTGGGGACCGCATTGCCATCATTGCCCAGGGAAGGCTCTACTGCTCAGGCACCCCAC
TCTTCCTGAAGAACTGCTTTGGCACAGGCTTGTACTTAACCTTGGTGCGCAAGATGAAAAACATCCAG
AGCCAAAGGAAAGGCAGTGAGGGGACCTGCAGCTGCTCGTCTAAGGGTTTCTCCACCACGTGTCCAGC
CCACGTCGATGACCTAACTCCAGAACAAGTCCTGGATGGGGATGTAAATGAGCTGATGGATGTAGTTC
TCCACCATGTTCCAGAGGCAAAGCTGGTGGAGTGCATTGGTCAAGAACTTATCTTCCTTCTTCCAAAT
AAGAACTTCAAGCACAGAGCATATGCCAGCCTTTTCAGAGAGCTGGAGGAGACGCTGGCTGACCTTGG
TCTCAGCAGTTTTGGAATTTCTGACACTCCCCTGGAAGAGATTTTTCTGAAGGTCACGGAGGATTCTG
ATTCAGGACCTCTGTTTGCGGGTGGCGCTCAGCAGAAAAGAGAAAACGTCAACCCCCGACACCCCTGC
TTGGGTCCCAGAGAGAAGGCTGGACAGACACCCCAGGACTCCAATGTCTGCTCCCCAGGGGCGCCGGC
TGCTCACCCAGAGGGCCAGCCTCCCCCAGAGCCAGAGTGCCCAGGCCCGCAGCTCAACACGGGGACAC
AGCTGGTCCTCCAGCATGTGCAGGCGCTGCTGGTCAAGAGATTCCAACACACCATCCGCAGCCACAAG
GACTTCCTGGCGCAGATCGTGCTCCCGGCTACCTTTGTGTTTTTGGCTCTGATGCTTTCTATTGTTAT
CCCTCCTTTTGGCGAATACCCCGCTTTGACCCTTCACCCCTGGATATATGGGCAGCAGTACACCTTCT
TCAGCATGGATGAACCAGGCAGTGAGCAGTTCACGGTACTTGCAGACGTCCTCCTGAATAAGCCAGGC
TTTGGCAACCGCTGCCTGAAGGAAGGGTGGCTTCCGGAGTACCCTGTGGCAACTCAACACCCTGGAA
GACTCCTTCTGTGTCCCCAAACATCACCCAGCTGTTCCAGAAGCAGAAATGGACACAGGTCAACCCTT
CACCATCCTGCAGGTGCAGCACCAGGGAGAAGCTCACCATGCTGCCAGAGTGCCCCGAGGGTGCCGGG
GGCCTCCCGCCCCCCAGAGAACACAGCGCAGCACGGAAATTCTACAAGACCTGACGGACAGGAACAT
CTCCGACTTCTTGGTAAAAACGTATCCTGCTCTTATAAGAAGCAGCTTAAAGAGCAAATTCTGGGTCA
ATGAACAGAGGTATGGAGGAATTTCCATTGGAGGAAAGCTCCCAGTCGTCCCCATCACGGGGGAAGCA
CTTGTTGGGTTTTTAAGCGACCTTGGCCGGATCATGAATGTGAGCGGGGCCCTATCACTAGAGAGGC
```

Figure 8 (cont')

```
CTCTAAAGAAATACCTGATTTCCTTAAACATCTAGAAACTGAAGACAACATTAAGGTGTGGTTTAATA
ACAAAGGCTGGCATGCCCTGGTCAGCTTTCTCAATGTGGCCCACAACGCCATCTTACGGGCCAGCCTG
CCTAAGGACAGGAGCCCCGAGGAGTATGGAATCACCGTCATTAGCCAACCCCTGAACCTGACCAAGGA
GCAGCTCTCAGAGATTACAGTGCTGACCACTTCAGTGGATGCTGTGGTTGCCATCTGCGTGATTTTCT
CCATGTCCTTCGTCCCAGCCAGCTTTGTCCTTTATTTGATCCAGGAGCGGGTGAACAAATCCAAGCAC
CTCCAGTTTATCAGTGGAGTGAGCCCCACCACCTACTGGGTGACCAACTTCCTCTGGGACATCATGAA
TTATTCCGTGAGTGCTGGGCTGGTGGTGGGCATCTTCATCGGGTTTCAGAAGAAAGCCTACACTTCTC
CAGAAAACCTTCCTGCCCTTGTGGCACTGCTCCTGCTGTATGGATGGGCGGTCATTCCCATGATGTAC
CCAGCATCCTTCCTGTTTGATGTCCCCAGCACAGCCTATGTGGCTTTATCTTGTGCTAATCTGTTCAT
CGGCATCAACAGCAGTGCTATTACCTTCATCTTGGAATTATTTGAGAATAACCGGACGCTGCTCAGGT
TCAACGCCGTGCTGAGGAAGCTGCTCATTGTCTTCCCCCACTTCTGCCTGGGCCGGGGCCTCATTGAC
CTTGCACTGAGCCAGGCTGTGACAGATGTCTATGCCCGGTTTGGTGAGGAGCACTCTGCAAATCCGTT
CCACTGGGACCTGATTGGGAAGAACCTGTTTGCCATGGTGGTGGAAGGGGTGGTGTACTTCCTCCTGA
CCCTGCTGGTCCAGCGCCACTTCTTCCTCTCCCAATGGATTGCCGAGCCCACTAAGGAGCCCATTGTT
GATGAAGATGATGATGTGGCTGAAGAAAGACAAAGAATTATTACTGGTGGAAATAAAACTGACATCTT
AAGGCTACATGAACTAACCAAGATTTATCCAGGCACCTCCAGCCCAGCAGTGGACAGGCTGTGTGTCG
GAGTTCGCCCTGGAGAGTGCTTTGGCCTCCTGGGAGTGAATGGTGCCGGCAAAACAACCACATTCAAG
ATGCTCACTGGGGACACCACAGTGACCTCAGGGGATGCCACCGTAGCAGGCAAGAGTATTTTAACCAA
TATTTCTGAAGTCCATCAAAATATGGGCTACTGTCCTCAGTTTGATGCAATTGATGAGCTGCTCACAG
GACGAGAACATCTTTACCTTTATGCCCGGCTTCGAGGTGTACCAGCAGAAGAAATCGAAAAGGTTGCA
AACTGGAGTATTAAGAGCCTGGGCCTGACTGTCTACGCCGACTGCCTGGCTGGCACGTACAGTGGGGG
CAACAAGCGGAAACTCTCCACAGCCATCGCACTCATTGGCTGCCCACCGCTGGTGCTGCTGGATGAGC
CCACCACAGGGATGGACCCCCAGGCACGCCGCATGCTGTGGAACGTCATCGTGAGCATCATCAGAGAA
GGGAGGGCTGTGGTCCTCACATCCCACAGCATGGAAGAATGTGAGGCACTGTGTACCCGGCTGGCCAT
CATGGTAAAGGGCGCCTTTCGATGTATGGGCACCATTCAGCATCTCAAGTCCAAATTTGGAGATGGCT
ATATCGTCACAATGAAGATCAAATCCCCGAAGGACGACCTGCTTCCTGACCTGAACCCTGTGGAGCAG
TTCTTCCAGGGGAACTTCCCAGGCAGTGTGCAGAGGGAGAGGCACTACAACATGCTCCAGTTCCAGGT
CTCCTCCTCCTCCCTGGCGAGGATCTTCCAGCTCCTCCTCTCCCACAAGGACAGCCTGCTCATCGAGG
AGTACTCAGTCACACAGACCACACTGGACCAGGTGTTTGTAAATTTTGCTAAACAGCAGACTGAAAGT
CATGACCTCCCTCTGCACCCTCGAGCTGCTGGAGCCAGTCGACAAGCCCAGGACTGAgtcgacgcggc
CGCGCAGTGAAAAAAATGCTTTATTTGTGAAATTTGTGATGCTATTGCTTTATTTGTAACCATTATAA
GCTGCAATAAACAAGTTctcgagttaagggcgaattcccgattaggatcttcctagagcatggctacg
tagataagtagcatggcgggttaatcattaactacaAGGAACCCCTAGTGATGGAGTTGGCCACTCCC
TCTCTGCGCGCTCGCTCGCTCACTGAGGCCGGGCGACCAAAGGTCGCCCGACGCCCGGGCTTTGCCCG
GGCGGCCTCAGTGAGCGAGCGAGCGCGCAG
```

Figure 10
A
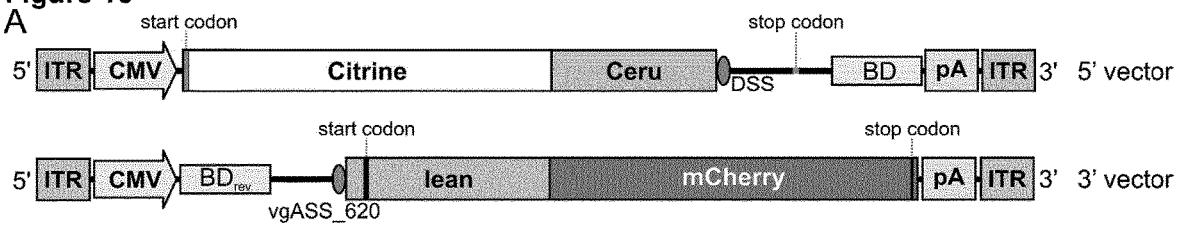
B
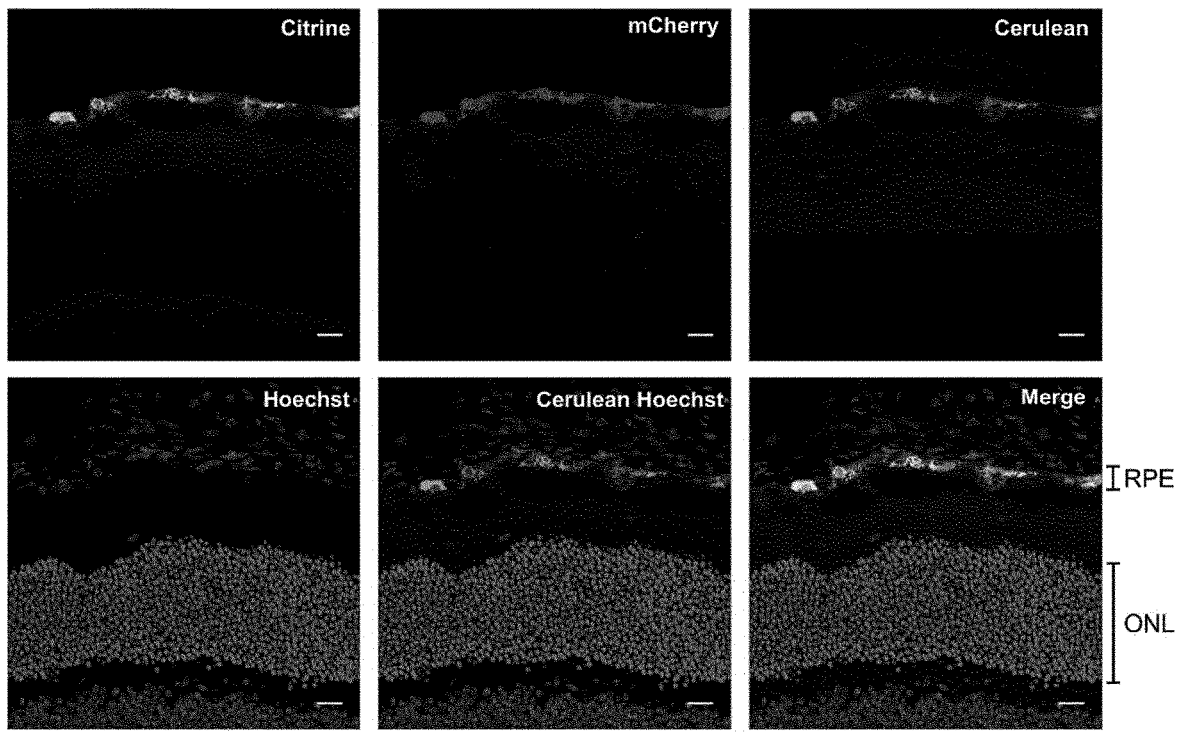
C
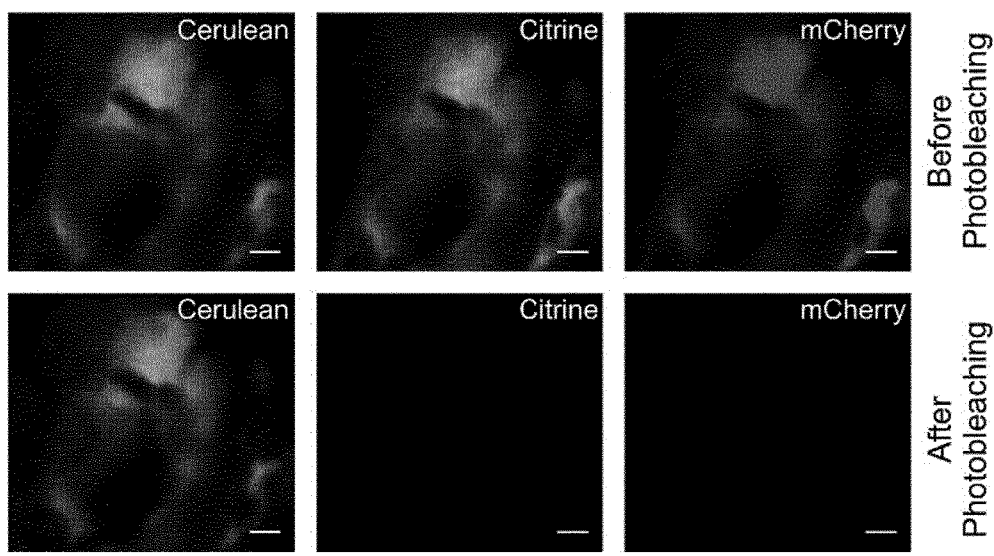

Figure 11
A
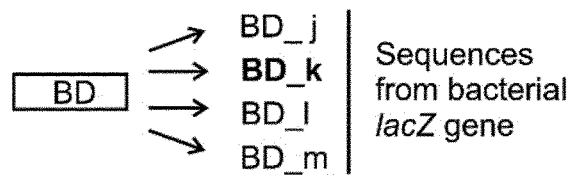
B
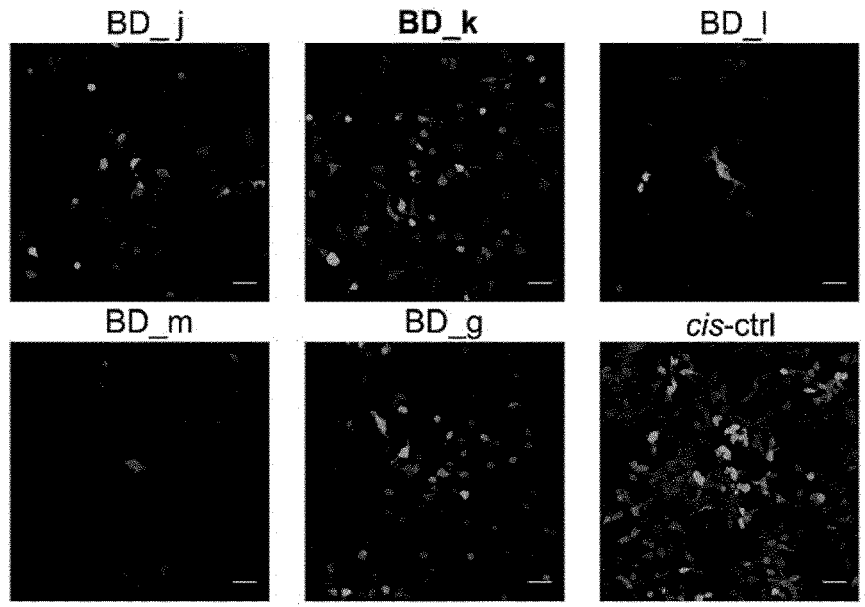
C
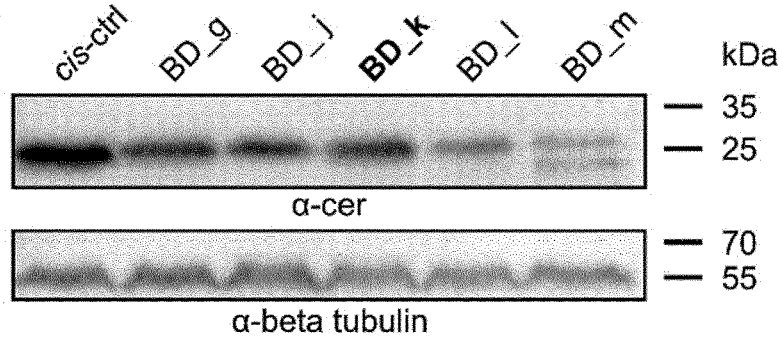
D
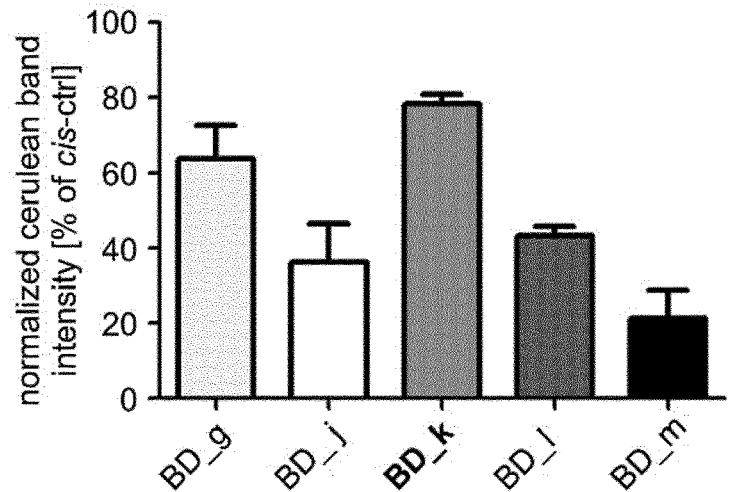

Figure 13
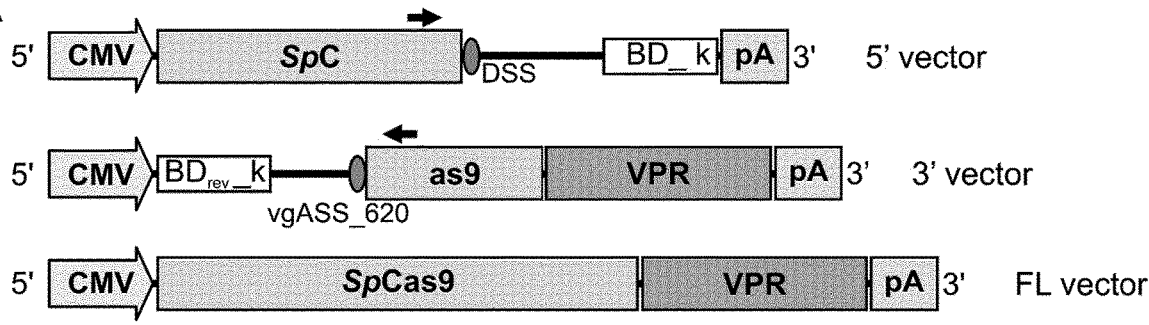
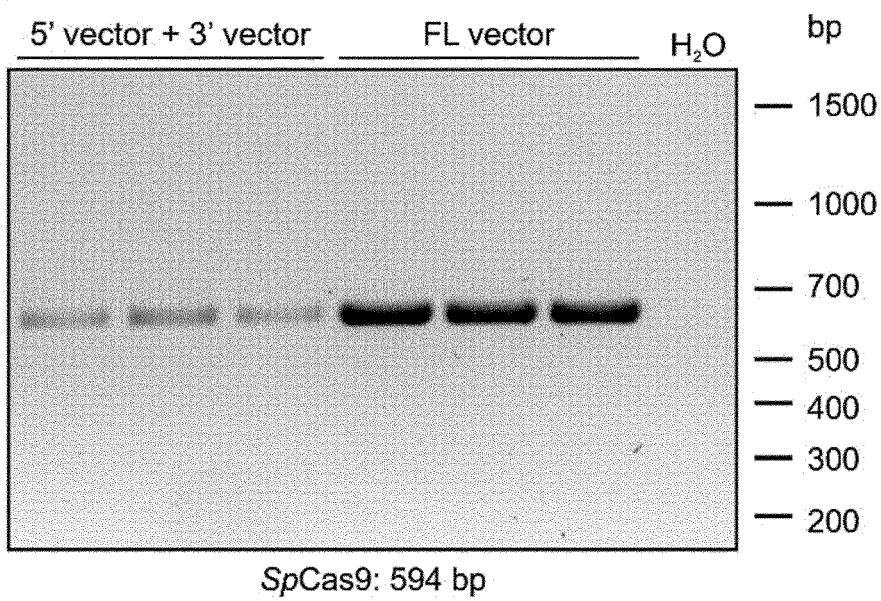
SpCas9: 594 bp
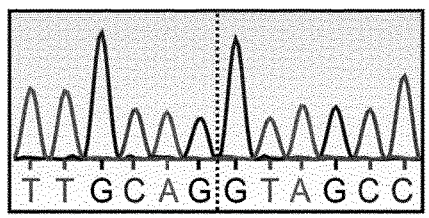
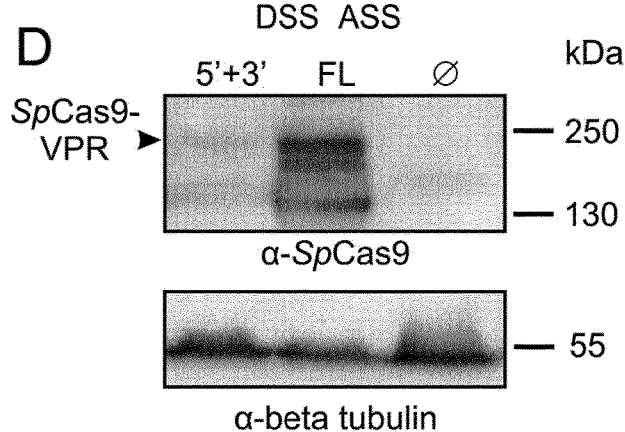

Figure 14
A
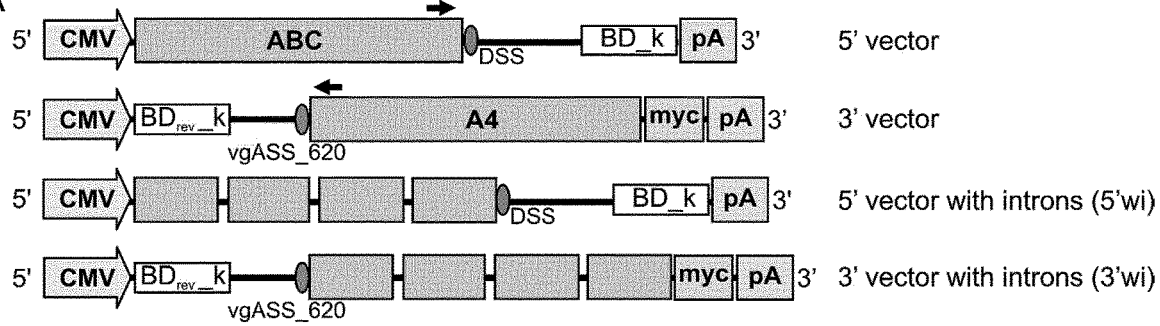
B
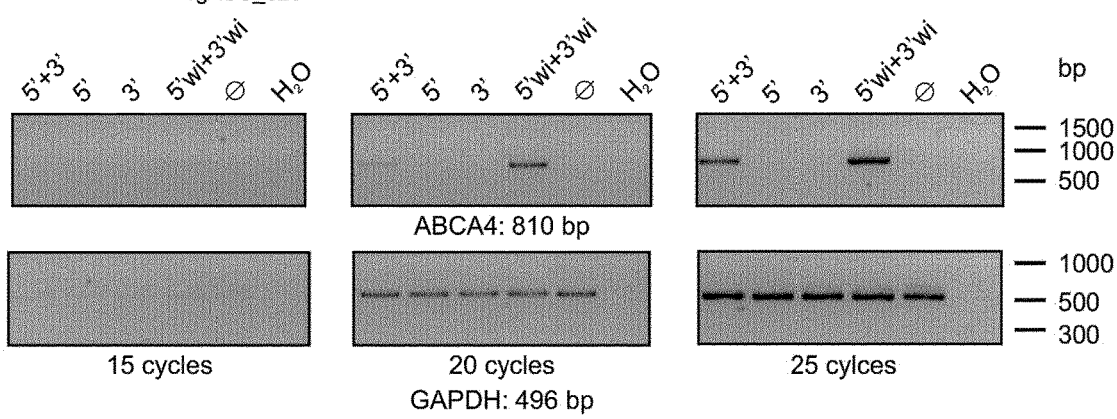
C
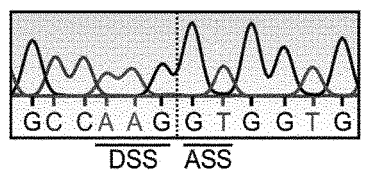

Figure 15 (cont')
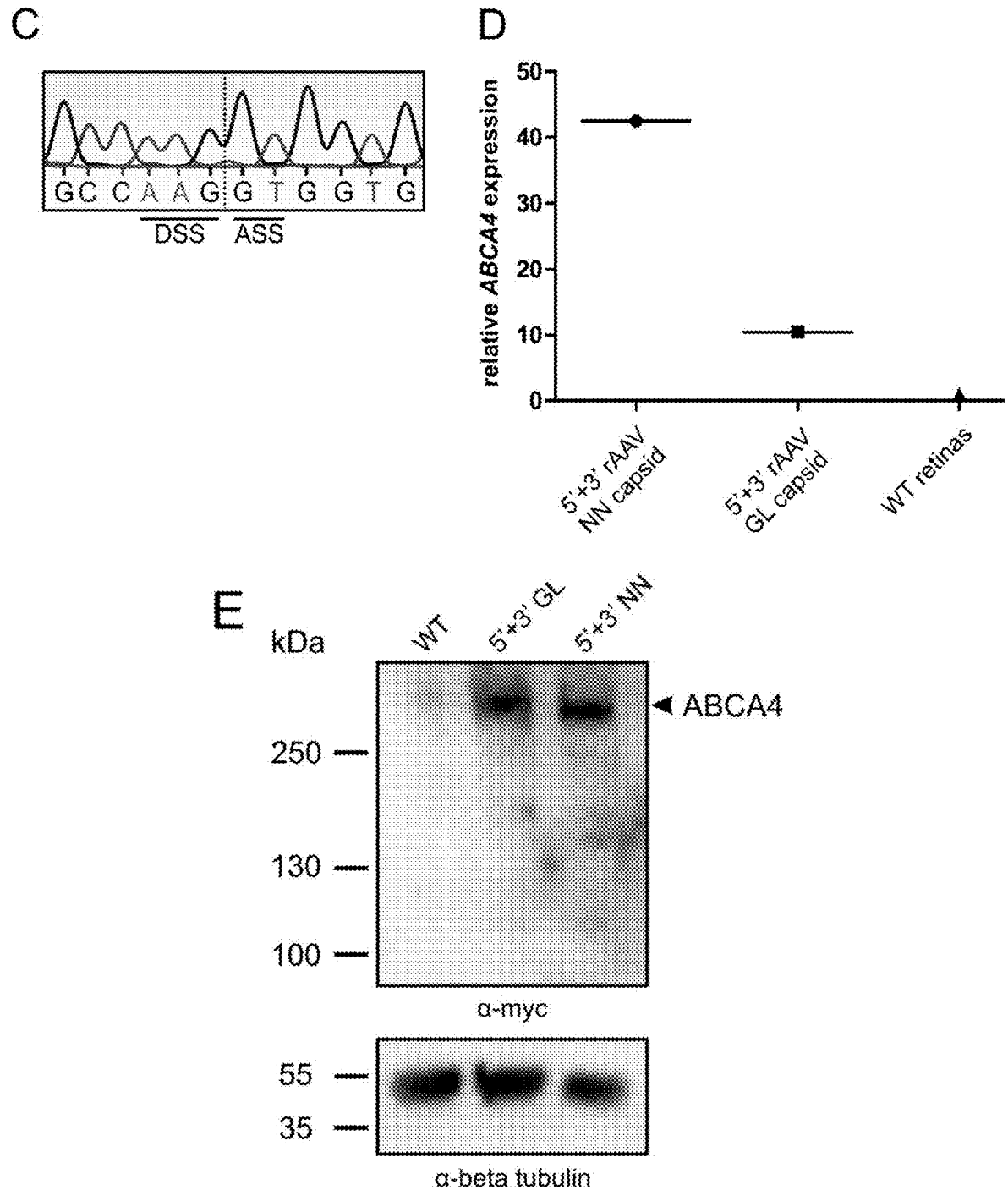

Figure 16

5' Cerulean + BD_g (SEQ ID NO: 35):

```
GACATTGATTATTGACTAGTTATTAATAGTAATCAATTACGGGGTCATTAGTTCATAGCCCA
TATATGGAGTTCCGCGTTACATAACTTACGGTAAATGGCCCGCCTGGCTGACCGCCCAACGA
CCCCCGCCCATTGACGTCAATAATGACGTATGTTCCCATAGTAACGCCAATAGGGACTTTCC
ATTGACGTCAATGGGTGGACTATTTACGGTAAACTGCCCACTTGGCAGTACATCAAGTGTAT
CATATGCCAAGTACGCCCCCTATTGACGTCAATGACGGTAAATGGCCCGCCTGGCATTATGC
CCAGTACATGACCTTATGGGACTTTCCTACTTGGCAGTACATCTACGTATTAGTCATCGCTA
TTACCATGGTGATGCGGTTTTGGCAGTACATCAATGGGCGTGGATAGCGGTTTGACTCACGG
GGATTTCCAAGTCTCCACCCCATTGACGTCAATGGGAGTTTGTTTTGGCACCAAAATCAACG
GGACTTTCCAAAATGTCGTAACAACTCCGCCCCATTGACGCAAATGGGCGGTAGGCGTGTAC
GGTGGGAGGTCTATATAAGCAGAGCTCTCTGGCTAACTAGAGAACCCACTGCTTACTGGCTT
ATCGAAATTAATACGACTCACTATAGGGAGACCCAAGCTGGCTAGTTAAGCTTATGGTGAGC
AAGGGCGAGGAGCTGTTCACCGGGGTGGTGCCCATCCTGGTCGAGCTGGACGGCGACGTAAA
CGGCCACAAGTTCAGCGTGTCCGGCGAGGGCGAGGGCGATGCCACCTACGGCAAGCTGACCC
TGAAGTTCATCTGCACCACAGGTAAGGGCACTGAGCAGAAGGGAAGAAGCTCCGGGGGCTCT
TTGTAGGGTGGATCCCCCTGCCTGTGAGGGACTTGGGAACAGCCAAGGTGGCTGCCGAGCTA
GCGAATTCCACCTGGCGCTGGCCCTTTCTGGGGCTTCACATTCCCTCCCTGGAACGGATCCC
TCGAGGTCACCCATTCGAACAAAAACTCATCTCAGAAGAGGATCTGAATATGCATACCGGTC
ATCATCACCATCACCATTGAGTTTAAACCCGCTGATCAGCCTCGACTGTGCCTTCTAGTTGC
CAGCCATCTGTTGTTTGCCCCTCCCCGTGCCTTCCTTGACCCTGGAAGGTGCCACTCCCAC
TGTCCTTTCCTAATAAAATGAGGAAATTGCATCGCATTGTCTGAGTAGGTGTCATTCTATTC
TGGGGGGTGGGGTGGGGCAGGACAGCAAGGGGGAGGATTGGGAAGACAATAGCAGGCATGCT
GGGGATGCGGTGGGCTCTATGG
```

Figure 17

3' Cerulean + BD_g (SEQ ID NO: 36):

GACATTGATTATTGACTAGTTATTAATAGTAATCAATTACGGGGTCATTAGTTCATAGCCCA
TATATGGAGTTCCGCGTTACATAACTTACGGTAAATGGCCCGCCTGGCTGACCGCCCAACGA
CCCCCGCCCATTGACGTCAATAATGACGTATGTTCCCATAGTAACGCCAATAGGGACTTTCC
ATTGACGTCAATGGGTGGACTATTTACGGTAAACTGCCCACTTGGCAGTACATCAAGTGTAT
CATATGCCAAGTACGCCCCCTATTGACGTCAATGACGGTAAATGGCCCGCCTGGCATTATGC
CCAGTACATGACCTTATGGGACTTTCCTACTTGGCAGTACATCTACGTATTAGTCATCGCTA
TTACCATGGTGATGCGGTTTTGGCAGTACATCAATGGGCGTGGATAGCGGTTTGACTCACGG
GGATTTCCAAGTCTCCACCCCATTGACGTCAATGGGAGTTTGTTTTGGCACCAAAATCAACG
GGACTTTCCAAAATGTCGTAACAACTCCGCCCCATTGACGCAAATGGGCGGTAGGCGTGTAC
GGTGGGAGGTCTATATAAGCAGAGCTCTCTGGCTAACTAGAGAACCCACTGCTTACTGGCTT
ATCGAAATTAATACGACTCACTATAGGGAGACCCAAGCTGGCTAGTTAAGCTTGGATCC*GTT*
*CCAGGGAGGGAATGTGAAGCCCCAGAAAGGGCCAGCGCCAGGTGGAATTCGCTAGCTCGGCA*
*GCCACCTTGGCTGTTCCCAAGTCCCTCACAGGCAGGGGGATCC*CAACGAGTCTTTTGTCATC
TACAGGTAAGCTGCCCGTGCCCTGGCCCACCCTCGTGACCACCCTGACCTGGGGCGTGCAGT
GCTTCGCCCGCTACCCCGACCACATGAAGCAGCACGACTTCTTCAAGTCCGCCATGCCCGAA
GGCTACGTCCAGGAGCGCACCATCTTCTTCAAGGACGACGGCAACTACAAGACCCGCGCCGA
GGTGAAGTTCGAGGGCGACACCCTGGTGAACCGCATCGAGCTGAAGGGCATCGACTTCAAGG
AGGACGGCAACATCCTGGGGCACAAGCTGGAGTACAACGCCATCAGCGACAACGTCTATATC
ACCGCCGACAAGCAGAAGAACGGCATCAAGGCCAACTTCAAGATCCGCCACAACATCGAGGA
CGGCAGCGTGCAGCTCGCCGACCACTACCAGCAGAACACCCCCATCGGCGACGGCCCCGTGC
TGCTGCCCGACAACCACTACCTGAGCACCCAGTCCAAGCTGAGCAAAGACCCCAACGAGAAG
CGCGATCACATGGTCCTGCTGGAGTTCGTGACCGCCGCCGGGATCACTCTCGGCATGGACGA
GCTGTACAAGTAACTCGAGGTCACCCATTCGAACAAAAACTCATCTCAGAAGAGGATCTGAA
TATGCATACCGGTCATCATCACCATCACCATTGAGTTTAAACCCGCTGATCAGCCTCGA<u>CTG</u>
<u>TGCCTTCTAGTTGCCAGCCATCTGTTGTTTGCCCCTCCCCCGTGCCTTCCTTGACCCTGGAA</u>
<u>GGTGCCACTCCCACTGTCCTTTCCTAATAAAATGAGGAAATTGCATCGCATTGTCTGAGTAG</u>
<u>GTGTCATTCTATTCTGGGGGGTGGGGTGGGGCAGGACAGCAAGGGGGAGGATTGGGAAGACA</u>
<u>ATAGCAGGCATGCTGGGGATGCGGTGGGCTCTATGG</u>

Figure 18

5'SpCas9-VPR + BD_k (SEQ ID NO: 37):

GACATTGATTATTGACTAGTTATTAATAGTAATCAATTACGGGGTCATTAGTTCATAGCCCA
TATATGGAGTTCCGCGTTACATAACTTACGGTAAATGGCCCGCCTGGCTGACCGCCCAACGA
CCCCCGCCCATTGACGTCAATAATGACGTATGTTCCCATAGTAACGCCAATAGGGACTTTCC
ATTGACGTCAATGGGTGGAGTATTTACGGTAAACTGCCCACTTGGCAGTACATCAAGTGTAT
CATATGCCAAGTACGCCCCCTATTGACGTCAATGACGGTAAATGGCCCGCCTGGCATTATGC
CCAGTACATGACCTTATGGGACTTTCCTACTTGGCAGTACATCTACGTATTAGTCATCGCTA
TTACCATGGTGATGCGGTTTTGGCAGTACATCAATGGGCGTGGATAGCGGTTTGACTCACGG
GGATTTCCAAGTCTCCACCCCATTGACGTCAATGGGAGTTTGTTTTGGCACCAAAAATCAACG
GGACTTTCCAAAATGTCGTAACAACTCCGCCCCATTGACGCAAATGGGCGGTAGGCGTGTAC
GGTGGGAGGTCTATATAAGCAGAGCTCGTTTAGTGAACCGTCAGAACCGGTCGACTAGAGGA
TCCATGGCCCCAAAGAAGAAGCGGAAGGTCGGTATCCACGGAGTCCCAGCAGCCGACAAGAA
GTACTCCATTGGGCTCGCTATCGGCACAAACAGCGTCGGCTGGGCCGTCATTACGGACGAGT
ACAAGGTGCCGAGCAAAAAATTCAAAGTTCTGGGCAATACCGATCGCCACAGCATAAAGAAG
AACCTCATTGGCGCCCTCCTGTTCGACTCCGGGGAAACGGCCGAAGCCACGCGGCTCAAAAG
AACAGCACGGCGCAGATATACCCGCAGAAGAATCGGATCTGCTACCTGCAGGAGATCTTTA
GTAATGAGATGGCTAAGGTGGATGACTCTTTCTTCCATAGGCTGGAGGAGTCCTTTTTGGTG
GAGGAGGATAAAAAGCACGAGCGCCACCCAATCTTTGGCAATATCGTGGACGAGGTGGCGTA
CCATGAAAAGTACCCAACCATATATCATCTGAGGAAGAAGCTTGTAGACAGTACTGATAAGG
CTGACTTGCGGTTGATCTATCTCGCGCTGGCGCATATGATCAAATTTCGGGGACACTTCCTC
ATCGAGGGGACCTGAACCCAGACAACAGCGATGTCGACAAACTCTTTATCCAACTGGTTCA
GACTTACAATCAGCTTTTCGAAGAGAACCCGATCAACGCATCCGGAGTTGACGCCAAAGCAA
TCCTGAGCGCTAGGCTGTCCAAATCCCGGCGGCTCGAAAACCTCATCGCACAGCTCCCTGGG
GAGAAGAAGAACGGCCTGTTTGGTAATCTTATCGCCCTGTCACTCGGGCTGACCCCCAACTT
TAAATCTAACTTCGACCTGGCCGAAGATGCCAAGCTTCAACTGAGCAAAGACACCTACGATG
ATGATCTCGACAATCTGCTGGCCCAGATCGGCGACCAGTACGCAGACCTTTTTTGGCGGCA
AAGAACCTGTCAGACGCCATTCTGCTGAGTGATATTCTGCGAGTGAACACGGAGATCACCAA
AGCTCCGCTGAGCGCTAGTATGATCAAGCGCTATGATGAGCACCACCAAGACTTGACTTTGC
TGAAGGCCCTTGTCAGACAGCAACTGCCTGAGAAGTACAAGGAAATTTTCTTCGATCAGTCT
AAAAATGGCTACGCCGGATACATTGACGGCGGAGCAAGCCAGGAGGAATTTTACAAATTTAT
TAAGCCCATCTTGGAAAAAATGGACGGCACCGAGGAGCTGCTGGTAAAGCTTAACAGAGAAG
ATCTGTTGCGCAAACAGCGCACTTTCGACAATGGAAGCATCCCCACCAGATTCACCTGGGC
GAACTGCACGCTATCCTCAGGCGGCAAGAGGATTTCTACCCCTTTTTGAAAGATAACAGGGA
AAAGATTGAGAAAATCCTCACATTTCGGATACCCTACTATGTAGGCCCCCTCGCCCGGGGAA
ATTCCAGATTCGCGTGGATGACTCGCAAATCAGAAGAGACCATCACTCCCTGGAACTTCGAG
GAAGTCGTGGATAAGGGGCCTCTGCCCAGTCCTTCATCGAAAGGATGACTAACTTTGATAA
AAATCTGCCTAACGAAAAGGTGCTTCCTAAACACTCTCTGCTGTACGAGTACTTCACAGTTT
ATAACGAGCTCACCAAGGTCAAATACGTCACAGAAGGGATGAGAAAGCCAGCATTCCTGTCT
GGAGAGCAGAAGAAAGCTATCGTGGACCTCCTCTTCAAGACGAACCGGAAAGTTACCGTGAA
ACAGCTCAAAGAAGACTATTTCAAAAAGATTGAATGTTTCGACTCTGTTGAAATCAGCGGAG
TGGAGGATCGCTTCAACGCATCCCTGGGAACGTATCACGATCTCCTGAAAATCATTAAAGAC
AAGGACTTCCTGGACAATGAGGAGAACGAGGACATTCTTGAGGACATTGTCCTCACCCTTAC

Figure 18 (cont')

GTTGTTTGAAGATAGGGAGATGATTGAAGAACGCTTGAAAACTTACGCTCATCTCTTCGACG
ACAAAGTCATGAAACAGCTCAAGAGGCGCCGATATACAGGATGGGGGCGGCTGTCAAGAAAA
CTGATCAATGGGATCCGAGACAAGCAGAGTGGAAAGACAATCCTGGATTTTCTTAAGTCCGA
TGGATTTGCCAACCGGAACTTCATGCAGTTGATCCATGATGACTCTCTCACCTTTAAGGAGG
ACATCCAGAAAGCACAAGTTTCTGGCCAGGGGACAGTCTTCACGAGCACATCGCTAATCTT
GCAGGTAAGGGCACTGAGCAGAAGGGAAGAAGCTCCGGGGGCTCTTTGTAGGGTGCGGCCGC
AGTGCATCAAGGCGATCACATCAGTGAAAAAAGCCAGACAGGCGGTTAAACCAACGCAGAT
TAAACAGCAGGATGCAAAAATTCGCAGGTGGTCAGATGGCGGCCGCTCTAGACTCGATGAGT
TTGGACAAACCACAACTAGAATGCAGTGAAAAAAATGCTTTATTTGTGAAATTTGTGATGCT
ATTGCTTTATTTGTAACCATTATAAGCTGCAATAAACAAGTT

Figure 19

**3'*Sp*Cas9-VPR + BD_k (SEQ ID NO: 38):**

GACATTGATTATTGACTAGTTATTAATAGTAATCAATTACGGGGTCATTAGTTCATAGCCCA
TATATGGAGTTCCGCGTTACATAACTTACGGTAAATGGCCCGCCTGGCTGACCGCCCAACGA
CCCCCGCCCATTGACGTCAATAATGACGTATGTTCCCATAGTAACGCCAATAGGGACTTTCC
ATTGACGTCAATGGGTGGAGTATTTACGGTAAACTGCCCACTTGGCAGTACATCAAGTGTAT
CATATGCCAAGTACGCCCCCTATTGACGTCAATGACGGTAAATGGCCCGCCTGGCATTATGC
CCAGTACATGACCTTATGGGACTTTCCTACTTGGCAGTACATCTACGTATTAGTCATCGCTA
TTACCATGGTGATGCGGTTTTGGCAGTACATCAATGGGCGTGGATAGCGGTTTGACTCACGG
GGATTTCCAAGTCTCCACCCCATTGACGTCAATGGGAGTTTGTTTTGGCACCAAAATCAACG
GGACTTTCCAAAATGTCGTAACAACTCCGCCCCATTGACGCAAATGGGCGGTAGGCGTGTAC
GGTGGGAGGTCTATATAAGCAGAGCTCGTTTAGTGAACCGTCAGAGGTACCACCGGTCGACT
AGAGGATCCCGGCCGC*CATCTGACCACCTGCAATTTTTGCATCCTGCTGTTTAATCTGCGT*
*TGGTTTAACCGCCTGTCTGGCTTTTTTTCACTGATGTGATCGCCTTGATGCACTCGGCCGCC*
AACGAGTCTTTTGTCATCTACAGGTAGCCCAGCTATCAAAAGGGAATACTGCAGACCGTTA
AGGTCGTGGATGAACTCGTCAAAGTAATGGGAAGGCATAAGCCCGAGAATATCGTTATCGAG
ATGGCCCGAGAGAACCAAACTACCCAGAAGGGACAGAAGAACAGTAGGGAAAGGATGAAGAG
GATTGAAGAGGGTATAAAAGAACTGGGGTCCCAAATCCTTAAGGAACACCCAGTTGAAAACA
CCCAGCTTCAGAATGAGAAGCTCTACCTGTACTACCTGCAGAACGGCAGGGACATGTACGTG
GATCAGGAACTGGACATCAATCGGCTCTCCGACTACGACGTGGATCATATCGTGCCCCAGTC
TTTTCTCAAAGATGATTCTATTGATAATAAAGTGTTGACAAGATCCGATAAAAATAGAGGGA
AGAGTGATAACGTCCCCTCAGAAGAAGTTGTCAAGAAAATGAAAAATTATTGGCGGCAGCTG
CTGAACGCCAAACTGATCACACAACGGAAGTTCGATAATCTGACTAAGGCTGAACGAGGTGG
CCTGTCTGAGTTGGATAAAGCCGGCTTCATCAAAAGGCAGCTTGTTGAGACACGCCAGATCA
CCAAGCACGTGGCCCAAATTCTCGATTCACGCATGAACACCAAGTACGATGAAAATGACAAA
CTGATTCGAGAGGTGAAAGTTATTACTCTGAAGTCTAAGCTGGTcTCAGATTTCAGAAAGGA
CTTTCAGTTTTATAAGGTGAGAGAGATCAACAATTACCACCATGCGCATGATGCCTACCTGA
ATGCAGTGGTAGGCACTGCACTTATCAAAAAATATCCCAAGCTTGAATCTGAATTTGTTTAC
GGAGACTATAAAGTGTACGATGTTAGGAAATGATCGCAAAGTCTGAGCAGGAAATAGGCAA
GGCCACCGCTAAGTACTTCTTTTACAGCAATATTATGAATTTTTTCAAGACCGAGATTACAC
TGGCCAATGGAGAGATTCGGAAGCGACCACTTATCGAAACAAACGGAGAAACAGGAGAAATC
GTGTGGGACAAGGGTAGGGATTTCGCGACAGTCCGGAAGGTCCTGTCCATGCCGCAGGTGAA
CATCGTTAAAAAGACCGAAGTACAGACCGGAGGCTTCTCCAAGGAAAGTATCCTCCCGAAAA
GGAACAGCGACAAGCTGATCGCACGCAAAAAGATTGGGACCCCAAGAAATACGGCGGATTC
GATTCTCCTACAGTCGCTTACAGTGTACTGGTTGTGGCCAAAGTGGAGAAAGGGAAGTCTAA
AAAACTCAAAAGCGTCAAGGAACTGCTGGGCATCACAATCATGGAGCGATCAAGCTTCGAAA
AAAACCCCATCGACTTTCTCGAGGCGAAAGGATATAAAGAGGTCAAAAAAGACCTCATCATT

Figure 19 (cont')

AAGCTTCCCAAGTACTCTCTCTTTGAGCTTGAAAACGGCCGGAAACGAATGCTCGCTAGTGC
GGGCGAGCTGCAGAAAGGTAACGAGCTGGCACTGCCCTCTAAATACGTTAATTTCTTGTATC
TGGCCAGCCACTATGAAAAGCTCAAAGGGTCtCCCGAAGATAATGAGCAGAAGCAGCTGTTC
GTGGAACAACACAAACACTACCTTGATGAGATCATCGAGCAAATAAGCGAATTCTCCAAAAG
AGTGATCCTCGCCGACGCTAACCTCGATAAGGTGCTTTCTGCTTACAATAAGCACAGGGATA
AGCCCATCAGGGAGCAGGCAGAAAACATTATCCACTTGTTTACTCTGACCAACTTGGGCGCG
CCTGCAGCCTTCAAGTACTTCGACACCACCATAGACAGAAAGCGGTACACCTCTACAAAGGA
GGTCCTGGACGCCACACTGATTCATCAGTCAATTACGGGGCTCTATGAAACAAGAATCGACC
TCTCTCAGCTCGGTGGAGACAGCAGGGCTGACCCCAAGAAGAAGAGGAAGGTGTCGCCAGGG
ATCCGTCGACTTGACGCGTTGATATCAACAAGTTTGTACAAAAAAGCAGGCTACAAAGAGGC
CAGCGGTTCCGGACGGGCTGACGCATTGGACGATTTTGATCTGGATATGCTGGGAAGTGACG
CCCTCGATGATTTTGACCTTGACATGCTTGGTTCGGATGCCCTTGATGACTTTGACCTCGAC
ATGCTCGGCAGTGACGCCCTTGATGATTTCGACCTGGACATGCTGATTAACTCTAGAAGTTC
CGGATCTCCGAAAAAGAAACGCAAAGTTGGTAGCCAGTACCTGCCCGACACCGACGACCGGC
ACCGGATCGAGGAAAAGCGGAAGCGGACCTACGAGACATTCAAGAGCATCATGAAGAAGTCC
CCCTTCAGCGGCCCCACCGACCCTAGACCTCCACCTAGAAGAATCGCCGTGCCCAGCAGATC
CAGCGCCAGCGTGCCAAAACCTGCCCCCAGCCTTACCCCTTCACCAGCAGCCTGAGCACCA
TCAACTACGACGAGTTCCCTACCATGGTGTTCCCCAGCGGCCAGATCTCTCAGGCCTCTGCT
CTGGCTCCAGCCCCTCCTCAGGTGCTGCCTCAGGCTCCTGCTCCTGCACCAGCTCCAGCCAT
GGTGTCTGCACTGGCTCAGGCACCAGCACCCGTGCCTGTGCTGGCTCCTGGACCTCCACAGG
CTGTGGCTCCACCAGCCCCTAAACCTACACAGGCCGGCGAGGGCACACTGTCTGAAGCTCTG
CTGCAGCTGCAGTTCGACGACGAGGATCTGGGAGCCCTGCTGGGAAACAGCACCGATCCTGC
CGTGTTCACCGACCTGGCCAGCGTGGACAACAGCGAGTTCCAGCAGCTGCTGAACCAGGGCA
TCCCTGTGGCCCCTCACACCACCGAGCCCATGCTGATGGAATACCCCGAGGCCATCACCCGG
CTCGTGACAGGCGCTCAGAGGCCTCCTGATCCAGCTCCTGCCCCTCTGGGAGCACCAGGCCT
GCCTAATGGACTGCTGTCTGGCGACGAGGACTTCAGCTCTATCGCCGATATGGATTTCTCAG
CCTTGCTGGGCTCTGGCAGCGGCAGCCGGGATTCCAGGGAAGGGATGTTTTTGCCGAAGCCT
GAGGCCGGCTCCGCTATTAGTGACGTGTTTGAGGGCCGCGAGGTGTGCCAGCCAAAACGAAT
CCGGCCATTTCATCCTCCAGGAAGTCCATGGGCCAACCGCCCACTCCCCGCCAGCCTCGCAC
CAACACCAACCGGTCCAGTACATGAGCCAGTCGGGTCACTGACCCCGGCACCAGTCCCTCAG
CCACTGGATCCAGCGCCCGCAGTGACTCCCGAGGCCAGTCACCTGTTGGAGGATCCCGATGA
AGAGACGAGCCAGGCTGTCAAAGCCCTTCGGGAGATGGCCGATACTGTGATTCCCCAGAAGG
AAGAGGCTGCAATCTGTGGCCAAATGGACCTTTCCCATCCGCCCCAAGGGGCCATCTGGAT
GAGCTGACAACCACACTTGAGTCCATGACCGAGGATCTGAACCTGGACTCACCCCTGACCCC
GGAATTGAACGAGATTCTGGATACCTTCCTGAACGACGAGTGCCTCTTGCATGCCATGCATA
TCAGCACAGGACTGTCCATCTTCGACACATCTCTGTTTtgaCAATAAAATATCTTTATTTTC
ATTACATCTGTGTGTTGGTTTTTTTGTGT

Figure 20

Dual AAV vector comprising 5'ABCA4 with introns (SEQ ID NO: 39):

CTGCGCGCTCGCTCGCTCACTGAGGCCGCCCGGGCAAAGCCCGGGCGTCGGGCGACCTTTGG
TCGCCCGGCCTCAGTGAGCGAGCGAGCGCGCAGAGAGGGAGTGGCCAACTCCATCACTAGGG
GTTCCTtgtagttaatgattaacccgccatgctacttatctacgtagccatgctctaggaag
atcggaattcgcccttaagggcgcgccgtttaaatagctagcGACATTGATTATTGACTAGT
TATTAATAGTAATCAATTACGGGGTCATTAGTTCATAGCCCATATATGGAGTTCCGCGTTAC
ATAACTTACGGTAAATGGCCCGCCTGGCTGACCGCCCAACGACCCCCGCCCATTGACGTCAA
TAATGACGTATGTTCCCATAGTAACGCCAATAGGGACTTTCCATTGACGTCAATGGGTGGAG
TATTTACGGTAAACTGCCCACTTGGCAGTACATCAAGTGTATCATATGCCAAGTACGCCCCC
TATTGACGTCAATGACGGTAAATGGCCCGCCTGGCATTATGCCCAGTACATGACCTTATGGG
ACTTTCCTACTTGGCAGTACATCTACGTATTAGTCATCGCTATTACCATGGTGATGCGGTTT
TGGCAGTACATCAATGGGCGTGGATAGCGGTTTGACTCACGGGGATTTCCAAGTCTCCACCC
CATTGACGTCAATGGGAGTTTGTTTTGGCACCAAAATCAACGGGACTTTCCAAAATGTCGTA
ACAACTCCGCCCCATTGACGCAAATGGGCGGTAGGCGTGTACGGTGGGAGGTCTATATAAGC
AGAGCTggtaccaccggtgccaccATGGGCTTCGTGAGACAGATACAGCTTTTGCTCTGGAA
GAACTGGACCCTGCGGAAAAGGCAAAAGATTCGCTTTGTGGTGGAACTCGTGTGGCCTTTAT
CTTTATTTCTGGTCTTGATCTGGTTAAGGAATGCCAACCCACTCTACAGCCATCATGAATGC
CATTTCCCCAACAAGGCGATGCCCTCAGCAGGAATGCTGCCGTGGCTCCAGGGGATCTTCTG
CAATGTGAACAATCCCTGTTTTCAAAGCCCCACCCCAGGAGAATCTCCTGGAATTGTGTCAA
ACTATAACAACTCCATCTTGGCAAGGGTATATCGAGATTTTCAAGAACTCCTCATGAATGCA
CCAGAGAGCCAGCACCTTGGCCGTATTTGGACAGAGCTACACATCTTGTCCCAATTCATGGA
CACCCTCCGGACTCACCCGGAGAGAATTGCAGGTAAGTGGCGACCGTGCCCACAGCCCTAG
CCGCCCTCCCCACTGCCCGGGCTTACCCTGGTCCTGCTCCCGCAGGAAGAGGAATACGAATA
AGGGATATCTTGAAAGATGAAGAAACACTGACACTATTTCTCATTAAAAACATCGGCCTGTC
TGACTCAGTGGTCTACCTTCTGATCAACTCTCAAGTCCGTCCAGAGCAGTTCGCTCATGGAG
TCCCGGACCTGGCGCTGAAGGACATCGCCTGCAGCGAGGCCCTCCTGGAGCGCTTCATCATC
TTCAGCCAGAGACGCGGGGCAAAGACGGTGCGCTATGCCCTGTGCTCCCTCTCCCAGGGCAC
CCTACAGTGGATAGAAGACACTCTGTATGCCAACGTGGACTTCTTCAAGCTCTTCCGTGTGC
TTCCCACACTCCTAGACAGCCGTTCTCAAGGTATCAATCTGAGATCTTGGGGAGGAATATTA
TCTGATATGTCACCAAGAATTCAAGAGTTTATCCATCGGCCGAGTATGCAGGACTTGCTGTG
GGTGACCAGGCCCCTCATGCAGAATGGTGGTCCAGAGACCTTTACAAAGCTGATGGGCATCC
TGTCTGACCTCCTGTGTGGCTACCCCGAGGGAGGTGGCTCTCGGGTGCTCTCCTTCAACTGG
TATGAAGACAATAACTATAAGGCCTTTCTGGGGATTGACTCCACAAGGAAGGATCCTATCTA
TTCTTATGACAGAAGAACAACATCCTTTTGTAATGCATTGATCCAGAGCCTGGAGTCAAATC
CTTTAACCAAAATCGCTTGGAGGGCGGCAAAGCCTTTGCTGATGGGAAAAATCCTGTACACT
CCTGATTCACCTGCAGCACGAAGGATACTGAAGAATGCCAACTCAACTTTTGAAGAACTGGA
ACACGTTAGGAAGTTGGTCAAAGCCTGGGAAGAAGTAGGGCCCCAGATCTGGTACTTCTTTG

Figure 20 (cont')

```
ACAACAGCACACAGATGAACATGATCAGAGATACCCTGGGGAACCCAACAGTAAAAGACTTT
TTGAATAGGCAGCTTGGTGAAGAAGGTATTACTGCTGAAGCCATCCTAAACTTCCTCTACAA
GGGCCCTCGGGAAAGCCAGGCTGACGACATGGCCAACTTCGACTGGAGGGACATATTTAACA
TCACTGATCGCACCCTCCGCCTGGTCAATCAATACCTGGAGTGCTTGGTCCTGGATAAGTTT
GAAAGCTACAATGATGAAACTCAGCTCACCCAACGTGCCCTCTCTCTACTGGAGGAAAACAT
GTTCTGGGCCGGAGTGGTATTCCCTGACATGTATCCCTGGACCAGCTCTCTACCACCCCACG
TGAAGTATAAGATCCGAATGGACATAGACGTGGTGGAGAAAACCAATAAGATTAAAGACAGG
TGAGTGGACTGGAGCCTGGGCACGAGGTGTGGGGTGGCCCCTGCCCTGCCACTTACACCACC
TGCCTCTTCCTGCAGGTATTGGGATTCTGGTCCCAGAGCTGATCCCGTGGAAGATTTCCGGT
ACATCTGGGGCGGGTTTGCCTATCTGCAGGACATGGTTGAACAGGGGATCACAAGGAGCCAG
GTGCAGGCGGAGGCTCCAGTTGGAATCTACCTCCAGCAGATGCCCTACCCCTGCTTCGTGGA
CGATTCTTTCATGATCATCCTGAACCGCTGTTTCCCTATCTTCATGGTGCTGGCATGGATCT
ACTCTGTCTCCATGACTGTGAAGAGCATCGTCTTGGAGAAGGAGTTGCGACTGAAGGAGACC
TTGAAAAATCAGGGTGTCTCCAATGCAGTGATTTGGTGTACCTGGTTCCTGGACAGCTTCTC
CATCATGTCGATGAGCATCTTCCTCCTGACGATATTCATCATGCATGGAAGAATCCTACATT
ACAGCGACCCATTCATCCTCTTCCTGTTCTTGTTGGCTTTCTCCACTGCCACCATCATGCTG
TGCTTTCTGCTCAGCACCTTCTTCTCCAAGGCCAGTCTGGCAGCAGCCTGTAGTGGTGTCAT
CTATTTCACCCTCTACCTGCCACACATCCTGTGCTTCGCCTGGCAGGACCGCATGACCGCTG
AGCTGAAGAAGGCTGTGAGCTTACTGTCTCCGGTGGCATTTGGATTTGGCACTGAGTACCTG
GTTCGCTTTGAAGAGCAAGGCCTGGGGCTGCAGTGGAGCAACATCGGGAACAGTCCCACGGA
AGGGGACGAATTCAGCTTCCTGCTGTCCATGCAGATGATGCTCCTTGATGCTGCTGTCTATG
GCTTACTCGCTTGGTACCTTGATCAGGTGTTTCCAGGAGACTATGGAACCCCACTTCCTTGG
TACTTTCTTCTACAAGAGTCGTATTGGCTTGGCGGTGAAGGTAAGTAGTCTGATTATACACA
AGATATTGTCTAGAACTTGATGAGACTGTGGATATGAATATTTCACTCTTTTCTCAGGGTGT
TCAACCAGAGAAGAAAGAGCCCTGGAAAAGACCGAGCCCCTAACAGAGGAAACGGAGGATCC
AGAGCACCCAGAAGGAATACACGACTCCTTCTTTGAACGTGAGCATCCAGGGTGGGTTCCTG
GGGTATGCGTGAAGAATCTGGTAAAGATTTTTGAGCCCTGTGGCCGGCCAGCTGTGGACCGT
CTGAACATCACCTTCTACGAGAACCAGATCACCGCATTCCTGGGCCACAATGGAGCTGGGAA
AACCACCACCTTGTCCATCCTGACGGGTCTGTTGCCACCAACCTCTGGGACTGTGCTCGTTG
GGGGAAGGGACATTGAAACCAGCCTGGATGCAGTCCGGCAGAGCCTTGGCATGTGTCCACAG
CACAACATCCTGTTCCACCACCTCACGGTGGCTGAGCACATGCTGTTCTATGCCCAGCTGAA
AGGAAAGTCCCAGGAGGAGGCCCAGCTGGAGATGGAAGCCATGTTGGAGGACACAGGCCTCC
ACCACAAGCGGAATGAAGAGGCTCAGGACCTATCAGGTGGCATGCAGAGAAAGCTGTCGGTT
GCCATTGCCTTTGTGGGAGATGCCAAGgtaagggcactgagcagaagggaagaagctccggg
ggctctttgtagggtaagcttAGTGCATCAAGGCGATCACATCAGTGAAAAAAAGCCAGACA
GGCGGTTAAACCAACGCAGATTAAACAGCAGGATGCAAAAATTCGCAGGTGGTCAGATGaag
cttattgtcgag
```

Figure 20 (cont')

[shaded]ctcgagttaagggcgaattcccgattagga
tcttcctagagcatggctacgtagataagtagcatggcgggttaatcattaactacaAGGAA
CCCCTAGTGATGGAGTTGGCCACTCCCTCTCTGCGCGCTCGCTCGCTCACTGAGGCCGGGCG
ACCAAAGGTCGCCCGACGCCCGGGCTTTGCCCGGGCGGCCTCAGTGAGCGAGCGAGCGCGCA
G

Figure 21

Dual AAV vector comprising 3'ABCA4 with introns (SEQ ID NO: 40):

CTGCGCGCTCGCTCGCTCACTGAGGCCGCCCGGGCAAAGCCCGGGCGTCGGGCGACCTTTGG
TCGCCCGGCCTCAGTGAGCGAGCGAGCGCGCAGAGAGGGAGTGGCCAACTCCATCACTAGGG
GTTCCTtgtagttaatgattaacccgccatgctacttatctacgtagccatgctctaggaag
atcggaattcgcccttaagggcgcgccgtttaaatagctagcGACATTGATTATTGACTAGT
TATTAATAGTAATCAATTACGGGGTCATTAGTTCATAGCCCATATATGGAGTTCCGCGTTAC
ATAACTTACGGTAAATGGCCCGCCTGGCTGACCGCCCAACGACCCCCGCCCATTGACGTCAA
TAATGACGTATGTTCCCATAGTAACGCCAATAGGGACTTTCCATTGACGTCAATGGGTGGAG
TATTTACGGTAAACTGCCCACTTGGCAGTACATCAAGTGTATCATATGCCAAGTACGCCCCC
TATTGACGTCAATGACGGTAAATGGCCCGCCTGGCATTATGCCCAGTACATGACCTTATGGG
ACTTTCCTACTTGGCAGTACATCTACGTATTAGTCATCGCTATTACCATGGTGATGCGGTTT
TGGCAGTACATCAATGGGCGTGGATAGCGGTTTGACTCACGGGGATTTCCAAGTCTCCACCC
CATTGACGTCAATGGGAGTTTGTTTTGGCACCAAAATCAACGGGACTTTCCAAAATGTCGTA
ACAACTCCGCCCCATTGACGCAAATGGGCGGTAGGCGTGTACGGTGGGAGGTCTATATAAGC
AGAGCTggtaccaccggtagaaagcttCATCTGACCACCTGCGAATTTTTGCATCCTGCTGT
TTAATCTGCGTTGGTTTAACCGCCTGTCTGGCTTTTTTTCACTGATGTGATCGCCTTGATGC
ACTaagctt *CAACGAGTCTTTTGTCATCTACAGGTGGTGATTCTGGACGAACCCACCTCTGG*
GGTGGACCCTTACTCGAGACGCTCAATCTGGGATCTGCTCCTGAAGTATCGCTCAGGCAGAA
CCATCATCATGTCCACTCACCACATGGACGAGGCCGACCTCCTTGGGGACCGCATTGCCATC
ATTGCCCAGGGAAGGCTCTACTGCTCAGGCACCCCACTCTTCCTGAAGAACTGCTTTGGCAC
AGGCTTGTACTTAACCTTGGTGCGCAAGATGAAAAACATCCAGAGCCAAAGGAAAGGCAGTG
AGGTGAGTCAGGCTGGGCGCCCCGCCCCCAGGGGCCCTCCCTCCCCAAGCCCCCCGGACGC
GCCTCACCCACGTTCCTCTCGCAGGGGACCTGCAGCTGCTCGTCTAAGGGTTTCTCCACCAC
GTGTCCAGCCCACGTCGATGACCTAACTCCAGAACAAGTCCTGGATGGGGATGTAAATGAGC
TGATGGATGTAGTTCTCCACCATGTTCCAGAGGCAAAGCTGGTGGAGTGCATTGGTCAAGAA
CTTATCTTCCTTCTTCCAAATAAGAACTTCAAGCACAGAGCATATGCCAGCCTTTTCAGAGA
GCTGGAGGAGACGCTGGCTGACCTTGGTCTCAGCAGTTTTGGAATTTCTGACACTCCCCTGG
AAGAGATTTTTCTGAAGGTCACGGAGGATTCTGATTCAGGACCTCTGTTTGCGGGTGGCGCT
CAGCAGAAAAGAGAAAACGTCAACCCCCGACACCCCTGCTTGGGTCCCAGAGAGAAGGCTGG
ACAGACACCCCAGGACTCCAATGTCTGCTCCCCAGGGGCGCCGGCTGCTCACCCAGAGGGCC
AGCCTCCCCCAGAGCCAGAGTGCCCAGGCCCGCAGCTCAACACGGGGACACAGCTGGTCCTC
CAGCATGTGCAGGCGCTGCTGGTCAAGAGATTCCAACACACCATCCGCAGCCACAAGGACTT
CCTGGCGCAGATCGTGCTCCCGGCTACCTTTGTGTTTTGGCTCTGATGCTTTCTATTGTTA
TCCCTCCTTTTGGCGAATACCCCGCTTTGACCCTTCACCCCTGGATATATGGGCAGCAGTAC
ACCTTCTTCAGCATGGATGAACCAGGCAGTGAGCAGTTCACGGTACTTGCAGACGTCCTCCT
GAATAAGCCAGGCTTTGGCAACCGCTGCCTGAAGGAAGGGTGGCTTCCGGAGTACCCCTGTG
GCAACTCAACACCCTGGAAGACTCCTTCTGTGTCCCCAAACATCACCCAGCTGTTCCAGAAG

Figure 21 (cont')

```
CAGAAATGGACACAGGTCAACCCTTCACCATCCTGCAGGTGCAGCACCAGGGAGAAGCTCAC
CATGCTGCCAGAGTGCCCCGAGGGTGCCGGGGGCCTCCCGCCCCCCAGAGAACACAGCGCA
GCACGGAAATTCTACAAGACCTGACGGACAGGAACATCTCCGACTTCTTGGTAAAAACGTAT
CCTGCTCTTATAAGAAGCAGCTTAAAGAGCAAATTCTGGGTCAATGAACAGAGGTATGGAGG
AATTTCCATTGGAGGAAAGCTCCCAGTCGTCCCCATCACGGGGAAGCACTTGTTGGGTTTT
TAAGCGACCTTGGCCGGATCATGAATGTGAGCGGGGCCCTATCACTAGAGAGGCCTCTAAA
GAAATACCTGATTTCCTTAAACATCTAGAAACTGAAGACAACATTAAGGTGTGGTTTAATAA
CAAAGGCTGGCATGCCCTGGTCAGCTTTCTCAATGTGGCCCACAACGCCATCTTGTAAGTCC
TACCTTTTTTGTTCCTTTGAAAGCCTCCTGGAAAGCTTTTCCTGAAGTGTTTGTTCTGTAAT
TTCTTTGCAGACGGGCCAGCCTGCCTAAGGACAGGAGCCCCGAGGAGTATGGAATCACCGTC
ATTAGCCAACCCCTGAACCTGACCAAGGAGCAGCTCTCAGAGATTACAGTGCTGACCACTTC
AGTGGATGCTGTGGTTGCCATCTGCGTGATTTTCTCCATGTCCTTCGTCCCAGCCAGCTTTG
TCCTTTATTTGATCCAGGAGCGGGTGAACAAATCCAAGCACCTCCAGTTTATCAGTGGAGTG
AGCCCCACCACCTACTGGGTGACCAACTTCCTCTGGGACATCATGAATTATTCCGTGAGTGC
TGGGCTGGTGGTGGGCATCTTCATCGGGTTTCAGAAGAAAGCCTACACTTCTCCAGAAAACC
TTCCTGCCCTTGTGGCACTGCTCCTGCTGTATGGATGGGCGGTCATTCCCATGATGTACCCA
GCATCCTTCCTGTTTGATGTCCCCAGCACAGCCTATGTGGCTTTATCTTGTGCTAATCTGTT
CATCGGCATCAACAGCAGTGCTATTACCTTCATCTTGGAATTATTTGAGAATAACCGGACGC
TGCTCAGGTTCAACGCCGTGCTGAGGAAGCTGCTCATTGTCTTCCCCACTTCTGCCTGGGC
CGGGGCCTCATTGACCTTGCACTGAGCCAGGCTGTGACAGATGTCTATGCCCGGTTTGGTGA
GGAGCACTCTGCAAATCCGTTCCACTGGGACCTGATTGGGAAGAACCTGTTTGCCATGGTGG
TGGAAGGGGTGGTGTACTTCCTCCTGACCCTGCTGGTCCAGCGCCACTTCTTCCTCTCCCAA
TGGATTGCCGAGCCCACTAAGGAGCCCATTGTTGATGAAGATGATGATGTGGCTGAAGAAAG
ACAAAGAATTATTACTGGTGGAAATAAAACTGACATCTTAAGGCTACATGAACTAACCAAGA
TTTATCCAGGCACCTCCAGCCCAGCAGTGGACAGGCTGTGTGTCGGAGTTCGCCCTGGAGAG
TGCTTTGGCCTCCTGGGAGTGAATGGTGCCGGCAAAACAACCACATTCAAGATGCTCACTGG
GGACACCACAGTGACCTCAGGGGATGCCACCGTAGCAGGCAAGAGTATTTTAACCAATATTT
CTGAAGTCCATCAAAATATGGGCTACTGTCCTCAGTTTGATGCAATTGATGAGCTGCTCACA
GGACGAGAACATCTTTACCTTTATGCCCGGCTTCGAGGTGTACCAGCAGAAGAAATCGAAAA
GGTAAGTGATTCCTAGGGCTGGGGAAGGTGGGTGGGAATCCTCTCCTGCTCACCTCCTCTCT
CCTGCCCCACAGGTTGCAAACTGGAGTATTAAGAGCCTGGGCCTGACTGTCTACGCCGACTG
CCTGGCTGGCACGTACAGTGGGGGCAACAAGCGGAAACTCTCCACAGCCATCGCACTCATTG
GCTGCCCACCGCTGGTGCTGCTGGATGAGCCCACCACAGGGATGGACCCCCAGGCACGCCGC
ATGCTGTGGAACGTCATCGTGAGCATCATCAGAGAAGGGAGGGCTGTGGTCCTCACATCCCA
CAGCATGGAAGAATGTGAGGCACTGTGTACCCGGCTGGCCATCATGGTAAAGGGCGCCTTTC
GATGTATGGGCACCATTCAGCATCTCAAGTCCAAATTTGGAGATGGCTATATCGTCACAATG
AAGATCAAATCCCCGAAGGACGACCTGCTTCCTGACCTGAACCCTGTGGAGCAGTTCTTCCA
```

Figure 21 (cont')

GGGGAACTTCCCAGGCAGTGTGCAGAGGGAGAGGCACTACAACATGCTCCAGTTCCAGGTCT
CCTCCTCCTCCCTGGCGAGGATCTTCCAGCTCCTCCTCTCCCACAAGGACAGCCTGCTCATC
GAGGAGTACTCAGTCACACAGACCACACTGGACCAGGTGTTTGTAAATTTTGCTAAACAGCA
GACTGAAAGTCATGACCTCCCTCTGCACCCTCGAGCTGCTGGAGCCAGTCGACAAGCCCAGG
ACTGAgtcgacgcggccgc
ctcgagttaagggcgaattcccg
attaggatcttcctagagcatggctacgtagataagtagcatggcgggttaatcattaacta
caAGGAACCCCTAGTGATGGAGTTGGCCACTCCCTCTCTGCGCGCTCGCTCGCTCACTGAGG
CCGGGCGACCAAAGGTCGCCCGACGCCCGGGCTTTGCCCGGGCGGCCTCAGTGAGCGAGCGA
GCGCGCAG

OPTIMIZED ACCEPTOR SPLICE SITE MODULE FOR BIOLOGICAL AND BIOTECHNOLOGICAL APPLICATIONS

CROSS-REFERENCE TO RELATED APPLICATIONS

This application is a national phase entry pursuant to 35 U.S.C. § 371 of International Application No. PCT/EP2019/086454, filed Dec. 19, 2019, which claims priority to European Application No. EP 18214415.4 filed Dec. 20, 2018, the entire contents of which are incorporated by reference herein for all purposes.

Sequence Listing

This application contains a Sequence Listing in computer readable form entitled "2021-12-10_01251-0008-00US_Sequence_Listing_ST25," created Dec. 10, 2021, having a size of 60 kilobytes, which is incorporated by reference herein.

TECHNICAL FIELD

The present invention relates to a novel acceptor splice region, as well as uses and applications thereof.

BACKGROUND

Most eukaryotic genes contain non-coding introns, which must be removed from the precursor messenger RNA (pre-mRNA) to generate a translatable mature messenger RNA (mRNA) in a process called "splicing". Splicing is mediated via a large ribonucleoprotein complex, the spliceosome, which consists of five conserved small nuclear ribonucleoproteins (snRNPs), i.e., U1, U2, U4, U5 and U6 snRNP, and more than 300 proteins. The spliceosome assembles and disassembles for each intron in a highly dynamic process. For this purpose, specific splicing sequences need to be recognized and hence exon and intron boundaries are defined by distinct sequence motifs, which serve as binding positions for the ribonucleoproteins involved in the regulation of mRNA splicing.

The most relevant splice motifs are the canonical donor and acceptor splice sites, which define the exon-intron boundaries. The 5' donor splice site (DSS) is located at the 3'-end of the exon and at the 5'-end of the downstream intron and the 3' acceptor splice site (ASS) is located at the 3'-end of the intron and the 5'-end of the downstream exon. A functional acceptor splice site (ASS) requires three distinct elements, which are usually located with a range of approximately 50 bp, a branch point (BP), a poly-pyrimidine tract (PPT) and the canonical ASS sequence.

The so-called GT-AG splicing is by far the most common type of mRNA splicing in mammals and defines the first two and the last two nucleotides of the intron at the DNA level. Thus, a part of the canonical DSS sequence represents the first two bases of the 5' intron sequence, which is a guanine followed by a thymine (GT) in the DNA sequence (corresponding to GU in the RNA sequence), and the last two bases of the intron (representing the most conserved part of the consensus ASS) are an adenine followed by a guanine (AG). The GT-AG nucleotides are essential for an effective splice reaction and their disruption or substitution leads to the loss of a functional splice site.

Each splicing cycle consists of two transesterification reactions. For the first reaction, known as branching, the branch point nucleoside (typically adenosine) attacks the phosphate bond at the 5' exon-intron junction. This results in the formation of an intronic lariat-3' exon intermediate (comprising the exon downstream of the splice site and the intron) and a free 5' exon end (comprising the exon upstream of the splice site). In the second reaction, called exon ligation, the free end of the 5' exon attacks the phosphate at the intron-3' exon junction causing a ligation of the two exons and a release of the intron lariat structure. The splicing reaction is regulated by auxiliary cis-acting splicing regulatory elements of the pre-mRNA composed of up to ten nucleotides. According to their function and position, they can be categorized into exonic splice enhancers (ESEs), exonic splice silencers (ESSs), intronic splice enhancers (ISEs) and intronic splice silencers (ISSs). These elements are able to recruit trans-acting proteins for promotion or prevention of exon inclusion and are therefore proposed to play an important role in alternative splicing.

The splicing efficiency for given exons is expected to depend on the strength of the donor and acceptor splice sites. This DSS or ASS strength in turn depends on the intronic or exonic sequence elements upstream or downstream of the GT or AG. The strength of a functional DSS can be reliably predicted using standard in silico prediction software (e.g. NNSplice: See worldwide website: fruitfly.org/seq_tools/splice.html or Human Splice Finder: See worldwide website: umd.be/HSF3/). By contrast, due to its complexity, in silico prediction of the ASS strength leads to less reliable results (e.g. Koller et al., (2011) "A novel screening system improves genetic correction by internal exon replacement." Nucleic acids research. 39:e108; Lorain et al., (2013) "Dystrophin rescue by trans-splicing: a strategy for DMD genotypes not eligible for exon skipping approaches." Nucleic acids research. 41:8391-8402). Therefore, the factual ASS strength needs to be validated experimentally. Many biological, biotechnological and therapeutical applications rely on the efficiency of the classical GT-AG mRNA splicing, and, hence, on the usage of strong splice sites.

Apart from the regular cis-splicing events to generate a translatable mature mRNA from a pre-mRNA by removing the non-coding introns, splicing can also occur in trans, thereby combining two separate pre-mRNA molecules to create a non-co-linear chimeric RNA (Lei et al., (2016) "Evolutionary insights into RNA trans-splicing in vertebrates", Genome Biol. Evol. 8(3):562-577). This process has first been discovered in trypanosomes. Since then, trans-splicing events have also been identified in many more species including mice (Hirano M and Noda T., (2004) "Genomic organization of the mouse Msh4 gene producing bicistronic chimeric and antisense mRNA", Gene 342: 165-177) as well as in human cells (Chuang et al., (2018) "Integrative transcriptome sequencing reveals extensive alternative trans-splicing and cis-back splicing in human cells". Nucleic Acids Research, 46(7): 3671-3691), although trans-splicing seems to occur less frequently in higher vertebrates only.

Attempts have been made to exploit trans-splicing for gene therapy. Viral vectors are an attractive vehicle for gene therapy, however, they often have a restricted loading capacity and hence there is a limitation as to which genes can be replaced. For example adeno-associated viral vectors have a packaging capacity of up to about 5.0 kb, which allows a transgene of about 4 kb or less. Trans-splicing, i.e., joining together two physically separate pre-mRNAs to form a mature mRNA may be one way to overcome these limitations. For example spliceosome-mediated RNA trans-splicing (SMaRT) may be used as a tool for gene therapy, comprising an exogenous pre-mRNA trans-splicing molecule that is introduced into a target cell to replace only a part of a mutated endogenous pre-mRNA. This may allow for the delivery of shorter coding sequences in the viral vectors.

An alternative way to address the size limitation of viral vectors, particularly for adeno-associated virus (AAV) based vectors, is the use of recombinant AAV (rAAV) dual vector technology. AAV is a single-stranded DNA virus. For rAAV dual vector technologies the coding sequence of the transgene (gene of interest) is split into at least two parts and packaged into two or more separate rAAV vectors. After co-transduction of the target cell by the split genome vectors, the full-length coding sequence is reconstituted. Since a number of cells, such as the photoreceptor cells of the retina show a high co-transduction efficiency of >90%, the efficient delivery of both rAAVs into the same target cell does not seem to be limiting. An efficient reconstitution of the two transgene halves, however, remains challenging. For several years post the development of rAAV dual vector systems, reconstitution has only been addressed at the DNA level and several strategies have been explored to improve this approach (McClements and MacLaren, (2017) "Adeno-associated virus (AAV) dual vector strategies for gene therapy encoding large transgenes, Yale Journal of Biology and Medicine 90: 611-623).

Often these rAAV dual vector systems are misleadingly referred to as "trans-splicing dual vectors", although mRNA splicing in these approaches never actually takes place in trans. Rather, reconstitution in previously described rAAV dual vector systems, relies on the concatemerization of the ITR structures and/or homologous recombination of overlapping sequences, resulting in a single pre-mRNA that may be spliced in cis to remove the concatemerized ITR elements and/or artificial recombinogenic elements. Such rAAV dual vector systems are, e.g., disclosed by Trapani et al., ("Effective delivery of large genes to the retina by dual AAV vectors", (2014) EMBO Molecular Medicine, 6(2): 194-211). Reconstitution of rAAV dual vector systems at the DNA level can be recognized by the presence of a promoter driving the expression of the 5' part of the coding sequence in the first AAV vector, and by the absence of a promoter driving the expression of the 3' part of the coding sequence in the second AAV vector. The reported in vivo efficiency for reconstitution of such rAAV dual vector systems is relatively low, namely below 10% (Carvalho et al., "Evaluating efficiencies of dual AAV approaches for retinal targeting", (2017) Frontiers in Neuroscience, 11(503): 1-8). In contrast, for pre-mRNA splicing to take place in a trans configuration, both vectors of the rAAV dual vector system require a promoter to generate two separate pre-mRNA molecules.

For an optimal performance of mRNA-splicing and particularly mRNA trans-splicing, there is an unmet need for identification of optimized and experimentally validated strong ASS. In particular, there is a need for strong ASS regions, which can inter alia be used in the development of further AAV vectors, such as next-generation rAAV dual vector systems or AAVs delivering highly specific and efficient pre-mRNA trans-splicing molecules, which may be used in gene therapy.

SUMMARY OF THE INVENTION

The present invention complies with this need as described herein and as described in the Examples, Figures and Claims.

Provided herein is a pre-mRNA trans-splicing molecule comprising, (i) an acceptor splice region, comprising (ia) a pyrimidine tract, wherein the pyrimidine tract comprises (iaa) 5 to 25 nucleotides; (iab) wherein at least 60% of the nucleotides within these 5 to 25 nucleotides are pyrimidine bases such as cytosine (C), thymine (T) and/or uracil (U); (ib) an acceptor splice site, (iba) wherein the acceptor splice site is located 3' to the pyrimidine tract; and (ibb) wherein the acceptor splice site comprises from 5' to 3' a sequence of NAGG, wherein N is a A, C, T/U or G; (ii) a nucleotide sequence of interest or a portion thereof; wherein the acceptor splice region is localized 3' or 5' to the nucleotide sequence of interest or the portion thereof; (iii) a binding domain targeting pre-mRNA, which is localized 3' or 5' to the nucleic acid sequence of interest or the portion thereof; and (iv) optionally a spacer sequence, wherein the spacer sequence is localized between the binding domain and the acceptor splice region. In one embodiment the pre-mRNA trans-splicing molecule of claim 1 comprises (ii) the nucleotide sequence of interest or the portion thereof, wherein the acceptor splice region is localized 5' to the nucleotide sequence of interest or the portion thereof; (iii) a donor splice site, wherein the donor splice site is localized 3' to the nucleotide sequence of interest or the portion thereof; (iv) a first binding domain targeting pre-mRNA located 5' to the nucleotide sequence of interest or the portion thereof; (v) a second binding domain targeting pre-mRNA located 3' to the nucleotide sequence of interest or the portion thereof; (vi) optionally a first spacer sequence, wherein the first spacer is localized between the first binding domain and the acceptor splice region; and (vii) optionally a second spacer sequence, wherein the second spacer is localized between the second binding domain and the donor splice site.

Preferably the acceptor splice region is localized 5' to the nucleotide sequence of interest or the portion thereof and the binding domain is localized 5' to acceptor splice region. The pre-mRNA trans-splicing molecule may further comprise a termination sequence, preferably a polyA sequence. Preferably the pre-mRNA trans-splicing molecule according to the invention comprises a pyrimidine tract, wherein the 5 to 25 nucleotides of the pyrimidine tract comprise a sequence encoded by the sequence of TTTTTT or TCTTTT. Additionally or alternatively the sequence between the last pyrimidine of the pyrimidine tract and the acceptor splice site has less than 10, preferably less than 5, more preferably less than 3 bases. Additionally or alternatively the acceptor splice site has a sequence of CAGG.

The acceptor splice region may comprise (a) 7 nucleotides 5' to the pyrimidine tract having at least 4 nucleotides of the sequence CAACGAG, wherein the first 5' nucleotide is C; (b) 7 nucleotides 5' to the pyrimidine tract having at least 5 nucleotides of the sequence CAACGAG, wherein the first 5' nucleotide is C; (c) 7 nucleotides 5' to the pyrimidine tract having at least 4 nucleotides of the sequence CAACGAG, wherein the first 5' nucleotides are CAA; or (d) 7 nucleotides 5' to the pyrimidine tract having at least 5 nucleotides of the sequence CAACGAG, wherein the first 5' nucleotides are CAAC. In one embodiment the acceptor splice region is encoded by a nucleotide sequence which has the sequence of SEQ ID NO: 3 or 4 or which is at least 85%, 90%, 95%, 97%, 98%, 99% or 100% identical to the sequence of SEQ ID NO: 3 or 4. Also provided is a DNA molecule, comprising a promoter and a sequence encoding the pre-mRNA trans-splicing molecule according to the invention, wherein the DNA molecule is preferably a vector or a plasmid.

In another aspect the invention relates to a method for producing a nucleic acid sequence, the method comprising (A) providing a first nucleic acid sequence comprising one or more donor splice site sequences; (B) providing a second nucleic acid sequence, wherein the second nucleic acid sequence comprises (i) an acceptor splice region comprising (ia) a pyrimidine tract, wherein the pyrimidine tract comprises (iaa) 5 to 25 nucleotides; (iab) wherein at least 60% of the nucleotides within these 5 to 25 nucleotides are pyrimidine bases such as cytosine (C), thymine (T) and/or uracil (U); (ib) an acceptor splice site, (iba) wherein the acceptor splice site is located 3' to the pyrimidine tract; and (ibb) wherein the acceptor splice site comprises from 5' to 3' a sequence of NAGG, wherein N is a A, C, T/U or G; (C) cleaving the first nucleic acid sequence at the one or more donor splice site sequence(s) and cleaving the second nucleic acid sequence in the acceptor splice site, (D) ligating the first cleaved nucleic acid sequence to the second cleaved nucleic acid sequence, thereby obtaining a nucleic acid sequence. The first nucleic acid sequence further comprises a nucleotide sequence of interest or a portion thereof, wherein at least a portion of the nucleotide sequence of interest is located 5' to the donor splice site and wherein the second nucleic acid sequence further comprises a nucleotide sequence of interest or a portion thereof, wherein at least a portion of the nucleotide sequence of interest is located 3' to the acceptor splice region. Preferably the first and the second nucleic acid sequence are introduced into a host cell, preferably wherein the first and the second nucleic acid sequence are a recombinant nucleic acid sequence.

In another aspect of an embodiment of the method of the invention, the method comprises step (A) introducing into a host cell a first nucleic acid sequence comprising a pre-mRNA trans-splicing molecule sequence or a nucleic acid sequence encoding said pre-mRNA trans-splicing molecule, wherein the first pre-mRNA trans-splicing molecule comprises from 5' to 3', (a) a 5' portion of a nucleotide acid sequence of interest; (b) a donor splice site; (c) optionally a spacer sequence; (d) a first binding domain; and (e) optionally a termination sequence, preferably a polyA sequence; step (B) introducing into the host cell a second nucleic acid sequence comprising a pre-mRNA trans-splicing molecule sequence or a nucleic acid sequence encoding said pre-mRNA trans-splicing molecule, wherein the second pre-mRNA trans-splicing molecule comprises from 5' to 3'; (i) a second binding domain, which is complementary to the first target domain of the first nucleic acid sequence; (ii) an acceptor splice region sequence comprising; (iia) a pyrimidine tract, wherein the pyrimidine tract comprises (iiaa) 5 to 25 nucleotides; (iiab) wherein at least 60% of the nucleotides within these 5 to 25 nucleotides are pyrimidine bases such as cytosine (C), thymine (T) and/or uracil (U); (iib) an acceptor splice site, (iiba) wherein the acceptor splice site is located 3' to the pyrimidine tract; and (iibb) wherein the acceptor splice site comprises from 5' to 3' a sequence of NAGG, wherein N is a A, C, T/U or G; (iii) a 3' portion of the nucleotide sequence of interest, and (iv) a termination sequence, preferably a polyA sequence; step (C) cleaving the first nucleic acid sequence at the donor splice site sequence and cleaving the second nucleic acid sequence in the acceptor splice site; and step (D) ligating the first cleaved nucleic acid sequence comprising the 5' portion of the nucleotide sequence of interest to the second cleaved nucleic acid sequence comprising the 3' portion of the nucleotide sequence of interest, thereby obtaining the nucleic acid sequence of interest.

In yet another aspect, the invention relates to an adeno-associated virus (AAV) vector comprising at least two inverted terminal repeats comprising a nucleic acid sequence between these two inverted terminal repeats, wherein said nucleic acid sequence comprises from 5' to 3': (i) a promoter; (ii) a binding domain; (iii) optionally a spacer sequence; (iv) an acceptor splice region sequence comprising (a) a pyrimidine tract, wherein the pyrimidine tract comprises (aa) 5 to 25 nucleotides; (ab) wherein at least 60% of the nucleotides within these 5 to 25 nucleotides are pyrimidine bases such as cytosine (C), thymine (T) and/or uracil (U); (b) a acceptor splice site, wherein the acceptor splice site is located 3' to the pyrimidine tract; and wherein the acceptor splice site comprises from 5' to 3' a sequence of NAGG, wherein N is a A, C, T/U or G; (v) a nucleotide sequence of interest or a portion thereof; and (vi) optionally a polyA sequence. The AAV vector may also be part of an AAV vector system comprising (I) a first AAV vector comprising at least two inverted terminal repeats comprising a nucleic acid sequence between these two inverted terminal repeats, wherein said nucleic acid sequence between these two inverted terminal repeats comprises from 5' to 3': (a) a promoter, (b) a nucleotide sequence encoding an N-terminal portion of a polypeptide of interest; (c) a donor splice site; (d) optionally a spacer sequence; (e) a first binding domain; and (f) optionally a termination sequence, preferably a polyA sequence; (II) a second AAV vector comprising a nucleic acid sequence comprising at least two inverted terminal repeats comprising a nucleic acid sequence between these two inverted terminal repeats, wherein said nucleic acid sequence between these two inverted terminal repeats comprises from 5' to 3' (i) a promoter; (ii) a second binding domain, which is complementary to the first binding domain of the first AAV vector; (ii) optionally a spacer sequence (iii) an acceptor splice region sequence comprising (a) a pyrimidine tract, wherein the pyrimidine tract comprises (aa) 5 to 25 nucleotides; (ab) wherein at least 60% of the nucleotides within these 5 to 25 nucleotides are pyrimidine bases such as cytosine (C), thymine (T) and/or uracil (U); (b) an acceptor splice site, wherein the acceptor splice site is located 3' to the pyrimidine tract; and wherein the acceptor splice site comprises from 5' to 3' a sequence of NAGG, wherein N is a A, C, T/U or G; (iv) a nucleotide sequence encoding a C-terminal portion of the polypeptide of interest; (iva) wherein the C-terminal portion of the polypeptide of interest and the N-terminal portion of the polypeptide of interest reconstitute the polypeptide of interest; and (v) a termination sequence, preferably a polyA sequence. In one embodiment the polypeptide is a full-length polypeptide and the first AAV vector comprises a N-terminal portion of a full-length polypeptide of interest and the second AAV vector comprises a C-terminal portion of the full-length polypeptide of interest.

Also provided is a nucleic acid sequence comprising an acceptor splice region sequence comprising (ia) a pyrimidine tract, wherein the pyrimidine tract comprises (aa) 5 to 25 nucleotides; (ab) wherein at least 60% of the nucleotides within these 5 to 25 nucleotides are pyrimidine bases such as cytosine (C), thymine (T) and/or uracil (U); (ib) a acceptor splice site, ba) wherein the acceptor splice site is located 3' to the pyrimidine tract; and bb) wherein the acceptor splice site comprises from 5' to 3' a sequence of NAGG, wherein N is a A, C, T/U or G; and (ii) a nucleotide sequence of interest, wherein the nucleotide sequence of interest (iia) is located 3' or 5' to the acceptor splice region.

In certain embodiments according to the invention the acceptor splice region described herein comprises a pyrimidine tract, wherein the 5 to 25 nucleotides of the pyrimidine tract comprise a sequence encoded by the sequence of TTTTTT or TCTTTT. The sequence between the last pyrimidine of the pyrimidine tract and the acceptor splice site preferably has less than 10, more preferably less than 5, even more preferably less than 3 bases. Moreover, the acceptor splice site preferably has the sequence CAGG. The acceptor splice region may further comprise 7 nucleotides 5' to the pyrimidine tract having at least 4 nucleotides of the sequence CAACGAG, wherein the first 5' nucleotide is C. In a preferred embodiment the splice acceptor region comprises or consists of the sequence of SEQ ID NO: 3 or 4 or is encoded by a nucleic acid sequence comprising or consisting of the sequence of SEQ ID NO: 3 or 4.

Figure 1:
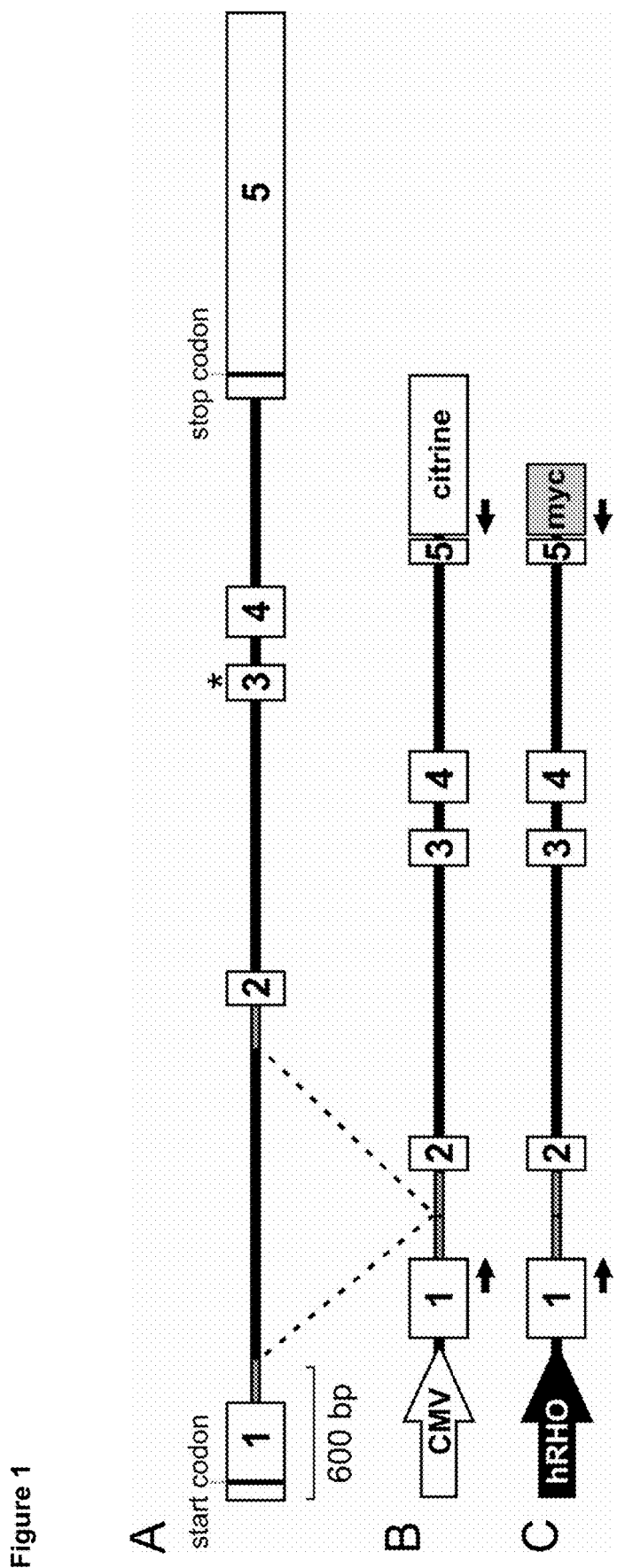
FIG. 1A-E: mRNA splicing of RHO minigenes in HEK293 cells and in transduced photoreceptors.

A, Schematic true to scale view of the RHO gene. The boxes represent the exons and the thick lines in between represent the introns, the respective start and stop codon is indicated. The asterisk symbolizes the c.620T>G mutation in exon 3. B and C, Rhodopsin minigenes encompassing the coding parts of the exons and the flanking introns were driven either by a CMV promoter for expression in HEK293 cells (B), or by a human rhodopsin (hRHO) promoter for expression in photoreceptors (C). To enable packaging of the RHO minigene into AAV vectors, intron 1 was shortened as indicated. For protein visualization and detection, RHO was C-terminally fused either to citrine (in B), or to a myc-tag (in C). The primers shown as arrows in B and C were used for specific detection of the wild type (WT) or mutant splicing products derived from HEK293 cells (D) or from transduced photoreceptors (E). D, RT-PCR analysis from HEK293 cells transiently transfected with WT and mutant RHO minigenes. E, Left, schematic representation of the subretinal RHO minigene delivery to murine retinas at postnatal day 14 (P14). Right, RT-PCR from injected murine retinas containing the respective WT or mutant RHO minigenes. RT-PCR was performed four weeks post injection. All experiments were repeated once.

FIG. 2A-D: Identification of the most efficient ASS_620 sequence.

A, Composition of the single elements of a functional ASS. The branch point (BP) is underlined representing the consensus sequence for human branch points, with the branch point nucleoside adenosine highlighted in bold. The polypyrimidine tract (Poly-C/T) is represented as an empty box and the ASS spanning the intron-exon boundary is represented by a grey filled box. B, Exon-intron organization of the human RHO gene and zoomed view in the DNA sequence of exon 3 of the human RHO gene for wild type (WT, upper panel; SEQ ID NO: 23) and the c.620T>G mutant (lower panel; SEQ ID NO: 24). Intronic sequences are shown in lower case, exonic sequences are shown in upper case (bold) letters. The single ASS elements are highlighted according to the scheme shown in A, the BP sequence is underlined (thick line), the Poly-C/T sequence is marked by an empty box, the ASS sequence(s) is/are marked by a filled grey box. The ATG sequence in the WT converted to the AGG sequence in the c.620T>G mutant is marked by a thin underline. Note that the c.620T>G mutation generates a novel canonical ASS sequence. The other two elements required for a functional ASS (BP and Poly-C/T) are already present in WT RHO exon 3. C, Structure of the human ribosomal protein 27 (RPS27) minigene used for the splicing experiments. Primers used for the RT-PCR shown in (D) are symbolized by arrows. The individual sequences containing potential elements of ASS_620 termed RHO_E3a-g (SEQ ID NO: 25), RHO_E3b (SEQ ID NO: 5), RHO_E3c (SEQ ID NO: 6), RHO_E3d (SEQ ID NO: 3), RHO_E3e (SEQ ID NO: 7), RHO_E3f (SEQ ID NO: 26), and RHO_E3g (SEQ ID NO: 8) as shown below were inserted into exon 3 of the RPS27 gene as indicated. RHO_E3a is the WT RHO sequence lacking a functional ASS. Potential BP, Poly-C/T or ASS sequences are indicated as above. D, RT-PCR from HEK293 cells transfected with the single chimeric RPS27 minigenes as indicated. CS, correctly spliced RPS27 minigene (i.e. using the native exon 3 ASS). AS, aberrantly spliced RPS27 minigene (i.e. using ASS_620).

FIG. 3A-E: ASS_620 is a strong acceptor splice site.

A, In silico acceptor splice site (ASS) strength prediction using two commonly available prediction tools, NNSplice (0.9 version; January 1997) (See worldwide website: fruitfly.org/seq_tools/splice.html) or human splicing finder (version 3.1) (HSF, See worldwide website: umd.be/HSF3/). B, Composition and sequence of the single elements of the 26 bp sequence referred to as vgASS_620 (SEQ ID NO: 3) comprising the ASS, the PolyC/T and seven additional nucleotides 5' of the Poly C/T. C, Schematic representation of the different minigenes used for determining the strength of vgASS_620. The position of the vgASS_620 insertion within the single minigenes is symbolized by an asterisk and a dashed line. The binding position of the primers used for the RT-PCR shown in D are indicated by arrows. D, RT-PCR from HEK293 cells transfected with the respective minigenes containing only the native (nat) acceptor splice site or both, the native acceptor splice site and vgASS_620 (620). All bands were checked by sequencing. E, Length of the RT-PCR products originating from the utilization of the native acceptor splice site or vgASS_620.

FIG. 4A-G: Cerulean reconstitution assay testing different binding domains.

A, Schematic overview of RHO intron 2 sequences used as binding domains for the reconstitution of cerulean via mRNA trans-splicing. The entire RHO intron 2 sequence (a) as well as different 5' (b, d, f, h) and 3' parts (c, e, g, i), or a small 5' part fused to a small 3'part (h+i) of intron 2 were tested providing the results shown in B-G. B and C, Control qRT-PCR (n=3) from transfected HEK293 cells to compare the mRNA levels of the single constructs comprising the different binding domains shown in A. Shown are the delta CT ($\Delta$CT) values in relation to the housekeeper aminolevulinic acid synthase (ALAS). Binding positions of primers (p1+p2 in B and p3+p4 in C) are displayed in D. Statistical analysis (n=3 for each transfection) was done by one-way ANOVA followed by the Tukey's test for multiple comparisons. D, Principle of the cerulean reconstitution assay using the example of the h+i binding domain, a donor splice site (DSS) and the acceptor splice site ASS_620. Cerulean was split at the nucleotide position 154 downstream of the start codon of the full-length cerulean sequence (c1) as indicated by the dashed line. In the control construct (c2) an artificial intron was introduced into the cerulean coding sequence at the indicated position 154 for creating two artificial cerulean exons. The antibody ($\alpha$-cerNT) used for Western blotting binds to the N-terminal cerulean half. The control construct (c2) served as reference for quantification in confocal imaging and Western blotting experiments. The different sequences indicated in (A) were tested as binding domains using the dual vector approach. The scheme of the dual vector approach for cerulean reconstitution is exemplarily shown for the h+i binding domain in combination with vgASS_620 (c3) or the native RHO exon 3 (RHO_E3) acceptor splice site (c4). E, Cerulean reconstitution efficiencies (CRE) of the different binding domains were calculated from Western blot band intensities resulting from three independent transfections.

For quantification, the band intensities were first normalized to internal tubulin controls. The normalized values are given as percentages of the reference construct intensity (c2). F, Representative confocal imaging of living HEK293 cells transfected with c1, c2, c3 or c4 constructs driven by a CMV promoter. For imaging, cerulean-specific laser and filter settings were used. Scale bar, 50 µm. G, Representative Western blots from protein lysates of transfected HEK293 cells (Ø, non-transfected cells; IB, immunoblotting; α-Tub, beta-tubulin-specific antibody).

FIG. 5: Sequence of the first dual AAV comprising the 5' coding sequence of ABCA4 (SEQ ID NO: 19): ITR sequences at the 5' end and the 3' end are highlighted in grey without underlining (NNN). The spacer sequences are depicted in small letters. The CMV promoter is highlighted in grey and is underlined using a solid line (NNN). The 5' coding sequence of the ABCA4 protein is underlined with a dotted line (NNN). The DSS is depicted in italic letters and is underlined (Nnn, with the capital letters representing the coding sequence and the small letter representing the non-coding sequence). The binding domain is highlighted in grey and is underlined with an interrupted line (NNN).

FIG. 6: Sequence of the second dual AAV comprising the 3' coding sequence of ABCA4 (SEQ ID NO: 20): ITR sequences at the 5' end and the 3' end are highlighted in grey without underlining (NNN). The spacer sequences are depicted in small letters. The CMV promoter is highlighted in grey and is underlined using a solid line (NNN). The binding domain is highlighted in grey and is underlined with interrupted lines (NNN). The acceptor splice site is depicted in italic letters and is underlined (NNN). The 3' coding sequence of the ABCA4 protein is underlined using a dotted line (NNN). The polyA sequence is highlighted in dark grey and underlined with waves (NNN).

FIG. 7: Sequence of the first dual AAV comprising the 5' coding sequence of ABCA4 and the ABCA4 promoter (SEQ ID NO: 21): ITR sequences at the 5' end and the 3' end are highlighted in grey without underlining (NNN). The spacer sequences are depicted in small letters. The ABCA4 promoter is highlighted in grey and is underlined using a solid line (NNN). The 5' coding sequence of the ABCA4 protein is underlined using a dotted line (NNN). The DSS is depicted in italic letters and is underlined (Nnn, with the capital letters representing the coding sequence and the small letters representing the non-coding sequence). The binding domain is underlined using an interrupted line (NIN).

FIG. 8: Sequence of the second dual AAV comprising the 3' coding sequence of ABCA4 and the ABCA4 promoter (SEQ ID NO: 22): ITR sequences at the 5' end and the 3' end are highlighted in grey without underlining (NNN). The spacer sequences are depicted in small letters. The ABCA4 promoter is highlighted in grey and underlined using a solid line (NNN). The binding domain is underlined using an interrupted line (NNN). The ASS is depicted in italic letters and is underlined (NNN). The 3' coding sequence of the ABCA4 protein is highlighted in grey and is underlined using a dotted line (NNN). The polyA sequence is highlighted in dark grey and underlined with waves (NNN).

FIG. 9A-D: Impact of acceptor splice site vs. binding domain on cerulean reconstitution efficiency. A, Binding domains (BDs) and acceptor splice sites (ASSs) tested in this experiment. All BD sequences originate from the human RHO gene. BDs and ASSs expected to yield high efficiencies are marked in bold and italic letters. B, Confocal live images of HEK293 cells transfected with constructs containing different combinations of the three BDs and the three ASSs shown in A. The strength of the respective BD and ASS is indicated. Scale bar, 50 µm. C, Upper panel, RT-PCR of the different BD and ASS combinations. Lower panel, Western blot of the different BD and ASS combinations. GAPDH and beta tubulin served as loading controls. D, Quantification of the reconstitution efficiency by the radiometric analysis of the cerulean protein bands in relation to the cis-ctrl (n=3-8). All protein bands were normalized to beta tubulin prior to quantification.

FIG. 10A-C: mRNA trans-splicing rAAV dual vector approach in vivo. A, 5' vector- and 3' vector-constructs used for in vivo expression. As an expression control, a citrine and an mCherry sequence was fused 5' of the cerulean 5' coding sequence (CDS) and 3' of the cerulean 3' CDS, respectively. B, Representative confocal images of retinal sections two weeks post injection expressing constructs containing BD_h+i. Fluorophore expression is present in the retinal pigment epithelium (RPE). ONL, outer nuclear layer. Scale bar, 20 µm. C, Confocal images of RPE cells before (upper panel) and after (lower panel) selective photobleaching of citrine and mCherry fluorophores using a 514 nm laser. Scale bar, 2 µm.

FIG. 11A-D: Identification of suitable BDs originating from the lacZ gene. A, Binding domains (BDs) taken from the bacterial lacZ gene and modified to possess no detectable homology to the human genome. B, Confocal live images of HEK293 cells transiently co-transfected with constructs containing the BDs shown in A. Scale bar, 50 µm. C, Western blot obtained from transfected HEK293 cell lysates. D, Quantification of cerulean reconstitution efficiency based on the ratiometric analysis of the western blot band intensity (n=3–8). BD_g efficiency served as a measure for the highest reconstitution obtained so far (cf. FIG. 9).

Figure 12:
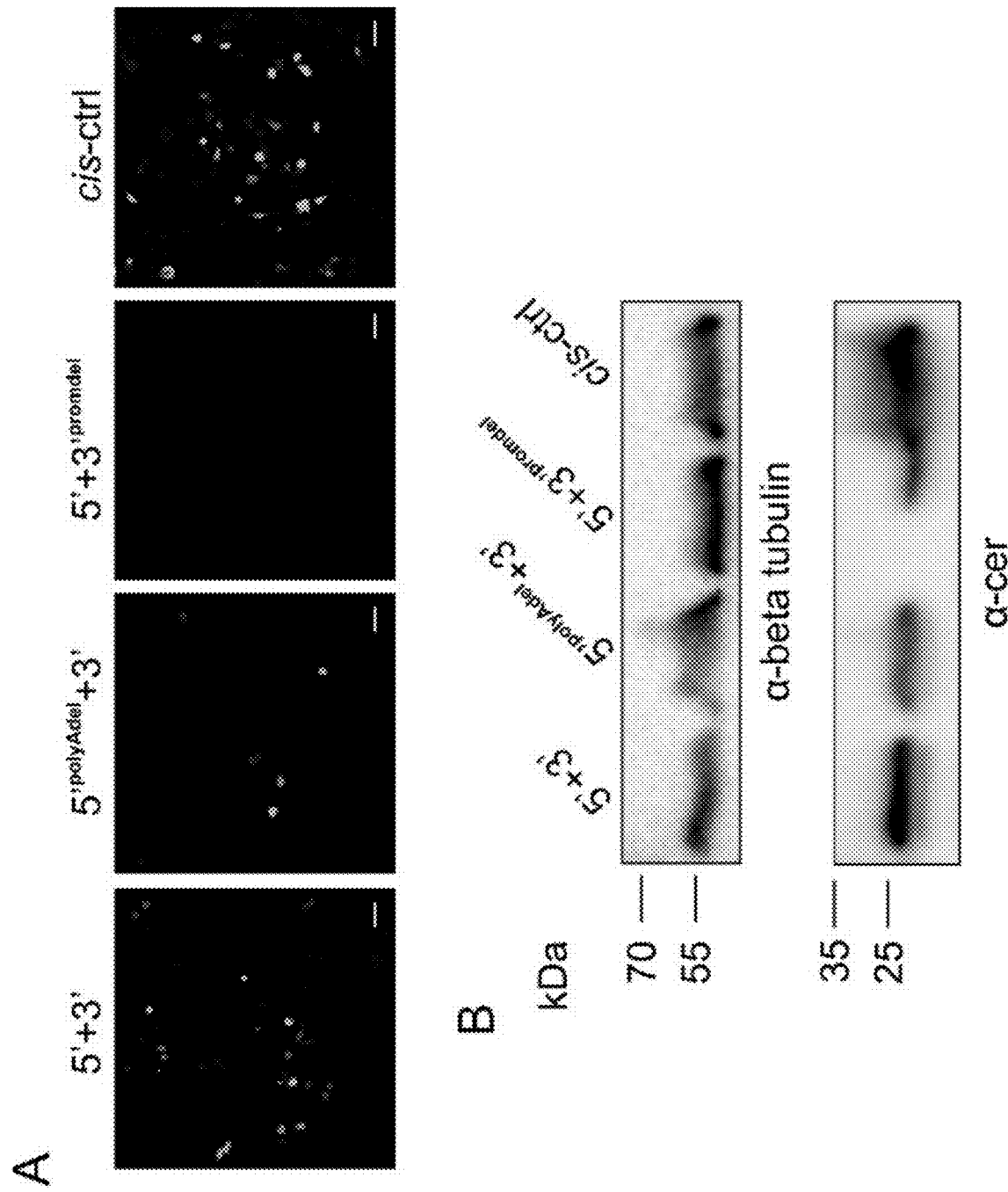

FIG. 12A-B: Deletion of regulatory elements and its impact on mRNA splicing efficiency. A, Confocal live images of HEK293 cells transiently co-transfected with cerulean constructs as indicated containing BD_k. $5'^{polyAdel}$, 5' vector without polyA signal. $3'^{promdel}$, 3' vector without promoter sequence. Scale bar, 50 µm. B, Western blot obtained from transfected HEK293 cell shown in A. Beta tubulin served as loading control.

FIG. 13A-D: Reconstitution of SpCas9-VPR. A, Plasmids used for mRNA trans-splicing of SpCas9-VPR in HEK293 cells (5' and 3' vector). As positive control served a plasmid containing full-length (FL) SpCas9-VPR CDS (FL vector). A junction-spanning primer pair was used for RT-PCR (black arrows). B, RT-PCR from HEK293 cells co-transfected with the 5' and 3' vector containing BD_k (n=3) or the FL vector (n=3). C, Representative sequencing result of the reconstituted SpCas9-VPR product. D, Western blot of protein lysates from the respective transfections. Ø, untransfected cells. Beta tubulin served as a loading control.

FIG. 14A-C: Reconstitution of ABCA4. A, Plasmids used for mRNA trans-splicing of ABCA4 in HEK293 cells (5' and 3' vector). Additionally, six short introns of six different genes were incorporated within the CDS of ABCA4, i.e. three into the 5' CDS (5' vector with introns, 5'wi) and three into the 3' CDS (3' vector with introns, 3'wi), respectively. A junction-spanning primer pair was used for RT-PCR (black arrows). myc, myc-tag. B, RT-PCRs run with different numbers of cycles from HEK293 cells co-transfected with the respective constructs as indicated. GAPDH served as loading control. Ø, untransfected cells. C, Representative sequencing result of reconstituted ABCA4.

Figure 15:
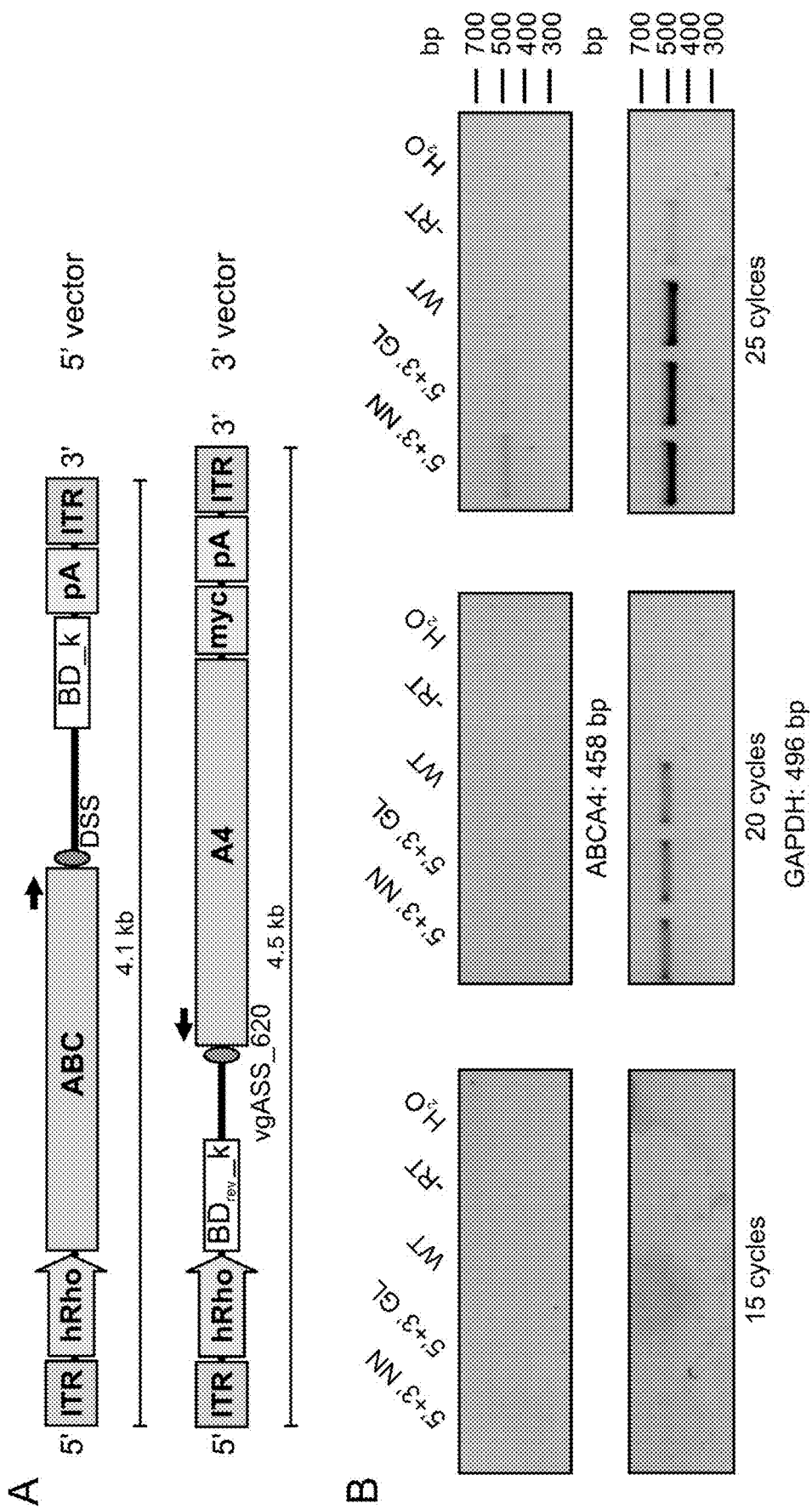

FIG. 15: rAAV dual vector mRNA trans-splicing of ABCA4 in vivo. A, 5' vector- and 3' vector-constructs containing BD_k used for in vivo expression. hRho, human rhodopsin promoter. B, RT-PCRs run with different numbers of cycles from retinal lysates of C54Bl/6J wild type mice co-transduced with the respective constructs as indicated. As negative control served non-injected wild type (WT) mice. NN/GL, capsid variants of AAV2. −RT, negative control without reverse transcriptase. GAPDH was used as loading control. C, Representative sequencing result of reconstituted ABCA4. D, Preliminary results of qRT-PCR performed from the same retinas shown in B. ABCA4 expression obtained upon co-transduction was normalized to non-injected WT retinas. E, Western blot from retinal lysates of the same mice shown in B-D. Human ABCA4 protein was detected by an anti-myc antibody and is indicated via an arrow head. Beta tubulin served as loading control.

FIG. 16: Sequence of the minigene encoding the 5' coding sequence of cerulean and the binding domain BD_g (SEQ ID NO: 35). The CMV promoter is highlighted in grey. The 5' coding sequence of the cerulean protein (bold letters) is highlighted in grey and underlined using a thick solid line (NNN). The DSS is underlined using a wavy line (NN_N). The binding domain is marked with italic letters and is underlined using a dotted line (NN) and the polyadenylation signal is underlined using a double line (NNN).

FIG. 17: Sequence of the minigene encoding the 3' coding sequence of cerulean and the binding domain BD_g (SEQ ID NO: 36). The CMV promoter is highlighted in grey. The binding domain is marked with italic letters and is underlined using a dotted line (NNN). The ASS is underlined using a wavy line (NNN) and bold letters. The 3' coding sequence of the cerulean protein is highlighted in grey and underlined using a thick solid line (NNN) and the polyadenylation signal is underlined using a double line (NNN).

FIG. 18: Sequence of the minigene encoding the 5' coding sequence of SpCas9-VPR and the binding domain BD_k (SEQ ID NO: 37). The CMV promoter is highlighted in grey. The 5' coding sequence of the SpCas9-VPR protein is highlighted in bold letters and underlined using a thick solid line (NNN). The DSS is underlined using a wavy line (NNN). The binding domain marked with italic letters and is underlined using a dotted line (NNN), the polyadenylation signal is underlined using a double line (NNN).

FIG. 19: Sequence of the minigene encoding the 3' coding sequence of SpCas9-VPR and the binding domain BD_k (SEQ ID NO: 38). The CMV promoter is highlighted in grey. The binding domain marked with italic letters and is underlined using a dotted line (NNN). The ASS is underlined using a wavy line and bold letters (NNN). The 3' coding sequence of the SpCas9-VPR protein is highlighted in grey and underlined using a thick solid line (NNN) and the polyadenylation signal is underlined using a double line (NNN).

FIG. 20: Sequence of the first dual AAV comprising the 5' coding sequence of ABCA4 with introns (SEQ ID NO: 39): ITR sequences at the 5' end and the 3' end are highlighted in grey without underlining (NNN). The spacer sequences are depicted in small letters. The CMV promoter is highlighted in grey and is underlined using a solid line (NNN). The 5' coding sequence of the ABCA4 protein is underlined with a dotted line interrupted by introns indicated by a wavy underline (NNNNNNNNN). The DSS is depicted in italic letters and is underlined (Nnn, with the capital letters representing the coding sequence and the small letter representing the non-coding sequence). The binding domain is highlighted in grey and is underlined with an interrupted line (NNN). The polyA sequence is highlighted in dark grey and underlined with waves (NNN).

FIG. 21: Sequence of the second dual AAV comprising the 3' coding sequence of ABCA4 (SEQ ID NO: 40): ITR sequences at the 5' end and the 3' end are highlighted in grey without underlining (NNN). The spacer sequences are depicted in small letters. The CMV promoter is highlighted in grey and is underlined using a solid line (NNN). The binding domain is highlighted in grey and is underlined with interrupted lines (NNN). The acceptor splice site is depicted in italic letters and is underlined (NNN). The 3' coding sequence of the ABCA4 protein is underlined using a dotted line interrupted by introns indicated by a wavy underline (NNNNNNNNN). The polyA sequence is highlighted in dark grey and underlined with waves (NNN).

DETAILED DESCRIPTION

The present inventors have found a novel acceptor splice region as described in the Examples. This acceptor splice region is very efficient and can be used in various applications, in which splicing is utilized. Thus, the acceptor splice region of the present invention can inter alia be used in trans-splicing, cis-splicing, SMaRT technology (Spliceosome-mediated RNA trans-splicing) using pre-mRNA trans-splicing molecules, for the reconstitution of split AAV vectors, AAV vector systems comprising 2 AAV vectors and/or trap vectors. However, the acceptor splice region as described herein can also be used for any further application in which splicing is of interest.

The present invention relates to a nucleic acid sequence comprising
 (i) an acceptor splice region sequence comprising
  (ia) a pyrimidine tract, wherein the pyrimidine tract comprises
   (aa) 5 to 25 nucleotides;
   (ab) wherein at least 60% of the nucleotides within these 5 to 25 nucleotides are pyrimidine bases such as cytosine (C), thymine (T) and/or uracil (U);
  (ib) an acceptor splice site,
   ba) wherein the acceptor splice site is located 3' to the pyrimidine tract; and
   bb) wherein the acceptor splice site comprises from 5' to 3' a sequence of NAGG, wherein N is a A, C, T/U or G; and
 (ii) a nucleotide sequence of interest, wherein the nucleotide sequence of interest
  (iia) is located 3' or 5' to the acceptor splice region, preferably 3' to the acceptor splice region;
  wherein the nucleic acid sequence according to the invention is preferably cleaved in the acceptor splice region thereby separating the nucleotide sequence of interest from the acceptor splice region sequence.

The invention further relates to the use of said nucleic acid sequence for cleaving in the acceptor splice region thereby separating the nucleotide sequence of interest from the acceptor splice region sequence.

The terms "nucleic acid molecule", "nucleic acid sequence" or "nucleotide sequence" are used synonymously herein and encompass any nucleic acid molecule having a nucleotide sequence comprising purine- and pyrimidine bases which are comprised by said nucleic acid molecule/sequence, whereby said bases represent the primary structure of a nucleic acid molecule. Nucleic acid sequences can include DNA, cDNA, genomic DNA, RNA, both sense and antisense strands. The RNA may for example be pre-mRNA, mRNA, tRNA or rRNA. The polynucleotide of the present invention can be composed of any polyribonucleotide or polydeoxribonucleotide, which may be unmodified RNA or DNA or modified RNA or DNA. The person skilled in the art will understand that a thymine (T) in a polydeoxynucleotide transcribes into an uracil (U) in a polyribonucleotide. The sequences referred to herein are typically provided as DNA sequences that may be transcribed into the corresponding RNA sequence (prior to any splicing event). Thus, a nucleic acid sequence comprising a T also discloses the corresponding (transcribed) RNA sequence, preferably pre-mRNA sequence, comprising a U.

A variety of modifications can be made to DNA and RNA; thus, the term "nucleic acid molecules" or "nucleotide" can embrace chemically, enzymatically, or metabolically modified forms. "Modified" bases/nucleotides include, for example, tritylated bases and unusual bases such as inosine.

The acceptor splice region sequence of the present invention comprises two features, namely an acceptor splice site and a pyrimidine tract. The pyrimidine tract comprises 5 to 25 nucleotides and wherein at least 60% of the nucleotides within these (in total) 5 to 25 nucleotides are pyrimidine bases such as cytosine (C), thymine (T) and/or uracil (U). It is also envisioned that the pyrimidine tract comprises 5, 6, 7, 8, 9, 10, 11, 12, 13, 14, 15, 16, 17, 18, 19, 20, 21, 22, 23, 24, or 25 nucleotides, preferably 10 to 18, more preferably 12 to 16 nucleotides. Additionally or alternatively at least 60%, 65%, 70%, 75%, 80%, 85%, 90%, 95%, 97%, 98%, 99% or 100% of the nucleotides within these (in total) 5 to 25 nucleotides are pyrimidine bases such as cytosine (C), thymine (T) and/or uracil (U). For example the pyrimidine tract can comprise 6 nucleotides. It is further envisioned that the pyrimidine tract comprises or consists of the sequence TTTTTT. It is further contemplated that the pyrimidine tract comprises or consists of the sequence TCTTTT. It is further contemplated that the pyrimidine tract comprises or consists of the sequence TTTTTTGTCATTT (SEQ ID NO. 11). It is further contemplated that the pyrimidine tract comprises or consists of the sequence TCTTTTGTCATCTA (SEQ ID NO. 12). It is further contemplated that the pyrimidine tract is preceded by 7 nucleotides, together comprising or consisting of the sequence CAACGAGTCTTTTGTCATCTA (SEQ ID NO. 13). The pyrimidine tract may also comprise or consist a sequence of TCTTTTGTCATCT (SEQ ID NO. 1). It is also contemplated that the pyrimidine tract as described herein has a nucleotide sequence which is at least 70%, 75%, 80%, 85%, 90%, 95%, 97%, 98%, 99% or 100% identical to a sequence of SEQ ID NO. 1, 11, 12 or 13 or a sequence of TTTTTT or TCTTTT. In one embodiment the 5 to 25 nucleotides of the pyrimidine tract comprise a sequence of TTTTTT or TCTTTT. Preferably, the sequence between the last pyrimidine of the pyrimidine tract and the acceptor splice site has less than 10, preferably less than 5, more preferably less than 3 bases. The term "pyrimidine tract" is used interchangeably herein with the term "polypyrimidine tract" and may be abbreviated as PPT or PolyC/T. The "last pyrimidine of the pyrimidine tract" refers to the most 3' pyrimidine of the 5 to 25 nucleotides of the pyrimidine tract.

In accordance with the present invention, the term "identical" or "percent identity" in the context of two or more nucleic acid molecules, refers to two or more sequences or subsequences that are the same, or that have a specified percentage of nucleotides that are the same (e.g., at least 95%, 96%, 97%, 98% or 99% identity), when compared and aligned for maximum correspondence over a window of comparison, or over a designated region as measured using a sequence comparison algorithm as known in the art, or by manual alignment and visual inspection. Sequences having, for example, 80% to 95% or greater sequence identity are considered to be substantially identical. Such a definition also applies to the complement of a test sequence. Those having skill in the art will know how to determine percent identity between/among sequences using, for example, algorithms such as those based on CLUSTALW computer program (Thompson Nucl. Acids Res. 2 (1994), 4673-4680) or FASTDB (Brutlag Comp. App. Biosci. 6 (1990), 237-245), as known in the art.

Also available to those having skill in this art are the BLAST and BLAST 2.0 algorithms (Altschul Nucl. Acids Res. 25 (1977), 3389-3402). The BLASTN program for nucleic acid sequences uses as defaults a word size (W) of 28, an expectation threshold (E) of 10, match/mismatch score 1, -2, gap costs linear and a comparison of both strands. For amino acid sequences, the BLASTP program uses as defaults a word size (W) of 6, and an expectation threshold (E) of 10, gap costs are Existence: 11 and Extension: 1. Furthermore, the BLOSUM62 scoring matrix (Henikoff Proc. Natl. Acad. Sci., USA, 89, (1989), 10915) can be used.

For example, BLAST2.0, which stands for Basic Local Alignment Search Tool (Altschul, Nucl. Acids Res. 25 (1997), 3389-3402; Altschul, J. Mol. Evol. 36 (1993), 290-300; Altschul, J. Mol. Biol. 215 (1990), 403-410), can be used to search for local sequence alignments.

As outlined herein the acceptor splice region sequence of the present invention in addition to the pyrimidine tract comprises an acceptor splice site. As used herein an "acceptor splice site" has the meaning as known to the skilled person and as described inter alia in Alberts B, Johnson A, Lewis J, et al. (2002) "Molecular Biology of the Cell. 4th edition." New York: Garland Science under the headline "from DNA to RNA". The acceptor splice site of the present invention comprises or consists of the nucleotides NAGG, preferably CAGG or CAGGT (or CAGG or CAGGU in RNA). The acceptor splice site is usually located within a sequence defined as "acceptor splice region". The term "acceptor splice site" (abbreviated to ASS) as used herein refers to the consensus acceptor splice sequence and may also be referred to as "splice acceptor site" (abbreviated to SAS). In the context of this invention the term "acceptor splice region" and "acceptor splice site" are used as distinct terms in order to distinguish between the region and the consensus acceptor splice site, wherein the acceptor splice region comprises the acceptor splice site. In the literature, the acceptor splice region as well as the acceptor splice site may be referred to as ASS or SAS.

The acceptor splice site is called acceptor splice site because at this site the nucleic acid is cut by the so called spliceosome or an artificial variant thereof. The spliceosome and how it works are also known to the skilled person. The structure of the human spliceosome is for example described in Zhang et al. (2017) "An atomic structure of the human spliceosome" Cell 169, 918-926. Artificial spliceosomes include e.g. enzymes that mediate the same cut to a splice site as a spliceosome. Artificial spliceosomes can comprise a DNA enzyme as described in Coppins and Silvermann (2005) "Mimicking the First Step of RNA Splicing: An Artificial DNA Enzyme Can Synthesize Branched RNA Using an Oligonucleotide Leaving Group as a 5'-Exon Analogue" Biochemistry, 44 (41), pp 13439-13446 and Müller (2017) "Design and Experimental Evolution of transSplicing Group I Intron Ribozymes." Molecules. 22(1). pii: E75. doi: 10.3390/molecules22010075. The acceptor splice site as described herein has a sequence of NAGG, wherein N can be any nucleotide. For example, N is a nucleotide selected from A, C, T, G or U. The acceptor splice site as described herein can also have a sequence of CAGG. The acceptor splice site as described herein can also have a sequence of CAGGT (or CAGGU for RNA).

The cut at the acceptor splice site of the present invention leads to two fragments, one comprising NAG of the NAGG and/or NAGGT splice site or CAG of the CAGG splice site and/or CAGGT splice site. The other fragment comprising the last G of the NAGG or CAGG splice site or the last GT of the NAGGT or the CAGGT splice site. Thus, it is envisioned that in the uses, nucleic acid sequences, AAV vectors, AAV vector systems and methods as described herein the finally obtained (after cleaving/splicing) nucleotide sequence (of interest) comprises the last G of the NAGG or CAGG sequence or the GT of the NAGGT or the CAGGT sequence. The person skilled in the art will understand that the splicing referred to herein takes place at the RNA level and hence the finally obtained (after cleaving/splicing) RNA nucleotide sequence (of interest) comprises the last G of the NAGG or CAGG sequence or the GU of the CAGGU sequence of the pre-mRNA nucleotide sequence. It is however also contemplated that in the methods and uses the final nucleic acid sequence (of interest) comprises the NAG of the NAGG splice site sequence, and/or the CAG of the CAGG or the CAGGT splice site sequence. It is thus envisioned that cleaving in the acceptor splice site comprises a cleaving between the G and the G of the acceptor splice site sequence of NAGG, CAGG and/or CAGGT (or CAGGU) thereby separating the nucleotide sequence (of interest) from the intronic acceptor splice region sequence.

The acceptor splice region of the present invention can inter alia be used in applications including trans- but also cis-splicing or any other splicing. Occurrence of splicing can be measured e.g. as described in Berger et al. (2016) "mRNA trans-splicing in gene therapy for genetic diseases" WIREs RNA 7: 487-498. For example, spliced nucleotide sequences can be quantified by end-point quantitative RT-PCR with specific primers and probes to discriminate the spliced product of interest. Further measuring of splicing can be performed as described in the Examples herein. For example, splicing can be measured by using marker genes as described in Orengo et al. (2006) "A bichromatic fluorescent reporter for cell-based screens of alternative splicing." Nucleic Acids Research 34(22):e148. Further splicing may be detected using restriction enzyme analysis as described in Berger et al., (2016) "Repair of rhodopsin mRNA by spliceosome-mediated RNA trans-splicing: a new approach for autosomal dominant retinitis pigmentosa.", Mol Ther.; 23(5):918-930.

An acceptor splice site when present in a pre-mRNA typically corresponds to the 3'-end of the intron and the 5' end of the next exon. When artificially introducing an acceptor splice site, preferably an acceptor splice region, it is not absolutely required that the acceptor splice site is located at an intron-exon boundary, but may also be located within an open reading frame, within an intron or at the 5' end of a complete or a partial open reading frame. It is also envisioned that the acceptor splice site is located at the 5'-end of an intron. It is further envisioned that the acceptor splice site is not located in a pre-mRNA molecule but within an artificial molecule, such as any nucleic acid molecule.

The acceptor splice site of the present invention is comprised in an acceptor splice region. Notably, the acceptor splice site of the present invention is located 3' to the pyrimidine tract.

The acceptor splice region (or acceptor splice site module) can further comprise a branch point and/or a branch point sequence. In principle any suitable branch point or branch point sequence is contemplated by the present invention. Exemplary branch point(s) or branch point sequence(s) are inter alia described in Gao et al. (2008) "Human branch point consensus sequence is yUnAy" Nucleic Acid Research, vol. 36, no. 7, pp. 2257-2267; Mercer et al. (2016) "Genome-wide discovery of human splicing branch points" Genome Research 25: 290-303.

For example, the branch point sequence may comprise or consist of the sequence UACUAAC. Additionally or alternatively the branch point sequence may comprise or consist of the sequence YNYURAY wherein Y is U or C and wherein R is A or G. Additionally or alternatively the branch point sequence may comprise or consist of the sequence YNCURAC wherein Y is U or C and wherein R is A or G. Additionally or alternatively the branch point sequence may comprise or consist of the sequence YNCURAY wherein Y is U or C and wherein R is A or G. Additionally or alternatively the branch point sequence may comprise or consist of the sequence CURAY wherein Y is U or C and wherein R is A or G. Additionally or alternatively the branch point sequence may comprise or consist of the sequence YUVAY wherein Y is U or C, wherein R is A or G and wherein V is A, C or G. Additionally or alternatively the branch point sequence may comprise or consist of the sequence CUSAY wherein Y is U or C, wherein S is G or C. Additionally or alternatively the branch point sequence may comprise or consist of the sequence CUGAC. Additionally or alternatively the branch point sequence may comprise or consist of the sequence CUAAC. The branch point may be present within a branch point sequence of C/U-U-N-A-C/U, CAACGA or CUCAA or GUCAA (wherein the branch point sequence is encoded by the respective DNA sequence of C/T-T-N-A-C/T, CAACGA or CTCAA or GTCAA). The underlined adenosine in all respective sequences represents the branch point nucleotide.

The acceptor splice region of the present invention can further comprise a branch point nucleotide sequence (c), wherein the branch point nucleotide sequence (ca) comprises 1-15 nucleotides;
(cb) comprises a branch point nucleotide, preferably adenosine (A); and
(cc) is located 5' to the pyrimidine tract and the acceptor splice site.

It is also contemplated that the branch point sequence comprises about 3, 4, 5, 6, 7, 8, 9, 10, 11, 12, 13, 14, 15 or more nucleotides. It is further contemplated that the branch point sequence comprises 6 to 8 nucleotides. It is also envisioned that the branch point sequence comprises 8 nucleotides. Notably, the nucleotides of the branch point sequence can however, be present in series, which is why they can also comprise more than 15 such as e.g. 30 (15+15), 40, 50, 100, 200 or more nucleotides in total.

The branch point nucleotide can be any nucleotide. Thus, the branch point nucleotide can be any of A (adenosine), T (thymine), G (guanine), C (cytosine), and U (uracil). Preferably, the branch point nucleotide is A (adenosine). The branch point nucleotide is located within the branch point sequence.

The acceptor splice region can additionally or alternatively comprise an intronic splice enhancer. Such splice enhancers are known to the skilled person and are inter alia described in Wang et al. (2012) "Intronic splicing enhancers, cognate splicing factors and context-dependent regulation rules" Nature Structural & Molecular Biology, vol. 19, no. 10, pp. 1044-1053. Two examples are the splice enhancer sequences "AACG" (group F) and "CGAG" (group D). However, any suitable intronic splice region is embraced by this term.

An exemplary intronic splice enhancer has a sequence of TGGGGGGAGG (SEQ ID NO: 2). Another exemplary intronic splice enhancer has a sequence of GTAACGGC. It is further contemplated that the intronic splice enhancer has a sequence of AACG. It is also contemplated that the acceptor splice regions as described herein has a nucleotide sequence which is at least 70%, 75%, 80%, 85%, 90%, 95%, 97%, 98%, 99% or 100% identical to a sequence of SEQ ID NO: 2, GTAACGGC or AACG.

The acceptor splice region of the present invention preferably further comprises about 7 nucleotides (such as 5-12 nucleotides, preferably 6-10, more preferably 6-8) 5' to the polypyrimidine tract. In a preferred embodiment the acceptor splice region further comprises (a) 7 nucleotides 5' to the pyrimidine tract having at least 4 nucleotides of the sequence CAACGAG, wherein the first 5' nucleotide is C; (b) 7 nucleotides 5' to the pyrimidine tract having at least 5 nucleotides of the sequence CAACGAG, wherein the first 5' nucleotide is C; (c) 7 nucleotides 5' to the pyrimidine tract having at least 6 nucleotides of the sequence CAACGAG, wherein the first 5' nucleotide is C; (d) 7 nucleotides 5' to the pyrimidine tract having at least 4 nucleotides of the sequence CAACGAG, wherein the first 5' nucleotides are CAA; (e) 7 nucleotides 5' to the pyrimidine tract having at least 4 nucleotides of the sequence CAACGAG, wherein the first 5' nucleotides are CAAC; (f) 7 nucleotides 5' to the pyrimidine tract having at least 5 nucleotides of the sequence CAACGAG, wherein the first 5' nucleotides are CAA; (g) 7 nucleotides 5' to the pyrimidine tract having at least 5 nucleotides of the sequence CAACGAG, wherein the first 5' nucleotides are CAAC; (h) 7 nucleotides 5' to the pyrimidine tract having at least 6 nucleotides of the sequence CAACGAG, wherein the first 5' nucleotides are CAA; (i) 7 nucleotides 5' to the pyrimidine tract having at least 6 nucleotides of the sequence CAACGAG, wherein the first 5' nucleotides are CAAC or (j) 7 nucleotides 5' to the pyrimidine tract having the sequence CAACGAG. Without being bound by theory, this sequence may act as a splice enhancer.

It is further envisioned that the acceptor splice region comprises 1, 2, 3, 4, 5, or more different/identical branch point sequences. It is further envisioned that the acceptor splice region comprises 1, 2, 3, 4, 5, or more different or identical intronic splice enhancer (sequences).

It is envisioned that the pyrimidine tract, the acceptor splice site and optionally further the branch point sequence and/or the intronic splice enhancer, thus the whole acceptor splice region includes in total about 1000, 500, 250, 100, 50, 45, 40, 35, 30, 25, 20, 15 or less nucleotides, preferably 26 nucleotides.

In some embodiments the branch point sequence or branch point nucleotide used by a specific acceptor splice site may be flexible. This means different branch points may be used, such as 3 or more, 5 or more, 7 or more, 9 or more, or 11 or more. In one embodiment the frequency of usage of each branch point is <30% or <20%. In cases where the choice of the branch point sequence or branch point nucleotide used by a specific acceptor splice site is flexible, the strength of an acceptor splice region does not originate and is not dependent from the presence of a specific contained branch point sequence or branch point nucleotide. The flexibility to use any branch point sequence or branch point nucleotide may render the acceptor splice region highly efficient and versatile and particularly suitable for use in different nucleic acid sequences to induce efficient splicing in a sequence independent manner.

The acceptor splice region as described herein and as present in the nucleic acid, the pre-mRNA trans-splicing molecule, the AVV vector, the AVV vector system and as used in the method according to the invention comprises in addition to the acceptor splice site and the polypyrimidine tract further nucleotides 5' of the polypyrimidine tract. In a preferred embodiment the acceptor splice region comprises about 7 nucleotides (such as 5-12 nucleotides, preferably 6-10, more preferably 6-8) 5' to the polypyrimidine tract. In a particularly preferred embodiment the acceptor splice region comprises the sequence CAACGAG 5' to the polypyrimidine tract. The acceptor splice region comprising the acceptor splice site, the polypyrimidine tract and the further nucleotides 5' of the polypyrimidine tract, preferably the further about 7 nucleotides 5' of the polypyrimidine tract, acts as a minimal acceptor splice region and may be inserted into any nucleic acid sequence to introduce a very potent functional acceptor splice region.

It is further envisioned that the acceptor splice region of the present invention comprises or consists of a sequence of CAACGAGTCTTTTGTCATCTACAGGT (SEQ ID NO: 3). It is further contemplated that the acceptor splice site of the present invention comprises or consists of a sequence of CAACGAGTTTTTTGTCATCTACAGGT (SEQ ID NO: 4). It is also envisioned that the acceptor splice region comprises or consists of any of CTACACGCTCAAGCCG-GAGGTCAACAACGAGTCTTTTGTCATCTACAGGT (SEQ ID NO: 5), GCCGGAGGT-CAACAACGAGTCTTTTGTCATCTACAGGT (SEQ ID NO: 6), GTCTTTTGTCATCTACAGGT (SEQ ID NO: 7), GTCTTTTGTCATCTACAGGTGTTCGTG (SEQ ID NO: 26) or GTCTTTTGTCATCTA-CAGGTGTTCGTGGTTCGTGGTCCA (SEQ ID NO: 8). Preferably the acceptor splice region of the present invention comprises or consists (or is encoded by a nucleic acid sequence comprising or consisting) of a sequence of CAACGAGTCTTTTGTCATCTACAGGT (SEQ ID NO: 3) or CAACGAGTTTTTTGTCATCTACAGGT (SEQ ID NO: 4).

It is also contemplated that the acceptor splice region as described herein has a nucleotide sequence which is at least 70%, 75%, 80%, 85%, 90%, 95%, 97%, 98%, 99% or 100% identical to any sequence of any one of SEQ ID NO: 3, 4, 5, 6, 7, 26 or 8. Preferably the acceptor splice region comprises a nucleotide sequence which is at least 85%, 90%, 95%, 97%, 98%, 99% or 100% identical to any sequence of any one of SEQ ID NO: 3, 4, 5, 6, 7, 26 or 8, more preferably at least 85%, 90%, 95%, 97%, 98%, 99% or 100% identical to any sequence of SEQ ID NO: 3 or 4, even more preferably at least 90%, 95%, 97%, 98%, 99% or 100% identical to any sequence of SEQ ID NO: 3 or 4.

The nucleic acid sequence according to the invention may further comprise in addition to the acceptor splice site a nucleotide sequence of interest. The nucleotide sequence of interest can be any suitable nucleotide sequence. The term "nucleotide sequence of interest" and "nucleic acid sequence of interest" are used interchangeably herein. Typically it is referred to as "nucleotide sequence of interest" to better distinguish the term from the nucleic acid sequence or nucleic acid molecule according to the invention. For example, the nucleotide sequence of interest can be an intronic or exonic nucleotide sequence or comprise both intronic and exonic (i.e. non-coding and coding) sequences. It is further contemplated that the nucleotide sequence of interest is a cDNA, mRNA, rRNA or tRNA. The nucleotide sequence of interest or a portion thereof can be located 3' or 5', preferably 3', to the acceptor splice region. In certain embodiments the nucleotide sequence of interest or a portion thereof as comprised in any of the nucleic acid sequences, pre-mRNA trans-splicing molecules, AAV vectors, AAV vectors or as used in any of the methods according to the invention may be a transgene or a portion thereof. It has been found that the splicing efficiency, particularly the trans-splicing efficiency, can be improved by the presence of introns in the nucleotide sequence of interest or a portion thereof. Particularly, for a nucleotide sequence of interest or a portion thereof with more than 1000 bp it may be advantageous to introduce or maintain introns in the sequence. Preferably introns are present about every 200 to 1000 bp of the nucleotide sequence of interest or a portion thereof, but may also occur in lower or higher sequence intervals. The introns may originate from the nucleotide sequence of interest and/or from a different gene and/or artificial.

The nucleotide sequence of interest (also referred to as nucleic acid sequence of interest) as used herein can also be a coding sequence, such as a sequence encoding for a polypeptide of interest or portions thereof. In a preferred embodiment the nucleotide sequence of interest is a coding sequence, more preferably a transgene, a sequence encoding for a polypeptide of interest or a portion thereof.

It is further envisioned by the present invention that the nucleotide sequence of interest encodes a therapeutic polypeptide, a therapeutic nucleic acid (such as a therapeutic RNA) or a portion thereof.

The therapeutic nucleic acid or therapeutic polypeptide can be used to treat an ocular disorder such as autosomal recessive severe early-onset retinal degeneration (Leber's Congenital Amaurosis), congenital achromatopsia, Stargardt's disease, Best disease (vitelliform macular degeneration), Doyne's disease, retinitis pigmentosa (particularly autosomal dominant, autosomal-recessive, X-linked, di- or polygenic retinitis pigmentosa), (X-linked) retinoschisis, macular degeneration (AMD), age-related macular degeneration, atrophic age-related macular degeneration, neovascular AMD, diabetic maculopathy, proliferative diabetic retinopathy (PDR), cystoid macular oedema, central serous retinopathy, retinal detachment, intra-ocular inflammation, glaucoma, posterior uveitis, congenital stationary night blindness, choroideremia, early-onset retinal dystrophy, cone, rod-cone or cone-rod dystrophy, pattern dystrophies, Usher syndrome and other syndromic ciliopathies, such as Bardet-Biedl syndrome, Joubert syndrome, Senior-Loken syndrome or Alström syndrome.

The nucleic acid, therapeutic nucleic acid, therapeutic protein/polypeptide or therapeutic molecule can be used to treat a disorder affecting the photoreceptor cells (photoreceptor cell disease) such as the rods and/or cones. Non-limiting examples of a photoreceptor cell disease include achromatopsia, age-related macular degeneration, retinal degeneration, retinal dystrophy, retinitis pigmentosa, cone dystrophy, rod-cone dystrophy, color blindness, macular degeneration, night blindness, retinoschisis, choroideremia, diabetic retinopathy, hereditary optic neuropathy, Oguchi disease type I, retinitis *punctata albescens* (RPA), progressive retinal atrophy (PRA), *fundus albipunctatus* (FA) or congenital stationary night blindness (CSNB).

The therapeutic nucleic acid or therapeutic polypeptide can be used to treat an inherited retinal disease (IRD). IRDs are a genetically and phenotypically heterogeneous group of disorders. They are the leading cause of blindness in people aged 15 to 45 and have an estimated prevalence of 1 in 1,500-1 in 3,000. IRDs can be grouped according to the primarily effected retinal cell type, i.e., rod or cone photoreceptors, and according to the state of disease. Non-limiting examples of IRDs are achromatopsia, age-related macular degeneration, retinal degeneration, retinal dystrophy, retinitis pigmentosa, cone dystrophy, rod-cone dystrophy, color blindness, macular degeneration, retinoschisis, choroideremia, diabetic retinopathy, hereditary optic neuropathy, Oguchi disease type I, retinitis *punctata albescens* (RPA), progressive retinal atrophy (PRA), *fundus albipunctatus* (FA) or congenital stationary night blindness (CSNB).

The most common progressive IRD predominantly affecting cones is Stargardt macular dystrophy. It is inherited in an autosomal recessive manner and it is mostly caused by mutations in the ABCA4 gene encoding the retinal transporter ABCR. In one embodiment the therapeutic nucleic acid encodes ABCA4 or a portion thereof, wherein the therapeutic nucleic acid is used to treat Stargardt macular dystrophy.

The most common IRD primarily affecting rod photoreceptors is retinitis pigmentosa (RP). RP is a progressive disease leading to night blindness and tunnel vision. In later stages, secondary cone photoreceptor cell death is induced eventually resulting in complete vision loss. Some forms of retinitis pigmentosa have been associated with mutations in the rhodopsin encoding gene. In one embodiment the therapeutic nucleic acid encodes rhodopsin or a portion thereof, wherein the therapeutic nucleic acid is used to treat retinitis pigmentosa.

The nucleic acid sequence according to the invention may also comprise a donor splice site, wherein the donor splice site is localized 3' to the nucleotide sequence of interest or a portion thereof. The term "donor splice region" is used herein interchangeably with "donor splice site" (abbreviated to DSS) or "splice donor site" (abbreviated as SDS). Thus, the nucleic acid sequence of the invention may also comprise a donor splice site (DSS). Donor splice sites are known to the skilled person and inter alia described in Buckley et al. (2009) "A method for identifying alternative or cryptic donor splice sites within gene and mRNA sequences. Comparisons among sequences from vertebrates, echinoderms and other groups" BMC Genomics 10: 318 and Qu et al. (2017) "A Bioinformatics-Based Alternative mRNA Splicing Code that May Explain Some Disease Mutations Is Conserved in Animals" Front. Genet., vol. 8 Art. 38. Here, any suitable donor splice site is contemplated by this term. A donor splice site is typically located at the 3'-end of the exon and at the 5'-end of the flanking intron. However, in the context of the present invention the donor splice site can also be located somewhere else within the nucleotide sequence of interest. Analogous to the acceptor splice site the donor splice site permits the spliceosome to cut at its site.

In principle, the donor splice site as described herein can be located at any position of a nucleic acid molecule. It is also envisioned that the donor splice site is located at the 3' end of the (first) nucleic acid sequence. For example, the donor splice site sequence may comprise or consist of a sequence of AAGGTAAGT, AAGGTGAGT, CAGGTAAGT, CAGGTGAGT, AAGGTAAG, AAGGTGAG, CAGGTAAG or CAGGTGAG. It is also envisioned that the donor splice site sequence has a sequences which has a sequence identity of at least 70%, 80% 85%, 90%, 95%, 98%, 99% or 100% to the sequence of AAGGTAAGT, AAGGTGAGT, CAGGTAAGT, CAGGTGAGT, AAGGTAAG, AAGGTGAG, CAGGTAAG or CAGGTGAG.

Similarly, the acceptor splice region as described herein can be located at any position of a nucleic acid molecule. It is also envisioned that the acceptor splice site is located at the 5' end of the (second) nucleic acid sequence.

The nucleotide sequence of interest may additionally or alternatively comprise a polyadenylation signal and/or a promoter as described herein.

The present invention also relates to a method for producing a nucleic acid sequence, the method comprising
(A) providing a first nucleic acid sequence comprising one or more donor splice site sequences;
(B) providing a second nucleic acid sequence, wherein the second nucleic acid sequence comprises
  (i) an acceptor splice region sequence comprising
    (ia) a pyrimidine tract, wherein the pyrimidine tract comprises
      (iaa) 5 to 25 nucleotides;
      (iab) wherein at least 60% of the nucleotides within these 5 to 25 nucleotides are pyrimidine bases such as cytosine (C), thymine (T) and/or uracil (U);
    (ib) an acceptor splice site,
      (iba) wherein the acceptor splice site is located 3' to the pyrimidine tract; and
      (ibb) wherein the acceptor splice site comprises from 5' to 3' a sequence of NAGG, wherein N is a A, C, T/U or G;
thereby obtaining a nucleic acid sequence. The method is preferably an in vitro method. The method may further comprise a step of splicing the first nucleic acid sequence at the one or more donor splice sequence(s) and the second nucleic acid sequence at the acceptor splice site to obtain a spliced nucleic acid sequence. The method may also comprise a step of (C) cleaving the first nucleic acid sequence at the one or more donor splice site sequence(s) and cleaving the second nucleic acid sequence in the acceptor splice site, and (D) ligating the first cleaved nucleic acid sequence to the second cleaved nucleic acid sequence.

This method reflects the so-called trans-splicing. In particular, trans-splicing is a type of splicing in which exons from two separate nucleic acid molecules (preferably pre-mRNA molecules) are joined together to form one nucleic acid molecule. For example, as is the case when pre-RNA is spliced to a final mRNA, tRNA or rRNA. This process is also known to the skilled person and is inter alia described in Alberts B, Johnson A, Lewis J, et al. (2002) "Molecular Biology of the Cell. 4th edition. New York: Garland Science under the headline "from DNA to RNA". Therefore, the spliced nucleic acid sequences are preferably mRNA, rRNA or tRNA sequences. The nucleotide sequence of interest can thus be a pre-mRNA.

The first and the second nucleic acid sequence may be a DNA or an RNA sequence. In case the first and the second nucleic acid sequence is a DNA sequence, both, the first and the second nucleic acid sequence further comprise a promoter and at least the second, preferably both also comprise a transcription termination sequence, such as a polyA sequence. In case the first and the second nucleic acid sequence is an RNA sequence, at least the second, preferably both nucleic acid sequences comprise a termination sequence, such as a polyA sequence. Preferably the nucleic acid sequence is a DNA sequence, more preferably a vector or a plasmid comprising the DNA sequence.

In one embodiment the first and the second nucleic acid sequence further comprise a binding domain. In yet another embodiment the first and the second nucleic acid sequence is a pre-mRNA trans-splicing molecule or a DNA sequence encoding a pre-mRNA trans-splicing molecule as described herein.

Without being bound by theory, the cleaving of the first nucleic acid sequence at the one or more donor splice site sequence(s) and cleaving the second nucleic acid sequence in the acceptor splice region sequence and ligating the first cleaved nucleic acid sequence to the second cleaved nucleic acid sequence is effected using two transesterification reactions in cis-splicing as well as in trans-splicing and is referred to as "splicing" herein. The term "trans-splicing" as used herein refers to RNA splicing, particularly pre-RNA splicing of two separate RNA or pre-RNA molecules to form the mature RNA, such as the final mRNA, tRNA or rRNA.

The term "in vitro method" refers to a method outside the body, i.e., human or animal body, but includes cell lines or primary cells outside the body.

The methods and uses as described herein can be performed in any suitable cell-free system such as a cell lysate or in any suitable host cell.

Such suitable host cells are known to the skilled person. For example, suitable host cells comprise the splicing machinery, i.e. the spliceosome. A person of ordinary skill in the art can select regulatory elements for use in appropriate host cells, for example, mammalian or human host cells. Regulatory elements include, for example, promoters, termination sequences (such as transcription termination sequences, translation termination sequences), enhancers, and polyadenylation elements. Moreover, the expression levels of the transgene (nucleic acid sequence of interest) can be enhanced by using regulatory elements like enhancer sequences or the woodchuck hepatitis virus post-transcriptional response element (WPRE). However, these elements further limit the packaging capacity of the rAAVs.

Therefore, in some cases, particularly where the size limitation is critical, it is recommended to omit such optional elements and preferably use small mandatory regulatory elements such as short polyadenylation signals as termination sequence for the AAV vector and particularly the dual rAAV vector system according to the invention. The host cell may be a eukaryotic cell or a mammalian cell, such as a human or rodent cell line. The host cell may be a HEK cell such as HEK293(T) cell, a Cos7 cell, a CHO cell, a fibroblast e.g. of human or murine origin, a retinoblastoma cell, a 661W cell, an induced pluripotent stem cell (iPSC) such as a human iPSC, a photoreceptor cell e.g. obtained from a vertebrate, a neuronal cell, or a glial cell.

In one embodiment the method is performed in a host cell in vitro (i.e., outside the body) comprising introducing said first nucleic acid sequence and introducing said second nucleic acid sequence. Said first nucleic acid sequence and said second nucleic acid sequence may be introduced by transfection or transduction, more specifically co-transfection or co-transduction.

Therefore, in one embodiment the method comprising
(A) providing a first nucleic acid sequence comprising one or more donor splice site sequences;
(B) providing a second nucleic acid sequence, wherein the second nucleic acid sequence comprises
  (i) an acceptor splice region sequence comprising
    (ia) a pyrimidine tract, wherein the pyrimidine tract comprises
      (iaa) 5 to 25 nucleotides;
      (iab) wherein at least 60% of the nucleotides within these 5 to 25 nucleotides are pyrimidine bases such as cytosine (C), thymine (T) and/or uracil (U);
    (ib) an acceptor splice site,
      (iba) wherein the acceptor splice site is located 3' to the pyrimidine tract; and (ibb) wherein the acceptor splice site comprises from 5' to 3' a sequence of NAGG, wherein N is a A, C, T/U or G;
(ii) a nucleotide sequence of interest, wherein the nucleotide sequence of interest
(iia) is located 3' to the acceptor splice region;
thereby obtaining a nucleic acid sequence. The method may further comprise a step of splicing the first nucleic acid sequence at the one or more donor splice site sequence(s) and the second nucleic acid sequence at the acceptor splice site to obtain a spliced nucleic acid sequence. The method may also comprise a step of (C) cleaving the first nucleic acid sequence at the one or more donor splice site sequence(s) and cleaving the second nucleic acid sequence in the acceptor splice site, and (D) ligating the first cleaved nucleic acid sequence to the second cleaved nucleic acid sequence thereby obtaining a nucleic acid sequence.

In cases where both nucleic acid sequences comprise a nucleotide sequence of interest the method additionally comprises the feature that the first nucleotide sequence comprises (ii) a nucleotide sequence of interest, wherein the nucleotide sequence of interest is located 5' to the donor splice site.

Both the second and the first nucleic acid sequence can comprise a nucleotide sequence of interest as described herein. Such a nucleotide sequence of interest can be located 5' of the donor splice site. A nucleotide sequence of interest can additionally or alternatively be located 3' to the acceptor splice region. In another embodiment of the invention the polynucleotide comprises the following arrangement order: Preferably, 5'-(sequence of interest)—(donor splice site)—3' combined with 5'-(acceptor splice region)—(sequence of interest)—3'. Alternatively, 5'-(sequence of interest)—(acceptor splice region)—3' combined with 5'-(donor splice site)—(sequence of interest)—3'.

In a preferred embodiment the nucleotide sequence of interest is a sequence encoding for a polypeptide and the first nucleic acid sequence comprises the 5' portion of the sequence coding for a polypeptide and the second nucleic acid sequence comprises the 3' portion of the sequence coding for a polypeptide and trans-splicing reconstitutes the 5' portion and the 3' portion of the sequence coding for the polypeptide.

The ligating of the cleaved nucleic acid sequences is a process known to the skilled person. For example, this ligation process can be performed by a ligating molecule. For example, the ligating molecule can be a RNA ligase or a protein with a RNA ligase function. Such RNA ligases are known to the skilled person and inter alia described e.g. in Chambers and Patrick (2015) "Archaeal Nucleic Acid Ligases and Their Potential in Biotechnology" Hindawi Publishing Corporation Archaea Volume 2015, Article ID 170571, 10 pages. Some (t)RNA ligases are for example described in Popow et al. (2012) "Diversity and roles of (t)RNA ligases" Cell Mol Life Sci. 69(16):2657-70. Therefore, the methods which include a ligation step can further comprise the step of the addition of a RNA ligase. The RNA ligase can for example be a mRNA ligase, a tRNA ligase or a rRNA ligase. Methods describing how e.g. ligated mRNA molecules can be analyzed are shown in the Examples.

In a preferred embodiment the method is performed in a host cell and more preferably in vitro (i.e., outside the body). Thus, the first and the second nucleic acid sequence are introduced into a host cell, wherein the first and the second nucleic acid sequence are a recombinant nucleic acid sequence and/or heterologous to the host cell. Introducing the first and the second nucleic acid into the host cell comprises transfection or transduction. Transfection may be DNA or RNA transfection and methods for transfecting DNA or RNA are known to the person skilled in the art. Preferably the nucleic acid sequence is a DNA sequence and the DNA sequence is transfected in form of a plasmid or vector comprising said DNA sequence. Transduction as referred to herein means introducing a nucleic acid using a viral vector, wherein the viral vector may comprise DNA or RNA. In a preferred embodiment the viral vector is a DNA viral vector and may comprise single-stranded DNA (such as AAV) or double stranded DNA.

In one embodiment the method according to the invention comprises (A) introducing into a host cell a first nucleic acid sequence comprising a pre-mRNA trans-splicing molecule sequence or a nucleic acid sequence encoding said pre-mRNA trans-splicing molecule, wherein the first pre-mRNA trans-splicing molecule comprises from 5' to 3'(a) a 5' portion of a nucleotide acid sequence of interest; (b) a donor splice site; (c) optionally a spacer sequence; (d) a first binding domain; and (e) optionally a termination sequence, preferably a polyA sequence and (B) introducing into a host cell a second nucleic acid sequence comprising the pre-mRNA trans-splicing molecule sequence or a nucleic acid sequence encoding said pre-mRNA trans-splicing molecule, wherein the second pre-mRNA trans-splicing molecule comprises from 5' to 3'; (i) a second binding domain, which is complementary to the first binding domain of the first nucleic acid sequence; (ii) an acceptor splice region sequence comprising; (iia) a pyrimidine tract, wherein the pyrimidine tract comprises (iiaa) 5 to 25 nucleotides; (iiab) wherein at least 60% of the nucleotides within these 5 to 25 nucleotides are pyrimidine bases such as cytosine (C), thymine (T) and/or uracil (U); (iib) an acceptor splice site, (iiba) wherein the acceptor splice site is located 3' to the pyrimidine tract; and (iibb) wherein the acceptor splice site comprises from 5' to 3' a sequence of NAGG, wherein N is a A, C, T/U or G; and (iii) a 3' portion of the nucleotide sequence of interest. The method may further comprise (C) cleaving the first nucleic acid sequence at the donor splice site sequence and cleaving the second nucleic acid sequence in the acceptor splice site; (D) ligating the first cleaved nucleic acid sequence comprising the 5' portion of the nucleotide sequence of interest to the second cleaved nucleic acid sequence comprising the 3' portion of the nucleotide sequence of interest, thereby obtaining the nucleic acid sequence of interest. In a preferred embodiment the first and the second nucleic acid sequence are a DNA sequence encoding said pre-mRNA trans-splicing molecule and the first nucleic acid sequence further comprises a promoter 5' of the 5' portion of the nucleic acid sequence of interest and the second nucleic acid sequence further comprises a promoter 5' of the second binding domain.

The present invention also relates to a nucleic acid sequence, comprising
(i) an acceptor splice region sequence comprising
(ia) a pyrimidine tract, wherein the pyrimidine tract comprises
(iaa) 5 to 25 nucleotides;
(iab) wherein at least 60% of the nucleotides within these 5 to 25 nucleotides are pyrimidine bases such as cytosine (C), thymine (T) and/or uracil (U);
(ib) a acceptor splice site,
(iba) wherein the acceptor splice site is located 3' to the pyrimidine tract; and (ibb) wherein the acceptor splice site comprises from 5' to 3' a sequence of NAGG, wherein N is a A, C, T/U or G;
(ii) a nucleotide sequence of interest, wherein the nucleotide sequence of interest
(iia) is located 3' or 5' to the acceptor splice region; wherein the nucleotide sequence of interest is not exon 3 of rhodopsin gene of SEQ ID NO: 9 or wherein the nucleotide sequence of interest does not comprise a sequence as defined in SEQ ID No: 9 and/or 10, or wherein the nucleic acid sequence of interest does not comprise exon 3 of rhodopsin gene of SEQ ID NO: 9.

The present invention also relates to a nucleic acid sequence, comprising
(i) an acceptor splice region sequence comprising
(ia) a pyrimidine tract, wherein the pyrimidine tract comprises
(iaa) 5 to 25 nucleotides;
(iab) wherein at least 60% of the nucleotides within these 5 to 25 nucleotides are pyrimidine bases such as cytosine (C), thymine (T) and/or uracil (U);
(ib) a acceptor splice site,
(iba) wherein the acceptor splice site is located 3' to the pyrimidine tract; and
(ibb) wherein the acceptor splice site comprises from 5' to 3' a sequence of NAGG, wherein N is a A, C, T/U or G;
(ii) a nucleotide sequence of interest, wherein the nucleotide sequence of interest
(iia) is located 3' or 5' to the acceptor splice region; wherein the nucleotide sequence of interest is not the rhodopsin mRNA of SEQ ID NO. 10.

It is envisioned that the nucleic acid sequence of the present invention has a length of at most 5800 nucleotides. It is further envisioned that the nucleic acid sequence of the present invention has a length of at most 5500, 5000, 4500, 4000, 3500, 3000, 2500, 2000, 1500, 1000, 500, 400, 300, 200 or at most 150 nucleotides.

A further application in which the acceptor splice region of the present invention can be used in a nucleic acid molecule is a so called exogenous pre-mRNA trans-splicing molecule for the Smart technology. Such pre-mRNA trans-splicing molecules in which the acceptor splice region of the present invention can be introduced are inter alia described in WO 2011/042556, WO2013/025461 as well as by Berger et al. (2016) "mRNA trans splicing in gene therapy for genetic diseases" WIREs RNA, 7:487-498, Puttaraju et al. (1999) "Spliceosome-mediated RNA trans-splicing as a tool for gene therapy" Nature Biotechnology, vol. 17, pp. 246-252; and Mansfield et al. (2003) "5' Exon replacement and repair by spliceosome-mediated RNA trans-splicing" RNA, vol. 9: 1290-1297. From these references the skilled person also knows how to construct such pre-mRNA trans-splicing molecules. Some exemplary pre-mRNA trans-splicing molecule nucleic acid molecules are also described herein.

The present invention also concerns a pre-mRNA trans-splicing molecule comprising,
(i) an acceptor splice region, comprising
(ia) a pyrimidine tract, wherein the pyrimidine tract comprises
(iaa) 5 to 25 nucleotides;
(iab) wherein at least 60% of the nucleotides within these 5 to 25 nucleotides are pyrimidine bases such as cytosine (C) or uracil (U);
(ib) a acceptor splice site,
(iba) wherein the acceptor splice site is located 3' to the pyrimidine tract; and
(ibb) wherein the acceptor splice site comprises from 5' to 3' a sequence of NAGG, wherein N is a A, C, U or G;
(ii) a nucleotide sequence of interest; wherein the acceptor splice region is localized 5' to the nucleotide sequence of interest;
(iii) a binding domain targeting pre-mRNA, which is localized 5' to the nucleic acid sequence of interest; and
(iv) optionally a spacer sequence, wherein the spacer sequence is localized between the binding domain and the acceptor splice region.

In a preferred embodiment the acceptor splice region is localized 5' to the nucleotide sequence of interest and the binding domain is localized 5' to acceptor splice region. Preferably the nucleic acid sequence or the pre-mRNA trans-splicing molecule further comprise a termination sequence, preferably a polyA sequence.

The present invention further relates to a pre-mRNA trans-splicing molecule comprising,
(i) an acceptor splice region comprising
(ia) a pyrimidine tract, wherein the pyrimidine tract comprises
(iaa) 5 to 25 nucleotides;
(iab) wherein at least 60% of the nucleotides within these 5 to 25 nucleotides are pyrimidine bases such as cytosine (C), thymidine (T) and/or uracil (U);
(ib) an acceptor splice site,
(iba) wherein the acceptor splice site is located 3' to the pyrimidine tract; and
(ibb) wherein the acceptor splice site comprises from 5' to 3' a sequence of NAGG, wherein N is a A, C, U or G;
(ii) a nucleotide sequence of interest, wherein the acceptor splice region is localized 5' to the nucleotide sequence of interest;
(iii) a donor splice site, wherein the donor splice site is localized 3' to the nucleotide sequence of interest;
(iv) a first binding domain targeting pre-mRNA located 5' to the nucleotide sequence of interest;
(v) a second binding domain targeting pre-mRNA located 3' to the nucleotide sequence of interest;
(vi) optionally a first spacer sequence, wherein the first spacer is localized between the first binding domain and the acceptor splice region;
(vii) optionally a second spacer sequence, wherein the second spacer is localized between the second binding domain and the donor splice site.

In one embodiment the first binding domain is localized 5' to acceptor splice region and the second binding domain is localized 3' to the donor splice site. The person skilled in the art will understand that the DNA sequence encoding the pre-mRNA trans-splicing molecule comprises a promoter in order to transcribe the pre-mRNA trans-splicing molecule, which is a RNA molecule. The term "binding domain targeting pre-mRNA" may also be referred to as "pre-mRNA targeting binding domain", which may be located 5' or 3' of the nucleotide sequence of interest.

The nucleic acid sequences as described herein can reflect a pre-mRNA trans-splicing molecule. The person skilled in the art will understand that the nucleic acid sequences and the pre-mRNA trans-splicing molecules as described herein are recombinant sequences or molecules. These pre-mRNA trans-splicing molecules are known in the art and inter alia described in WO 2011/042556, WO2013/025461 as well as by Berger et al. (2016) "mRNA trans splicing in gene therapy for genetic diseases" WIREs RNA, 7:487-498, Puttaraju et al. (1999) "Spliceosome-mediated RNA trans-splicing as a tool for gene therapy" Nature Biotechnology, vol. 17, pp. 246-252, Mansfield et al. (2003) "5' Exon replacement and repair by spliceosome-mediated RNA trans-splicing" RNA, vol. 9: 1290-1297 and Berger et al. (2016) "mRNA trans-splicing in gene therapy for genetic diseases" WIREs RNA 7: 487-498. Thus, the skilled person knows how to constructs those pre-mRNA trans-splicing molecules. It is envisioned that the pre-mRNA trans-splicing molecule binds to target pre-mRNA, wherein the pre-mRNA may be a natural pre-mRNA, particularly a pre-mRNA endogenous to the host cell, or a recombinant pre-mRNA, particularly another pre-mRNA trans-splicing molecule. It is also contemplated that the pre-mRNA trans-splicing molecule preferentially induces the trans-splicing reaction more efficiently than the cis-splicing reaction.

The term "binding domain targeting pre-mRNA" as used herein can be any suitable "binding domain targeting pre-mRNA", which means that is complementary to a sequence of the targeted pre-mRNA located 5' or 3' to the nucleotide sequence of interest. The "binding domain targeting pre-mRNA" as used herein may also be referred to as "target binding domain", "binding domain" (abbreviated to BD) or "binding sequence". For example, the binding domain may recognize the target pre-mRNA or mRNA by base-pairing. For example, the target on the mRNA can be an intron. The target binding domain of the pre-mRNA trans-splicing molecules described herein may contain one or two binding domains of at least 15 to 30 nucleotides, preferably 80-120 nucleotides, more preferably about 100 nucleotides; or having long target binding domains as described in US Patent Publication No. US 2006-0194317 A1, of up to several hundred nucleotides which are complementary to and in antisense orientation to the targeted region of the selected (e.g. endogenous) pre-mRNA. This confers specificity of binding and anchors the endogenous pre-mRNA closely in space so that the spliceosome e.g. of the nucleus of a host cell can trans-splice a portion of the pre-mRNA trans-splicing molecule to a portion of the (e.g. endogenous) pre-mRNA. Alternatively the binding domain may be reverse complementary to the binding domain of another recombinant pre-mRNA, such as another pre-mRNA trans-splicing molecule. This confers specificity of binding and anchors the two pre-mRNA trans-splicing molecules closely in space so that the spliceosome e.g. of the nucleus of a host cell can trans-splice a portion of the one pre-mRNA trans-splicing molecule to a portion of the other pre-mRNA trans-splicing molecule. Thus, it is envisioned that the binding domain comprises between about 15 to 250 nucleotides, between about 15 to 200 nucleotides, between about 100 to 200 nucleotides or less than 500, 400, 300 or 200 nucleotides. In one embodiment the binding domain comprises 50-150 nucleotides, preferably 80-120 nucleotides, even more preferably 90 to 110 nucleotides or about 100 nucleotides. Alternatively or more preferably furthermore, an efficient binding domain has a GC content of 45-65% and/or is derived from intronic eukaryotic sequences or bacterial sequences and/or comprises at least one branch point in the last 30 bp (as e.g., evaluated using the human splicing finder 3.1 (See worldwide website: umd.be/HSF/index.html)).

Within a host cell, the binding domain may bind to endogenous pre-mRNA or to a second heterologous or recombinant pre-mRNA, (provided or introduced to the host cell) as long as the endogenous pre-mRNA or the second heterologous or recombinant pre-mRNA comprises a sequence reverse complement to the target binding domain. Thus for a second heterologous or recombinant pre-mRNA, it comprises a binding domain reverse complement to the binding domain of the first heterologous pre-mRNA. The terms "endogenous" and heterologous" are used herein relative to the host cell. Targeting endogenous pre-mRNA is also referred to as spliceosome-mediated RNA trans-splicing and is typically used to replace a part of the endogenous pre-mRNA. Targeting a second heterologous or recombinant pre-mRNA is also referred to as trans-splicing and generates a new recombinant mRNA ligating the first nucleotide sequence or a portion thereof (5') from one pre-mRNA trans-splicing molecule to the second nucleotide sequence or a portion thereof (3') of another pre-mRNA trans-splicing molecule. The term "recombinant" as used herein refers to a DNA molecule or sequence formed by laboratory methods of genetic recombination, such as molecular cloning and to a RNA or polypeptide molecule/sequence encoded by said recombinant DNA molecule or sequence.

The term "pre-mRNA" or "pre-RNA" refers to the RNA prior to trans-splicing and typically describes RNA molecules prior to cis-splicing (e.g., comprising introns and exons), but may also refer to RNA molecules post cis-splicing (e.g., comprising exons only), such as in case where the binding domain target a sequence spanning an exon-exon boundary.

The term "heterologous" as used herein refers to a protein or a nucleic acid molecule or sequence that is experimentally transferred or introduced into a cell and is therefore not endogenous to this cell. Wherein the heterologous protein or nucleic acid molecule or sequence may be from a different cell type or a different species than the recipient, it may as well be from the same cell type or species as the recipient, as long as it is introduced into the recipient host cell. As referred to herein, the terms "heterologous" and "recombinant" are used interchangeably.

An exemplary binding domain suitable for use in the present invention, without being limited thereto, is a binding domain having an RNA sequence encoded by the sequence of SEQ ID NO: 27, 28, 32, 33 or 18. Further target binding domains may be identified using a reporter reconstitution assay, such as the cerulean reconstitution assay for determining reconstitution efficiencies as described and used in Examples 2 and 5 or as described in Riedmayr L M. (2020, SMaRT for Therapeutic Purposes. Methods Mol Biol 2079: 219-32. doi: 10.1007/978-1-4939-9904-O_17) or Dallinger G. et al. (2003, Development of spliceosome-mediated RNA trans-splicing (SMaRT) for the correction of inherited skin diseases. Exp Dermatol 12:37-46).

A second binding region may be placed at the 3' end of the molecule and can be incorporated into the pre-mRNA trans-splicing molecule of the invention. Absolute complementarity, although preferred, is not required. A sequence "complementary" to a portion of the endogenous pre-mRNA, as referred to herein, means a sequence having sufficient complementarity to be able to hybridize with the endogenous pre-mRNA, forming a stable duplex. The ability to hybridize will depend on both the degree of complementarity and the length of the nucleic acid (See, for example, Sambrook et ah, 1989, Molecular Cloning, A Laboratory Manual, 2d Ed., Cold Spring Harbor Laboratory Press, Cold Spring Harbor, N.Y.).

Complementarity as used with regard to binding domains targeting pre-mRNA thus means that the binding domain comprises a sequences, which is at least 60%, 65%, 70%, 75%, 80%, 85%, 90%, 95%, 98% 99% or 100% complementary to the target sequence on the pre-mRNA, preferably at least 90%, 95%, 98% 99% or 100% complementary to the target sequence on the pre-mRNA.

A spacer region to separate the splice site(s) from the binding domain is preferably also included in the pre-mRNA trans-splicing molecule. The spacer sequence is a region of the pre-mRNA trans-splicing molecule that can cover elements of the 3' and/or 5' splice site of the pre-mRNA trans-splicing molecule by relatively weak complementarity thereby preventing non-specific trans-splicing.

The spacer separating the 5' donor splice site and the 3'-end binding domain can comprise between about 10 and 100 nucleotides, preferably between about 10 to 70, between about 20 and 70 nucleotides, between about 20 to 50 and more preferably between about 30 and 50 nucleotides. This spacer may comprise a downstream intronic splice enhancer (DISE). The spacer sequence that separates the 3' acceptor splice region from the 5'-end binding domain can comprise between about 2 and 100 nucleotides or between about 10 and 100 nucleotides, preferably between about 2 and 50, more preferably between about 5 and 20 nucleotides.

The spacers can be non-coding sequences but may be designed to include features such as stop codons which would block any translation of a spliced pre-mRNA trans-splicing molecule. Additional features can be added to the pre-mRNA trans-splicing molecule are known to the skilled person as described above. It is further envisioned that the nucleic acid sequences or pre-mRNA trans-splicing molecules as described herein are comprised in a (recombinant) vector. Such vectors are known to the skilled person as well. Vectors comprising the nucleotide sequences of the present invention such as the pre-mRNA trans-splicing molecules of interest can be plasmid, viral, or others known in the art, used for replication and expression in mammalian cells.

Expression of the nucleotide sequence of interest or a nucleotide sequence as described herein such as pre-mRNA trans-splicing molecule can be regulated by any promoter/enhancer sequences known in the art to act in mammalian, preferably human cells. Such promoters/enhancers can be inducible or constitutive. Such promoters are described also elsewhere herein. One exemplary promoter is the human or murine Rhodopsin or short or medium or long wavelength sensitive opsin promoter, etc. Any type of plasmid, cosmid, YAC or viral vector can be used to prepare the recombinant DNA construct which can be introduced directly into the tissue site. Alternatively, viral vectors can be used which selectively infect the desired target cell. Vectors for use in the practice of the invention include any eukaryotic expression vectors, including but not limited to viral expression vectors such as those derived from the class of retroviruses, adenoviruses or adeno-associated viruses. In a preferred embodiment, the recombinant vector of the invention is a eukaryotic expression vector.

In another specific embodiment, the present invention comprises delivering the nucleic acid sequence such as the pre-mRNA trans-splicing molecule of the invention or a nucleic acid sequence encoding the pre-mRNA trans-splicing molecule of the invention to a target cell. Various delivery systems are known and can be used to transfer the compositions of the invention into cells, e. g. encapsulation in liposomes, microparticles, microcapsules, recombinant cells capable of expressing the composition, receptor-mediated endocytosis, construction of a nucleic acid as part of a retroviral, adenoviral, adeno-associated viral or other vector, injection of DNA, electroporation, calcium phosphate mediated transfection, etc. The present invention also concerns a cell comprising the nucleic acid sequence such as the pre-mRNA trans-splicing molecule of the invention, a nucleic acid sequence encoding the pre-mRNA trans-splicing molecule or a recombinant vector comprising the nucleic acid sequence encoding the pre-mRNA trans-splicing molecule of the invention.

The nucleic acid sequence of interest or nucleic acid sequences as disclosed herein can be used to provide a gene encoding a functional biologically active molecule to cells of an individual with an inherited genetic disorder where expression of the missing or mutant gene product produces a normal phenotype. This can inter alia be achieved by an adeno-associated virus vector as also disclosed herein.

The invention also relates to a deoxyribonucleic acid (DNA) molecule comprising a promoter and a sequence encoding the pre-mRNA trans-splicing molecule as described herein. Preferably the DNA molecule is a vector or a plasmid, wherein the vector may be a viral vector such as an AAV, an adenovirus, or a lentivirus vector or a plasmid. The pre-mRNA trans-splicing molecule or the DNA molecule such as the viral vector may be used in therapy, particularly gene therapy, more particularly in gene therapy treating an ocular disorder.

A further application in which the acceptor splice site of the present invention can be used is in any AAV vector or AAV vector system. Such vector systems and how they can be constructed are known to the skilled person and inter alia described in Carvalho et al. (2017) "Evaluating efficiencies of dual AAV approaches for retinal targeting" Frontiers in Neuroscience, vol. 11, Article 503, US 2014/0256802 or Trapani et al. (2013) "Effective delivery of large genes to the retina by dual AAV vectors" EMBO Molecular Medicine, vol. 6, no. 2, pp. 194-211. Some exemplary AAV vectors and AAV vectors systems are also described herein.

The present invention also relates to an adeno-associated virus (AAV) vector comprising at least two inverted terminal repeats comprising a nucleic acid sequence between these two inverted terminal repeats, wherein said nucleic acid sequence comprises from 5' to 3'
  (i) a promoter;
  (ii) a binding domain;
  (iii) optionally a spacer sequence;
  (iv) an acceptor splice region sequence comprising
    (a) a pyrimidine tract, wherein the pyrimidine tract comprises
      (aa) 5 to 25 nucleotides;
      (ab) wherein at least 60% of the nucleotides within these 5 to 25 nucleotides are pyrimidine bases such as cytosine (C), thymine (T) and/or uracil (U);
    (b) a acceptor splice site,
      ba) wherein the acceptor splice site is located 3' to the pyrimidine tract; and
      bb) wherein the acceptor splice site comprises from 5' to 3' a sequence of NAGG, wherein N is a A, C, T/U or G (preferably A, C, T or G);
  (v) a nucleotide sequence of interest
  (vi) optionally a termination sequence, such as a poly A sequence.

Structurally, AAVs are small (25 nm), single-DNA stranded non-enveloped viruses with an icosahedral capsid. Naturally occurring or engineered AAV variants (also AAV serotypes) that differ in the composition and structure of their capsid (cap) protein have varying tropism, i.e. ability to transduce different (retinal) cell types (Boye et al. (2013) "A comprehensive review of retinal gene therapy" Molecular therapy 21 509-519). When combined with ubiquitously active promoters this tropism defines the site of gene expression. Whereas in combination with cell-type specific promoters the degree of site-specificity (i.e. transgene expression only in rod or cone photoreceptors) is defined by the combination of both, the tropism of the AAV serotype and the specificity of the promoter (Schön et al. (2015) "Retinal gene delivery by adeno-associated virus (AAV) vectors: Strategies and applications" Eur J Pharm Biopharm. 95(Pt B):343-52).

The terms "adeno-associated virus vector" or "recombinant AAV" or "rAAV" all used interchangeably are meant to include any AAV that comprises a heterologous polynucleotide sequence (also referred to a nucleotide sequence of interest herein) in its viral genome. In general, the heterologous polynucleotide/nucleotide sequence of interest is flanked by at least one, and generally by two naturally occurring or variant AAV inverted terminal repeat sequences (ITRs). The term rAAV vector encompasses both rAAV vector particles and rAAV vector plasmids. Thus, for example, a rAAV that comprises a heterologous polynucleotide sequence would be a rAAV that includes a nucleic acid sequence not normally included in a naturally-occurring, wild-type AAV, for example, a transgene (e.g. a non-AAV RNA-coding polynucleotide sequence, non-AAV protein-coding polynucleotide sequence), a non-AAV promoter sequence, a non-AAV poly-adenylation sequence, etc.

Such recombinant AAV vectors are common general knowledge in the art and so the skilled person also knows how to construct such recombinant AAVs.

A "rAAV vector genome" or "rAAV genome" is an AAV genome (i.e. vDNA) that comprises one or more heterologous nucleic acid sequences. rAAV vectors generally require only the terminal repeat(s) (TR) in as to generate virus. All other viral sequences are considered dispensable and may be supplied in trans (Muzyczka, (1992) Curr Topics Microbiol. Immunol. 158:97). Typically, the rAAV vector genome will only retain the one or more TR sequence so as to maximize the size of the transgene/nucleotide sequence of interest/heterologous nucleic acid sequence that can be efficiently packaged by the vector/capsid. The structural and non-structural protein coding sequences may be provided in trans (e.g., from a vector, such as a plasmid, or by stably integrating the sequences into a packaging cell). In embodiments of the invention the rAAV vector genome comprises at least one TR sequence (e g., AAV TR sequence), optionally two TRs (e.g., two AAV TRs), which typically will be at the 5' and 3' ends of the vector genome and flank the heterologous nucleic acid, but need not be contiguous thereto. The TRs can be the same or different from each other.

The term "inverted terminal repeat", "terminal repeat" or "TR" all used interchangeable includes any viral terminal repeat or synthetic sequence that forms a hairpin structure and functions as an inverted terminal repeat (i.e. if it mediates the desired functions such as replication, virus packaging, integration and/or provirus rescue, and the like). The TR can be an AAV TR or a non-AAV TR. For example, a non-AAV TR sequence such as those of other parvoviruses (e.g. canine parvovirus (CPV), mouse parvovirus (MVM), human parvovirus B-19) or any other suitable virus sequence (e.g., the SV40 hairpin that serves as the origin of SV40 replication) can be used as a TR, which can further be modified by truncation, substitution, deletion, insertion and/or addition. Further, the TR can be partially or completely synthetic, such as the "double-D sequence" as described in U.S. Pat. No. 5,478,745. The terminal repeat can have a length of about 50, 100, 150, 200, 250, 300 or more nucleotide. For example, the terminal repeat has about 145 nucleotides. For example the inverted terminal repeat can have a sequence of SEQ ID NO. 14 and/or 15. It is also envisioned that the inverted terminal repeat can have a sequence having at least 60%, 70%, 75%, 80%, 85%, 90%, 95%, 98% or 100% sequence identity to a sequence of SEQ ID 14 and/or 15. Preferably, the AAV vector comprises both of SEQ ID NO. 14 and 15 or a sequence having at least 60% sequence identity to SEQ ID 14 and 15.

An 'AAV terminal repeat" or "AAV TR" may be from any AAV, including but not limited to serotypes 1, 2, 3, 3B, 4, 5, 6, 7, 8, 9, 10, 11, 12 or 13 or any other AAV now known or later discovered. An AAV terminal repeat need not have the native terminal repeat sequence (e.g., a native AAV TR sequence may be altered by insertion, deletion, truncation and/or missense mutations), as long as the terminal repeat mediates the desired functions, e.g., replication, virus packaging, integration, and/or provirus rescue, and the like. The virus vectors of the invention can further be "targeted" virus vectors (e.g., having a directed tropism) and/or a "hybrid" parvovirus (i.e, in which the viral TRs and viral capsid are from different parvoviruses) as described in international patent publication WO 00/28004.

It is also envisioned that the recombinant AAV or AAV vector comprises or has a sequence having a sequence identity of at least 70%, 75%, 80%, 85%, 90%, 95%, 97%, 99% or 100% with a naturally occurring AAV type 1 (AAV-1), AAV type 2 (AAV-2), AAV type 3 (AAV-3), AAV3B, AAV type 4 (AAV-4), AAV type 5 (AAV-5), AAV type 6 (AAV-6), AAV type 7 (AAV-7), AAV type 8 (AAV-8), AAV9, AAV10, AAV11, AAV12, rh10, avian AAV, bovine AAV, canine AAV, equine AAV, primate AAV, non-primate AAV, and ovine AAV.

According to the invention the nucleic acid sequence between the two inverted terminal repeats further comprises a promotor as described herein. The selection of the promoter to be employed in the AAV may be made from among a wide number of constitutive or inducible promoters that can express the selected transgene/nucleotide sequence of interest in the desired target cell. The target cell can be a photoreceptor cell. The promoter may be derived from any species, including human.

A promoter as described herein can be "cell specific". The term "cell-specific" means that the particular promoter selected for the recombinant vector can direct expression of the selected transgene/nucleotide sequence of interest in a particular cell or ocular cell type. Useful promoters include, without limitation, the rod opsin promoter, the red-green opsin promoter, the blue opsin promoter, the cGMP-P-phosphodiesterase promoter, the mouse opsin promoter (Beltran et al. (2010) "rAAV2/5 gene-targeting to rods:dose-dependent efficiency and complications associated with different promoters." Gene Ther. 17(9):1162-74), the rhodopsin promoter (Mussolino et al, Gene Ther, July 2011, 18(7): 637-45); the alpha-subunit of cone transducin (Morrissey et al, BMC Dev, Biol, January 2011, 11:3); beta phosphodiesterase (PDE) promoter; the retinitis pigmentosa (RP1) promoter (Nicord et al, J. Gene Med, December 2007, 9(12): 1015-23); the NXNL2/NXNL 1 promoter (Lambard et al, PLoS One, October 2010, 5(10):e13025), the PE65 promoter; the retinal degeneration slow/peripherin 2 (Rds/perph2) promoter (Cai et al, Exp Eye Res. 2010 August; 91(2): 186-94); and the VMD2 promoter (Achi et al, Human Gene Therapy, (2009) 20:31-9).

Useful promoters to be used in the present invention also include, without limitation, the rod opsin promoter (RHO), the red-green opsin promoter, the blue opsin promoter, the cGMP-Phosphodiesterase promoter, the SWS promoter (blue short wavelength-sensitive (SWS) opsin promoter), the mouse opsin promoter (Beltran et al 2010 cited above), the rhodopsin promoter (Mussolino et al, Gene Ther, July 2011, 18(7):637-45); the alpha-subunit of cone transducin (Morrissey et al, BMC Dev, Biol, January 2011, 11:3); the cone arrestin (ARR3) promoter (Kahle N A et al., Hum Gene Ther Clin Dev, September 2018, 29(3):121-131), the beta phosphodiesterase (PDE) promoter; the retinitis pigmentosa (RP1) promoter (Nicord et al, J. Gene Med, December 2007, 9(12): 1015-23); the NXNL2/NXNL 1 promoter (Lambard et al, PLoS One, October 2010, 5(10):e13025), the RPE65 promoter; the retinal degeneration slow/peripherin 2 (Rds/perph2) promoter (Cai et al, Exp Eye Res. 2010 August; 91(2): 186-94); the VMD2 promoter (Achi et al, Human Gene Therapy, 2009 (20:31-9)), and the ABCA4 promoter or any hybrid promoter consisting of at least two different promoters.

It is also contemplated that the nucleic acid sequence between the two inverted terminal repeats further comprises a termination signal, such as a polyadenylation signal, located 3' to the nucleic acid sequence of interest. The termination signal, such as the polyadenylation signal, located 3' to the nucleic acid sequence of interest is optional, because the pre-RNA may be trans-spliced to an endogenous pre-RNA or a further recombinant pre-RNA to form the 5' end of the mature RNA, such as the mature mRNA. However, it has been shown that trans-splicing efficacy is higher in the presence of a polyadenylation signal.

A promotor is required in order to transcribe the pre-RNA, however, the nucleic acid sequence does not necessarily need an ATG (translation start) and/or a Kozak consensus sequence. In case the pre-RNA may be trans-spliced to an endogenous pre-RNA or a further recombinant pre-RNA to form the 3' end of the mature RNA, such as the mature mRNA, the lack of an ATG and/or a Kozak consensus sequence may be advantageous to avoid undesired translation from the pre-RNA prior to trans-splicing.

Selection of these and other common vector and regulatory elements are conventional and many such sequences are available. See e.g. Ausubel et al., Current Protocols in Molecular Biology, John Wiley & Sons, New York, 1989). Of course, not all vectors and expression control sequences will function equally well to express all of the transgenes as described herein. However, one of skill in the art may make a selection among these, and other, expression control sequences without departing from the scope of this invention.

The present invention also relates to an adeno-associated virus (AAV) vector system comprising
(I) a first AAV vector comprising a nucleic acid sequence at least two inverted terminal repeats comprising a nucleic acid sequence between these two inverted terminal repeats, wherein said nucleic acid sequence between these two inverted terminal repeats comprises from 5' to 3'
  (a) a promoter,
  (b) a nucleotide sequence encoding an N-terminal portion of a polypeptide of interest;
  (c) a donor splice site;
  (d) optionally a spacer sequence;
  (e) a first binding domain; and
  (f) optionally a termination signal, preferably a polyA signal:
(II) a second AAV vector comprising a nucleic acid sequence comprising at least two inverted terminal repeats comprising a nucleic acid sequence between these two inverted terminal repeats, wherein said nucleic acid sequence between these two inverted terminal repeats comprises from 5' to 3'
  (i) a promoter;
  (ii) a second binding domain, which is complementary to the first binding domain of the first AAV vector;
  (iii) optionally a spacer sequence;
  (iv) an acceptor splice region sequence comprising
    (a) a pyrimidine tract, wherein the pyrimidine tract comprises
      (aa) 5 to 25 nucleotides;
      (ab) wherein at least 60% of the nucleotides within these 5 to 25 nucleotides are pyrimidine bases such as cytosine (C), thymine (T) and/or uracil (U);
    (b) an acceptor splice site,
      (ba) wherein the acceptor splice site is located 3' to the pyrimidine tract; and
      (bb) wherein the acceptor splice site comprises from 5' to 3' a sequence of NAGG, wherein N is a A, C, T/U or G;
  (v) a nucleotide sequence encoding a C-terminal portion of the polypeptide of interest;
    (vb) wherein the C-terminal portion of the polypeptide of interest and the N-terminal portion of the polypeptide of interest reconstitute the polypeptide of interest; and
  (vi) a termination signal, preferably a polyA signal.

Thus, the C-terminal portion of the polypeptide of interest corresponds to the portion of the polypeptide of interest that is missing from the N-terminal portion of the polypeptide comprised in the first AAV vector. In one embodiment the polypeptide is a full-length polypeptide and the first AAV vector comprises an N-terminal portion of a full-length polypeptide of interest and the second AAV vector comprises a C-terminal portion of the full-length polypeptide of interest and the C-terminal portion of the full-length polypeptide of interest and the N-terminal portion of the full-length polypeptide of interest reconstitute the polypeptide of interest. Thus, the C-terminal portion of the full-length polypeptide of interest corresponds to the portion of the full-length polypeptide of interest that is missing from the N-terminal portion of the full-length polypeptide comprised in the first AAV vector. More specifically following trans-splicing the mRNA comprises a sequence encoding the N-terminal portion of the polypeptide of interest and the C-terminal portion of the polypeptide of interest (in frame), wherein the mRNA encodes the (full length) polypeptide of interest and hence the polypeptide of interest is reconstituted.

Notably, there exists a size limitation of rAAV or AAV vector genome packaging capacity of about ~5 kb. Since cDNAs of many therapeutic proteins are large, devising strategies to deliver large transgenes using rAAV vectors can significantly expand the clinical application of rAAV-mediated gene therapy. Thus, in one embodiment the polypeptide of interest is a polypeptide encoded by a transgene. To deliver transgenes that already exceed the AAV packaging capacity, the trans-splicing approach was developed. Briefly, two separate rAAV vectors deliver two parts of a transgene into a target cell, one part containing a splicing donor signal at the 3' end of the 5' part of the transgene and the other part harbouring a splicing acceptor signal at the 5' end of the 3' part of the transgene. While in prior art systems the intermolecular recombination between the two vector genomes generates an intervening ITR junction or an intervening sequence containing a recombinogenic sequence, which is in a next step excised by the cellular cis-splicing mechanism from a single pre-mRNA molecule to form a complete full-length transgene cassette, in the AAV vector system according to the invention the two vector genomes are transcribed separately, the pre-mRNAs interact via their complementary binding domains and the two pre-mRNAs are spliced in trans to form a complete (full-length) transgene transcript.

The efficiency of the vector systems can be assessed by measuring the expression of the (full-length) protein of interest or mRNA encoding the protein of interest that has been provided by the dual AAV vector approach, e.g., by measures and techniques as described herein or known to the skilled person.

The second binding domain is complementary to the first binding domain of the first AAV vector. Absolute complementarity, although preferred, is not required. A sequence "complementary" to a portion of the first binding domain, as referred to herein, means a sequence having sufficient complementarity to be able to hybridize with the first binding domain, forming a stable duplex. The ability to hybridize will depend on both the degree of complementarity and the length of the nucleic acid (See, for example, Sambrook et ah, 1989, Molecular Cloning, A Laboratory Manual, 2d Ed., Cold Spring Harbor Laboratory Press, Cold Spring Harbor, N.Y.). Complementarity as used with regard to second binding domain thus means that the second binding domain comprises a sequences, which is at least 60%, 65%, 70%, 75%, 80%, 85%, 90%, 95%, 98% 99% or 100% complementary to the first binding domain comprised in the first AAV, preferably at least 90%, 95%, 98% 99% or 100% complementary to the to the first binding domain comprised in the first AAV.

The first binding domain can have or comprise a sequence as depicted in SEQ ID NO: 17, or a sequence having 60%, 65%, 70%, 75%, 80%, 85%, 90%, 95%, 98%, 99% or 100% sequence identity to a sequence of SEQ ID 17. The second binding domain can have or comprise a sequence as depicted in SEQ ID NO: 18 or a sequence having 60%, 65%, 70%, 75%, 80%, 85%, 90%, 95%, 98%, 99% or 100% sequence identity to a sequence of SEQ ID No. 18. The person skilled in the art will understand that the first and the second binding domain may be exchanged, as long as the second binding domain is complementary to the first binding domain. Thus, the first binding domain can have or comprise a sequence as depicted in SEQ ID NO. 18, or a sequence having 60%, 65%, 70%, 75%, 80%, 85%, 90%, 95%, 98%, 99% or 100% sequence identity to a sequence of SEQ ID 17. The second binding domain can have or comprise a sequence as depicted in SEQ ID NO. 17 or a sequence having 60%, 65%, 70%, 75%, 80%, 85%, 90%, 95%, 98%, 99% or 100% sequence identity to a sequence of SEQ ID No. 18.

Alternatively, the second binding domain, has or comprises a sequence of any one of SEQ ID NOs: 18, 27, 28, 32 and 33, or a sequence having 60%, 65%, 70%, 75%, 80%, 85%, 90%, 95%, 98%, 99% or 100% sequence identity to a sequence of any one of SEQ ID NOs: 18, 27, 28, 32 and 33 and the first binding domain has or comprises a sequence complementary to the second binding domain, preferably at least 80%, 85%, 90%, 95%, 98% 99% or 100% complementary to the second binding domain, more preferably at least 90%, 95%, 98% 99% or 100% complementary to the second binding domain, even more preferably 98% 99% or 100% complementary to the second binding domain. The person skilled in the art will understand that the first and the second binding domain may be exchanged, as long as the binding domains are complementary to each other. Thus, the first binding domain can have or comprise a sequence of any one of SEQ ID NOs: 18, 27, 28, 32 and 33, or a sequence having 60%, 65%, 70%, 75%, 80%, 85%, 90%, 95%, 98%, 99% or 100% sequence identity to a sequence of any one of SEQ ID NOs: 18, 27, 28, 32 and 33 and the second binding domain has or comprises a sequence complementary to the first binding domain, preferably at least 80%, 85%, 90%, 95%, 98% 99% or 100% complementary to the first binding domain, more preferably at least 90%, 95%, 98% 99% or 100% complementary to the first binding domain, even more preferably 98% 99% or 100% complementary to the first binding domain.

It has further been shown that nucleotides 50 to 100 of SEQ ID NO: 27 or 28 are effective as a binding domain. Thus, in one embodiment the second or the first binding domain comprises a sequence of nucleotides 50 to 100 of SEQ ID NO: 27 or 28, or a sequence having 80%, 85%, 90%, 95%, 98%, 99% or 100% sequence identity to a sequence of nucleotides 50 to 100 of SEQ ID NO: 27 or 28. Preferably the binding domain has at least 80 nucleotides comprising a sequence of nucleotides 50 to 100 of SEQ ID NO: 27 or 28, or a sequence having 80%, 85%, 90%, 95%, 98%, 99% or 100% sequence identity to a sequence of nucleotides 50 to 100 of SEQ ID NO: 27 or 28. The person skilled in the art will understand that the other binding domain has or comprises a sequence complementary to the first or the second binding domain, respectively, preferably at least 80%, 85%, 90%, 95%, 98% 99% or 100% complementary to the first or the second binding domain, respectively, more preferably at least 90%, 95%, 98% 99% or 100% complementary to the first or the second binding domain, respectively, even more preferably 98% 99% or 100% complementary to the first or the second binding domain, respectively.

In another embodiment the second or the first binding domain comprises a sequence of nucleotides 1 to 50 of SEQ ID NO: 18, 32 or 33, or a sequence having 80%, 85%, 90%, 95%, 98%, 99% or 100% sequence identity to a sequence of nucleotides 1 to 50 of SEQ ID NO: 18, 32 or 33. Preferably the binding domain has at least 80 nucleotides comprising a sequence of nucleotides 1 to 50 of SEQ ID NO: 18, 32 or 33, or a sequence having 80%, 85%, 90%, 95%, 98%, 99% or 100% sequence identity to a sequence of nucleotides 1 to 50 of SEQ ID NO: 18, 32 or 33. The person skilled in the art will understand that the other binding domain has or comprises a sequence complementary to the first or the second binding domain, respectively, preferably at least 80%, 85%, 90%, 95%, 98% 99% or 100% complementary to the first or the second binding domain, respectively, more preferably at least 90%, 95%, 98% 99% or 100% complementary to the first or the second binding domain, respectively, even more preferably 98% 99% or 100% complementary to the first or the second binding domain, respectively.

The binding domain may have between about 15 to 250 nucleotides, between about 15 to 200 nucleotides, between about 100 to 200 nucleotides or less than 500, 400, 300 or 200 nucleotides. In one embodiment the binding domain comprises 50-150 nucleotides, preferably 80-120 nucleotides, even more preferably 90 to 110 nucleotides or about 100 nucleotides. The binding domains as described herein may also be used in the pre-mRNA trans-splicing molecules or the methods according to the invention.

The first and the second binding domain as used according to the invention may be derived from human sequences or non-human sequences, such as bacterial sequences. For human use, such as in therapy (particularly gene therapy), non-human sequences are preferred to avoid off-target effects in human cells.

The second AAV vector and optionally the first AAV vector as described herein may comprise a termination signal, such as a polyadenylation (polyA) signal, located 3' to the nucleic acid sequence. PolyA signals/sequences are known to the skilled person and may be derived from many suitable species, including, without limitation SV-40, human and bovine. "PolyA" (A=adenylic acid) refers to a nucleic acid sequence comprising multiple adenosine monophosphates, such as a nucleic acid sequence that comprises the AAUAAA consensus sequence, which enables polyadenylation of a processed transcript. In a gene disruption or selection cassette (GDSC), the polyA sequence is located downstream to the reporter and/or selectable marker gene and signals the end of the transcript to the RNA-polymerase. It is envisioned that the AAV vector can comprise a polyA sequence of SEQ ID 16 or a sequence having at least 60%, 65%, 70%, 75%, 80%, 85%, 90%, 95%, 98% or 100% sequence identity to a sequence depicted in SEQ ID No. 16.

The AAV vectors or other vectors of the present invention may further optionally include one or more transcription termination sequences, one or more translation termination sequences, one or more signal peptide sequences, one or more internal ribosome entry sites (IRES), and/or one or more enhancer elements, or any combination thereof. Transcription termination regions can typically be obtained from the 3' untranslated region of a eukaryotic or viral gene sequence. Transcription termination sequences can be positioned downstream of a coding sequence to provide for efficient termination. Signal peptide sequences are amino-terminal peptidic sequences that encode information responsible for the location of an operably-linked polypeptide to one or more post-translational cellular destinations, including, for example, specific organelle compartments, or to the sites of protein synthesis and/or activity, and even to the extracellular environment.

Enhancers—cis-acting regulatory elements that increase gene transcription—may also be included in one of the disclosed AAV vectors or vectors. A variety of enhancer elements are known to those of ordinary skill in the relevant arts, and include, without limitation, a CaMV 35S enhancer element, a cytomegalovirus (CMV) early promoter enhancer element, an SV40 enhancer element, as well as combinations and/or derivatives thereof. One or more nucleic acid sequences that direct or regulate polyadenylation of the mRNA encoded by a structural gene of interest, may also be optionally included in one or more of the vectors of the present invention.

The disclosed dual-vector systems may be introduced into one or more selected mammalian cells using any one or more of the methods that are known to those of ordinary skill in the gene therapy and/or viral arts. Such methods include, without limitation, transfection, microinjection, electroporation, lipofection, cell fusion, and calcium phosphate precipitation, as well as biolistic methods. In one embodiment, the vectors of the invention may be introduced in vivo, including, for example, by lipofection (i.e., DNA transfection via liposomes prepared from one or more cationic lipids). Synthetic cationic lipids (LIPOFECTIN, Invitrogen Corp., La Jolla, Calif., USA) may be used to prepare liposomes that will encapsulate the vectors to facilitate their introduction into one or more selected cells. A vector system of the invention can also be introduced in vivo as "naked" DNA using methods known to those of ordinary skill in the art.

The present invention also relates to a kit comprising the nucleic acid sequence and/or the AAV vector and/or the AAV vector system of the present invention.

The present invention also relates to a method for producing a nucleic acid sequence of interest, the method comprising
(A) contacting a nucleic acid sequence with a host cell, wherein the nucleic acid sequence comprises
  (i) one or more donor splice site sequences;
  (ii) an acceptor splice region sequence comprising
    (a) a pyrimidine tract, wherein the pyrimidine tract comprises
      (aa) 5 to 25 nucleotides;
      (ab) wherein at least 60% of the nucleotides within these 5 to 25 nucleotides are pyrimidine bases such as cytosine (C), thymine (T) and/or uracil (U);
    (b) a acceptor splice site,
      ba) wherein the acceptor splice site is located 3' to the pyrimidine tract; and
      bb) wherein the acceptor splice site comprises from 5' to 3' a sequence of NAGG, wherein N is a A, C, T/U or G;
  (iii) a nucleotide sequence of interest or a portion thereof, wherein the nucleotide sequence of interest or the portion thereof;
    (a) is located 3' to the donor splice site and 5' to the acceptor splice region; and
(B) cleaving the nucleic acid sequence at the one or more donor splice site sequence(s) of (i) and in the acceptor splice region sequence of (ii), thereby separating the nucleotide sequence of interest or the portion thereof from the donor splice site and the acceptor splice region.

As it is known to the skilled person splicing can occur in different manners. Known to the skilled person are for example, the cis splicing and the trans-splicing. Cis-splicing is a process in which intron sequences are excised from RNA transcripts in cis (mRNA or other RNAs). This process in a host cell takes place in the nucleus. Cis-splicing is known to the skilled person and inter alia described in Alberts B, Johnson A, Lewis J, et al. (2002) "Molecular Biology of the Cell. 4th edition." New York: Garland Science under the headline "from DNA to RNA").

Generally therapy or treatment or prevention of a disease comprises administering to a mammalian subject in need thereof, an effective amount of a composition comprising an AAV vector, an AAV vector system, vector or nucleic acid molecule such as pre-mRNA trans-splicing molecule described herein, e.g. carrying a nucleic acid sequence encoding transgene/nucleotide sequence of interest, or fragment thereof, under the control of regulatory sequences which express the product of the gene in the subject's target cells such as ocular cells, and optionally further a pharmaceutically acceptable carrier.

The present invention therefore also relates to a pharmaceutical composition comprising an AAV vector, AAV vector system, vector or nucleic acid sequence (such as a pre-mRNA trans-splicing molecule) as described herein. Such pharmaceutical compositions can further comprise a carrier, preferably a pharmaceutically acceptable carrier.

The pharmaceutical composition can be in the form of an injectable solution. The injectable solutions or suspensions may be formulated according to known art, using suitable non-toxic, pharmaceutically acceptable diluents or solvents, such as mannitol, 1,3-butanediol, water, Ringer's solution or isotonic sodium chloride solution, or suitable dispersing or wetting and suspending agents, such as sterile, bland, fixed oils, including synthetic mono- or diglycerides, and fatty acids, including oleic acid.

For injectable formulations, the pharmaceutical compositions can be in lyophilized powder in admixture with suitable excipients in a suitable vial or tube. Before use in the clinic, the drugs may be reconstituted by dissolving the lyophilized powder in a suitable solvent system to form a composition suitable for intravenous or intramuscular injection or for subretinal, intravitreal or subconjunctival injection.

It is also envisaged that the pharmaceutical composition of the present invention is formulated/administered as eye drops.

The AAV vector, AAV vector system, vector, or nucleic acid sequence (such as a pre-mRNA trans-splicing molecule) of the present invention or the pharmaceutical composition of the present invention can be administered in a therapeutically effective amount. The "therapeutically effective amount" for the AAV vector, AAV vector system, nucleic acid sequence such as pre-mRNA trans-splicing molecule or vector can vary with factors including but not limited to stability of the active compound in the patient's body, the severity of the conditions to be alleviated, the total weight of the patient treated, the route of administration, the ease of absorption, distribution, and excretion of the active compound by the body, the age and sensitivity of the patient to be treated, adverse events, and the like, as will be apparent to a skilled artisan. The amount of administration can be adjusted as the various factors change over time.

In principle the AAV vector, AAV vector system, vector, or nucleic acid sequence such as pre-mRNA trans-splicing molecule of the present invention or the pharmaceutical composition of the present invention can be administered in any suitable way. The AAV vector, AAV vector system, vector, nucleic acid sequence or pharmaceutical composition of the present invention e.g. comprising the desired transgene (i.e., nucleotide sequence of interest) for use in targeting photoreceptor cells can be formulated into a pharmaceutical composition intended for subretinal or intravitreal injection. Other forms of administration that may be useful in the methods described herein include, but are not limited to, direct delivery to a desired organ (e.g., the eye e.g. eye drops), oral, inhalation, intranasal, intratracheal, intravenous, intramuscular, subcutaneous, intradermal, and other parental routes of administration. Routes of administration may be combined, if desired.

Furthermore, it may be desirable to perform non-invasive retinal imaging and functional studies to identify areas of specific ocular cells to be targeted for therapy.

The AAV vector, AAV vector system, vector, or nucleic acid sequence such as pre-mRNA trans-splicing molecule as described herein or the pharmaceutical composition of the present invention may be administered in a physiologically acceptable carrier to a subject, as described herein. The concentration of AAV in the pharmaceutical composition or upon administration can be between 10E8 and 10E12 total vector genomes per µl, preferably between 6×10E8 and 6×0E10 per µl. The AAV vectors can also be administered in a concentration of about 10E9 vector genomes per µl.

The AAV vector, AAV vector system, vector, or nucleic acid sequence (such as a pre-mRNA trans-splicing molecule) or the pharmaceutical composition of the present invention may be administered alone or in combination with other treatments. Thus, also the pharmaceutical composition may additionally or alternatively comprise one or more further active ingredients.

The pharmaceutical composition, AAV vector, AAV vector system, vector, pre-mRNA trans-splicing molecule, or nucleic acid sequence for the use of the invention can be administered to a subject. The AAV vector, AAV vector system, vector, pre-mRNA trans-splicing molecule, nucleic acid sequence or pharmaceutical compositions as described herein are applicable for both human therapy and veterinary applications, preferably for treating ocular disorder, particularly for gene therapy of an ocular disorder. Examples for suitable ocular disorders without being limited thereto are autosomal recessive severe early-onset retinal degeneration (Leber's Congenital Amaurosis), congenital achromatopsia, Stargardt's disease, Best disease (vitelliform macular degeneration), Doyne's disease, retinitis pigmentosa (particularly autosomal dominant, autosomal-recessive, X-linked, di- or polygenic retinitis pigmentosa), (X-linked) retinoschisis, macular degeneration (AMD), age-related macular degeneration, atrophic age-related macular degeneration, neovascular AMD, diabetic maculopathy, proliferative diabetic retinopathy (PDR), cystoid macular oedema, central serous retinopathy, retinal detachment, intra-ocular inflammation, glaucoma, posterior uveitis, congenital stationary night blindness, choroideremia, early-onset retinal dystrophy, cone, rod-cone or cone-rod dystrophy, pattern dystrophies, Usher syndrome and other syndromic ciliopathies, such as Bardet-Biedl syndrome, Joubert syndrome, Senior-Loken syndrome or Alström syndrome.

The subject can be a mammal or any other vertebrate. Examples of suitable mammals include, but are not limited to, a mouse, a rat, a cow, a goat, a sheep, a pig, a dog, a cat, a horse, a guinea pig, a canine, a hamster, a mink, a seal, a whale, a camel, a chimpanzee, a rhesus monkey and a human, with human being preferred. Examples of other vertebrates include, but are not limited to, a zebra fish, a salamander, a turkey, a chicken, a goose, a duck, a teal, a mallard, a starling, a Northern pintail, a gull, a swan, a Guinea fowl or water fowl to name a few.

The present invention also relates to an AAV vector, AAV vector system, vector, nucleic acid sequence (such as a pre-mRNA trans-splicing molecule) or pharmaceutical composition of the present invention for use in treating a photoreceptor cell disease. In these embodiments the AAV vector (e.g. rAAV) AAV vector, AAV vector system, vector, nucleic acid sequence (such as a pre-mRNA trans-splicing molecule) or pharmaceutical composition may comprise a nucleotide sequence of interest that is a heterologous nucleic acid encoding a therapeutic polypeptide or a portion thereof, a therapeutic nucleic acid or a portion thereof, a therapeutic protein/polypeptide or a portion thereof or a therapeutic molecule or a portion thereof.

Similar to mRNA splicing, which evolved to remove non-coding RNA sequences, dispensable proteins sequences can be excised during a process known as protein splicing. In this context, protein fragments referred to as exteins (analog to exons) can be spliced together upon removal of the so-called inteins (analog to introns). In contrast to mRNA splicing which requires a complex splicing machinery, protein splicing is an autocatalytic chemical process. Protein splicing can also occur between two different proteins, a process known as protein trans-splicing. For this purpose, inteins are split into two parts and each of these parts is tagged to the protein to be fused. This approach leads to a scarless fusion of two proteins or polypeptides or parts thereof, without the need of additional factors. The split-intein technology may further be combined with mRNA trans-splicing to further enhance protein reconstitution efficiency. Thus, in one embodiment the first nucleic acid sequence or the first AAV vector further comprises a nucleic acid sequence that encodes the N-terminal part of an intein between the nucleotide sequence encoding the N-terminal portion of the polypeptide of interest (or the 5' portion of the nucleic acid sequence of interest) and the donor splice site and the second nucleic acid sequence or the second AAV vector further comprises a nucleic acid sequence that encodes the C-terminal part of an intein between the nucleotide sequence encoding the C-terminal portion of the polypeptide of interest (or the 3' portion of the nucleic acid sequence of interest) and the acceptor splice region.

It is clear that all possible embodiments described for the inventive ASS can be used mutatis mutandis in the methods, nucleic acid sequences such as pre-mRNA trans-splicing molecules, kits, AAV vectors, AAV vector systems, and uses as described herein.

The present invention is further characterized by the following items:

1. Use of a nucleic acid sequence comprising
   (i) an acceptor splice region sequence comprising
      (ia) a pyrimidine tract, wherein the pyrimidine tract comprises
         (aa) 5 to 25 nucleotides;
         (ab) wherein at least 60% of the nucleotides within these 5 to 25 nucleotides are pyrimidine bases such as cytosine (C), thymine (T) and/or uracil (U);
      (ib) an acceptor splice site,
         ba) wherein the acceptor splice site is located 3' to the pyrimidine tract; and
         bb) wherein the acceptor splice site comprises from 5' to 3' a sequence of NAGG, wherein N is a A, C, T/U or G; and
   (ii) a nucleotide sequence of interest, wherein the nucleotide sequence of interest
      (iia) is located 3' or 5' to the splice region;
   for cleaving in the acceptor splice region thereby separating the nucleotide sequence of interest from the acceptor splice region sequence.

2. A nucleic acid sequence comprising
   (i) an acceptor splice region sequence comprising
      (ia) a pyrimidine tract, wherein the pyrimidine tract comprises
         (aa) 5 to 25 nucleotides;
         (ab) wherein at least 60% of the nucleotides within these 5 to 25 nucleotides are pyrimidine bases such as cytosine (C), thymine (T) and/or uracil (U);
      (ib) an acceptor splice site,
         ba) wherein the acceptor splice site is located 3' to the pyrimidine tract; and
         bb) wherein the acceptor splice site comprises from 5' to 3' a sequence of NAGG, wherein N is a A, C, T/U or G,
   optionally for cleaving in the acceptor splice region thereby separating the nucleotide sequence of interest from the acceptor splice region sequence.

3. The use of a nucleic acid sequence of item one or the nucleic acid sequence of item 2, wherein the acceptor splice region further comprises a branch point nucleotide, preferably adenosine and/or an intronic splice enhancer.

4. The use or the nucleic acid sequence of any one of the preceding items, wherein the acceptor splice region further comprises a branch point nucleotide sequence (c), wherein the branch point nucleotide sequence
   (ca) comprises 1-15 nucleotides;
   (cb) comprises the branch point nucleotide, preferably adenosine (A); and
   (cc) is located 5' to the pyrimidine tract and the acceptor splice site.

5. The use of a nucleic acid sequence or the nucleic acid sequence of any one of the preceding items, wherein the pyrimidine tract, the acceptor splice region and optionally further the branch point sequence and/or the intronic splice enhancer includes in total about 200, 150, 100, 50, 45, 40, 35, 30, 25, 20, 15 or less nucleotides, preferably 26 nucleotides.

6. The use of a nucleic acid sequence or the nucleic acid sequence of any one of the preceding items, wherein
   (a) the 5 to 25 nucleotides of the pyrimidine tract comprise the sequence TTTTTT or TCTTTT;
   (b) the sequence between the last pyrimidine of the pyrimidine tract and the acceptor splice site has less than 10, preferably less than 5, more preferably less than 3 bases; and/or
   (c) the acceptor splice site has a sequence of CAGG.

7. The use of a nucleic acid sequence or the nucleic acid sequence of any one of the preceding items, wherein the acceptor splice region further comprises
   (a) 7 nucleotides 5' to the pyrimidine tract having at least 4 nucleotides of the sequence CAACGAG, wherein the first 5' nucleotide is C;
   (b) 7 nucleotides 5' to the pyrimidine tract having at least 5 nucleotides of the sequence CAACGAG, wherein the first 5' nucleotide is C;
   (c) 7 nucleotides 5' to the pyrimidine tract having at least 6 nucleotides of the sequence CAACGAG, wherein the first 5' nucleotide is C;
   (d) 7 nucleotides 5' to the pyrimidine tract having at least 4 nucleotides of the sequence CAACGAG, wherein the first 5' nucleotides are CAA;
   (e) 7 nucleotides 5' to the pyrimidine tract having at least 4 nucleotides of the sequence CAACGAG, wherein the first 5' nucleotides are CAAC;
   (f) 7 nucleotides 5' to the pyrimidine tract having at least 5 nucleotides of the sequence CAACGAG, wherein the first 5' nucleotides are CAA;
   (g) 7 nucleotides 5' to the pyrimidine tract having at least 5 nucleotides of the sequence CAACGAG, wherein the first 5' nucleotides are CAAC;
   (h) 7 nucleotides 5' to the pyrimidine tract having at least 6 nucleotides of the sequence CAACGAG, wherein the first 5' nucleotides are CAA; or
   (i) 7 nucleotides 5' to the pyrimidine tract having at least 6 nucleotides of the sequence CAACGAG, wherein the first 5' nucleotides are CAAC.

8. The use of a nucleic acid sequence or the nucleic acid sequence of any one of the preceding items, wherein the acceptor splice region has the sequence of SEQ ID NO: 3 or 4.

8. The use of a nucleic acid sequence or the nucleic acid sequence of any one of the preceding items, wherein the nucleic acid sequence further comprises a donor splice site.

10. The use of a nucleic acid sequence or the nucleic acid sequence of any one of the preceding items, wherein the nucleic acid sequence further comprises a promoter, preferably wherein the nucleic acid sequence is a DNA sequence and further comprises a promoter.

11. The use of a nucleic acid sequence or the nucleic acid sequence of any of the preceding items wherein the nucleic acid sequence comprises
   (i) a acceptor splice region, comprising
      (iia) a pyrimidine tract, wherein the pyrimidine tract comprises
         (iiaa) 5 to 25 nucleotides;

(iiab) wherein at least 60% of the nucleotides within these 5 to 25 nucleotides are pyrimidine bases such as cytosine (C), thymine (T) and/or uracil (U);
(iib) a acceptor splice site,
(iiba) wherein the acceptor splice site is located 3' to the pyrimidine tract; and
(iibb) wherein the acceptor splice site comprises from 5' to 3' a sequence of NAGG, wherein N is a A, C, T/U or G;
(ii) a nucleotide sequence of interest; wherein the acceptor splice region is localized 3' or 5' to the nucleotide sequence of interest;
(iii) a binding domain targeting pre-mRNA, which is localized 3' or 5' to the nucleotide sequence of interest; and
(iv) optionally a spacer sequence, wherein the spacer sequence is localized between the binding domain and the acceptor splice region.

12. The use of a nucleic acid sequence or the nucleic acid sequence of any of the preceding items wherein the nucleic acid sequence comprises
(i) an acceptor splice region comprising
(ia) a pyrimidine tract, wherein the pyrimidine tract comprises
(iiiaa) 5 to 25 nucleotides;
(iiiab) wherein at least 60% of the nucleotides within these 5 to 25 nucleotides are pyrimidine bases such as cytosine (C), thymine (T) and/or uracil (U);
(ib) an acceptor splice site,
(iba) wherein the acceptor splice site is located 3' to the pyrimidine tract; and
(ibb) wherein the acceptor splice site comprises from 5' to 3' a sequence of NAGG, wherein N is a A, C, T/U or G;
(ii) a nucleotide sequence of interest, wherein the acceptor splice region is localized 5' to the nucleotide sequence of interest;
(iii) a donor splice site, wherein the donor splice site is localized 3' to the nucleotide sequence of interest;
(iv) a first binding domain targeting pre-mRNA located 5' to the nucleotide sequence of interest;
(v) a second binding domain targeting pre-mRNA located 3' to the nucleotide sequence of interest;
(vi) optionally a first spacer sequence, wherein the first spacer is localized between the first binding domain and the acceptor splice region; and
(vii) optionally a second spacer sequence, wherein the second spacer is localized between the second binding domain and the donor splice site.

13. The use of a nucleic acid sequence or the nucleic acid sequence of any of the preceding items wherein the nucleic acid sequence comprises an adeno-associated virus (AAV) vector, comprising at least two inverted terminal repeats comprising a nucleic acid sequence between these two inverted terminal repeats, wherein said nucleic acid sequence comprises from 5' to 3'
(i) a promoter;
(ii) optionally a binding domain;
(iii) an acceptor splice region sequence comprising
(a) a pyrimidine tract, wherein the pyrimidine tract comprises
(aa) 5 to 25 nucleotides;
(ab) wherein at least 60% of the nucleotides within these 5 to 25 nucleotides are pyrimidine bases such as cytosine (C), thymine (T) and/or uracil (U);
(b) a acceptor splice site,
ba) wherein the acceptor splice site is located 3' to the pyrimidine tract; and
bb) wherein the acceptor splice site comprises from 5' to 3' a sequence of NAGG, wherein N is a A, C, T/U or G;
(iv) a nucleotide sequence of interest
(v) optionally a termination sequence, preferably a polyA sequence.

14. The use of a nucleic acid sequence or the nucleic acid sequence of any of the preceding items wherein the acceptor splice region is localized within a vector, within an AAV vector and or within a pre-mRNA trans-splicing molecule.

15. The use of a nucleic acid sequence or the nucleic acid sequence of any of the preceding items, wherein the acceptor splice region is used for trans-splicing.

16. A method for producing a nucleic acid sequence, the method comprising
(A) providing a first nucleic acid sequence comprising one or more donor splice site sequences;
(B) providing a second nucleic acid sequence, wherein the second nucleic acid sequence comprises
(i) an acceptor splice region sequence comprising
(ia) a pyrimidine tract, wherein the pyrimidine tract comprises
(iaa) 5 to 25 nucleotides;
(iab) wherein at least 60% of the nucleotides within these 5 to 25 nucleotides are pyrimidine bases such as cytosine (C), thymine (T) and/or uracil (U);
(ib) a acceptor splice site,
(iba) wherein the acceptor splice site is located 3' to the pyrimidine tract; and
(ibb) wherein the acceptor splice site comprises from 5' to 3' a sequence of NAGG, wherein N is a A, C, T/U or G;
(ii) a nucleotide sequence of interest, wherein the nucleotide sequence of interest
(iia) is located 3' to the acceptor splice region; and
(C) obtaining a nucleic acid sequence.

17. The method of item 16, wherein the method further comprises the step of
(D) cleaving the first nucleic acid sequence at the one or more donor splice site sequence(s) and cleaving the second nucleic acid sequence in the acceptor splice site,
(E) ligating the first cleaved nucleic acid sequence to the second cleaved nucleic acid sequence,
thereby obtaining a nucleic acid sequence.

18. The method of item 16 or 17, wherein the first nucleic acid sequence further comprises a nucleotide sequence of interest or a portion thereof, wherein at least a portion of the nucleotide sequence of interest is located 5' to the donor splice site and wherein the second nucleic acid sequence further comprises a nucleotide sequence of interest or a portion thereof, wherein at least a portion of the nucleotide sequence of interest is located 3' to the splice acceptor splice region.

19. The method of any one of items 16 to 18, wherein the first and the second nucleic acid sequence are introduced into a host cell, preferably wherein the first and the second nucleic acid sequence are a recombinant nucleic acid sequence.

20. A method for producing a nucleic acid sequence, the method comprising
- (A) providing a first nucleic acid sequence comprising one or more donor splice site sequences;
- (B) providing a second nucleic acid sequence, wherein the second nucleic acid sequence comprises
  - (i) an acceptor splice region sequence comprising
    - (ia) a pyrimidine tract, wherein the pyrimidine tract comprises
      - (iaa) 5 to 25 nucleotides;
      - (iab) wherein at least 60% of the nucleotides within these 5 to 25 nucleotides are pyrimidine bases such as cytosine (C), thymine (T) and/or uracil (U);
    - (ib) a acceptor splice site,
      - (iba) wherein the acceptor splice site is located 3' to the pyrimidine tract; and
      - (ibb) wherein the acceptor splice site comprises from 5' to 3' a sequence of NAGG, wherein N is a A, C, T/U or G; and
- (C) cleaving the first nucleic acid sequence at the one or more donor splice site sequence(s) and cleaving the second nucleic acid sequence in the acceptor splice site,
- (D) ligating the first cleaved nucleic acid sequence to the second cleaved nucleic acid sequence, thereby obtaining a nucleic acid sequence.

21. The method of any one of items 16 to 20, wherein the first nucleic acid sequence further comprises a nucleotide sequence of interest or a portion thereof, wherein at least a portion of the nucleotide sequence of interest is located 5' to the donor splice site and wherein the second nucleic acid sequence further comprises a nucleotide sequence of interest or a portion thereof, wherein at least a portion of the nucleotide sequence of interest is located 3' to the splice acceptor splice region.

22. A method for producing a nucleic acid or the method of any one of items 16 to 21, comprising
- (A) introducing into a host cell a first nucleic acid sequence comprising a pre-mRNA trans-splicing molecule sequence or a nucleic acid sequence encoding said pre-mRNA trans-splicing molecule, wherein the first pre-mRNA trans-splicing molecule comprises from 5' to 3'
  - (a) a 5' portion of a nucleotide acid sequence of interest;
  - (b) a donor splice site;
  - (c) optionally a spacer sequence;
  - (d) a first binding domain; and
  - (e) optionally a termination sequence, preferably a poly A sequence and
- (B) introducing into a host cell a second nucleic acid sequence comprising the pre-mRNA trans-splicing molecule sequence or a nucleic acid sequence encoding said pre-mRNA trans-splicing molecule, wherein the second pre-mRNA trans-splicing molecule comprises from 5' to 3';
  - (i) a second binding domain, which is complementary to the first target domain of the first nucleic acid sequence;
  - (ii) an acceptor splice region sequence comprising;
    - (iia) a pyrimidine tract, wherein the pyrimidine tract comprises
      - (iiaa) 5 to 25 nucleotides;
      - (iiab) wherein at least 60% of the nucleotides within these 5 to 25 nucleotides are pyrimidine bases such as cytosine (C), thymine (T) and/or uracil (U);
    - (iib) an acceptor splice site,
      - (iiba) wherein the acceptor splice site is located 3' to the pyrimidine tract; and
      - (iibb) wherein the acceptor splice site comprises from 5' to 3' a sequence of NAGG, wherein N is a A, C, T/U or G; and
  - (iii) a 3' portion of the nucleotide sequence of interest and thereby obtaining the nucleic acid sequence of interest, optionally further comprising
- (C) cleaving the first nucleic acid sequence at the donor splice site sequence and cleaving the second nucleic acid sequence in the acceptor splice site; and
- (D) ligating the first cleaved nucleic acid sequence comprising the 5 portion of the nucleotide sequence of interest to the second cleaved nucleic acid sequence comprising the 3' portion of the nucleotide sequence of interest, thereby obtaining the nucleic acid sequence of interest.

23. The method of any one of items 16 to 22, wherein
- (a) the 5 to 25 nucleotides of the pyrimidine tract comprise the sequence TTTTTT or TCTTTT;
- (b) the sequence between the last pyrimidine of the pyrimidine tract and the acceptor splice site has less than 10, preferably less than 5, more preferably less than 3 bases; and/or
- (c) the acceptor splice site has a sequence of CAGG.

24. The method of any one of items 16 to 23, wherein the acceptor splice region further comprises
- (a) 7 nucleotides 5' to the pyrimidine tract having at least 4 nucleotides of the sequence CAACGAG, wherein the first 5' nucleotide is C;
- (b) 7 nucleotides 5' to the pyrimidine tract having at least 5 nucleotides of the sequence CAACGAG, wherein the first 5' nucleotide is C;
- (c) 7 nucleotides 5' to the pyrimidine tract having at least 6 nucleotides of the sequence CAACGAG, wherein the first 5' nucleotide is C;
- (d) 7 nucleotides 5' to the pyrimidine tract having at least 4 nucleotides of the sequence CAACGAG, wherein the first 5' nucleotides are CAA;
- (e) 7 nucleotides 5' to the pyrimidine tract having at least 4 nucleotides of the sequence CAACGAG, wherein the first 5' nucleotides are CAAC;
- (f) 7 nucleotides 5' to the pyrimidine tract having at least 5 nucleotides of the sequence CAACGAG, wherein the first 5' nucleotides are CAA;
- (g) 7 nucleotides 5' to the pyrimidine tract having at least 5 nucleotides of the sequence CAACGAG, wherein the first 5' nucleotides are CAAC;
- (h) 7 nucleotides 5' to the pyrimidine tract having at least 6 nucleotides of the sequence CAACGAG, wherein the first 5' nucleotides are CAA; or
- (i) 7 nucleotides 5' to the pyrimidine tract having at least 6 nucleotides of the sequence CAACGAG, wherein the first 5' nucleotides are CAAC.

25. A nucleic acid sequence, comprising
- (i) an acceptor splice region sequence comprising
  - (ia) a pyrimidine tract, wherein the pyrimidine tract comprises
    - (iaa) 5 to 25 nucleotides;
    - (iab) wherein at least 60% of the nucleotides within these 5 to 25 nucleotides are pyrimidine bases such as cytosine (C), thymine (T) and/or uracil (U);
  - (ib) a acceptor splice site,
    - (iba) wherein the acceptor splice site is located 3' to the pyrimidine tract;

and
(ibb) wherein the acceptor splice site comprises from 5' to 3' a sequence of NAGG, wherein N is a A, C, T/U or G;
(ii) a nucleotide sequence of interest, wherein the nucleotide sequence of interest
(iia) is located 3' or 5' to the acceptor splice region.

26. A nucleic acid sequence, comprising
(i) an acceptor splice region sequence comprising
(ia) a pyrimidine tract, wherein the pyrimidine tract comprises
(iaa) 5 to 25 nucleotides;
(iab) wherein at least 60% of the nucleotides within these 5 to 25 nucleotides are pyrimidine bases such as cytosine (C), thymine (T) and/or uracil (U);
(ib) a acceptor splice site,
(iba) wherein the acceptor splice site is located 3' to the pyrimidine tract;
and
(ibb) wherein the acceptor splice site comprises from 5' to 3' a sequence of NAGG, wherein N is a A, C, T/U or G;
(ii) a nucleotide sequence of interest, wherein the nucleotide sequence of interest
(iia) is located 3' or 5' to the acceptor splice region;
and optionally wherein the nucleotide sequence of interest is not the rhodopsin gene of SEQ ID NO: 10 and/or not exon 3 of the rhodopsin gene of SEQ ID NO: 9 and/or is not exon 3 of the rhodopsin gene of SEQ ID NO: 9 and/or wherein the nucleotide sequence of interest does not comprise a sequence as shown in SEQ ID No: 9 and/or 10.

27. The nucleic acid sequence of item 25 or 26, wherein the nucleic acid sequence has a length of at most 150 nucleotides.

28. The nucleic acid sequence of any one of items 25 to 27, wherein the nucleic acid sequence has a length of at most 5500 nucleotides.

29. The nucleic acid sequence of any one of items 25 to 28, wherein (a) the 5 to 25 nucleotides of the pyrimidine tract comprise the sequence TTTTTT or TCTTTT and/or (b) the sequence between the last pyrimidine of the pyrimidine tract and the acceptor splice site has less than 10, preferably less than 5, more preferably less than 3 bases.

30. An acceptor splice region sequence comprising
(ia) a pyrimidine tract, wherein the pyrimidine tract comprises
(iaa) 5 to 25 nucleotides;
(iab) wherein at least 60% of the nucleotides within these 5 to 25 nucleotides are pyrimidine bases such as cytosine (C), thymine (T) and/or uracil (U);
(ib) a acceptor splice site,
(iba) wherein the acceptor splice site is located 3' to the pyrimidine tract; and
(ibb) wherein the acceptor splice site comprises from 5' to 3' a sequence of CAGG.

31. The nucleic acid or acceptor splice region sequence of any one of items 25 to 30, wherein
(a) the 5 to 25 nucleotides of the pyrimidine tract comprise the sequence TTTTTT or TCTTTT;
(b) the sequence between the last pyrimidine of the pyrimidine tract and the acceptor splice site has less than 10, preferably less than 5, more preferably less than 3 bases; and/or
(c) the acceptor splice site has a sequence of CAGG.

32. The nucleic acid or acceptor splice region sequence of any one of items 25 to 31, wherein the acceptor splice region further comprises
(a) 7 nucleotides 5' to the pyrimidine tract having at least 4 nucleotides of the sequence CAACGAG, wherein the first 5' nucleotide is C;
(b) 7 nucleotides 5' to the pyrimidine tract having at least 5 nucleotides of the sequence CAACGAG, wherein the first 5' nucleotide is C;
(c) 7 nucleotides 5' to the pyrimidine tract having at least 6 nucleotides of the sequence CAACGAG, wherein the first 5' nucleotide is C;
(d) 7 nucleotides 5' to the pyrimidine tract having at least 4 nucleotides of the sequence CAACGAG, wherein the first 5' nucleotides are CAA;
(e) 7 nucleotides 5' to the pyrimidine tract having at least 4 nucleotides of the sequence CAACGAG, wherein the first 5' nucleotides are CAAC;
(f) 7 nucleotides 5' to the pyrimidine tract having at least 5 nucleotides of the sequence CAACGAG, wherein the first 5' nucleotides are CAA;
(g) 7 nucleotides 5' to the pyrimidine tract having at least 5 nucleotides of the sequence CAACGAG, wherein the first 5' nucleotides are CAAC;
(h) 7 nucleotides 5' to the pyrimidine tract having at least 6 nucleotides of the sequence CAACGAG, wherein the first 5' nucleotides are CAA; or
(i) 7 nucleotides 5' to the pyrimidine tract having at least 6 nucleotides of the sequence CAACGAG, wherein the first 5' nucleotides are CAAC.

33. A pre-mRNA trans-splicing molecule comprising,
(i) a acceptor splice region, comprising
(iia) a pyrimidine tract, wherein the pyrimidine tract comprises
(iiaa) 5 to 25 nucleotides;
(iiab) wherein at least 60% of the nucleotides within these 5 to 25 nucleotides are pyrimidine bases such as cytosine (C), thymine (T) and/or uracil (U);
(iib) a acceptor splice site,
(iiba) wherein the acceptor splice site is located 3' to the pyrimidine tract; and
(iibb) wherein the acceptor splice site comprises from 5' to 3' a sequence of NAGG, wherein N is a A, C, T/U or G;
(ii) a nucleotide sequence of interest or a portion thereof; wherein the acceptor splice region is localized 3' or 5' to the nucleotide sequence of interest or the portion thereof;
(iii) a binding domain targeting pre-mRNA, which is localized 5' to the nucleic acid sequence of interest or the portion thereof; and
(iv) optionally a spacer sequence, wherein the spacer sequence is localized between the binding domain and the acceptor splice region.

34. The pre-mRNA trans-splicing molecule of item 33, further comprising a donor splice site 3' to the nucleic acid molecule and to the acceptor splice region.

35. The pre-mRNA trans-splicing molecule of item 33 or 34 comprising,
(i) an acceptor splice region comprising
(ia) a pyrimidine tract, wherein the pyrimidine tract comprises
(iiiaa) 5 to 25 nucleotides;

(iiiab) wherein at least 60% of the nucleotides within these 5 to 25 nucleotides are pyrimidine bases such as cytosine (C), thymine (T) and/or uracil (U);
(ib) a acceptor splice site,
(iba) wherein the acceptor splice site is located 3' to the pyrimidine tract; and
(ibb) wherein the acceptor splice site comprises from 5' to 3' a sequence of NAGG, wherein N is a A, C, T/U or G;
(ii) a nucleotide sequence of interest, wherein the acceptor splice region is localized 5' to the nucleotide sequence of interest;
(iii) a donor splice site, wherein the donor splice site is localized 3' to the nucleotide sequence of interest;
(iv) a first binding domain targeting pre-mRNA located 5' to the nucleotide sequence of interest;
(v) a second binding domain targeting pre-mRNA located 3' to the nucleotide sequence of interest;
(vi) optionally a first spacer sequence, wherein the first spacer is localized between the first binding domain and the acceptor splice region;
(vii) optionally a second spacer sequence, wherein the second spacer is localized between the second binding domain and the donor splice site.

36. The pre-mRNA trans-splicing molecule of any one of items 33 to 35, wherein the acceptor splice region is localized 5' to the nucleotide sequence of interest or the portion thereof and the binding domain is localized 5' to acceptor splice region.

37. The pre-mRNA trans-splicing molecule of any one of items 33 to 36 further comprising a termination sequence, preferably a polyA sequence.

38. The pre-mRNA trans-splicing molecule of any one of items 33 to 37, wherein
(a) the 5 to 25 nucleotides of the pyrimidine tract comprise the sequence TTTTTT or TCTTTT;
(b) the sequence between the last pyrimidine of the pyrimidine tract and the acceptor splice site has less than 10, preferably less than 5, more preferably less than 3 bases; and/or
(c) the acceptor splice site has a sequence of CAGG.

39. The pre-mRNA trans-splicing molecule of any one of items 33 to 38, wherein the acceptor splice region further comprises
(a) 7 nucleotides 5' to the pyrimidine tract having at least 4 nucleotides of the sequence CAACGAG, wherein the first 5' nucleotide is C;
(b) 7 nucleotides 5' to the pyrimidine tract having at least 5 nucleotides of the sequence CAACGAG, wherein the first 5' nucleotide is C;
(c) 7 nucleotides 5' to the pyrimidine tract having at least 6 nucleotides of the sequence CAACGAG, wherein the first 5' nucleotide is C;
(d) 7 nucleotides 5' to the pyrimidine tract having at least 4 nucleotides of the sequence CAACGAG, wherein the first 5' nucleotides are CAA;
(e) 7 nucleotides 5' to the pyrimidine tract having at least 4 nucleotides of the sequence CAACGAG, wherein the first 5' nucleotides are CAAC;
(f) 7 nucleotides 5' to the pyrimidine tract having at least 5 nucleotides of the sequence CAACGAG, wherein the first 5' nucleotides are CAA;
(g) 7 nucleotides 5' to the pyrimidine tract having at least 5 nucleotides of the sequence CAACGAG, wherein the first 5' nucleotides are CAAC;
(h) 7 nucleotides 5' to the pyrimidine tract having at least 6 nucleotides of the sequence CAACGAG, wherein the first 5' nucleotides are CAA; or
(i) 7 nucleotides 5' to the pyrimidine tract having at least 6 nucleotides of the sequence CAACGAG, wherein the first 5' nucleotides are CAAC.

40. A DNA molecule comprising a promoter and a sequence encoding the pre-mRNA trans-splicing molecule according to any one of items 33 to 39.

41. An adeno-associated virus (AAV) vector system comprising
(I) a first AAV vector comprising at least two inverted terminal repeats comprising a nucleic acid sequence between these two inverted terminal repeats, wherein said nucleic acid sequence between these two inverted terminal repeats comprises from 5' to 3'
(a) a promoter,
(b) a nucleotide sequence encoding an N-terminal portion of a polypeptide of interest;
(c) a donor splice site;
(d) optionally a spacer sequence;
(e) a first binding domain; and
(f) optionally a termination sequence, preferably a polyA sequence;
(II) a second AAV vector comprising a nucleic acid sequence comprising at least two inverted terminal repeats comprising a nucleic acid sequence between these two inverted terminal repeats, wherein said nucleic acid sequence between these two inverted terminal repeats comprises from 5' to 3'
(i) a promoter;
(ii) a second binding domain, which is complementary to the first binding domain of the first AAV vector;
(iii) an acceptor splice region sequence comprising
(a) a pyrimidine tract, wherein the pyrimidine tract comprises
(aa) 5 to 25 nucleotides;
(ab) wherein at least 60% of the nucleotides within these 5 to 25 nucleotides are pyrimidine bases such as cytosine (C), thymine (T) and/or uracil (U);
(b) an acceptor splice site,
(ba) wherein the acceptor splice site is located 3' to the pyrimidine tract; and
(bb) wherein the acceptor splice site comprises from 5' to 3' a sequence of NAGG, wherein N is a A, C, T/U or G;
(iv) a nucleotide sequence of interest encoding a C-terminal portion of the polypeptide of interest;
(iva) wherein the C-terminal portion of the polypeptide of interest and the N-terminal portion of the polypeptide of interest reconstitute the polypeptide of interest; and
(v) a termination sequence, preferably polyA sequence.

42. The AAV vector system of item 41, wherein the polypeptide is a full-length polypeptide and the first AAV vector comprises an N-terminal portion of a full-length polypeptide of interest and the second AAV vector comprises a C-terminal portion of the full-length polypeptide of interest.

43. The AAV vector system of item 41 or 42, wherein the C-terminal portion of the polypeptide of interest, corresponds to the portion of the polypeptide of interest, optionally the full-length protein of interest that is missing from the N-terminal portion of the polypeptide comprised in the first AAV vector.

44. The AAV vector system of any one of items 41 to 43, wherein the first and the second AAV vector comprises a termination sequence, preferably a polyA sequence.

45. An adeno-associated virus (AAV) vector comprising at least two inverted terminal repeats comprising a nucleic acid sequence between these two inverted terminal repeats, wherein said nucleic acid sequence comprises from 5' to 3'
   (i) a promoter;
   (ii) optionally a spacer sequence;
   (iii) a binding domain;
   (iv) an acceptor splice region sequence comprising
      (a) a pyrimidine tract, wherein the pyrimidine tract comprises
         (aa) 5 to 25 nucleotides;
         (ab) wherein at least 60% of the nucleotides within these 5 to 25 nucleotides are pyrimidine bases such as cytosine (C), thymine (T) and/or uracil (U);
      (b) a acceptor splice site,
         ba) wherein the acceptor splice site is located 3' to the pyrimidine tract; and
         bb) wherein the acceptor splice site comprises from 5' to 3' a sequence of NAGG, wherein N is a A, C, T/U or G;
   (iv) a nucleotide sequence of interest
   (v) optionally a termination sequence, preferably a poly A sequence.

46. The AAV vector or the AAV vector system of any one of items 41 to 45, wherein
   (a) the 5 to 25 nucleotides of the pyrimidine tract comprises the sequence TTTTTT or TCTTTT;
   (b) the sequence between the last pyrimidine of the pyrimidine tract and the acceptor splice site has less than 10, preferably less than 5, more preferably less than 3 bases; and/or
   (c) the acceptor splice site has a sequence of CAGG.

47. The AAV vector or the AAV vector system of any one of items 41 to 46, wherein the acceptor splice region further comprises
   (a) 7 nucleotides 5' to the pyrimidine tract having at least 4 nucleotides of the sequence CAACGAG, wherein the first 5' nucleotide is C;
   (b) 7 nucleotides 5' to the pyrimidine tract having at least 5 nucleotides of the sequence CAACGAG, wherein the first 5' nucleotide is C;
   (c) 7 nucleotides 5' to the pyrimidine tract having at least 6 nucleotides of the sequence CAACGAG, wherein the first 5' nucleotide is C;
   (d) 7 nucleotides 5' to the pyrimidine tract having at least 4 nucleotides of the sequence CAACGAG, wherein the first 5' nucleotides are CAA;
   (e) 7 nucleotides 5' to the pyrimidine tract having at least 4 nucleotides of the sequence CAACGAG, wherein the first 5' nucleotides are CAAC;
   (f) 7 nucleotides 5' to the pyrimidine tract having at least 5 nucleotides of the sequence CAACGAG, wherein the first 5' nucleotides are CAA;
   (g) 7 nucleotides 5' to the pyrimidine tract having at least 5 nucleotides of the sequence CAACGAG, wherein the first 5' nucleotides are CAAC;
   (h) 7 nucleotides 5' to the pyrimidine tract having at least 6 nucleotides of the sequence CAACGAG, wherein the first 5' nucleotides are CAA; or
   (i) 7 nucleotides 5' to the pyrimidine tract having at least 6 nucleotides of the sequence CAACGAG, wherein the first 5' nucleotides are CAAC.

48. An acceptor splice region, comprising
   (ia) a pyrimidine tract, wherein the pyrimidine tract comprises
      (iaa) 5 to 25 nucleotides;
      (iab) wherein at least 60% of the nucleotides within these 5 to 25 nucleotides are pyrimidine bases such as cytosine (C), thymine (T) and/or uracil (U);
   (ib) a acceptor splice site,
      (iba) wherein the acceptor splice site is located 3' to the pyrimidine tract; and
      (ibb) wherein the acceptor splice site comprises from 5' to 3' a sequence of NAGG, wherein N is a A, C, T/U or G.

49. The acceptor splice region of any one of the precedings for use in a vector, an AAV vector or within a pre-mRNA trans-splicing molecule according to the invention.

50. The acceptor splice region sequence of any one of items 48 or 49, wherein
   (a) the 5 to 25 nucleotides of the pyrimidine tract comprise the sequence TTTTTT or TCTTTT;
   (b) the sequence between the past pyrimidine of the pyrimidine tract and the acceptor splice site has less than 10, preferably less than 5, more preferably less than 3 bases; and/or
   (c) the acceptor splice site has a sequence of CAGG.

51. The acceptor splice region sequence of any one of items 48 to 50, wherein the acceptor splice region further comprises
   (a) 7 nucleotides 5' to the pyrimidine tract having at least 4 nucleotides of the sequence CAACGAG, wherein the first 5' nucleotide is C;
   (b) 7 nucleotides 5' to the pyrimidine tract having at least 5 nucleotides of the sequence CAACGAG, wherein the first 5' nucleotide is C;
   (c) 7 nucleotides 5' to the pyrimidine tract having at least 6 nucleotides of the sequence CAACGAG, wherein the first 5' nucleotide is C;
   (d) 7 nucleotides 5' to the pyrimidine tract having at least 4 nucleotides of the sequence CAACGAG, wherein the first 5' nucleotides are CAA;
   (e) 7 nucleotides 5' to the pyrimidine tract having at least 4 nucleotides of the sequence CAACGAG, wherein the first 5' nucleotides are CAAC;
   (f) 7 nucleotides 5' to the pyrimidine tract having at least 5 nucleotides of the sequence CAACGAG, wherein the first 5' nucleotides are CAA;
   (g) 7 nucleotides 5' to the pyrimidine tract having at least 5 nucleotides of the sequence CAACGAG, wherein the first 5' nucleotides are CAAC;
   (h) 7 nucleotides 5' to the pyrimidine tract having at least 6 nucleotides of the sequence CAACGAG, wherein the first 5' nucleotides are CAA; or
   (i) 7 nucleotides 5' to the pyrimidine tract having at least 6 nucleotides of the sequence CAACGAG, wherein the first 5' nucleotides are CAAC.

52. A kit comprising the acceptor splice region, the AAV vector, the AAV vector system, the vector, the DNA, the nucleic acid sequence or the pre-mRNA trans-splicing molecule according to the invention.

53. A method for producing a nucleic acid sequence of interest, the method comprising
   (A) providing a nucleic acid sequence to a host cell, wherein the nucleic acid sequence comprises
      (i) one or more donor splice site sequences;
      (ii) an acceptor splice region sequence comprising
         (a) a pyrimidine tract, wherein the pyrimidine tract comprises (aa) 5 to 25 nucleotides;
(ab) wherein at least 60% of the nucleotides within these 5 to 25 nucleotides are pyrimidine bases such as cytosine (C), thymine (T) and/or uracil (U);
(b) a acceptor splice site,
ba) wherein the acceptor splice site is located 3' to the pyrimidine tract; and
bb) wherein the acceptor splice site comprises from 5' to 3' a sequence of NAGG, wherein N is a A, C, T/U or G;
(iii) a nucleotide sequence of interest, wherein the nucleotide sequence of interest;
(a) is located 3' to the donor splice site and 5' to the acceptor splice region; and
(B) cleaving the nucleic acid sequence at the one or more donor splice site sequence(s) of (i) and between the G and G of the splice acceptor sequence (site) of NAGG, thereby separating the nucleotide sequence of interest from the donor splice site and the acceptor splice region.

54. A method for producing/cleaving a nucleic acid sequence of interest, the method comprising
(a) providing a nucleic acid sequence comprising
(i) an acceptor splice region sequence comprising
(ia) a pyrimidine tract, wherein the pyrimidine tract comprises
(aa) 5 to 25 nucleotides;
(ab) wherein at least 60% of the nucleotides within these 5 to 25 nucleotides are pyrimidine bases such as cytosine (C), thymine (T) and/or uracil (U);
(ib) a acceptor splice site,
ba) wherein the acceptor splice site is located 3' to the pyrimidine tract; and
bb) wherein the acceptor splice site comprises from 5' to 3' a sequence of NAGG, wherein N is a A, C, T/U or G; and
(ii) a nucleotide sequence of interest, wherein the nucleotide sequence of interest
(iia) is located 3' or 5' to the splice region;
(b) cleaving the acceptor splice region thereby separating the nucleotide sequence of interest from the acceptor splice region sequence.

55. Pharmaceutical composition comprising the nucleic acid molecule, the pre-mRNA trans-splicing molecule, the AAV vector, the AAV vector system, the vector of any of the preceding items.

56. The nucleic acid molecule, the pre-mRNA trans-splicing molecule, the AAV vector, the AAV vector system, the vector, the DNA molecule or the pharmaceutical composition of any of the preceding items for use in therapy, preferably for use in treating an ocular disorder.

57. A method of treating a subject for a nucleic acid sequence of interest, the method comprising
(a) administering a (therapeutically effective amount of a) nucleic acid molecule, the pre-mRNA trans-splicing molecule, the AAV vector, the AAV vector system, the vector the DNA molecule or the pharmaceutical composition of any of the preceding items to a subject (in need thereof), wherein the subject preferably has an ocular disorder.

58. A nucleic acid molecule, pre-mRNA trans-splicing molecule, AAV vector, AAV vector system, vector, DNA molecule or pharmaceutical composition of any of the preceding items for the manufacture of a medicament.

59. The nucleic acid molecule, the pre-mRNA trans-splicing molecule, the AAV vector, the AAV vector system, the vector, the DNA molecule, the pharmaceutical composition for use or the method of any of the preceding items, wherein the ocular disorder is selected from the group consisting of autosomal recessive severe early-onset retinal degeneration (Leber's Congenital Amaurosis), congenital achromatopsia, Stargardt's disease, Best disease (vitelliform macular degeneration), Doyne's disease, retinitis pigmentosa (particularly autosomal dominant, autosomal-recessive, X-linked, di- or polygenic retinitis pigmentosa), (X-linked) retinoschisis, macular degeneration (AMD), age-related macular degeneration, atrophic age-related macular degeneration, neovascular AMD, diabetic maculopathy, proliferative diabetic retinopathy (PDR), cystoid macular oedema, central serous retinopathy, retinal detachment, intra-ocular inflammation, glaucoma, posterior uveitis, congenital stationary night blindness, choroideremia, early-onset retinal dystrophy, cone, rod-cone or cone-rod dystrophy, pattern dystrophies, Usher syndrome and other syndromic ciliopathies, such as Bardet-Biedl syndrome, Joubert syndrome, Senior-Loken syndrome or Alström syndrome.

It must be noted that as used herein, the singular forms "a", "an", and "the", include plural references unless the context clearly indicates otherwise. Thus, for example, reference to "a reagent" includes one or more of such different reagents and reference to "the method" includes reference to equivalent steps and methods known to those of ordinary skill in the art that could be modified or substituted for the methods described herein.

Furthermore, the term "about," as used herein when referring to a measurable value such as an amount or the length of a polynucleotide or polypeptide sequence, dose, time, temperature, and the like, is meant to encompass variations of ±20%, 10%, 5%, 1%, ±0 5%, or ±0 1% of the specified amount. Also as used herein, "and/or" refers to and encompasses any and all possible combinations of one or more of the associated listed items, as well as the lack of combinations when interpreted in the alternative ("or").

Unless the context indicates otherwise, it is specifically intended that the various features of the invention described herein can be used in any combination.

Moreover, the present invention also contemplates that in some embodiments of the invention, any feature or combination of features set forth herein can be excluded or omitted.

All publications and patents cited in this disclosure are incorporated by reference in their entirety. To the extent the material incorporated by reference contradicts or is inconsistent with this specification, the specification will supersede any such material.

Unless otherwise indicated, the term "at least" preceding a series of elements is to be understood to refer to every element in the series. Those skilled in the art will recognize, or be able to ascertain using no more than routine experimentation, many equivalents to the specific embodiments of the invention described herein. Such equivalents are intended to be encompassed by the present invention.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step. When used herein the term "comprising" can be substituted with the term "containing" or sometimes when used herein with the term "having". However, the term "comprising of" or equivalents as used herein encompass "consisting of" or "consisting essentially of" as defined below and hence may be replaced with the term "consisting of" or "consisting essentially of".

As used herein "consisting of" excludes any element, step, or ingredient not specified in the claim element. As used herein, "consisting essentially of" does not exclude materials or steps that do not materially affect the basic and novel characteristics of the claim.

Sequences as used in the present invention:

The following sequences having more than 10 nucleotides have been referred to herein:

| Seq | Name | Sequence |
|---|---|---|
| 1 | Pyrimidine tract | TCTTTTGTCATCT |
| 2 | Intronic splice enhancer | TGGGGGGAGG |
| 3 | vgASS_620 (RHOE3d in FIG. 2) (ASS region) | CAACGAGTCTTTTGTCATCTACAGGT |
| 4 | vgASS_620 mod (ASS region) | CAACGAGTTTTTTGTCATCTACAGGT |
| 5 | ASS region (RHOE3b in FIG. 2) | CTACACGCTCAAGCCGGAGGTCAACAACGAG TCTTTTGTCATCTACAGGT |
| 6 | ASS region (RHOE3c in FIG. 2) | GCCGGAGGTCAACAACGAGTCTTTTGTCATCTACAGGT |
| 7 | ASS region (RHOE3e in FIG. 2) | GTCTTTTGTCATCTACAGGT |
| 8 | ASS region (RHOE3 g in FIG. 2) | GTCTTTTGTCATCTACAGGTGTTCGTGGTTCGTGGTCCA |
| 9 | Mutated exon 3 of rhodopsin gene (the c.620T>G is underlined) | GTACATCCCCGAGGGCCTGCAGTGCTCGTGTGGAATCGACTACTACA CGCTCAAGCCGGAGGTCAACAACGAGTCTTTTGTCATCTACAGGTTC GTGGTCCACTTCACCATCCCCATGATTATCATCTTTTTCTGCTATGGG CAGCTCGTCTTCACCGTCAAGGAG |
| 10 | Mutated rhodopsin gene GenBank: BC112104.1 Homo sapiens rhodopsin, mRNA (cDNA clone MGC: 138309 IMAGE: 8327572), complete cds (the stop and start codon as well as the c.620T>G mutation are underlined) | CCAGCTGGAGCCCTGAGTGGCTGAGCTCAGGCCTTCGCAGCATTCTT GGGTGGGAGCAGCCACGGGTCAGCCACAAGGGCCACAGCCATGAAT GGCACAGAAGGCCCTAACTTCTACGTGCCCTTCTCCAATGCGACGGG TGTGGTACGCAGCCCCTTCGAGTACCCACAGTACTACCTGGCTGAGC CATGGCAGTTCTCCATGCTGGCCGCCTACATGTTTCTGCTGATCGTG CTGGGCTTCCCCATCAACTTCCTCACGCTCTACGTCACCGTCCAGCA CAAGAAGCTGCGCACGCCTCTCAACTACATCCTGCTCAACCTAGCCG TGGCTGACCTCTTCATGGTCCTAGGTGGCTTCACCAGCACCCTCTAC ACCTCTCTGCATGGATACTTCGTCTTCGGGCCCACAGGATGCAATTTG GAGGGCTTCTTTGCCACCCTGGGCGGTGAAATTGCCCTGTGGTCCTT GGTGGTCCTGGCCATCGAGCGGTACGTGGTGGTGTGTAAGCCCATG AGCAACTTCCGCTTCGGGGAGAACCATGCCATCATGGGCGTTGCCTT CACCTGGGTCATGGCGCTGGCCTGCGCCGCACCCCCACTCGCCGGC TGGTCCAGGTACATCCCCGAGGGCCTGCAGTGCTCGTGTGGAATCG ACTACTACACGCTCAAGCCGGAGGTCAACAACGAGTCTTTTGTCATCT ACAGGTTCGTGGTCCACTTCACCATCCCCATGATTATCATCTTTTTCT GCTATGGGCAGCTCGTCTTCACCGTCAAGGAGGCCGCTGCCCAGCA GCAGGAGTCAGCCACCACACAGAAGGCAGAGAAGGAGGTCACCCGC ATGGTCATCATCATGGTCATCGCTTTCCTGATCTGCTGGGTGCCCTAC GCCAGCGTGGCATTCTACATCTTCACCCACCAGGGCTCCAACTTCGG TCCCATCTTCATGACCATCCCAGCGTTCTTTGCCAAGAGCGCCGCCA TCTACAACCCTGTCATCTATATCATGATGAACAAGCAGTTCCGGAACT GCATGCTCACCACCATCTGCTGCGGCAAGAACCCACTGGGTGACGAT GAGGCCTCTGCTACCGTGTCCAAGACGGAGACGAGCCAGGTGGCCC CGGCCTAAGACCTGCCTAGGACTCTGTGGCCGACTATAGGCGTCTCC CATCCCCTACACCTTCCCCCAGCCACAGCCATCCCACCAG |
| 11 | Pyrimidine tract | TTTTTTGTCATTT |
| 12 | Pyrimidine tract | TCTTTTGTCATCTA |
| 13 | Pyrimidine tract + 7 nt | CAACGAGTCTTTTGTCATCTA |
| 14 | Inverted repeat | CTGCGCGCTCGCTCGCTCACTGAGGCCGCCCGGGCAAAGCCCGGG |

-continued

Figure 2:
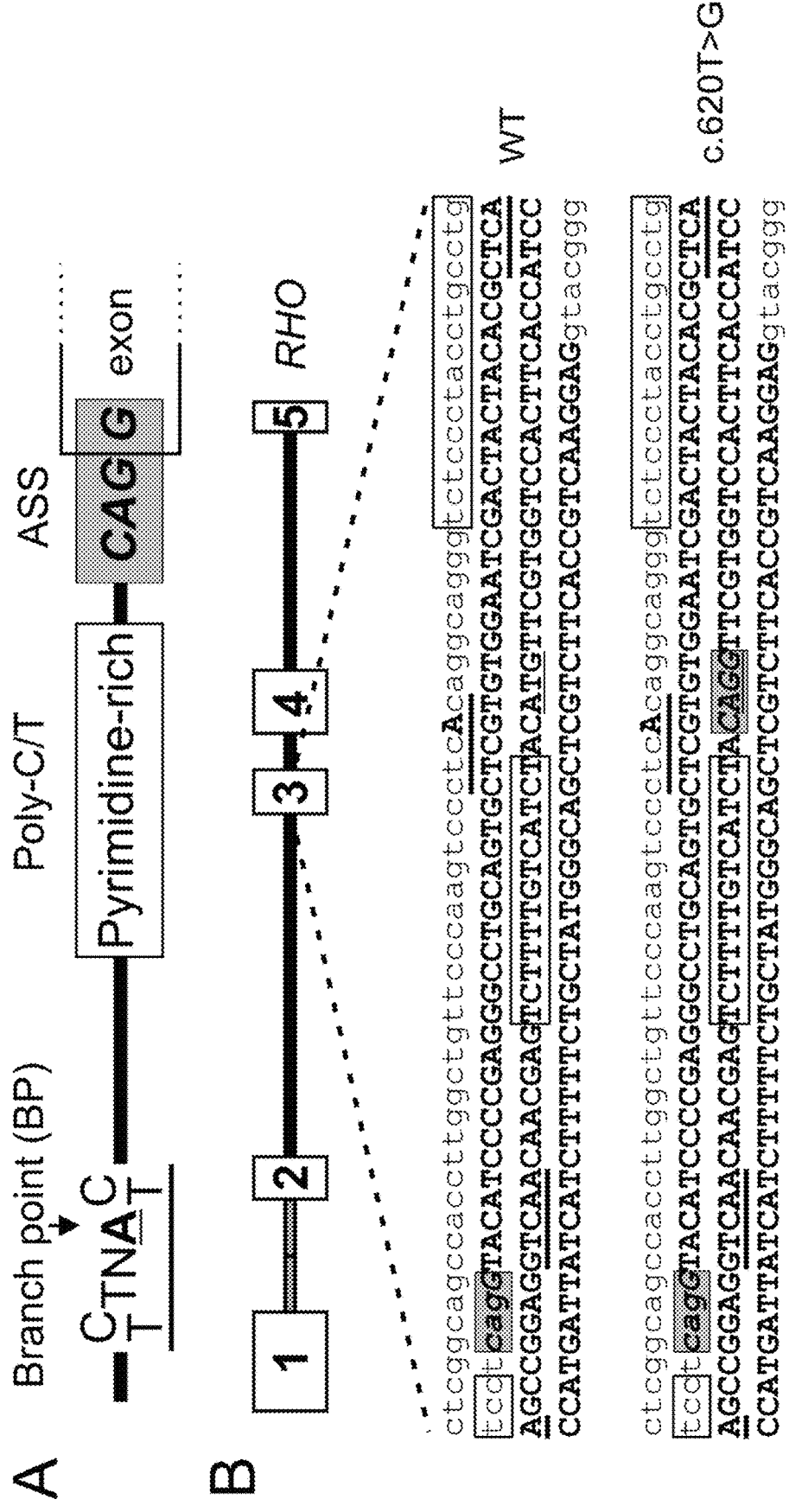

| Seq | Name | Sequence |
|---|---|---|
|  | (5') | CGTCGGGCGACCTTTGGTCGCCCGGCCTCAGTGAGCGAGCGAGCGC GCAGAGAGGGAGTGGCCAACTCCATCACTAGGGGTTCCT |
| 15 | Inverted repeat (3') | AGGAACCCCTAGTGATGGAGTTGGCCACTCCCTCTCTGCGCGCTCGC TCGCTCACTGAGGCCGGGCGACCAAAGGTCGCCCGACGCCCGGGCT TTGCCCGGGCGGCCTCAGTGAGCGAGCGAGCGCGCAG |
| 16 | Poly A sequence | GCAGTGAAAAAAATGCTTTATTTGTGAAATTTGTGATGCTATTGCTTTA TTTGTAACCATTATAAGCTGCAATAAACAAGTT |
| 17 | First binding domain sequence | AGTGCATCAAGGCGATCACATCAGTGAAAAAAAGCCAGACAGGCGGT TAAACCAACGCAGATTAAACAGCAGGATGCAAAAATTCGCAGGTGGT CAGATG |
| 18 | Second binding domain sequence (BD_k) | CATCTGACCACCTGCGAATTTTTGCATCCTGCTGTTTAATCTGCGTTG GTTTAACCGCCTGTCTGGCTTTTTTTCACTGATGTGATCGCCTTGATG CACT |
| 19 | Dual AAV 5' coding sequence of ABCA4 (CMV promoter) | Sequence as shown in FIG. 5 |
| 20 | Dual AAV 3' coding sequence of ABCA4 (CMV promoter) | Sequence as shown in FIG. 6 |
| 21 | Dual AAV comprising the 5' coding sequence of ABCA4 (ABCA4 promoter) | Sequence as shown in FIG. 7 |
| 22 | Dual AAV comprising the 3' coding sequence of ABCA4 (ABCA4 promoter) | Sequence as shown in FIG. 8 |
| 23 | WT ASS sequence in FIG. 2 | ctcggcagccaccttggctgttcccaagtccctcacaggcagggtctccctacctgcctgtcctcaggta catccccgagggcctgcagtgctcgtgtggaatcgactactacacgctcaagccggaggtcaacaac gagtcttttgtcatctacatgttcgtggtccacttcaccatccccatgattatcatcttttttctgctatgggcagc tcgtcttcaccgtcaaggaggtacggg |
| 24 | c.6201>G ASS sequence in FIG. 2 (the mutation is underlined) | ctcggcagccaccttggctgttcccaagtccctcacaggcagggtctccctacctgcctgtcctcaggta catccccgagggcctgcagtgctcgtgtggaatcgactactacacgctcaagccggaggtcaacaac gagtcttttgtcatctacag<u>g</u>tcgtggtccacttcaccatccccatgattatcatcttttttctgctatgggcag ctcgtcttcaccgtcaaggaggtacggg |
| 25 | ASS region (RHOE3a in FIG. 2) | ctacacgctcaagccggaggtcaacaacgagtcttttgtcatctacatgt |
| 26 | ASS region (RHOE3f in FIG. 2) | gtcttttgtcatctacaggtgttcgtg |
| 27 | BD_g | GTTCCAGGGAGGGAATGTGAAGCCCCAGAAAGGGCCAGCGCCAGGT GGAATTCGCTAGCTCGGCAGCCACCTTGGCTGTTCCCAAGTCCCTCA CAGGCAGGG |
| 28 | BD_h + i | GTTAACCCTCCAGTCAGGACTCAAACCCAGTAGTGTCTGGTTCCAGG CACTGACCTGCTAGCTCGGCAGCCACCTTGGCTGTTCCCAAGTCCCT CACAGGCAGGG |
| 29 | BD sequence (PTM1, B2) obtained from RHO intron 1 (Berger et al., | CACCATTCATGGTGATAGCCGGGCTGCTGTTTGTGCAGGGCTGGCAC TGAACACTGCCTTGATCTTATTTGGAGCAATATGCGCTTGTCTAATTTC ACAGCAAGAAAACTGAGCTGAGGCTCAAAGAAGTCAAGCGCCCTGCT GGGGCG |

-continued

| Seq | Name | Sequence |
|---|---|---|
| 30 | ITR2 forward primer | GGAACCCCTAGTGATGGAGTT |
| 31 | ITR2 reverse primer | CGGCCTCAGTGAGCGA |
| 32 | BD_i | CATCTGACCACCAGCGAATTTTTGCATCCAGCTGTTTAATCAGCGTTGGTTTAACCGCCAGTCAGGCTTTCTTTCAAAGATGTGATCGCCTTGCAGCACT |
| 33 | BD_l | CCATCCCGCATCTGACCACCAGCGAAATGGATTTTTGCATCCAGCTGGGTAACGTTGGCAATTTAACCGCCAGTCAGGCTTTCTTTCAAAGATGTGGATT |
| 34 | BD_m | CCATCCCGCATCTGACCACCTGCGAAATGGATTTTTGCATCCTGCTGGGTAACGTTGGCAATTTAACCGCCTGTCTGGCTTTCTTTCAATGATGTGGATT |
| 35 | 5' cerulean + BD_g | Sequence as shown in FIG. 16 |
| 36 | 3' cerulean + BD_g | Sequence as shown in FIG. 17 |
| 37 | 5' SpCas9-VPR + BD_k | Sequence as shown in FIG. 18 |
| 38 | 3' SpCas9-VPR + BD_k | Sequence as shown in FIG. 19 |
| 39 | Dual AAV vector- 5'ABCA4_w introns | Sequence as shown in FIG. 20 |
| 40 | Dual AAV vector- 3'ABCA4_w introns | Sequence as shown in FIG. 21 |

Putative branch point sequences are underlined, the branch point is underlined twice and depicted in bold letters, the pyrimidine tract sequence is listed in italic letters and the acceptor splice site is shown in bold letters.
Underlined in SEQ ID NO: 9 and 10 is the mutation from 620T>G and the start and stop codons.

EXAMPLES

The following examples illustrate the invention. These examples should not be construed as to limit the scope of this invention. The examples are included for purposes of illustration and the present invention is limited only by the claims.

Materials and Methods

CELL CULTURE AND TRANSFECTION

Human embryonic kidney 293 (HEK293) cells (DMSZ) were maintained in DMEM medium+L-alanyl-L-glutamine (e.g., GlutaMAX™)+1 g/l glucose+pyruvate+10% FBS (Biochrom)+1% penicillin/streptomycin (Biochrom) in a $CO_2$ incubator (Heraeus, Thermo Fisher Scientific) at 37° C. and 10% CO2. The HEK293 derived *Lenti*-X 293T (HEK293T) cells (Clontech, Takara) were cultured in DMEM medium+L-alanyl-L-glutamine (e.g., GlutaMAX™)+4.5 g/l glucose+10% FBS+1% penicillin/streptomycin under the same conditions. Both cell lines were passaged two times per week at a confluence of approximately 90%.

Transient transfections were performed using the calcium phosphate method. For this purpose, cells were seeded onto 6 cm cell culture plates. When transfecting SpCas9-containing plasmids for western blotting, 10 cm cell culture plates were used. The cells were incubated overnight until they reached the desired confluence of approximately 70%. The transfection mix components were added to a 15 ml Falcon tube in the indicated order. 2×BBS was added dropwise during vortexing.

The transfection mix was incubated for 3-4 minutes at RT and added dropwise to the culture medium. For the initial experiments (Example 2, FIG. 4), the cells have been incubated in a 5% $CO_2$ setting for 24 h and the cells were harvested without replacing the medium. For the optimized protocol (Examples 3, 5-8; FIGS. 9 and 11-14), the cells were incubated in a 5% $CO_2$ setting for 3-4 h, the culture medium was replaced and the cells were maintained at 10% $CO_2$ for approximately 48 h. When fluorophore-containing plasmids were transfected, successful transfection and expression was evaluated via the fluorescent cell imaging system EVOS® FL cell imaging system (Life Technologies, Thermo Fisher Scientific).

The 661W cells were kindly provided by Prof. Muayyad Al-Ubaidi (University of Houston). This cell line was cloned from murine retinal tumors and was found to exhibit molecular characteristics of cone photoreceptors (al-Ubaidi et al., 1992, Tan et al., 2004). 661W cells were maintained in DMEM medium+L-alanyl-L-glutamine (e.g., Gluta- MAX™)+1 g/l glucose+pyruvate+10% FBS (Biochrom)+ 1% Antibiotic-Antimycotic in a $CO_2$ incubator (Heraeus, Thermo Fisher Scientific) at 37° C. and 10% $CO_2$. They were passaged twice per week at a confluence of approximately 90%. Transient transfections were performed using the calcium phosphate method as described above.

Mouse embryonic fibroblasts (MEFs) were generated as described (Jat et al., 1986, Xu, 2005). The cells were maintained in DMEM medium+L-alanyl-L-glutamine (e.g., GlutaMAX™)+1 g/l glucose+pyruvate+10% FBS (Biochrom)+1% penicillin/streptomycin (Biochrom) in a $CO_2$ incubator (Heraeus, Thermo Fisher Scientific) at 37° C. and 5% $CO_2$. They were passaged once per week at a confluence of approximately 90%. MEFs were transiently transfected using the TurboFect™ Transfection Reagent (Thermo Fisher Scientific). Cells were seeded onto a 6 cm cell culture plate and incubated until 70-90% confluence was reached. The reaction mix was prepared in the following order.

After addition of each component, the solution was mixed vigorously by vortexing. The transfection mix was incubated for 15-20 min at RT and subsequently added dropwise to the culture plate. The medium was exchanged after 3 h and the cells were harvested 48 h post transfection. When fluorophore-containing plasmids were transfected, successful transfection and expression was evaluated via the fluorescent cell imaging system EVOS® FL cell imaging system (Life Technologies, Thermo Fisher Scientific).

Production of Recombinant Adeno-Associated Viruses

Recombinant Adeno-associated viruses (rAAVs) were produced by a triple calcium phosphate transfection of a pAAV2.1 plasmid containing the gene of interest, a pAD. Helper plasmid and a plasmid encoding the desired capsid. For subretinal injections into the murine retina, the 2/8Y733F capsid variant was selected due to its high efficiency in transducing photoreceptors and the RPE (Petrs-Silva et al., 2009, Mol. Ther, 17, 463-71). HEK293T cells were seeded onto 15×15 cm cell culture plates and incubated over night until a confluence of 60-80% was reached. Prior to transfection, the FBS-containing medium was replaced by serum-free medium. The transfection reagents were added to a 50 ml Falcon tube in the indicated order: pAAV2.1 plasmid 270 µg, pAD Helper plasmid X µg, Capsid plasmid Y µg, $H_2O$ ad 11.85 ml, Polybrene® (hexadimethrine bromide; Abbott Laboratories) (8 mg/ml) 15 µl, Dextran (10 mg/ml) 1.5 ml, $CaCl_2$ (2.5 M) 1.5 ml, 2×BBS 15 ml. The required amounts of pAD Helper and capsid plasmid were calculated using the following formulas: X µg=270 µg×MM of pAD HelperMM of pAAV2.1 Y µg=270 µg×MM of capsid plasmid MM of pAAV2.1. $CaCl_2$ and 2×BBS were added dropwise during vortexing. 2 ml of the transfection mix were added dropwise to each of the 15 culture plates. The plates were rocked gently and subsequently placed in a 5% $CO_2$ setting for 24 h. The medium was exchanged afterwards and the plates were placed in a 10% $CO_2$ setting for another 48 h.

The virus-containing culture medium was harvested twice. The first harvest took place 72 h post transfection by collecting the entire medium of all plates and adding fresh medium. The second harvest took place after another 72 h incubation period. The culture medium was collected into a 500 ml centrifugation tube. The residual cells were removed from the medium by centrifugation at 4,000 rpm and 4° C. for 15 min (JA-10 rotor, J2-MC High speed centrifuge, Beckman Coulter) and filtration of the supernatant through a 0.45 µm PES filter unit (Nalgene, Thermo Fisher Scientific). A 40% polyethylene glycol (PEG) solution was added to the flow-through to a final concentration of 8% and kept at 4° C. overnight to precipitate the viral particles. Subsequently, the solution was centrifuged at 4,000 rpm and 4° C. for 15 min (JA-10 rotor, J2-MC High speed centrifuge, Beckman Coulter). The supernatant was discarded and the virus-containing pellet was stored at −20° C. until further processing.

For Iodixanol Density Gradient Centrifugation, the pellet was re-suspended in 7.5 ml sterilely filtrated PBS and incubated with Benzonase® (VWR) at a final concentration of 50 U/ml in a water bath (Haake) at 37° C. for 30 min to remove residual, non-packaged DNA. Next, the virus suspension was pipetted into a Quick-Seal® polypropylene tube (39 ml, Beckman Coulter) and a density gradient was established by adding solutions with different iodixanol concentrations below the virus suspension in the following order: 7 ml of 15%, 6 ml of 25%, 5 ml of 40% and 6 ml of 60% iodixanol solution. For this purpose, a peristaltic pump (MINIPULS® 3; Gilson) and a long glass pipette were used. Subsequently, the tubes were sealed with the Beckman Tube Topper and centrifuged at 70,000 rpm and 18° C. for 1 h 45 min in an Optima L-80K ultracentrifuge (70 Ti rotor, Beckman Coulter). Afterwards, the top of the tube was perforated with a cannula to ensure air flow. The 40% iodixanol phase enriched with viral particles was collected from the gradient using a 20 G cannula and 20 ml syringe by puncturing the tube laterally at the border between the 40% and the 60% phase. The virus-containing solution was stored at −80° C. until further processing.

To further purify the virus, an anion exchange chromatography was performed employing the ÄKTAprime plus chromatography system (GE Healthcare), the 5 ml HiTrap® Q FF anion exchange chromatography column (GE Healthcare) and the PrimeView 5.31 software (GE Healthcare). Before starting, the column was equilibrated with buffer A (20 mM Tris, 15 mM NaCl, pH 8.5) and the virus-containing solution was diluted with this buffer in a 1:1 ratio. The solution was loaded onto the column via a loop injector (50 ml Superloop, GE Healthcare). The UV light-absorbance and conductance properties of the collected fractions were monitored providing information about the amount of contained virus. Remaining bound molecules were removed from the column using a 2.5 M NaCl solution. All virus-containing fractions were pooled and used for subsequent processing. 3.5.4 Increase of rAAV Concentration To increase the virus concentration, Amicon® Ultra-4 centrifugation filter units (Merck) with a molecular weight cut-off of 100 kDa were used. The virus-containing solution was loaded on top of the filter unit and centrifuged at 4,000 rpm (JA-10 rotor, J2-MC High speed centrifuge, Beckman Coulter) and 4° C. in 20 min intervals until the volume was reduced to 500 µl. Subsequently, the filter unit was washed with 1 ml 0.014% Tween/PBS-MK (10×PBS 50 ml, 1M $MgCl$ 500 µl, 2.5 M KCl 500 µl, add 500 ml water). The solution was further centrifuged under the same conditions until the volume was reduced to 100 µl of concentrated viral solution. 10 µl aliquots were prepared and stored at −80° C. until use.

To determine the titer of the produced rAAVs, a qPCR was performed using the real-time PCR system StepOnePlus™ Real-Time PCR system (Applied Biosystems, Thermo Fisher Scientific). A standard curve was produced to serve as a reference. For this purpose, a fragment containing a part of the ITR was amplified by PCR using the following primers.

```
ITR2 forward:
                                        (SEQ ID NO: 30)
5' GGAACCCCTAGTGATGGAGTT 3'

ITR2 reverse:
                                        (SEQ ID NO: 31)
5' CGGCCTCAGTGAGCGA 3'
```

Next, the amplicon was purified and the concentration was determined using the NanoDrop™ 2000c spectrophotometer (Thermo Fisher Scientific). After preparation of a standard solution with concentration c, a dilution series ranging from $10^{10}$ to $10^1$ copies was made. To attain the standard curve, a qPCR was run with three technical replicates of the standard dilution series. For this purpose, a MicroAmp™ Fast Optical 96-Well Reaction Plate (Applied Biosystems, Thermo Fisher Scientific) and the real-time PCR master mix the PowerUp™ SYBR™ Green Master Mix (Thermo Fisher Scientific) were used. The virus solution was diluted 100-fold in H2O and run on the same reaction plate with three technical replicates. The reaction mix was prepared as follows. The obtained data was analyzed using the real-time PCR system StepOnePlus™ Real-Time PCR system software (Applied Biosystems, Thermo Fisher Scientific). Baseline settings and cycling threshold position were adjusted manually if necessary. The standard curve was attained by plotting the resulting cycle threshold (Ct) values against the logarithm of the dilution. The number of viral genomes per µl (vg/p1) of the produced rAAVs could be inferred from the standard curve.

Subretinal Injection

For subretinal injections, C57Bl6/J mice at postnatal day 21 (P21) were anesthetized by an intraperitoneal injection of ketamine (40 mg/kg body weight) and xylazine (20 mg/kg body weight). After a complete absence of the paw withdrawal reflex the pupils were dilated by administration of atropine (1%)- and tropicamide (0.5%)-containing eye drops (Mydriaticum Stulln®, Pharma Stulln GmbH). The *fundus* of the eye was focused using a surgical microscope (OPMI 1 FR pro, Zeiss). 1 µl containing 1010 rAAV particles was injected subretinally by a single injection with a NANOFIL 10 µl syringe (World Precision Instruments) and a 34 G beveled needle (World Precision Instruments). The injected eyes were treated with an eye ointment containing 5 mg/g gentamicin and 0.3 mg/g dexamethasone. The mice were kept on a heating plate (Leica H11120, Leica Biosystems) at 37° C. until full recovery from anesthesia. Two to four weeks post injection, all injected retinas were harvested and processed for RT-PCR analysis or immunohistochemistry.

Immunohistochemistry

For immunohistochemistry subretinally injected mice were euthanized via cervical dislocation. The eyes were removed and placed in 0.1 M phosphate buffer (PB). Subsequently, the eyeball was punctured at the ora *serrata* with a 21 G cannula and fixed in 4% paraformaldehyde (PFA, Sigma Aldrich, pH adjusted to 7.4) for 5 min. Next, the eye was positioned below a stereomicroscope (Stemi 2000, Zeiss) on a filter paper drenched with 0.1 M PB. By cutting alongside the ora *serrata* using surgical scissors (SuperFine Vannas, World Precision Instruments), the cornea, lens and vitreous body were removed. The remaining part of the eyeball containing the retina was fixed in 4% PFA for 45 min at RT and subsequently washed 3 times for 5 min in 0.1 M PB. For cryopreservation, the eyeball was placed in a 30% sucrose solution (w/v) overnight at 4° C.

The next day, the eyeball was embedded in tissue freezing medium (Sakura) and chilled on dry ice until the medium solidified. The retina was sectioned using a cryostat (Leica CM3050 S, Leica Biosystems) into 10 µm thick slices, collected on coated glass object slides (Superfrost Plus microscopic slides, Thermo Fisher Scientific) and stored at −20° C.

For immunohistochemical staining, the retinal sections were thawed at RT and encircled using a Super PAP Pen Liquid Blocker (Science Services). Subsequently, the sections were rehydrated with 0.1 M PB for 5 min and fixed with 4% PFA for 10 min. After washing the sections three times for 5 min each with 0.1 M phosphate buffer, pH 7.4 (PB), a solution containing the primary antibodies, 5% ChemiBLOCKER (Merck) and 0.3% Triton X-100 in 0.1 M PB was applied. The cryosections were incubated with the primary antibody solution overnight at 4° C. The next day, the retinas were washed three times with 0.1 M PB for 5 min and incubated with a solution containing the secondary antibodies and 2% ChemiBLOCKER in 0.1 M PB for 1.5 h at RT. After subsequent washing with 0.1 M PB three times for 5 min, the cell nuclei were stained with 5 µg/ml Hoechst 33342 solution (Invitrogen). Finally, the sections were washed with 0.1 M PB, embedded in Fluoromount-G Mounting Medium (Thermo Fisher Scientific), covered by a cover slip and stored at 4° C.

Confocal Microscopy

Images of the stained retinas were obtained using a Leica TCS SP8 inverted confocal laser scanning microscope (Leica Microsystems) equipped with a 405 nm diode as well as a 552 nm and a 633 nm optically pumped semiconductor laser appropriate for the excitation of Hoechst 33342, Cy3 and Cy5, respectively. The filter settings were chosen according to the emission spectrum of the respective dye. Images were acquired as z-stacks (1 µm steps) with a HC PL APO 40×/1.30 Oil CS2 objective (Leica Microsystems) and type F immersion liquid (Leica Microsystems) using the LAS X software (Leica Microsystems). With the same software, z-stacks were condensed into 2D images by applying a maximum intensity projection. The images were processed further with the ImageJ 1.48 v software (National Institutes of Health).

Images of transiently transfected living cells were obtained using the Leica TCS SP8 spectral confocal laser scanning microscope (Leica Microsystems) equipped with a 448 nm, a 514 nm and a 552 nm optically pumped semiconductor laser appropriate for the excitation of cerulean, citrine and mCherry, respectively. The filter settings were chosen according to the emission spectrum of the respective fluorophore. Images were acquired with a HCX APO 20×/1.00 W objective (Leica Microsystems). All images were processed with the ImageJ 1.48 v software.

RNA Extraction

For RNA extraction from injected retinas, the mice were euthanized via cervical dislocation. The retinas were collected by placing blunt forceps below the eye, incising the eye ball using a sterile scalpel (Swann-Morton) and gradually moving the forceps upward. Three retinas were pooled per construct and RNA was extracted using the RNeasy Mini Kit (Qiagen) according to the manufacturer's instructions. For disruption, the tissue was homogenized by adding 350 µl of RLT buffer (Qiagen, provided with the kit)+3.5 µl β-mercaptoethanol (β-ME, Sigma Aldrich) and passing it through a 20 G needle fitted onto a sterile syringe at least five times. The remaining steps were executed according to protocol. The RNA was eluted in 30 µl RNAse-free H2O.

For RNA extraction from transiently transfected cells, the RNeasy Mini Kit Plus (Qiagen) was used. For this purpose, the medium was removed from the 6 cm culture plates and the cells were scrapped off using a 16 cm cell scraper (Sarstedt). The cells were collected in 500 µl medium into a 2 ml safe-lock tube (Eppendorf) and centrifuged at 3,000×g and 4° C. for 10 min. The supernatant was discarded and the pellet was re-suspended in 600 µl RLT Plus buffer (Qiagen, provided with the kit)+6 µl β-ME (Sigma Aldrich). A steel ball was placed into each tube and the cells were disrupted using the mixer mill MM400 (Retsch) at 30 Hz for 1 min. Afterwards, the balls were removed and the suspension was centrifuged at 21,000×g and RT for 5 min. The remaining steps were executed according to protocol including an optional step removing the genomic DNA via gDNA eliminator spin columns. The RNA was eluted in 30 µl RNAse-free H2O.

The RNA concentrations were measured using the NanoDrop™ 2000c spectrophotometer (Thermo Fisher Scientific). The RNA was kept on ice until further use or stored at −20° C. for short-term or −80° C. for long-term storage.

cDNA Synthesis

For cDNA synthesis, the Revert Aid First Strand cDNA Synthesis Kit (Thermo Fisher Scientific) was used according to the manufacturer's instructions. Equal amounts of RNA were used per experiment. The cDNA reaction mix was incubated in the thermal cycler Eppendorf® Mastercycler® *nexus* gradient. The cDNA was kept on ice until further use or stored at −20° C. for short-term or −80° C. for long-term storage.

Reverse Transcription PCR

Reverse transcription PCR (RT-PCR) was performed using the Herculase II fusion DNA polymerase (Agilent Technologies) or the VWR® Taq DNA polymerase.

Branch Point Analysis

For Nested Lariat RT-PCR, RNA was extracted as described above. 10 µg RNA were incubated with RNase R (Lucigen) following the manufacturer's instructions to remove any non-circular RNA. Subsequent cDNA synthesis (Revert Aid First Strand cDNA Synthesis Kit, Life Technologies) was performed as described above. For this reaction, only the random hexamer primer was used. Next, the lariats were amplified via a nested RT-PCR using the Herculase II fusion DNA polymerase (Agilent Technologies). For the first round of amplification, the reaction mix was prepared as described in 3.12. For the second round of amplification, 5 µl of the first PCR were added to the reaction mix instead of the cDNA. Moreover, a second primer pair binding 25-30 bp downstream of the first primer pair was used. The applied cycling conditions are listed in Table 11.

For TOPO Cloning and Analysis of Lariats, the products of the nested RT-PCR were subcloned into plasmids. For this purpose, 3'-adenine overhangs were added to the DNA fragments post amplification by incubating one unit of Taq Polymerase (VWR) with the PCR reaction for 10 min at 72° C. Subsequently, the lariats were subcloned into a TOPO vector (TOPO TA Cloning Kit, Thermo Fisher Scientific) according to the manufacturer's instructions. The plasmids were transformed into bacteria and a small-scale plasmid preparation was performed. The resulting plasmids were sequenced (Eurofins Genomics) and the obtained lariat sequences were analyzed by alignment with the investigated intron using the DNAMAN software (Lynnon Biosoft).

Protein Extraction

For protein extraction, the medium was removed from the 6 or 10 cm culture plates. The cells were scrapped off using a 16 cm cell scraper (Sarstedt) and collected in 500 µl medium into a 2 ml safe-lock tube (Eppendorf). The cell suspension was centrifuged at 3,000×g and 4° C. for 10 min, the supernatant was discarded and the pellet re-suspended in 150 µl and 250 µl Triton X-100 (TX) lysis buffer (2.5 ml Triton X-100, 15 ml 5 mM NaCl ml, 0.4 ml 2.5 M $CaCl_2$, add 500 ml water; the protease inhibitor cOmplete™ ULTRA protease Inhibitor Cocktail tablets (Roche) were added right before use (1 tablet/10 ml)) for 6 cm and 10 cm plates, respectively. A steel ball was added to each safe-lock tube and the cells were disrupted using the mixer mill MM400 (Retsch) at 30 Hz for 1 min. Afterwards, the tubes containing the balls were rotated end-over-end (tube rotator; VWR) for 20 min at 4° C. Subsequently, the balls were removed and the lysates were centrifuged at 5,000×g for 10 min at 4° C. The protein-containing supernatant was transferred into a new reaction tube and stored at −20° C.

Total protein concentration was determined using the Bradford assay. 5 µl of the protein lysate was mixed with 95 µl of a 0.15 M NaCl solution and transferred into a PMMA standard disposable cuvette (BRAND). Subsequently, 1 ml of Coomassie blue solution was added, thoroughly mixed by pipetting and incubated at RT for 2 min. Using the BioPhotometer (Eppendorf), the absorption of the solution was measured against a blank control containing 5 µl of the TX lysis buffer. The obtained value represents the total amount of protein contained in 5 µl lysate.

Example 1: Identification of an Optimized ASS Module

The impact of disease-linked rhodopsin mutations on mRNA splicing has been analyzed using human rhodopsin (RHO) minigenes in HEK293 cells and in transduced murine photoreceptors. Among those, we found one mutation in exon 3 of the RHO gene (c.620T>G) which creates a novel ASS (FIG. 1). The sequence of the ASS and the predicted ASS elements are shown in FIGS. 2A and B.

In silico prediction showed that the acceptor splice site formed by the c.620T>G mutation (hereafter referred to as ASS_620) has similar splice scores as the native rhodopsin acceptor splice site of exon 3 (cf. FIG. 3A). This suggests that both splice sites could be used by the splicing machinery alternatively. However, experimental data showed that ASS_620 was exclusively used in both, HEK293 cells (FIG. 1D) and in murine photoreceptors (FIG. 1E). This suggests that ASS_620 is a strong acceptor splice site.

For potential usage in biotechnological applications, the strength and functionality of an ASS should be independent of the gene environment. To test whether ASS_620 is functional in another non-native environment and to determine the ASS_620 elements required for most efficient splicing, sequences of variable lengths flanking the c.620T>G mutation were introduced into the exon 3 of the RPS27 gene (FIG. 2C). The single sequences led to variable splicing efficiencies at the ASS_620 position (FIG. 2D). Highest splicing efficiencies (close to 100%) were obtained when using the RHO-E3d comprising RPS27 minigene, i.e., the minigene comprising a 26 bp sequence (CAACGAG TC TTTTGTCATCTACAGGT; SEQ ID NO: 3) consisting of a 7 bp sequence at the 5'end, a polypyrimidine tract and the canonical ASS. Surprisingly, this sequence did not contain any of the predicted branch points present in RHO exon 3. The 7 bp sequence at the 5' end (CAACGAG) could harbor a currently not characterized effective branch point sequence, or, alternatively, an intronic splice enhancer recognition site required for efficient usage of the ASS. The 26 bp sequence (SEQ ID NO: 3) is referred to herein as "vgASS_620".

To further confirm the splicing efficiency of vgASS_620, it was introduced into four additional randomly chosen genes (HBQ1, S100A12, CLRN1 and CNGB1) with variable predicted acceptor splice site strengths (FIG. 3C). Compared to vgASS_620, the predicted strength of the native exon acceptor splice site was higher in the case of RPS27, similar in the case of S100A12, CLRN1 and HBQ1, and lower in the case of CNGB1 (FIG. 3A). In subsequent RT-PCR experiments it was shown that vgASS_620 was not only exclusively used in RPS27, but also in all additional genes tested herein (FIG. 3D-E). These results demonstrate that vgASS_620 is a very strong acceptor splice site independent of the gene environment. It was therefore hypothesized that vgASS_620 can be utilized to improve the currently rather low trans-splicing efficiencies in SMaRT or dual adeno associated virus (AAV) vector hybrid technologies.

Example 2: Cerulean Reporter Assay for In Vitro Applications

To test this hypothesis, a splice reporter assay has been generated by splitting the coding sequence of cerulean into two artificial exons interrupted by an artificial intron (FIG. 4D). This intron contained vgASS_620 and a strong donor splice site separated from each other by artificial 145 bp. Confocal imaging of transfected HEK293 cells revealed a strong and robust cerulean fluorescence when both splice sites were provided in cis (FIG. 4F(c1)). RT-PCR experiments and sequencing of the corresponding bands confirmed that in this configuration both cerulean exons are spliced together efficiently (data not shown). As shown in FIG. 4G, Western blotting experiments using a specific antibody against the N-terminal part of cerulean detected a specific immunosignal at the expected size (27 kDa). Taken together, these findings suggest that the reporter assay is functional and very efficient in the cis configuration. In subsequent experiments, this construct was therefore used as a reference to determine the cerulean reconstitution efficiency when the two cerulean splice fragments were provided in trans (i.e. on separate plasmids). The DSS used in this experiment has a sequence of AAGGTAAG.

Next, the impact of the binding domain and the acceptor splice site strength for the cerulean reconstitution efficiencies were analyzed using a reporter assay, wherein reconstitution of the reporter requires mRNA trans-splicing.

For this purpose, a fluorescent reporter-based assay has been developed for which the coding sequence of the cyan fluorescent protein "cerulean" was again split into two halves at position 154 (FIG. 4D). The first DNA construct comprising the 5' part under the control of a CMV promoter was further equipped with a strong DSS (AAGGTAAG) followed by a binding domain and the second DNA construct comprising the 3' part under the control of a CMV promoter was equipped with vgASS_620 as ASS following a binding domain complementary to the binding domain of the first DNA construct, as shown in FIG. 4D (c3). After transcription, base-pairing of the BDs brings the splicing elements into close proximity, which facilitates splicing in trans and results in a full-length mature cerulean mRNA. Reconstitution of cerulean may be detected optically, e.g., by microscopy (as in FIG. 4F) or flow cytometry, on mRNA level (e.g., using RT-PCR) or on protein level (e.g., using Western blot as in FIG. 4G).

As an exemplary template for optimization of the binding domain, intron 2 of the human rhodopsin gene was chosen for two reasons: (1) An optimized type of the RHO intron 2 binding domain can be used for a SMaRT-based replacement of the c.620T>G splice mutation, as this mutation is localized in exon 3 (FIG. 1). (2) The RHO intron 2 sequence is not homologous to any of the sequences in the mouse genome (data not shown) and is therefore not expected to cause off-target effects. Consequently, the optimized RHO intron 2 binding domain could also be utilized for reconstitution of other large human genes in mouse retinas using the dual AAV vector approach.

HEK 293 cells were transiently co-transfected with the first and the second DNA construct as described above and shown exemplary for BD_h+i in FIG. 4D(c3) and the presence of cerulean fluorescence was evaluated via confocal live cell imaging. A construct containing both cerulean parts in cis with an intervening artificial intron comprising the same splicing elements was used as a cis-splicing reference control (cis-ctrl). When the two halves were transfected separately, no fluorescence could be detected. When co-transfecting both constructs, fluorescent cells could be observed, indicating successful trans-splicing and reconstitution of the cerulean coding sequence.

The RHO intron 2 binding domain was optimized by varying its size and position (FIG. 4A). Moreover, artificial BDs were created and tested by fusing sequences originating from the 5' and the 3' end of the intron as for BD_h+i.

Following co-transfection of HEK293 cells mRNA expression of the two constructs was analyzed compared to the housekeeping gene ALAS using primers p1 and p2 for the 5' construct and primers p3 and p4 for the 3' construct, demonstrating only small differences in expression on pre-mRNA level (FIGS. 4B and C). Reconstitution efficiencies were determined by the radiometric analysis of the cerulean protein bands relative to the cis-ctrl and varied greatly using different BDs (FIG. 4E). All protein bands were normalized to beta tubulin prior to quantification. Two binding domains BD_g (SEQ ID NO: 27) and BD_h+i (SEQ ID NO: 28), both about 100 bp in length resulted in a high cerulean reconstitution efficiency reaching >30%. Importantly, this high efficiency by far outperformed those known from previous studies using an alternative approach based on the reconstitution of a split gene on the genomic level (hybrid, overlapping and genomic "trans"-splicing approach) (Carvalho et al., 2017, Frontiers in Neurosciences, 11, Article 503). All three strategies were tested in vitro using the reporter gene lacZ. The highest reported reconstitution efficiencies in this setting amounted to 17.7%.

A recent study postulated that the efficiency of trans-splicing is not influenced by the splice site strength (Lorain et al., 2013). To test this assumption, the cerulean reconstitution efficiency of vgASS_620 was compared with the native acceptor splice site of RHO exon 3 in combination with the most efficient binding domain BD_h+i (SEQ ID NO: 28). As may be taken from FIG. 4E, compared to vgASS_620, reconstitution efficiencies originating from the native ASS were strikingly lower (35.7±4.6% vs 0.7±0.1%). This finding provides clear evidence that the trans-splicing efficiency in the dual vector approach strongly depends on the acceptor splice site strength (FIG. 4D-G).

Figure 9:
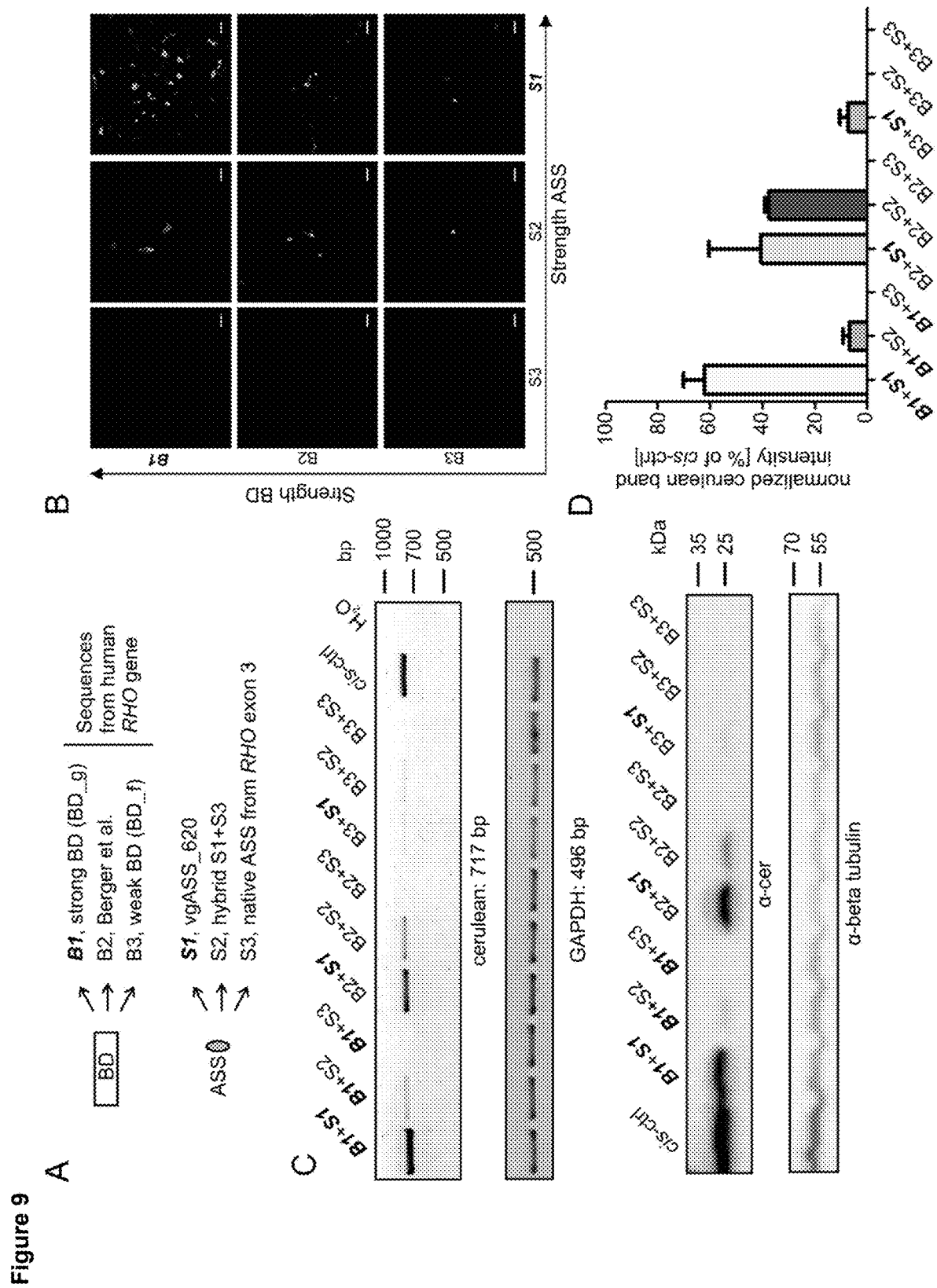

Reconstitution efficacy could be increased in later experiments (see e.g., Example 3, FIG. 9D). First of all the number of independent samples (n) has still been very low in the initial experiment. By increasing the number of independent samples (n) and optimizing the transfection protocol, the reconstitution efficiencies could be quantified more reliably and higher values, such as 60% or even higher reconstitution efficiency (FIG. 9), could be reached, as the co-transfection efficiency has been increased.

In addition to HEK293 cells reconstitution efficacy trans-splicing has also been tested in 661W cells and MEF cells. Using the binding domain BD_g reconstitution efficacies of >40% in 661W cells and of >50% in MEF cells have been observed (data not shown). No significant differences in trans-splicing efficacies could be detected when comparing the two cell lines. This suggests that the mRNA trans-splicing approach is cell-type independent.

Collectively, the in vitro results indicate that trans-splicing efficiencies can be markedly increased not only by varying the sequence and length of the binding domain but also by optimizing the acceptor splice site strength. These promising findings open new avenues for further optimization of trans-splicing based technologies.

Figure 4:
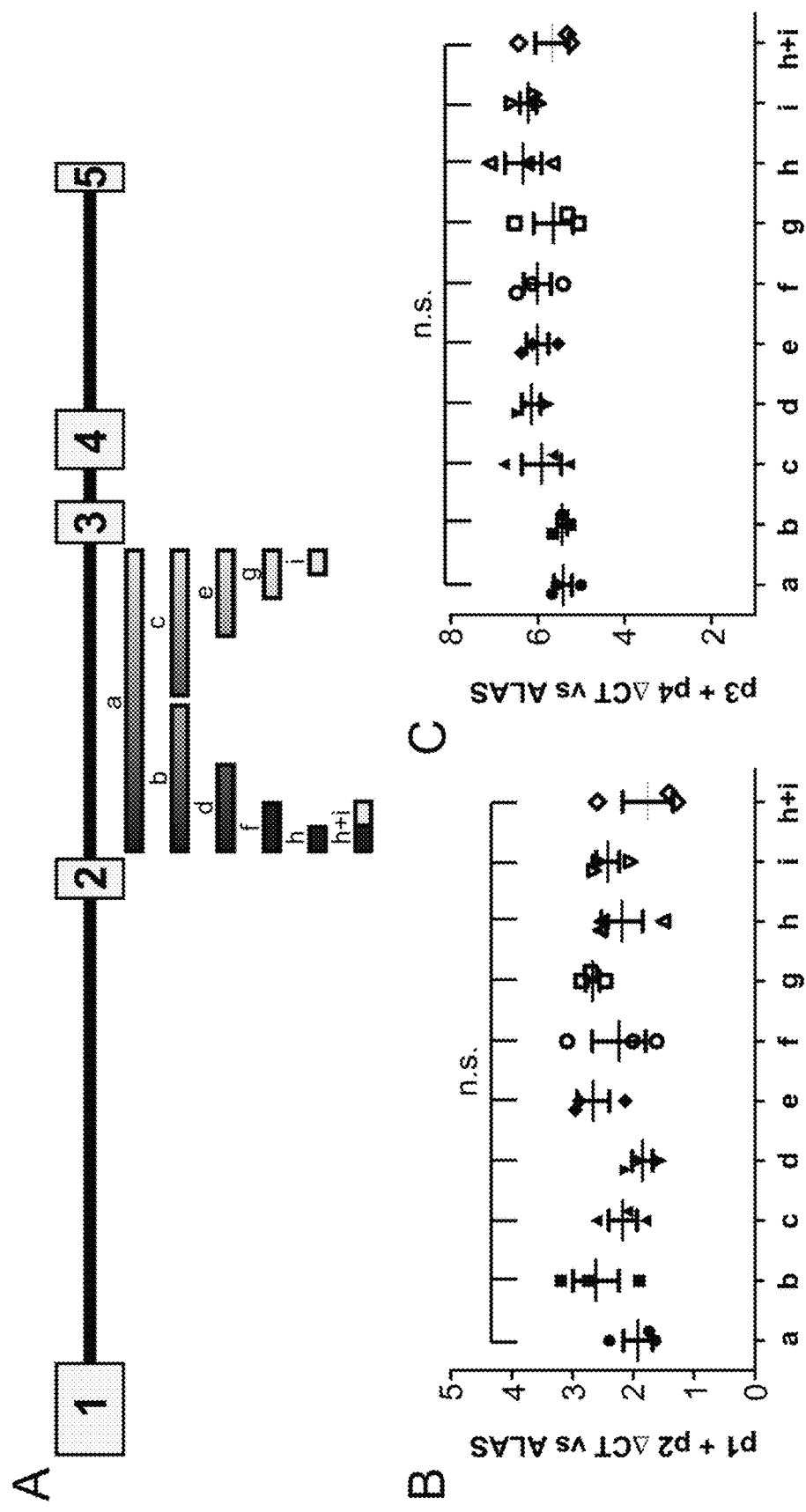

In combination with vgASS_620, the binding domain "g" shown in FIG. 4 can be used to establish a SMaRT-based gene therapy approach of rhodopsin mutations in or downstream of exon 3. In addition, vgASS_620 can also be combined with a variety of other binding domains to treat other inherited retinal disease (IRD) genes via SMaRT or via the dual AAV vector approach. The disclosure provided herein applies to the usage of any DNA or RNA sequence containing the vgASS_620 splice module apart from its naturally occurring context (i.e. apart from the rhodopsin gene in patients carrying the c.620T>G mutation). vgASS_620 of SEQ ID NO: 3 or a nucleotide acid sequence having at least 70% sequence identity to SEQ ID 3 could be used for following applications:

1) Design of minigenes (e.g. for the analysis of mutations on mRNA splicing)
2) To target endogenous mRNAs in biological or therapeutic context (e.g. using the SMaRT technology)
3) Reconstitution of two mRNA fragments in trans. This is of special importance in the context of overcoming the limited genome packaging capacity of adeno-associated virus (AAV) vectors (approx. 5.0 kb, preferably <4.7 kb). FIGS. 5 to 8 depict sequences of AAV vectors which can be used in the dual AAV vectors systems described herein.
4) Design of gene expression or targeting cassettes to selectively increase the presence of certain splice products in alternatively spliced genes containing weak ASS splice sites.

Example 3: Impact of the Acceptor Splice Site Versus the Binding Domain (BD) on Reconstitution Efficacy The BD length and sequence represent key determinants of the reconstitution efficiencies. The BDs most likely influence the tight binding and, potentially, folding of the mRNAs, but they are not expected to directly facilitate the efficiency or precision of the subsequent splicing process. As mentioned above, DSSs are well characterized and the prediction of their strength is well-matched on their experimental performance. Consequently, there is no apparent need for optimization of this splice site in the framework of the split fluorophore reconstitution assay. By contrast, due to their complexity, the strength of the ASS cannot be reliably predicted. The results suggest that vgASS_620 is an exceptionally strong acceptor splice site. Given that the splice site strength can impact on the reconstitution efficiencies of the split fluorophore assay, vgASS_620 should lead to higher values when compared to other acceptor splice sites.

To analyze this, the reconstitution efficiencies in the presence of vgASS_620 or two other ASSs, i.e. the native ASS of RHO exon 3 (S3, FIG. 9) and a hybrid ASS (S2) which was created by replacing the poly-pyrimidine tract (PPT) of vgASS_620 with the PPT of the native RHO exon 3 ASS, were compared. Moreover, each ASS was combined with three different binding domains: a strong (BD_g, 1; SEQ ID NO: 27) and a weak (BD_f, E3) binding domain originating from this study and a published BD sequence (PTM1, E2) obtained from RHO intron 1 (SEQ ID NO: 29). This sequence was shown to yield high efficiencies for the repair of mutated RHO transcripts via spliceosome-mediated mRNA trans-splicing (Berger et al., "Repair of rhodopsin mRNA by spliceosome-mediated RNA trans-splicing: A new approach for autosomal dominant retinitis pigmentosa", (2015) Mol. Ther. 23(5): 918-930). All combinations were analyzed via confocal live cell imaging, RT-PCR and Western blotting (FIG. 9). This experiment resulted in several important findings. First, it revealed that both, the BD and the ASS are key components determining reconstitution efficiencies. Second, the most potent BD identified in this study (BD_g, 1) outperforms the published RHO binding domain (E2). Third, the ASS strength appears to influence the reconstitution efficiencies even more potently than the BD, as the weakest BD combined with the strongest ASS (B3+S1) still results in detectable trans-splicing, whereas the strongest BD combined with the weakest ASS (B1+S3) does not lead to a detectable reconstitution of the coding sequence.

The vgASS_620 consists of an ASS, a PPT and an additional 7 bp sequence upstream, the deletion of which is impairing ASS_620 recognition. It has therefore been speculated that this 7 bp sequence might contain a very potent branch point potentially explaining the universal and efficient recognition of vgASS_620 independent of the gene environment. However, there were no potent branch points predicted within this sequence. Instead, some other sequences were predicted to serve as branch points positioned up to 40 bp upstream of the c.620T>G ASS. Nevertheless, when simultaneously mutating all predicted branch point nucleotides and all potential branch point adenines contained in the 7 bp sequence upstream of the PPT, splicing could not be altered for the c.620T>G mutant (data not shown). This finding indicates that the branch point(s) are either located elsewhere or that the c.620T>G ASS possesses a high flexibility in branch point choice. To identify the branch point(s) utilized for splicing at the c.620T>G ASS more directly, a nested lariat RT-PCR was performed using HEK293 cells transiently expressing the RHO c.620T>G minigene. HEK293 cells transfected with the RHO WT minigene served as a reference. When performing the lariat RT-PCR, one band was obtained for the WT and for the mutant minigene, respectively, both differing in their size.

Both bands appeared somewhat diffuse suggesting that the corresponding lariats were of different size. To identify the single sequences contained in these diffuse bands, the lariat RT-PCR products were subcloned into a TOPO vector and the obtained clones were analyzed individually via sequencing. When investigating the RHO WT lariats, two major branch points (used in 42% and 33% of cases) and three minor branch points (8% of cases each) were identified (Table 2). The two major branch points closely resembled the consensus sequence and yielded high prediction scores. All RHO WT branch points were found 57-184 bp upstream of the intron-exon-junction. As more than 90% of human branch points are found within 50 bp upstream of the ASS sequence, mRNA splicing of RHO exon 3 seems unconventional (Corvelo et al., 2010, PLoS Comput. Biol., 6(11): e1001016).

TABLE 2

Detected branch points and corresponding prediction scores

| Branch point | Relative position | HSF score | Frequency of usage |
|---|---|---|---|
| RHO WT minigene | | | |
| cactgAt | −184 bp | 84.3 | 41.6% |
| tccacAa | −177 bp | 76.8 | 8.3% |
| tccccAt | −158 bp | 85.6 | 33.3% |
| ttatgAt | −113 bp | 60.6 | 8.3% |
| cagccAc | −57 bp | 58.4 | 8.3% |
| RHO c.620T>G minigene | | | |
| atcgAt | −245 bp | 83.6 | 16.7% |
| attccAt | −236 bp | 55.6 | 8.3% |
| tgcagAc | −213 bp | 73.9 | 8.3% |
| cgtttAt | −208 bp | 55.9 | 8.3% |
| atcccCt | −200 bp | not predicted | 16.7% |
| cagggAg | −189 bp | not predicted | 8.3% |
| gaagcCc | −174 bp | not predicted | 8.3% |
| ttcccAa | −132 bp | 79.5 | 8.3% |
| caggcAg | −118 bp | not predicted | 8.3% |
| tccctAc | −107 bp | 77.6 | 8.3% |

Nevertheless, the branch point profile obtained for RHO c.620T>G was remarkably different, when compared to the WT minigene. First, various branch points have been identified for the c.620T>G mutant. However, no major branch point(s) could be detected and none of them were identical with the ones obtained for the WT minigene. Second, the branch points were located even further upstream from the used ASS, i.e. 107-245 bp corresponding to 21-159 bp upstream of the native exon 3 ASS. Third, almost half of the detected branch points hardly resembled the consensus sequence and accordingly were not predicted using the human splice finder (HSF) splice prediction tool. All in all, these data suggest that the strength of vgASS_620 does not originate from the presence of a contained, very potent branch point but might partially be caused by a high flexibility in branch point choice. This could explain its unusually efficient performance and renders it a very attractive tool for biotechnological applications requiring efficient splicing.

Example 4: Investigation of mRNA Trans-Splicing-Based rAAV Dual Vectors In Vivo

The most potent application of the mRNA trans-splicing-based assay evaluated in the previous sections is the reconstitution of large genes in the framework of dual rAAV vectors. Consequently, the mRNA trans-splicing approach was tested in the mouse retina using rAAVs. For this purpose, a slightly modified version of the split fluorophore assay was used. To control the rAAV vector-born expression in the cells transduced with the single viruses, both dual rAAV vector cassettes were equipped with a fluorophore sequence, i.e. a citrine at the 5' end of the coding sequence for the 5' vector and a mCherry at the 3' end of the coding sequence for the 3' vector. One of the BDs yielding the highest reconstitution efficiencies in vitro, i.e. BD_h+i, was used in vivo (FIG. 10A). In this experimental setup, cerulean fluorescence should be present in cells expressing citrine as well as mCherry.

The titer-matched viruses were injected subretinally at postnatal day 21 (P21) into WT C57Bl6/J mice. After harvesting the retinas two weeks post injection, a solid fluorophore expression could be detected in the RPE (FIG. 10B). Moreover, cerulean fluorescence could be observed in all areas where citrine and mCherry were expressed indicating successful mRNA trans-splicing in cells co-transduced with both AAVs. However, citrine and cerulean possess partially overlapping excitation and emission spectra. To exclude the possibility of the cerulean fluorescence being an artefact caused by e.g. bleed-through of citrine or mCherry, both fluorophores were bleached selectively in a small area of the RPE by exciting the fluorophores with a high intensity 514 nm laser. With this procedure, the citrine and mCherry fluorescence could be removed completely (FIG. 10C). Nevertheless, the cerulean fluorescence remained unchanged indicating that it originates solely from trans-spliced cerulean mRNA. This experiment provides proof of principle for the usability of mRNA trans-splicing for reconstitution of genes expressed from AAVs in vivo.

Example 5: Identification of Potent Binding Domains Suitable for Human Gene Therapy So far, all binding domain (BD) sequences were obtained from human intronic regions. When used for human gene therapy, they thus could potentially also bind to endogenous mRNAs and induce trans-splicing with these transcripts. For application of mRNA trans-splicing in human gene therapy, it is therefore necessary to identify BDs which do not contain sequences homologous to the human genome. For this purpose, a random 100 bp sequence was taken from the bacterial lacZ gene and modified via random insertions, deletions and substitutions to obtain four sequences without any homology to the human genome (FIG. 11A).

When co-transfecting HEK293 cells with the 5' vector- and 3' vector-constructs containing the respective binding domains, very high cerulean reconstitution efficiencies of 78.3%±2.1% could be observed for one of the BDs (BD_k, FIG. 11B-D). BD_k was thus more efficient than the best performing human BDs shown in FIG. 4 and was therefore used for preliminary experiments evaluating reconstitution of large genes via mRNA trans-splicing.

Example 6: Impact of Polyadenylation Signal on Reconstitution Efficiency and Involvement of DNA-Based Reconstitution in In Vitro Assay As the reconstitution of the two pre-mRNA molecules originating from the 5' and the 3' vector should be taking place in the nucleus, the polyadenylation signal (pA), which is necessary for stabilizing and translating the mature mRNA, could in theory be omitted in the 5' vector. The advantage of this deletion is that any residual non-spliced 5' pre-mRNA should not result in the translation of a truncated protein. Therefore, the impact of a deletion of the pA in the 5' vector on the cerulean reconstitution efficiency was investigated. For this purpose, a 5' vector lacking the pA was co-transfected with the regular 3' vector. Compared to the co-transfected vectors both containing a pA, the reconstitution seems to be slightly reduced (FIGS. 12A and B). However, this experiment shows that the pA signal can be omitted if necessary. Moreover, the successful reconstitution observed so far could in theory also be mediated by homologous recombination at the DNA level as in the prior art hybrid dual vector approach, as all necessary components, i.e. a recombinogenic sequence and splicing elements for removal of this sequence via cis-splicing, are present in the mRNA trans-splicing vectors (Carvalho et al., 2017). To exclude this possibility, the promoter in the 3' vector was deleted to prevent its transcription into a pre-mRNA and hence resembling the 3' vectors used for the hybrid dual vector approach known so far. After co-transfecting this construct with the regular 5' vector, no reconstitution could be observed. This result confirms that all observed reconstitution of cerulean is mediated exclusively via mRNA trans-splicing.

Example 7: Proof-of-Principle for Reconstitution of Large Genes Via mRNA Trans-Splicing In addition to the AAV cerulean split reporter assay for evaluation of mRNA trans-splicing a protein with therapeutic potential has been tested. The transcriptional activator SpCas9-VPR, a catalytically inactive nuclease fused to the transcriptional activator domains VP64-p65-Rta (VPR), is a recently developed novel tool for gene therapy. Due to its large size (5.8 kb), it needs to be delivered via dual vectors for in vivo applications. Consequently, SpCas9-VPR represents a suitable candidate for reconstitution via mRNA trans-splicing. The coding sequence of SpCas9-VPR was split into two halves at c.2185 and the two halves of the coding sequence were equipped with BD_k or its complementary sequence and the appropriate splicing element, i.e. DSS or vgASS_620. A full length (FL) SpCas9-VPR construct was used as a positive control. The RT-PCR from HEK293 cells co-transfected with the split constructs revealed that SpCas9-VPR mRNA was reconstituted successfully and that no unwanted side-products were generated (FIG. 13B). Sequencing of the PCR product confirmed an accurate restoration of the reading frame (FIG. 13C). Moreover, FL SpCas9-VPR protein could be detected via western blotting (FIG. 13D). The reconstitution efficiency of SpCas9-VPR was 13.2%±0.9%. This provides a proof of principle for the applicability of the mRNA trans-splicing approach for reconstitution of large genes.

Example 8: Reconstitution of ABCA4 (FIG. 14)

To finally also investigate the reconstitution of a large gene of human origin, the ABCA4 gene (6.8 kb) encoding the retinal ATP-binding cassette transporter was selected. This gene is a suitable candidate for gene therapy, as its mutations cause the inherited retinal dystrophy Stargardt macular dystrophy. ABCA4 was split into two halves at c.3243 and equipped with BD_k, DSS and vgASS_620 (FIG. 14A). Both halves contain a long intronless ABCA4 coding sequence (CDS) which does not resemble native pre-mRNAs composed of exons and introns. This therefore might impede the recruitment of the splice factors to the pre-mRNA and consequently might also reduce the mRNA trans-splicing efficiency. For the split gene to resemble endogenous human pre-mRNA more closely, additional constructs were designed containing three short (80 bp) intervening introns in both CDS halves. HEK293 cells were transiently co-transfected with the intronless or intron-containing constructs to examine the reconstitution-capability in vitro.

The RT-PCR revealed that ABCA4 was reconstituted successfully on mRNA level for the split constructs with and without intervening introns (FIG. 14B). Interestingly, the split constructs containing introns seem to be trans-spliced more efficiently. Again, no unspecific splice products could be detected and the reading frame was correctly restored (FIG. 14C).

Example 9: RAAV Dual Vector mRNA Trans-Splicing of ABCA4 In Vivo (FIG. 15)

In a final experiment, ABCA4 reconstitution was additionally tested in vivo. For this purpose, the CMV promoter was replaced with a human rhodopsin (hRHO) promoter to ensure a photoreceptor-specific expression (FIG. 15A). AAVs were produced using the in-house optimized NN and GL capsid variants derived from the wildtype AAV2 capsid as described in WO 2019/076856. The titer-matched viruses containing the 5' or the 3' CDS of ABCA4 were co-injected subretinally into 1 month old C57Bl6/J wildtype mice. After 4 weeks, retinas were harvested and successful reconstitution was evaluated on mRNA as well as on protein level. The RT-PCR performed with a junction-spanning primer pair revealed that both capsid variants, i.e. NN and GL, resulted in successful reconstitution with the NN capsid yielding higher levels of reconstituted mRNA most likely due to higher (co-)transduction efficiencies (FIG. 15B). A seamless ligation of the two separate pre-mRNA molecules was confirmed via sequencing (FIG. 15C). For a more exact quantification, a qRT-PCR was performed. These preliminary results (n=1) show that a relative ABCA4 expression ranging from a 10-fold to a 42-fold increase relative to a non-injected C57Bl6/J wildtype retina was reached, again confirming a successful and efficient reconstitution at the mRNA level (FIG. 15D). Finally, to investigate ABCA4 reconstitution at the protein level, protein lysates of injected retinas were used for western blotting. To ensure a specific detection of the transgene-derived protein, an anti-myc antibody was used. The results show that in both cases the reconstituted mRNA resulted in a successful in vivo protein expression (FIG. 15E).

The invention claimed is:

1. A pre-mRNA trans-splicing molecule comprising,
    (i) an acceptor splice region, comprising a sequence of at least 80% sequence identity to SEQ ID NO: 3 or SEQ ID NO: 4, further comprising
        (ia) a pyrimidine tract, wherein the pyrimidine tract comprises
            (iaa) 5 to 25 nucleotides;
            (iab) wherein at least 60% of the nucleotides within these 5 to 25 nucleotides are cytosine (C), thymine (T) and/or uracil (U);
            (iac) wherein the 5 to 25 nucleotides of the pyrimidine tract comprise the sequence TTTTTT or TCTTTT; and
        (ib) an acceptor splice site,
            (iba) wherein the acceptor splice site is located 3' to the pyrimidine tract; and
            (ibb) wherein the acceptor splice site comprises from 5' to 3' a sequence of CAGG;
    (ii) a nucleotide sequence of interest or a portion thereof, wherein the acceptor splice region is localized 3' or 5' to the nucleotide sequence of interest or the portion thereof;
    (iii) a binding domain targeting pre-mRNA, which is localized 3' or 5' to the nucleotide sequence of interest or the portion thereof, and
    (iv) optionally a spacer sequence, wherein the spacer sequence is localized between the binding domain and the acceptor splice region.

2. The pre-mRNA trans-splicing molecule of claim 1 comprising,
    (i) the nucleotide sequence of interest or the portion thereof, wherein the acceptor splice region is localized 5' to the nucleotide sequence of interest or the portion thereof;
    (ii) a donor splice site, wherein the donor splice site is localized 3' to the nucleotide sequence of interest or the portion thereof;
    (iii) a first binding domain targeting pre-mRNA located 5' to the nucleotide sequence of interest or the portion thereof,
    (iv) a second binding domain targeting pre-mRNA located 3' to the nucleotide sequence of interest or the portion thereof;
    (v) optionally a first spacer sequence, wherein the first spacer is localized between the first binding domain and the acceptor splice region; and
    (vi) optionally a second spacer sequence, wherein the second spacer is localized between the second binding domain and the donor splice site.

3. The pre-mRNA trans-splicing molecule of claim 1, wherein the acceptor splice region is localized 5' to the nucleotide sequence of interest or the portion thereof and the binding domain is localized 5' to acceptor splice region.

4. The pre-mRNA trans-splicing molecule of claim 1, further comprising a termination sequence.

5. The pre-mRNA trans-splicing molecule of claim 1, wherein (a) the acceptor splice region comprises the sequence of SEQ ID NOs: 3 or 4; and/or
(b) the sequence between the last pyrimidine of the pyrimidine tract and the acceptor splice site has less than 10 bases.

6. The pre-mRNA trans-splicing molecule of claim 1, wherein the acceptor splice region further comprises
   (a) 7 nucleotides 5' to the pyrimidine tract having at least 4 nucleotides of the sequence CAACGAG, wherein the first 5' nucleotide is C;
   (b) 7 nucleotides 5' to the pyrimidine tract having at least 5 nucleotides of the sequence CAACGAG, wherein the first 5' nucleotide is C;
   (c) 7 nucleotides 5' to the pyrimidine tract having at least 4 nucleotides of the sequence CAACGAG, wherein the first 5' nucleotides are CAA; or
   (d) 7 nucleotides 5' to the pyrimidine tract having at least 5 nucleotides of the sequence CAACGAG, wherein the first 5' nucleotides are CAAC.

7. A DNA molecule comprising a promoter and a sequence encoding the pre-mRNA trans-splicing molecule according to claim 1.

8. An in vitro method for producing a nucleic acid sequence, the method comprising
   (A) providing a first nucleic acid sequence comprising one or more donor splice site sequences;
   (B) providing a second nucleic acid sequence, wherein the second nucleic acid sequence comprises
      (i) an acceptor splice region sequence comprising a sequence of at least 80% sequence identity to SEQ ID NO: 3 or SEQ ID NO: 4, further comprising;
         (ia) a pyrimidine tract, wherein the pyrimidine tract comprises
            (iaa) 5 to 25 nucleotides;
            (iab) wherein at least 60% of the nucleotides within these 5 to 25 nucleotides are cytosine (C), thymine (T) and/or uracil (U);
            (iac) wherein the 5 to 25 nucleotides of the pyrimidine tract comprise the sequence TTTTTT or TCTTTT; and
         (ib) an acceptor splice site,
            (iba) wherein the acceptor splice site is located 3' to the pyrimidine tract; and
            (ibb) wherein the acceptor splice site comprises from 5' to 3' a sequence of CAGG;
         wherein the second nucleic acid sequence further comprises a nucleotide sequence of interest or a portion thereof, wherein the acceptor splice region is localized 3' or 5' to the nucleotide sequence of interest or the portion thereof and a binding domain targeting pre-mRNA, which is localized 3' or 5' to the nucleotide sequence of interest or the portion thereof, and, optionally, a spacer sequence, wherein the spacer sequence is localized between the binding domain and the acceptor splice region;
   (C) cleaving the first nucleic acid sequence at the one or more donor splice site sequence(s) and cleaving the second nucleic acid sequence in the acceptor splice site,
   (D) ligating the first cleaved nucleic acid sequence to the second cleaved nucleic acid sequence,
   thereby obtaining a nucleic acid sequence.

9. The in vitro method of claim 8, wherein the first nucleic acid sequence further comprises a nucleotide sequence of interest or a portion thereof, wherein at least a portion of the nucleotide sequence of interest is located 5' to the donor splice site and wherein at least a portion of the nucleotide sequence of interest is located 3' to the splice acceptor splice region in the second nucleic acid sequence.

10. The in vitro method of claim 8, wherein the first and the second nucleic acid sequence are introduced into a host cell.

11. The in vitro method of claim 8, comprising
   (A) introducing into a host cell a first nucleic acid sequence comprising a pre-mRNA trans-splicing molecule sequence or a nucleic acid sequence encoding said pre-mRNA trans-splicing molecule, wherein the first pre-mRNA trans-splicing molecule comprises from 5' to 3'
      (a) a 5' portion of a nucleotide acid sequence of interest;
      (b) a donor splice site;
      (c) optionally a spacer sequence;
      (d) a first binding domain; and
      (e) optionally a termination sequence, or a polyA sequence, and
   (B) introducing into the host cell a second nucleic acid sequence comprising a pre-mRNA trans-splicing molecule sequence or a nucleic acid sequence encoding said pre-mRNA trans-splicing molecule, wherein the second pre-mRNA trans-splicing molecule comprises from 5' to 3';
      (i) a second binding domain, which is complementary to the first binding domain of the first nucleic acid sequence;
      (ii) an acceptor splice region sequence comprising a sequence of at least 80% sequence identity to SEQ ID NO: 3 or SEQ ID NO: 4, further comprising;
         (iia) a pyrimidine tract, wherein the pyrimidine tract comprises
            (iiaa) 5 to 25 nucleotides;
            (iiab) wherein at least 60% of the nucleotides within these 5 to 25 nucleotides are cytosine (C), thymine (T) and/or uracil (U);
            (iiac) wherein the 5 to 25 nucleotides of the pyrimidine tract comprise the sequence TTTTTT or TCTTTT; and
         (iib) an acceptor splice site,
            (iiba) wherein the acceptor splice site is located 3' to the pyrimidine tract; and
            (iibb) wherein the acceptor splice site comprises from 5' to 3' a sequence of CAGG;
      (iii) a 3' portion of the nucleotide sequence of interest, and
      (iv) a termination sequence, or a polyA sequence,
   (C) cleaving the first nucleic acid sequence at the donor splice site sequence and cleaving the second nucleic acid sequence in the acceptor splice site; and
   (D) ligating the first cleaved nucleic acid sequence comprising the 5' portion of the nucleotide sequence of interest to the second cleaved nucleic acid sequence comprising the 3' portion of the nucleotide sequence of interest, thereby obtaining the nucleic acid sequence of interest.

12. An adeno-associated virus (AAV) vector comprising at least two inverted terminal repeats comprising a nucleic acid sequence between these two inverted terminal repeats, wherein said nucleic acid sequence comprises from 5' to 3'
   (i) a promoter;
   (ii) a binding domain;
   (iii) optionally a spacer sequence;
   (iv) an acceptor splice region sequence comprising a sequence of at least 80% sequence identity to SEQ ID NO: 3 or SEQ ID NO: 4, further comprising (a) a pyrimidine tract, wherein the pyrimidine tract comprises
(aa) 5 to 25 nucleotides;
(ab) wherein at least 60% of the nucleotides within these 5 to 25 nucleotides are cytosine (C), thymine (T) and/or uracil (U);
(ac) wherein the 5 to 25 nucleotides of the pyrimidine tract comprise the sequence TTTTTT or TCTTTT; and
(b) an acceptor splice site,
ba) wherein the acceptor splice site is located 3' to the pyrimidine tract; and
bb) wherein the acceptor splice site comprises from 5' to 3' a sequence of CAGG;
(v) a nucleotide sequence of interest or a portion thereof, and
(vi) optionally a poly A sequence.

13. An adeno-associated virus (AAV) vector system comprising
(I) a first AAV vector comprising at least two inverted terminal repeats comprising a nucleic acid sequence between these two inverted terminal repeats, wherein said nucleic acid sequence between these two inverted terminal repeats comprises from 5' to 3'
(a) a promoter,
(b) a nucleotide sequence encoding an N-terminal portion of a polypeptide of interest;
(c) a donor splice site;
(d) optionally a spacer sequence;
(e) a first binding domain; and
(f) optionally a termination sequence, or a polyA sequence;
(II) a second AAV vector comprising a nucleic acid sequence comprising at least two inverted terminal repeats comprising a nucleic acid sequence between these two inverted terminal repeats, wherein said nucleic acid sequence between these two inverted terminal repeats comprises from 5' to 3'
(i) a promoter;
(ii) a second binding domain, which is complementary to the first binding domain of the first AAV vector;
(ii) optionally a spacer sequence
(iii) an acceptor splice region sequence comprising a sequence of at least 80% sequence identity to SEQ ID NO: 3 or SEQ ID NO: 4, further comprising
(a) a pyrimidine tract, wherein the pyrimidine tract comprises
(aa) 5 to 25 nucleotides;
(ab) wherein at least 60% of the nucleotides within these 5 to 25 nucleotides are cytosine (C), thymine (T) and/or uracil (U); and
(ac) wherein the 5 to 25 nucleotides of the pyrimidine tract comprise the sequence TTTTTT or TCTTTT; and
(b) an acceptor splice site,
(ba) wherein the acceptor splice site is located 3' to the pyrimidine tract; and
(bb) wherein the acceptor splice site comprises from 5' to 3' a sequence of CAGG;
(iv) a nucleotide sequence encoding a C-terminal portion of the polypeptide of interest;
(iva) wherein the C-terminal portion of the polypeptide of interest and the N-terminal portion of the polypeptide of interest reconstitute the polypeptide of interest; and
(v) a termination sequence.

14. The AAV vector system of claim 13, wherein the polypeptide of interest is a full-length polypeptide of interest and the first AAV vector comprises an N-terminal portion of the full-length polypeptide of interest and the second AAV vector comprises a C-terminal portion of the full-length polypeptide of interest.

15. A nucleic acid sequence comprising
(i) an acceptor splice region sequence comprising a sequence of at least 90% sequence identity to SEQ ID No: 3 or SEQ ID No: 4, further comprising
(ia) a pyrimidine tract, wherein the pyrimidine tract comprises
(aa) 5 to 25 nucleotides;
(ab) wherein at least 60% of the nucleotides within these 5 to 25 nucleotides are cytosine (C), thymine (T) and/or uracil (U);
(ac) wherein the 5 to 25 nucleotides of the pyrimidine tract comprise the sequence TTTTTT or TCTTTT; and;
(ib) an acceptor splice site,
ba) wherein the acceptor splice site is located 3' to the pyrimidine tract; and
bb) wherein the acceptor splice site comprises from 5' to 3' a sequence of CAGG; and
(ii) a nucleotide sequence of interest, wherein the nucleotide sequence of interest
(iia) is located 3' or 5' to the acceptor splice region.

16. The in vitro method of claim 8, wherein
(a) the sequence between the last pyrimidine of the pyrimidine tract and the acceptor splice site has less than 10 bases;
(b) the acceptor splice region further comprises 7 nucleotides 5' to the pyrimidine tract having at least 4 nucleotides of the sequence CAACGAG, wherein the first 5' nucleotide is C; and/or
(c) the acceptor splice region comprises the sequence of SEQ ID NO: 3 or 4.

17. The AAV vector of claim 12, wherein
(a) the sequence between the last pyrimidine of the pyrimidine tract and the acceptor splice site has less than 10 bases;
(b) the acceptor splice region further comprises 7 nucleotides 5' to the pyrimidine tract having at least 4 nucleotides of the sequence CAACGAG, wherein the first 5' nucleotide is C; and/or
(c) the acceptor splice region comprises the sequence of SEQ ID NO: 3 or 4.

18. The nucleic acid sequence of claim 15, wherein
(a) the sequence between the last pyrimidine of the pyrimidine tract and the acceptor splice site has less than 10 bases;
(b) the acceptor splice region further comprises 7 nucleotides 5' to the pyrimidine tract having at least 4 nucleotides of the sequence CAACGAG, wherein the first 5' nucleotide is C; and/or
(c) the acceptor splice region comprises the sequence of SEQ ID NO: 3 or 4.

19. A method of treating an ocular disorder in a patient in need thereof, comprising administering to the patient the adeno-associated virus vector system of claim 13 by subretinal or intravitreal injection.

20. A method of treating an ocular disorder a patient in need thereof, comprising administering to the patient the AAV vector of claim 12 by subretinal or intravitreal injection.

21. The pre-mRNA trans-splicing molecule of claim 1, wherein the acceptor splice region further comprises 7 nucleotides 5' to the pyrimidine tract having the sequence CAACGAG.

22. The AAV vector of claim 12, wherein the acceptor splice region further comprises 7 nucleotides 5' to the pyrimidine tract having the sequence CAACGAG.

23. The AAV vector system of claim 13, wherein the acceptor splice region further comprises 7 nucleotides 5' to the pyrimidine tract having the sequence CAACGAG.

* * * * *

SEQUENCE LISTING

<160> NUMBER OF SEQ ID NOS: 40

<210> SEQ ID NO 1
<211> LENGTH: 13
<212> TYPE: DNA
<213> ORGANISM: Unknown
<220> FEATURE:
<223> OTHER INFORMATION: pyrimidine tract

<400> SEQUENCE: 1
tcttttgtca tct                                              13

<210> SEQ ID NO 2
<211> LENGTH: 10
<212> TYPE: DNA
<213> ORGANISM: Unknown
<220> FEATURE:
<223> OTHER INFORMATION: intronic splice enhancer

<400> SEQUENCE: 2
tgggggagg                                                   10

<210> SEQ ID NO 3
<211> LENGTH: 26
<212> TYPE: DNA
<213> ORGANISM: Unknown
<220> FEATURE:
<223> OTHER INFORMATION: ASS region

<400> SEQUENCE: 3
caacgagtct tttgtcatct acaggt                                26

<210> SEQ ID NO 4
<211> LENGTH: 26
<212> TYPE: DNA
<213> ORGANISM: Unknown
<220> FEATURE:
<223> OTHER INFORMATION: ASS region

<400> SEQUENCE: 4
caacgagttt tttgtcatct acaggt                                26

<210> SEQ ID NO 5
<211> LENGTH: 50
<212> TYPE: DNA
<213> ORGANISM: Unknown
<220> FEATURE:
<223> OTHER INFORMATION: ASS region

<400> SEQUENCE: 5
ctacacgctc aagccggagg tcaacaacga gtcttttgtc atctacaggt       50

<210> SEQ ID NO 6
<211> LENGTH: 38
<212> TYPE: DNA
<213> ORGANISM: Unknown
<220> FEATURE:
<223> OTHER INFORMATION: ASS region

<400> SEQUENCE: 6
gccggaggtc aacaacgagt cttttgtcat ctacaggt                   38

<210> SEQ ID NO 7
<211> LENGTH: 20
<212> TYPE: DNA
<213> ORGANISM: Unknown

```
<220> FEATURE:
<223> OTHER INFORMATION: ASS region

<400> SEQUENCE: 7
gtcttttgtc atctacaggt                                              20

<210> SEQ ID NO 8
<211> LENGTH: 39
<212> TYPE: DNA
<213> ORGANISM: Unknown
<220> FEATURE:
<223> OTHER INFORMATION: ASS region

<400> SEQUENCE: 8
gtcttttgtc atctacaggt gttcgtggtt cgtggtcca                          39

<210> SEQ ID NO 9
<211> LENGTH: 166
<212> TYPE: DNA
<213> ORGANISM: Unknown
<220> FEATURE:
<223> OTHER INFORMATION: exon 3 of rhodopsin gene (containing the
      c.620T>G mutation

<400> SEQUENCE: 9
gtacatcccc gagggcctgc agtgctcgtg tggaatcgac tactacacgc tcaagccgga    60
ggtcaacaac gagtcttttg tcatctacag gttcgtggtc cacttcacca tccccatgat   120
tatcatcttt ttctgctatg ggcagctcgt cttcaccgtc aaggag                  166

<210> SEQ ID NO 10
<211> LENGTH: 1213
<212> TYPE: DNA
<213> ORGANISM: Unknown
<220> FEATURE:
<223> OTHER INFORMATION: mutated rhodopsin

<400> SEQUENCE: 10
ccagctggag ccctgagtgg ctgagctcag gccttcgcag cattcttggg tgggagcagc    60
cacgggtcag ccacaagggc cacagccatg aatggcacag aaggccctaa cttctacgtg   120
cccttctcca atgcgacggg tgtggtacgc agccccttcg agtacccaca gtactacctg   180
gctgagccat ggcagttctc catgctggcc gcctacatgt ttctgctgat cgtgctgggc   240
ttccccatca acttcctcac gctctacgtc accgtccagc acaagaagct gcgcacgcct   300
ctcaactaca tcctgctcaa cctagccgtg gctgacctct catggtcct aggtggcttc   360 accagcaccc tctacacctc tctgcatgga tacttcgtct cgggcccac aggatgcaat    420 ttggagggct tctttgccac cctgggcggt gaaattgccc tgtggtcctt ggtggtcctg   480
gccatcgagc ggtacgtggt ggtgtgtaag cccatgagca acttccgctt cggggagaac   540
catgccatca tgggcgttgc cttcacctgg gtcatggcgc tggcctgcgc cgcacccca    600 ctcgccggct ggtccaggta catccccgag ggcctgcagt gctcgtgtgg aatcgactac   660
tacacgctca agccggaggt caacaacgag tcttttgtca tctacaggtt cgtggtccac   720
ttcaccatcc ccatgattat catcttttc tgctatgggc agctcgtctt caccgtcaag   780
gaggccgctg cccagcagca ggagtcagcc accacacaga aggcagagaa ggaggtcacc   840
cgcatggtca tcatcatggt catcgctttc ctgatctgct gggtgcccta cgccagcgtg   900
gcattctaca tcttcaccca ccagggctcc aacttcggtc ccatcttcat gaccatccca   960
gcgttctttg ccaagagcgc cgccatctac aaccctgtca tctatatcat gatgaacaag  1020
```

```
cagttccgga actgcatgct caccaccatc tgctgcggca agaacccact gggtgacgat    1080
gaggcctctg ctaccgtgtc caagacggag acgagccagg tggccccggc ctaagacctg    1140
cctaggactc tgtggccgac tataggcgtc tcccatcccc tacaccttcc cccagccaca    1200
gccatcccac cag                                                       1213

<210> SEQ ID NO 11
<211> LENGTH: 13
<212> TYPE: DNA
<213> ORGANISM: Unknown
<220> FEATURE:
<223> OTHER INFORMATION: pyrimidine tract

<400> SEQUENCE: 11 tttttttgtca ttt                                                      13

<210> SEQ ID NO 12
<211> LENGTH: 14
<212> TYPE: DNA
<213> ORGANISM: Unknown
<220> FEATURE:
<223> OTHER INFORMATION: pyrimidine tract

<400> SEQUENCE: 12
tcttttgtca tcta                                                      14

<210> SEQ ID NO 13
<211> LENGTH: 21
<212> TYPE: DNA
<213> ORGANISM: Unknown
<220> FEATURE:
<223> OTHER INFORMATION: pyrimidine tract

<400> SEQUENCE: 13
caacgagtct tttgtcatct a                                              21

<210> SEQ ID NO 14
<211> LENGTH: 130
<212> TYPE: DNA
<213> ORGANISM: Unknown
<220> FEATURE:
<223> OTHER INFORMATION: inverted repeat

<400> SEQUENCE: 14
ctgcgcgctc gctcgctcac tgaggccgcc cgggcaaagc ccgggcgtcg ggcgaccttt    60
ggtcgcccgg cctcagtgag cgagcgagcg cgcagagagg gagtggccaa ctccatcact    120
aggggttcct                                                           130

<210> SEQ ID NO 15
<211> LENGTH: 130
<212> TYPE: DNA
<213> ORGANISM: Unknown
<220> FEATURE:
<223> OTHER INFORMATION: inverted repeat

<400> SEQUENCE: 15
aggaacccct agtgatggag ttggccactc cctctctgcg cgctcgctcg ctcactgagg    60
ccgggcgacc aaaggtcgcc cgacgcccgg gctttgcccg ggcggcctca gtgagcgagc    120
gagcgcgcag                                                           130

<210> SEQ ID NO 16
```

```
<211> LENGTH: 82
<212> TYPE: DNA
<213> ORGANISM: Unknown
<220> FEATURE:
<223> OTHER INFORMATION: poly A sequence

<400> SEQUENCE: 16
gcagtgaaaa aaatgcttta tttgtgaaat tgtgatgct attgctttat ttgtaaccat       60
tataagctgc aataaacaag tt                                              82

<210> SEQ ID NO 17
<211> LENGTH: 100
<212> TYPE: DNA
<213> ORGANISM: Unknown
<220> FEATURE:
<223> OTHER INFORMATION: first binding domain

<400> SEQUENCE: 17
agtgcatcaa ggcgatcaca tcagtgaaaa aaagccagac aggcggttaa accaacgcag       60
attaaacagc aggatgcaaa aattcgcagg tggtcagatg                            100

<210> SEQ ID NO 18
<211> LENGTH: 100
<212> TYPE: DNA
<213> ORGANISM: Unknown
<220> FEATURE:
<223> OTHER INFORMATION: second binding domain

<400> SEQUENCE: 18
catctgacca cctgcgaatt tttgcatcct gctgtttaat ctgcgttggt ttaaccgcct       60
gtctggcttt ttttcactga tgtgatcgcc ttgatgcact                            100

<210> SEQ ID NO 19
<211> LENGTH: 4455
<212> TYPE: DNA
<213> ORGANISM: Unknown
<220> FEATURE:
<223> OTHER INFORMATION: Dual AAV 5 coding sequence of ABCA4 (CMV
      promoter)

<400> SEQUENCE: 19
ctgcgcgctc gctcgctcac tgaggccgcc cgggcaaagc ccgggcgtcg ggcgaccttt       60
ggtcgcccgg cctcagtgag cgagcgagcg cgcagagagg gagtggccaa ctccatcact      120
aggggttcct tgtagttaat gattaacccg ccatgctact tatctacgta gccatgctct      180
aggaagatcg gaattcgccc ttaagggcgc gccgtttaaa tagctagcga cattgattat      240
tgactagtta ttaatagtaa tcaattacgg ggtcattagt tcatagccca tatatggagt      300
tccgcgttac ataacttacg gtaaatggcc cgcctggctg accgcccaac gaccccgcc       360 cattgacgtc aataatgacg tatgttccca tagtaacgcc aatagggact ttccattgac      420
gtcaatgggt ggagtattta cggtaaactg cccacttggc agtacatcaa gtgtatcata      480
tgccaagtac gccccctatt gacgtcaatg acggtaaatg gcccgcctgg cattatgccc      540
agtacatgac cttatgggac tttcctactt ggcagtacat ctacgtatta gtcatcgcta      600
ttaccatggt gatgcggttt tggcagtaca tcaatgggcg tggatagcgg tttgactcac      660
ggggatttcc aagtctccac cccattgacg tcaatgggag tttgttttgg caccaaaatc      720
aacgggactt tccaaaatgt cgtaacaact ccgccccatt gacgcaaatg ggcggtaggc      780
gtgtacggtg ggaggtctat ataagcagag ctggtaccac cggtgccacc atgggcttcg      840
```

```
tgagacagat acagcttttg ctctggaaga actggaccct gcggaaaagg caaaagattc    900
gctttgtggt ggaactcgtg tggcctttat ctttatttct ggtcttgatc tggttaagga    960
atgccaaccc actctacagc catcatgaat gccatttccc caacaaggcg atgccctcag   1020
caggaatgct gccgtggctc cagggggatct tctgcaatgt gaacaatccc tgttttcaaa   1080
gccccacccc aggagaatct cctggaattg tgtcaaacta taacaactcc atcttggcaa   1140
gggtatatcg agattttcaa gaactcctca tgaatgcacc agagagccag cacccttggcc   1200 gtatttggac agagctacac atcttgtccc aattcatgga caccctccgg actcacccgg   1260
agagaattgc aggaagagga atacgaataa gggatatctt gaaagatgaa gaaacactga   1320
cactatttct cattaaaaac atcggcctgt ctgactcagt ggtctacctt ctgatcaact   1380
ctcaagtccg tccagagcag ttcgctcatg gagtcccgga cctggcgctg aaggacatcg   1440
cctgcagcga ggccctcctg gagcgcttca tcatcttcag ccagagacgc ggggcaaaga   1500
cggtgcgcta tgccctgtgc tccctctccc agggcaccct acagtggata aagacactc    1560 tgtatgccaa cgtggacttc ttcaagctct ccgtgtgct cccacactc ctagacagcc      1620 gttctcaagg tatcaatctg agatcttggg gaggaatatt atctgatatg tcaccaagaa   1680
ttcaagagtt tatccatcgg ccgagtatgc aggacttgct gtgggtgacc aggcccctca   1740
tgcagaatgg tggtccagag acctttacaa agctgatggg catcctgtct gacctcctgt   1800
gtggctaccc cgagggaggt ggctctcggg tgctctcctt caactggtat gaagacaata   1860
actataaggc ctttctgggg attgactcca caaggaagga tcctatctat tcttatgaca   1920
gaagaacaac atccttttgt aatgcattga tccagagcct ggagtcaaat cctttaacca   1980
aaatcgcttg gagggcggca agccttttgc tgatgggaaa aatcctgtac actcctgatt   2040
cacctgcagc acgaaggata ctgaagaatg ccaactcaac ttttgaagaa ctggaacacg   2100
ttaggaagtt ggtcaaagcc tgggaagaag tagggcccca gatctggtac ttctttgaca   2160
acagcacaca gatgaacatg atcagagata cctgggggaa cccaacagta aaagactttt   2220
tgaataggca gcttggtgaa gaaggtatta ctgctgaagc catcctaaac ttcctctaca   2280
agggccctcg ggaaagccag gctgacgaca tggccaactt cgactggagg gacatattta   2340
acatcactga tcgcacccct cgcctggtca atcaatacct ggagtgcttg gtcctggata   2400
agtttgaaag ctacaatgat gaaactcagc tcacccaacg tgccctctct ctactggagg   2460
aaaacatgtt ctgggccgga gtggtattcc ctgacatgta tccctggacc agctctctac   2520 cacccccacgt gaagtataag atccgaatgg acatagacgt ggtggagaaa accaataaga   2580
ttaaagacag gtattgggat tctggtccca gagctgatcc cgtggaagat ttccggtaca   2640 tctgggggcgg gtttgcctat ctgcaggaca tggttgaaca ggggatcaca aggagccagg   2700
tgcaggcgga ggctccagtt ggaatctacc tccagcagat gccctacccc tgcttcgtgg   2760
acgattcttt catgatcatc ctgaaccgct gtttccctat cttcatggtg ctggcatgga   2820
tctactctgt ctccatgact gtgaagagca tcgtcttgga aaggagttg cgactgaagg    2880 agaccttgaa aaatcagggt gtctccaatg cagtgatttg tgtacctgg ttcctggaca    2940 gcttctccat catgtcgatg agcatcttcc tcctgacgat attcatcatg catggaagaa   3000
tcctacatta cagcgaccca ttcatcctct tcctgttctt gttggctttc tccactgcca   3060
ccatcatgct gtgctttctg ctcagccacct tcttctccaa ggccagtctg cagcagcct   3120 gtagtggtgt catctatttc accctctacc tgccacacat cctgtgcttc gcctggcagg   3180
accgcatgac cgctgagctg aagaaggctg tgagcttact gtctccggtg gcatttggat   3240
```

```
ttggcactga gtacctggtt cgctttgaag agcaaggcct ggggctgcag tggagcaaca    3300
tcgggaacag tcccacggaa ggggacgaat tcagcttcct gctgtccatg cagatgatgc    3360
tccttgatgc tgctgtctat ggcttactcg cttggtacct tgatcaggtg tttccaggag    3420
actatggaac cccacttcct tggtactttc ttctacaaga gtcgtattgg cttggcggtg    3480
aagggtgttc aaccagagaa gaaagagccc tggaaaagac cgagccccta acagaggaaa    3540
cggaggatcc agagcaccca gaaggaatac acgactcctt ctttgaacgt gagcatccag    3600
ggtgggttcc tggggtatgc gtgaagaatc tggtaaagat ttttgagccc tgtggccggc    3660
cagctgtgga ccgtctgaac atcaccttct acgagaacca gatcaccgca ttcctgggcc    3720
acaatggagc tgggaaaacc accaccttgt ccatcctgac gggtctgttg ccaccaacct    3780
ctgggactgt gctcgttggg ggaagggaca ttgaaaccag cctggatgca gtccggcaga    3840
gccttggcat gtgtccacag cacaacatcc tgttccacca cctcacggtg gctgagcaca    3900
tgctgttcta tgcccagctg aaaggaaagt cccaggagga ggcccagctg gagatggaag    3960
ccatgttgga ggacacaggc ctccaccaca gcggaatgaa gaggctcag gacctatcag    4020 gtggcatgca gagaaagctg tcggttgcca ttgcctttgt gggagatgcc aaggtaaggg    4080
cactgagcag aagggaagaa gctccggggg ctctttgtag ggtaagctta gtgcatcaag    4140
gcgatcacat cagtgaaaaa aagccagaca ggcggttaaa ccaacgcaga ttaaacagca    4200
ggatgcaaaa attcgcaggt ggtcagatga agcttattct cgagttaagg gcgaattccc    4260
gattaggatc ttcctagagc atggctacgt agataagtag catggcgggt taatcattaa    4320
ctacaaggaa ccctagtga tggagttggc cactccctct ctgcgcgctc gctcgctcac    4380
tgaggccggg cgaccaaagg tcgcccgacg cccgggcttt gcccgggcgg cctcagtgag    4440
cgagcgagcg cgcag                                                    4455
```

<210> SEQ ID NO 20
<211> LENGTH: 4855
<212> TYPE: DNA
<213> ORGANISM: Unknown
<220> FEATURE:
<223> OTHER INFORMATION: Dual AAV 3 coding sequence of ABCA4 (CMV promoter)

<400> SEQUENCE: 20

```
ctgcgcgctc gctcgctcac tgaggccgcc cgggcaaagc ccgggcgtcg gcgacctttt     60
ggtcgcccgg cctcagtgag cgagcgagcg cgcagagagg gagtggccaa ctccatcact    120 agggggttcct tgtagttaat gattaacccg ccatgctact tatctacgta gccatgctct    180
aggaagatcg gaattcgccc ttaagggcgc gccgtttaaa tagctagcga cattgattat    240
tgactagtta ttaatagtaa tcaattacgg ggtcattagt tcatagccca tatatggagt    300
tccgcgttac ataacttacg gtaaatggcc cgcctggctg accgcccaac gacccccgcc    360
cattgacgtc aataatgacg tatgttccca tagtaacgcc aatagggact ttccattgac    420
gtcaatgggt ggagtattta cggtaaactg cccacttggc agtacatcaa gtgtatcata    480
tgccaagtac gccccctatt gacgtcaatg acggtaaatg gcccgcctgg cattatgccc    540
agtacatgac cttatgggac tttcctactt ggcagtacat ctacgtatta gtcatcgcta    600
ttaccatggt gatgcggttt tggcagtaca tcaatgggcg tggatagcgg tttgactcac    660
ggggatttcc aagtctccac cccattgacg tcaatgggag tttgttttgg caccaaaatc    720
aacgggactt tccaaaatgt cgtaacaact ccgccccatt gacgcaaatg ggcggtaggc    780
```

```
gtgtacggtg ggaggtctat ataagcagag ctggtaccac cggtagaaag cttcatctga    840
ccacctgcga atttttgcat cctgctgttt aatctgcgtt ggtttaaccg cctgtctggc    900 ttttttcac tgatgtgatc gccttgatgc actaagcttc aacgagtctt ttgtcatcta     960
caggtggtga ttctggacga acccacctct ggggtggacc cttactcgag acgctcaatc   1020
tgggatctgc tcctgaagta tcgctcaggc agaaccatca tcatgtccac tcaccacatg   1080
gacgaggccg acctccttgg ggaccgcatt gccatcattg cccagggaag gctctactgc   1140
tcaggcaccc cactcttcct gaagaactgc tttggcacag gcttgtactt aaccttggtg   1200
cgcaagatga aaacatcca gagccaaagg aaaggcagtg aggggacctg cagctgctcg   1260
tctaagggtt tctccaccac gtgtccagcc cacgtcgatg acctaactcc agaacaagtc   1320
ctggatgggg atgtaaatga gctgatggat gtagttctcc accatgttcc agaggcaaag   1380
ctggtggagt gcattggtca agaacttatc ttccttcttc caaataagaa cttcaagcac   1440
agagcatatg ccagccttt cagagagctg gaggagacgc tggctgacct tggtctcagc   1500
agttttggaa tttctgacac tcccctggaa gagattttc tgaaggtcac ggaggattct   1560
gattcaggac ctctgtttgc gggtggcgct cagcagaaaa gagaaaacgt caaccccga   1620 caccctgct tgggtcccag agagaaggct ggacagacac cccaggactc caatgtctgc   1680
tccccagggg cgccggctgc tcacccagag ggccagcctc ccccagagcc agagtgccca   1740
ggcccgcagc tcaacacggg gacacagctg gtcctccagc atgtgcaggc gctgctggtc   1800
aagagattcc aacacaccat ccgcagccac aaggacttcc tggcgcagat cgtgctcccg   1860
gctacctttg tgtttttggc tctgatgctt tctattgtta tccctccttt tggcgaatac   1920
cccgctttga cccttcaccc ctggatatat gggcagcagt acaccttctt cagcatggat   1980
gaaccaggca gtgagcagtt cacggtactt gcagacgtcc tctgaataa gccaggcttt   2040 ggcaaccgct gcctgaagga agggtggctt ccggagtacc cctgtggcaa ctcaacaccc   2100
tggaagactc cttctgtgtc cccaaacatc acccagctgt tccagaagca gaaatggaca   2160
caggtcaacc cttcaccatc ctgcaggtgc agcaccaggg agaagctcac catgctgcca   2220
gagtgccccg agggtgccgg gggcctcccg ccccccaga gaacacagcg cagcacggaa   2280
attctacaag acctgacgga caggaacatc tccgacttct tggtaaaaac gtatcctgct   2340
cttataagaa gcagcttaaa gagcaaattc tgggtcaatg aacagaggta tggaggaatt   2400
tccattggag gaaagctccc agtcgtcccc atcacggggg aagcacttgt tgggttttta   2460
agcgaccttg gccggatcat gaatgtgagc gggggcccta tcactagaga ggcctctaaa   2520
gaaatacctg atttccttaa acatctagaa actgaagaca acattaaggt gtggtttaat   2580
aacaaaggct ggcatgccct ggtcagcttt ctcaatgtgg cccacaacgc catcttacgg   2640
gccagcctgc taaggacag gagccccgag gagtatggaa tcaccgtcat tagccaaccc   2700
ctgaacctga ccaaggagca gctctcagag attacagtgc tgaccacttc agtggatgct   2760
gtggttgcca tctgcgtgat tttctccatg tccttcgtcc cagccagctt tgtcctttat   2820
ttgatccagg agcgggtgaa caatccaag cacctccagt ttatcagtgg agtgagcccc   2880
accacctact gggtgaccaa cttcctctgg gacatcatga attattccgt gagtgctggg   2940
ctggtggtgg gcatcttcat cgggtttcag aagaagcct acacttctcc agaaaacctt   3000
cctgcccttg tggcactgct cctgctgtat ggatgggcgg tcattcccat gatgtaccca   3060
gcatccttcc tgtttgatgt ccccagcaca gcctatgtgg ctttatcttg tgctaatctg   3120
```

```
ttcatcggca tcaacagcag tgctattacc ttcatcttgg aattatttga gaataaccgg    3180
acgctgctca ggttcaacgc cgtgctgagg aagctgctca ttgtcttccc ccacttctgc    3240
ctgggccggg gcctcattga ccttgcactg agccaggctg tgacagatgt ctatgcccgg    3300
tttggtgagg agcactctgc aaatccgttc cactgggacc tgattgggaa gaacctgttt    3360
gccatggtgg tggaaggggt ggtgtacttc ctcctgaccc tgctggtcca gcgccacttc    3420
ttcctctccc aatggattgc cgagcccact aaggagccca ttgttgatga agatgatgat    3480
gtggctgaag aaagacaaag aattattact ggtggaaata aaactgacat cttaaggcta    3540
catgaactaa ccaagattta tccaggcacc tccagcccag cagtggacag gctgtgtgtc    3600
ggagttcgcc ctggagagtg ctttggcctc ctgggagtga atggtgccgg caaaacaacc    3660
acattcaaga tgctcactgg ggacaccaca gtgacctcag gggatgccac cgtagcaggc    3720
aagagtattt taaccaatat ttctgaagtc catcaaaata tgggctactg tcctcagttt    3780
gatgcaattg atgagctgct cacaggacga gaacatcttt acctttatgc ccggcttcga    3840
ggtgtaccag cagaagaaat cgaaaaggtt gcaaactgga gtattaagag cctgggcctg    3900
actgtctacg ccgactgcct ggctggcacg tacagtgggg gcaacaagcg gaaactctcc    3960
acagccatcg cactcattgg ctgcccaccg ctggtgctgc tggatgagcc caccacaggg    4020
atggaccccc aggcacgccg catgctgtgg aacgtcatcg tgagcatcat cagagaaggg    4080
agggctgtgg tcctcacatc ccacagcatg gaagaatgtg aggcactgtg tacccggctg    4140
gccatcatgg taaagggcgc ctttcgatgt atgggcacca ttcagcatct caagtccaaa    4200
tttggagatg gctatatcgt cacaatgaag atcaaatccc cgaaggacga cctgcttcct    4260
gacctgaacc ctgtggagca gttcttccag gggaacttcc caggcagtgt gcagagggag    4320
aggcactaca catgctcca gttccaggtc tcctcctcct ccctggcgag gatcttccag    4380
ctcctcctct cccacaagga cagcctgctc atcgaggagt actcagtcac acagaccaca    4440
ctggaccagg tgtttgtaaa ttttgctaaa cagcagactg aaagtcatga cctccctctg    4500
caccctcgag ctgctggagc cagtcgacaa gcccaggact gagtcgacgc ggccgcgcag    4560
tgaaaaaaat gctttatttg tgaaatttgt gatgctattg ctttatttgt aaccattata    4620
agctgcaata acaagttct cgagttaagg gcgaattccc gattaggatc ttcctagagc    4680
atggctacgt agataagtag catggcgggt taatcattaa ctacaaggaa cccctagtga    4740
tggagttggc cactccctct ctgcgcgctc gctcgctcac tgaggccggg cgaccaaagg    4800
tcgcccgacg cccgggcttt gcccgggcgg cctcagtgag cgagcgagcg cgcag          4855
```

<210> SEQ ID NO 21
<211> LENGTH: 4390
<212> TYPE: DNA
<213> ORGANISM: Unknown
<220> FEATURE:
<223> OTHER INFORMATION: Dual AAV comprising the 5 coding sequence of
      ABCA4 (ABCA4 promoter)

<400> SEQUENCE: 21

```
ctgcgcgctc gctcgctcac tgaggccgcc cgggcaaagc ccgggcgtcg ggcgaccttt      60
ggtcgcccgg cctcagtgag cgagcgagcg cgcagagagg gagtggccaa ctccatcact    120
aggggttcct tgtagttaat gattaacccg ccatgctact tatctacgta gccatgctct    180
aggaagatcg gaattcgccc ttaagggcgc gccgtttaaa tagctagcaa aagactaaaa    240 gaggggaggga tcacttcaga tctgccgagt gagtcgattg gacttaaagg gccagtcaaa    300
```

```
ccctgactgc cggctcatgg caggctcttg ccgaggacaa atgcccagcc tatatttatg    360
caaagagatt ttgttccaaa cttaaggtca aagataccta aagacatccc cctcaggaac    420
ccctctcatg gaggagagtg cctgagggtc ttggtttccc attgcatccc ccacctcaat    480
ttccctggtg cccagccact tgtgtcttta gggttctctt tctctccata aagggagcc     540
aacacagtgt cggcctcctc tccccaacta agggcttatg tgtaattaaa agggattatg    600
ctttgaaggg gaaaagtagc ctttaatcac caggagaagg acacagcgtc cggagccaga    660
ggcgctctta acgcgtttta tgtcctttgc tgtctgaggg gcctcagctc tgaccaatct    720
ggtcttcgtg tggtcattag cggtaccggt accaccggtg ccaccatggg cttcgtgaga    780
cagatacagc ttttgctctg aagaactgga ccctgcgga aaaggcaaaa gattcgcttt      840
gtggtggaac tcgtgtggcc tttatcttta tttctggtct tgatctggtt aaggaatgcc    900
aacccactct acagccatca tgaatgccat tccccaaca aggcgatgcc ctcagcagga     960
atgctgccgt ggctccaggg gatcttctgc aatgtgaaca atccctgttt tcaaagcccc   1020
accccaggag aatctcctgg aattgtgtca actataaca actccatctt ggcaagggta     1080
tatcgagatt ttcaagaact cctcatgaat gcaccagaga ccagcacct tggccgtatt    1140
tggacagagc tacacatctt gtcccaattc atggacaccc tccggactca cccggagaga   1200
attgcaggaa gaggaatacg aataagggat atcttgaaag atgaagaaac actgacacta   1260
tttctcatta aaaacatcgg cctgtctgac tcagtggtct accttctgat caactctcaa   1320
gtccgtccag agcagttcgc tcatggagtc ccggacctgg cgctgaagga catcgcctgc   1380
agcgaggccc tcctggagcg cttcatcatc ttcagccaga gacgcgggc aaagacggtg    1440
cgctatgccc tgtgctccct ctcccagggc acctacagt ggatagaaga cactctgtat    1500
gccaacgtgg acttcttcaa gctcttccgt gtgcttccca cactcctaga cagccgttct   1560
caaggtatca atctgagatc ttggggagga atattatctg atatgtcacc aagaattcaa   1620
gagtttatcc atcggccgag tatgcaggac ttgctgtggg tgaccaggcc cctcatgcag   1680
aatggtggtc cagagaccct tacaaagctg atgggcatcc tgtctgacct cctgtgtggc   1740
taccccgagg gaggtggctc tcgggtgctc tccttcaact ggtatgaaga caataactat   1800
aaggcctttc tggggattga ctccacaagg aaggatccta tctattctta tgacagaaga   1860
acaacatcct tttgtaatgc attgatccag agcctggagt caaatccttt aaccaaaatc   1920
gcttggaggg cggcaaagcc tttgctgatg ggaaaaatcc tgtacactcc tgattcacct   1980
gcagcacgaa ggatactgaa gaatgccaac tcaactttg aagaactgga acacgttagg    2040
aagttggtca aagcctggga agaagtaggg ccccagatct ggtacttctt tgacaacagc   2100
acacagatga acatgatcag agatacccctg gggaaccaa cagtaaaaga cttttttgaat  2160
aggcagcttg gtgaagaagg tattactgct gaagccatcc taaacttcct ctacaagggc   2220
cctcgggaaa gccaggctga cgacatggcc aacttcgact ggagggacat atttaacatc   2280
actgatcgca ccctccgcct ggtcaatcaa tacctggagt gcttggtcct ggataagttt   2340
gaaagctaca atgatgaaac tcagctcacc caacgtgccc tctctctact ggaggaaaac   2400
atgttctggg ccggagtggt attccctgac atgtatccct ggaccagctc tctaccaccc   2460
cacgtgaagt ataagatccg aatggacata gacgtggtgg agaaaaccaa taagattaaa   2520
gacaggtatt gggattctgg tcccagagct gatcccgtgg aagatttccg gtacatctgg   2580
ggcgggtttg cctatctgca ggacatggtt gaacagggga tcacaaggag ccaggtgcag   2640
gcggaggctc cagttggaat ctacctccag cagatgccct acccctgctt cgtggacgat   2700
```

```
tctttcatga tcatcctgaa ccgctgtttc cctatcttca tggtgctggc atggatctac    2760
tctgtctcca tgactgtgaa gagcatcgtc ttggagaagg agttgcgact gaaggagacc    2820
ttgaaaaatc agggtgtctc caatgcagtg atttggtgta cctggttcct ggacagcttc    2880
tccatcatgt cgatgagcat cttcctcctg acgatattca tcatgcatgg aagaatccta    2940
cattacagcg acccattcat cctcttcctg ttcttgttgg ctttctccac tgccaccatc    3000
atgctgtgct ttctgctcag caccttcttc tccaaggcca gtctggcagc agcctgtagt    3060
ggtgtcatct atttcacccc ctacctgcca cacatcctgt gcttcgcctg caggaccgc    3120 atgaccgctg agctgaagaa ggctgtgagc ttactgtctc cggtggcatt tggatttggc    3180
actgagtacc tggttcgctt tgaagagcaa ggcctggggc tgcagtggag caacatcggg    3240
aacagtccca cggaagggga cgaattcagc ttcctgctgt ccatgcagat gatgctcctt    3300
gatgctgctg tctatggctt actcgcttgg taccttgatc aggtgttttcc aggagactat   3360 ggaaccccac ttccttggta ctttcttcta caagagtcgt attggcttgg cggtgaaggg    3420
tgttcaacca gagaagaaag agccctggaa aagaccgagc cctaacaga ggaaacggag     3480 gatccagagc acccagaagg aatacacgac tccttctttg aacgtgagca tccagggtgg    3540
gttcctgggg tatgcgtgaa gaatctggta aagatttttg agccctgtgg ccggccagct    3600
gtggaccgtc tgaacatcac cttctacgag aaccagatca ccgcattcct gggccacaat    3660
ggagctggga aaaccaccac cttgtccatc ctgacgggtc tgttgccacc aacctctggg    3720
actgtgctcg ttgggggaag ggacattgaa accagcctgg atgcagtccg gcagagcctt    3780
ggcatgtgtc cacagcacaa catcctgttc caccacctca cggtggctga gcacatgctg    3840
ttctatgccc agctgaaagg aaagtccag gaggaggccc agctggagat ggaagccatg    3900
ttggaggaca caggcctcca ccacaagcgg aatgaagagg ctcaggacct atcaggtggc    3960
atgcagagaa agctgtcggt tgccattgcc tttgtgggag atgccaaggt aagggcactg    4020
agcagaaggg aagaagctcc gggggctctt tgtagggtaa gcttagtgca tcaaggcgat    4080
cacatcagtg aaaaaaagcc agacaggcgg ttaaaccaac gcagattaaa cagcaggatg    4140
caaaaattcg caggtggtca gatgaagctt attctcgagt taagggcgaa ttcccgatta    4200
ggatcttcct agagcatggc tacgtagata gtagcatgg cgggttaatc attaactaca     4260
aggaacccct agtgatggag ttggccactc cctctctgcg cgctcgctcg ctcactgagg    4320
ccgggcgacc aaaggtcgcc cgacgcccgg gctttgcccg ggcggcctca gtgagcgagc    4380
gagcgcgcag                                                           4390
```

<210> SEQ ID NO 22
<211> LENGTH: 4790
<212> TYPE: DNA
<213> ORGANISM: Unknown
<220> FEATURE:
<223> OTHER INFORMATION: Dual AAV comprising the 3 coding sequence of
      ABCA4 (ABCA4 promoter)

<400> SEQUENCE: 22

```
ctgcgcgctc gctcgctcac tgaggccgcc cgggcaaagc ccgggcgtcg ggcgaccttt     60
ggtcgcccgg cctcagtgag cgagcgagcg cgcagagagg gagtggccaa ctccatcact    120
aggggttcct tgtagttaat gattaacccg ccatgctact tatctacgta gccatgctct    180
aggaagatcg gaattcgccc ttaagggcgc gccgtttaaa tagctagcaa aagactaaaa    240
gagggaggga tcacttcaga tctgccgagt gagtcgattg gacttaaagg gccagtcaaa    300
```

| | |
|---|---|
| ccctgactgc cggctcatgg caggctcttg ccgaggacaa atgcccagcc tatatttatg | 360 |
| caaagagatt ttgttccaaa cttaaggtca aagataccta aagacatccc cctcaggaac | 420 |
| ccctctcatg gaggagagtg cctgagggtc ttggtttccc attgcatccc ccacctcaat | 480 |
| ttccctggtg cccagccact tgtgtcttta gggttctctt tctctccata aaagggagcc | 540 |
| aacacagtgt cggcctcctc tccccaacta agggcttatg tgtaattaaa agggattatg | 600 |
| cttttgaaggg gaaaagtagc ctttaatcac caggagaagg acacagcgtc cggagccaga | 660 |
| ggcgctctta acggcgttta tgtcctttgc tgtctgaggg gcctcagctc tgaccaatct | 720 |
| ggtcttcgtg tggtcattag cggtaccggt accaccggta gaaagcttca tctgaccacc | 780 |
| tgcgaatttt tgcatcctgc tgtttaatct gcgttggttt aaccgcctgt ctggcttttt | 840 |
| ttcactgatg tgatcgcctt gatgcactaa gcttcaacga gtcttttgtc atctacaggt | 900 |
| ggtgattctg gacgaaccca cctctggggt ggacccttac tcgagacgct caatctggga | 960 |
| tctgctcctg aagtatcgct caggcagaac catcatcatg tccactcacc acatggacga | 1020 |
| ggccgacctc cttggggacc gcattgccat cattgcccag ggaaggctct actgctcagg | 1080 |
| caccccactc ttcctgaaga actgctttgg cacaggcttg tacttaacct tggtgcgcaa | 1140 |
| gatgaaaaac atccagagcc aaaggaaagg cagtgagggg acctgcagct gctcgtctaa | 1200 |
| gggtttctcc accacgtgtc cagcccacgt cgatgaccta actccagaac aagtcctgga | 1260 |
| tggggatgta aatgagctga tggatgtagt tctccaccat gttccagagg caaagctggt | 1320 |
| ggagtgcatt ggtcaagaac ttatcttcct tcttccaaat aagaacttca agcacagagc | 1380 |
| atatgccagc cttttcagag agctggagga gacgctggct gaccttggtc tcagcagttt | 1440 |
| tggaatttct gacactcccc tggaagagat ttttctgaag gtcacggagg attctgattc | 1500 |
| aggacctctg tttgcgggtg gcgctcagca gaaaagagaa aacgtcaacc cccgacaccc | 1560 |
| ctgcttgggt cccagagaga aggctggaca gacaccccag gactccaatg tctgctcccc | 1620 |
| aggggcgccg gctgctcacc cagagggcca gcctccccca gagccagagt gcccaggccc | 1680 |
| gcagctcaac acggggacac agctggtcct ccagcatgtg caggcgctgc tggtcaagag | 1740 |
| attccaacac accatccgca gccacaagga cttcctggcg cagatcgtgc tcccggctac | 1800 |
| ctttgtgttt ttggctctga tgctttctat tgttatccct cctttttggcg aatacccgc | 1860 |
| tttgacccctt caccccctgga tatatgggca gcagtacacc ttcttcagca tggatgaacc | 1920 |
| aggcagtgag cagttcacgg tacttgcaga cgtcctcctg aataagccag gctttggcaa | 1980 |
| ccgctgcctg aaggaagggt ggcttccgga gtacccctgt ggcaactcaa caccctggaa | 2040 |
| gactccttct gtgtccccaa acatcaccca gctgttccag aagcagaaat ggacacaggt | 2100 |
| caacccttca ccatcctgca ggtgcagcac cagggagaag ctcaccatgc tgccagagtg | 2160 |
| ccccgagggt gccgggggcc tcccgccccc ccagagaaca cagcgcagca cggaaattct | 2220 |
| acaagacctg acggacagga acatctccga cttcttggta aaaacgtatc ctgctcttat | 2280 |
| aagaagcagc ttaaagagca aattctgggt caatgaacag aggtatggag gaatttccat | 2340 |
| tggaggaaag ctcccagtcg tccccatcac gggggaagca cttgttgggt ttttaagcga | 2400 |
| ccttggccgg atcatgaatg tgagcggggg ccctatcact agagaggcct ctaaagaaat | 2460 |
| acctgatttc cttaaacatc tagaaactga agacaacatt aaggtgtggt ttaataacaa | 2520 |
| aggctggcat gccctggtca gctttctcaa tgtggcccac aacgccatct tacgggccag | 2580 |
| cctgcctaag gacaggagcc ccgaggagta tggaatcacc gtcattagcc aacccctgaa | 2640 |

```
cctgaccaag gagcagctct cagagattac agtgctgacc acttcagtgg atgctgtggt    2700
tgccatctgc gtgattttct ccatgtcctt cgtcccagcc agctttgtcc tttatttgat    2760
ccaggagcgg gtgaacaaat ccaagcacct ccagtttatc agtggagtga gccccaccac    2820
ctactgggtg accaacttcc tctgggacat catgaattat tccgtgagtg ctgggctggt    2880
ggtgggcatc ttcatcgggt ttcagaagaa agcctacact tctccagaaa accttcctgc    2940
ccttgtggca ctgctcctgc tgtatggatg ggcggtcatt cccatgatgt acccagcatc    3000
cttcctgttt gatgtcccca gcacagccta tgtggcttta tcttgtgcta atctgttcat    3060
cggcatcaac agcagtgcta ttaccttcat cttggaatta tttgagaata accgacgct    3120 gctcaggttc aacgccgtgc tgaggaagct gctcattgtc ttcccccact tctgcctggg    3180
ccggggcctc attgaccttg cactgagcca ggctgtgaca gatgtctatg cccggtttgg    3240
tgaggagcac tctgcaaatc cgttccactg ggacctgatt gggaagaacc tgtttgccat    3300
ggtggtggaa ggggtggtgt acttcctcct gaccctgctg gtccagcgcc acttcttcct    3360
ctcccaatgg attgccgagc ccactaagga gcccattgtt gatgaagatg atgatgtggc    3420
tgaagaaaga caaagaatta ttactggtgg aaataaaact gacatcttaa ggctacatga    3480
actaaccaag atttatccag gcacctccag cccagcagtg gacaggctgt gtgtcggagt    3540
tcgccctgga gagtgctttg gcctcctggg agtgaatggt gccggcaaaa caaccacatt    3600
caagatgctc actggggaca ccacagtgac ctcaggggat gccaccgtag caggcaagag    3660
tattttaacc aatatttctg aagtccatca aaatatgggc tactgtcctc agtttgatgc    3720
aattgatgag ctgctcacag gacgagaaca tctttacctt tatgcccggc ttcgaggtgt    3780
accagcagaa gaaatcgaaa aggttgcaaa ctggagtatt aagagcctgg gcctgactgt    3840
ctacgccgac tgcctggctg gcacgtacag tgggggcaac aagcggaaac tctccacagc    3900
catcgcactc attggctgcc caccgctggt gctgctggat gagcccacca cagggatgga    3960
cccccaggca cgccgcatgc tgtggaacgt catcgtgagc atcatcagag aagggagggc    4020
tgtggtcctc acatcccaca gcatggaaga atgtgaggca ctgtgtaccc ggctggccat    4080
catggtaaag gcgcctttc gatgtatggg caccattcag catctcaagt ccaaatttgg    4140
agatggctat atcgtcacaa tgaagatcaa atccccgaag gacgacctgc ttcctgacct    4200
gaaccctgtg gagcagttct tccagggaa cttcccaggc agtgtgcaga gggagaggca    4260
ctacaacatg ctccagttcc aggtctcctc ctcctccctg gcgaggatct tccagctcct    4320
cctctcccac aaggacagcc tgctcatcga ggagtactca gtcacacaga ccacactgga    4380
ccaggtgttt gtaaattttg ctaaacagca gactgaaagt catgacctcc ctctgcaccc    4440
tcgagctgct ggagccagtc gacaagccca ggactgagtc gacgcggccg cgcagtgaaa    4500
aaaatgcttt atttgtgaaa tttgtgatgc tattgcttta tttgtaacca ttataagctg    4560
caataaacaa gttctcgagt taagggcgaa ttcccgatta ggatcttcct agagcatggc    4620
tacgtagata agtagcatgg cgggttaatc attaactaca aggaacccct agtgatggag    4680
ttggccactc cctctctgcg cgctcgctcg ctcactgagg ccgggcgacc aaaggtcgcc    4740
cgacgcccgg gctttgcccg ggcggcctca gtgagcgagc gagcgcgcag                4790
```

<210> SEQ ID NO 23
<211> LENGTH: 240
<212> TYPE: DNA
<213> ORGANISM: Unknown
<220> FEATURE:
<223> OTHER INFORMATION: ASS sequence

<400> SEQUENCE: 23
ctcggcagcc accttggctg ttcccaagtc cctcacaggc agggtctccc tacctgcctg    60
tcctcaggta catccccgag ggcctgcagt gctcgtgtgg aatcgactac tacacgctca   120
agccggaggt caacaacgag tcttttgtca tctacatgtt cgtggtccac ttcaccatcc   180
ccatgattat catctttttc tgctatgggc agctcgtctt caccgtcaag gaggtacggg   240

<210> SEQ ID NO 24
<211> LENGTH: 240
<212> TYPE: DNA
<213> ORGANISM: Unknown
<220> FEATURE:
<223> OTHER INFORMATION: ASS sequence

<400> SEQUENCE: 24
ctcggcagcc accttggctg ttcccaagtc cctcacaggc agggtctccc tacctgcctg    60
tcctcaggta catccccgag ggcctgcagt gctcgtgtgg aatcgactac tacacgctca   120
agccggaggt caacaacgag tcttttgtca tctacaggtt cgtggtccac ttcaccatcc   180
ccatgattat catctttttc tgctatgggc agctcgtctt caccgtcaag gaggtacggg   240

<210> SEQ ID NO 25
<211> LENGTH: 50
<212> TYPE: DNA
<213> ORGANISM: Unknown
<220> FEATURE:
<223> OTHER INFORMATION: ASS sequence

<400> SEQUENCE: 25
ctacacgctc aagccggagg tcaacaacga gtcttttgtc atctacatgt                50

<210> SEQ ID NO 26
<211> LENGTH: 27
<212> TYPE: DNA
<213> ORGANISM: Unknown
<220> FEATURE:
<223> OTHER INFORMATION: ASS sequence

<400> SEQUENCE: 26
gtcttttgtc atctacaggt gttcgtg                                         27

<210> SEQ ID NO 27
<211> LENGTH: 102
<212> TYPE: DNA
<213> ORGANISM: Artificial Sequence
<220> FEATURE:
<223> OTHER INFORMATION: binding domain BD_g

<400> SEQUENCE: 27
gttccaggga gggaatgtga agccccagaa agggccagcg ccaggtggaa ttcgctagct    60
cggcagccac cttggctgtt cccaagtccc tcacaggcag gg                      102

<210> SEQ ID NO 28
<211> LENGTH: 105
<212> TYPE: DNA
<213> ORGANISM: Artificial Sequence
<220> FEATURE:
<223> OTHER INFORMATION: Binding domain BD_h+i

<400> SEQUENCE: 28
gttaaccctc cagtcaggac tcaaacccag tagtgtctgg ttccaggcac tgacctgcta    60

```
gctcggcagc caccttggct gttcccaagt ccctcacagg caggg                    105
```

<210> SEQ ID NO 29
<211> LENGTH: 149
<212> TYPE: DNA
<213> ORGANISM: Artificial Sequence
<220> FEATURE:
<223> OTHER INFORMATION: Binding domain PTM1, B2

<400> SEQUENCE: 29

```
caccattcat ggtgatagcc gggctgctgt ttgtgcaggg ctggcactga acactgcctt    60
gatcttattt ggagcaatat gcgcttgtct aatttcacag caagaaaact gagctgaggc   120
tcaaagaagt caagcgccct gctggggcg                                     149
```

<210> SEQ ID NO 30
<211> LENGTH: 21
<212> TYPE: DNA
<213> ORGANISM: Artificial Sequence
<220> FEATURE:
<223> OTHER INFORMATION: ITR2 forward primer

<400> SEQUENCE: 30

```
ggaacccta gtgatggagt t                                               21
```

<210> SEQ ID NO 31
<211> LENGTH: 16
<212> TYPE: DNA
<213> ORGANISM: Artificial Sequence
<220> FEATURE:
<223> OTHER INFORMATION: ITR2 reverse primer

<400> SEQUENCE: 31

```
cggcctcagt gagcga                                                    16
```

<210> SEQ ID NO 32
<211> LENGTH: 100
<212> TYPE: DNA
<213> ORGANISM: Artificial Sequence
<220> FEATURE:
<223> OTHER INFORMATION: Binding domain BD_j

<400> SEQUENCE: 32

```
catctgacca ccagcgaatt tttgcatcca gctgtttaat cagcgttggt ttaaccgcca    60
gtcaggcttt ctttcaaaga tgtgatcgcc ttgcagcact                         100
```

<210> SEQ ID NO 33
<211> LENGTH: 100
<212> TYPE: DNA
<213> ORGANISM: Artificial Sequence
<220> FEATURE:
<223> OTHER INFORMATION: Binding domain BD_I

<400> SEQUENCE: 33

```
ccatcccgca tctgaccacc agcgaaatgg atttttgcat ccagctgggt aacgttggca    60
atttaaccgc cagtcaggct ttctttcaaa gatgtggatt                         100
```

<210> SEQ ID NO 34
<211> LENGTH: 100
<212> TYPE: DNA
<213> ORGANISM: Artificial Sequence
<220> FEATURE:
<223> OTHER INFORMATION: Binding domain BD_m

<400> SEQUENCE: 34

```
ccatcccgca tctgaccacc tgcgaaatgg attttttgcat cctgctgggt aacgttggca    60
atttaaccgc ctgtctggct ttctttcaat gatgtggatt                         100
```

<210> SEQ ID NO 35
<211> LENGTH: 1324
<212> TYPE: DNA
<213> ORGANISM: Artificial Sequence
<220> FEATURE:
<223> OTHER INFORMATION: 5' cerulean + BD_g

<400> SEQUENCE: 35

```
gacattgatt attgactagt tattaatagt aatcaattac ggggtcatta gttcatagcc    60
catatatgga gttccgcgtt acataactta cggtaaatgg cccgcctggc tgaccgccca   120 acgaccccg cccattgacg tcaataatga cgtatgttcc catagtaacg ccaatgggga    180
ctttccattg acgtcaatgg gtggactatt tacggtaaac tgcccacttg gcagtacatc   240
aagtgtatca tatgccaagt acgcccccta ttgacgtcaa tgacggtaaa tggcccgcct   300
ggcattatgc ccagtacatg accttatggg actttcctac ttggcagtac atctacgtat   360
tagtcatcgc tattaccatg gtgatgcggt tttggcagta catcaatggg cgtggatagc   420
ggtttgactc acggggattt ccaagtctcc accccattga cgtcaatggg agtttgtttt   480
ggcaccaaaa tcaacgggac tttccaaaat gtcgtaacaa ctccgcccca ttgacgcaaa   540
tgggcggtag gcgtgtacgg tgggaggtct atataagcag agctctctgg ctaactagag   600
aacccactgc ttactggctt atcgaaatta atacgactca ctatagggag acccaagctg   660
gctagttaag cttatggtga gcaagggcga ggagctgttc accggggtgg tgcccatcct   720
ggtcgagctg gacggcgacg taaacggcca caagttcagc gtgtccggcg agggcgaggg   780
cgatgccacc tacggcaagc tgaccctgaa gttcatctgc accacaggta agggcactga   840
gcagaaggga agaagctccg ggggctcttt gtagggtgga tcccctgcc tgtgagggac    900 ttgggaacag ccaaggtggc tgccgagcta gcgaattcca cctggcgctg gccctttctg   960
gggcttcaca ttccctccct ggaacggatc cctcgaggtc acccattcga acaaaaactc  1020
atctcagaag aggatctgaa tatgcatacc ggtcatcatc accatcacca ttgagtttaa  1080
acccgctgat cagcctcgac tgtgccttct agttgccagc catctgttgt ttgcccctcc  1140
cccgtgcctt ccttgaccct ggaaggtgcc actcccactg tcctttccta ataaaatgag  1200
gaaattgcat cgcattgtct gagtaggtgt cattctattc tggggggtgg ggtggggcag  1260
gacagcaagg gggaggattg ggaagacaat agcaggcatg ctggggatgc ggtgggctct  1320
atgg                                                              1324
```

<210> SEQ ID NO 36
<211> LENGTH: 1710
<212> TYPE: DNA
<213> ORGANISM: Artificial Sequence
<220> FEATURE:
<223> OTHER INFORMATION: 3' cerulean + BD_g

<400> SEQUENCE: 36

```
gacattgatt attgactagt tattaatagt aatcaattac ggggtcatta gttcatagcc    60
catatatgga gttccgcgtt acataactta cggtaaatgg cccgcctggc tgaccgccca   120 acgaccccg cccattgacg tcaataatga cgtatgttcc catagtaacg ccaatgggga    180
ctttccattg acgtcaatgg gtggactatt tacggtaaac tgcccacttg gcagtacatc   240
```

```
aagtgtatca tatgccaagt acgcccccta ttgacgtcaa tgacggtaaa tggcccgcct    300
ggcattatgc ccagtacatg acctratggg actttcctac ttggcagtac atctacgtat    360
tagtcatcgc tattaccatg gtgatgcggt tttggcagta catcaatggg cgtggatagc    420
ggtttgactc acggggattt ccaagtctcc accccattga cgtcaatggg agtttgtttt    480
ggcaccaaaa tcaacgggac tttccaaaat gtcgtaacaa ctccgcccca ttgacgcaaa    540
tgggcggtag gcgtgtacgg tgggaggtct atataagcag agctctctgg ctaactagag    600
aacccactgc ttactggctt atcgaaatta atacgactca ctatagggag acccaagctg    660
gctagttaag cttggatccg ttccagggag ggaatgtgaa gccccagaaa gggcagcgc    720 caggtggaat tcgctagctc ggcagccacc ttggctgttc ccaagtccct cacaggcagg    780
gggatcccaa cgagtctttt gtcatctaca ggtaagctgc ccgtgccctg cccacccctc    840
gtgaccaccc tgacctgggg cgtgcagtgc ttcgcccgct accccgacca catgaagcag    900
cacgacttct tcaagtccgc catgcccgaa ggctacgtcc aggagcgcac catcttcttc    960
aaggacgacg gcaactacaa gacccgcgcc gaggtgaagt tcgagggcga caccctggtg   1020
aaccgcatcg agctgaaggg catcgacttc aaggaggacg gcaacatcct ggggcacaag   1080
ctggagtaca acgccatcag cgacaacgtc tatatcaccg ccgacaagca gaagaacggc   1140
atcaaggcca acttcaagat ccgccacaac atcgaggacg gcagcgtgca gctcgccgac   1200
cactaccagc agaacccccc catcggcgac ggccccgtgc tgctgcccga caaccactac   1260
ctgagcaccc agtccaagct gagcaaagac cccaacgaga gcgcgatca catggtcctg   1320 ctggagttcg tgaccgccgc cgggatcact ctcggcatgg acgagctgta caagtaactc   1380
gaggtcaccc attcgaacaa aaactcatct cagaagagga tctgaatatg cataccggtc   1440
atcatcacca tcaccattga gtttaaaccc gctgatcagc ctcgactgtg ccttctagtt   1500
gccagccatc tgttgtttgc ccctcccccg tgccttcctt gaccctggaa ggtgccactc   1560
ccactgtcct ttcctaataa aatgaggaaa ttgcatcgca ttgtctgagt aggtgtcatt   1620
ctattctggg gggtggggtg gggcaggaca gcaagggga ggattgggaa gacaatagca   1680
ggcatgctgg ggatgcggtg ggctctatgg                                     1710
```

<210> SEQ ID NO 37
<211> LENGTH: 3142
<212> TYPE: DNA
<213> ORGANISM: Artificial Sequence
<220> FEATURE:
<223> OTHER INFORMATION: 5' SpCas9-VPR + BD_k

<400> SEQUENCE: 37

```
gacattgatt attgactagt tattaatagt aatcaattac ggggtcatta gttcatagcc     60
catatatgga gttccgcgtt acataactta cggtaaatgg cccgcctggc tgaccgccca    120
acgacccccg cccattgacg tcaataatga cgtatgttcc catagtaacg ccaatgggga    180
ctttccattg acgtcaatgg gtggagtatt tacggtaaac tgcccacttg gcagtacatc    240
aagtgtatca tatgccaagt acgcccccta ttgacgtcaa tgacggtaaa tggcccgcct    300
ggcattatgc ccagtacatg acctratggg actttcctac ttggcagtac atctacgtat    360
tagtcatcgc tattaccatg gtgatgcggt tttggcagta catcaatggg cgtggatagc    420
ggtttgactc acggggattt ccaagtctcc accccattga cgtcaatggg agtttgtttt    480
ggcaccaaaa tcaacgggac tttccaaaat gtcgtaacaa ctccgcccca ttgacgcaaa    540
tgggcggtag gcgtgtacgg tgggaggtct atataagcag agctcgttta gtgaaccgtc    600
```

```
agaaccggtc gactagagga tccatggccc caaagaagaa gcggaaggtc ggtatccacg    660
gagtcccagc agccgacaag aagtactcca ttgggctcgc tatcggcaca aacagcgtcg    720
gctgggccgt cattacggac gagtacaagg tgccgagcaa aaaattcaaa gttctgggca    780
ataccgatcg ccacagcata aagaagaacc tcattggcgc cctcctgttc gactccgggg    840
aaacggccga agccacgcgg ctcaaaagaa cagcacggcg cagatatacc cgcagaaaga    900
atcggatctg ctacctgcag gagatcttta gtaatgagat ggctaaggtg gatgactctt    960
tcttccatag gctggaggag tcctttttgg tggaggagga taaaaagcac gagcgccacc   1020
caatctttgg caatatcgtg gacgaggtgg cgtaccatga aaagtaccca accatatatc   1080
atctgaggaa gaagcttgta gacagtactg ataaggctga cttgcggttg atctatctcg   1140
cgctggcgca tatgatcaaa tttcggggac acttcctcat cgaggggac ctgaacccag    1200 acaacagcga tgtcgacaaa ctctttatcc aactggttca gacttacaat cagcttttcg   1260
aagagaaccc gatcaacgca tccggagttg acgccaaagc aatcctgagc gctaggctgt   1320
ccaaatcccg gcggctcgaa aacctcatcg cacagctccc tggggagaag aagaacggcc   1380
tgtttggtaa tcttatcgcc ctgtcactcg ggctgacccc caactttaaa tctaacttcg   1440
acctggccga agatgccaag cttcaactga gcaaagacac ctacgatgat gatctcgaca   1500
atctgctggc ccagatcggc gaccagtacg cagaccttt tttggcggca aagaacctgt    1560
cagacgccat tctgctgagt gatattctgc gagtgaacac ggagatcacc aaagctccgc   1620
tgagcgctag tatgatcaag cgctatgatg agcaccacca agacttgact ttgctgaagg   1680
cccttgtcag acagcaactg cctgagaagt acaaggaaat tttcttcgat cagtctaaaa   1740
atggctacgc cggatacatt gacggcggag caagccagga ggaatttac aaatttatta    1800 agcccatctt ggaaaaaatg gacggcaccg aggagctgct ggtaaagctt aacagagaag   1860
atctgttgcg caaacagcgc actttcgaca atggaagcat cccccaccag attcacctgg   1920
gcgaactgca cgctatcctc aggcggcaag aggatttcta cccctttttg aaagataaca   1980
gggaaaagat tgagaaaatc ctcacatttc ggatacccta ctatgtaggc ccctcgccc    2040 ggggaaattc cagattcgcg tggatgactc gcaaatcaga agagaccatc actccctgga   2100
acttcgagga agtcgtggat aagggggcct ctgcccagtc cttcatcgaa aggatgacta   2160
actttgataa aaatctgcct aacgaaaagg tgcttcctaa acactctctg ctgtacgagt   2220
acttcacagt ttataacgag ctcaccaagg tcaaatacgt cacagaaggg atgagaaagc   2280
cagcattcct gtctggagag cagaagaaag ctatcgtgga cctcctcttc aagacgaacc   2340
ggaaagttac cgtgaaacag ctcaaagaag actatttcaa aaagattgaa tgtttcgact   2400
ctgttgaaat cagcggagtg gaggatcgct tcaacgcatc cctgggaacg tatcacgatc   2460
tcctgaaaat cattaaagac aaggacttcc tggacaatga ggagaacgag gacattcttg   2520
aggacattgt cctcaccctt acgttgtttg aagatagggg gatgattgaa gaacgcttga   2580
aaacttacgc tcatctcttc gacgacaaag tcatgaaaca gctcaagagg cgccgatata   2640
caggatgggg gcggctgtca agaaaactga tcaatgggat ccgagacaag cagagtggaa   2700
agacaatcct ggattttctt aagtccgatg gatttgccaa ccggaacttc atgcagttga   2760
tccatgatga ctctctcacc tttaaggagg acatccagaa agcacaagtt tctggccagg   2820
gggacagtct tcacgagcac atcgctaatc ttgcaggtaa gggcactgag cagaagggaa   2880
gaagctccgg gggctctttg tagggtgcgg ccgcagtgca tcaaggcgat cacatcagtg   2940
```

| aaaaaaagcc agacaggcgg ttaaaccaac gcagattaaa cagcaggatg caaaaattcg | 3000 |
| caggtggtca gatggcggcc gctctagact cgatgagttt ggacaaacca caactagaat | 3060 |
| gcagtgaaaa aaatgcttta tttgtgaaat tgtgatgct attgctttat ttgtaaccat | 3120 |
| tataagctgc aataaacaag tt | 3142 |

<210> SEQ ID NO 38
<211> LENGTH: 4430
<212> TYPE: DNA
<213> ORGANISM: Artificial Sequence
<220> FEATURE:
<223> OTHER INFORMATION: 3' SpCas9-VPR + BD_k

<400> SEQUENCE: 38

| gacattgatt attgactagt tattaatagt aatcaattac ggggtcatta gttcatagcc | 60 |
| catatatgga gttccgcgtt acataactta cggtaaatgg cccgcctggc tgaccgccca | 120 |
| acgaccccg cccattgacg tcaataatga cgtatgttcc catagtaacg ccaatagga | 180 |
| ctttccattg acgtcaatgg gtggagtatt tacggtaaac tgcccacttg gcagtacatc | 240 |
| aagtgtatca tatgccaagt acgcccccta ttgacgtcaa tgacggtaaa tggcccgcct | 300 |
| ggcattatgc ccagtacatg accttatggg actttcctac ttggcagtac atctacgtat | 360 |
| tagtcatcgc tattaccatg gtgatgcggt tttggcagta catcaatggg cgtggatagc | 420 |
| ggtttgactc acggggattt ccaagtctcc accccattga cgtcaatggg agtttgtttt | 480 |
| ggcaccaaaa tcaacgggac tttccaaaat gtcgtaacaa ctccgcccca ttgacgcaaa | 540 |
| tgggcggtag gcgtgtacgg tgggaggtct atataagcag agctcgttta gtgaaccgtc | 600 |
| agaggtacca ccggtcgact agaggatccc ggccgccatc tgaccacctg cgaattttg | 660 |
| catcctgctg tttaatctgc gttggtttaa ccgcctgtct ggcttttttt cactgatgtg | 720 |
| atcgccttga tgcactcggc cgccaacgag tcttttgtca tctacaggta gcccagctat | 780 |
| caaaaaggga atactgcaga ccgttaaggt cgtggatgaa ctcgtcaaag taatgggaag | 840 |
| gcataagccc gagaatatcg ttatcgagat ggcccgagag aaccaaacta cccagaaggg | 900 |
| acagaagaac agtagggaaa ggatgaagag gattgaagag ggtataaaag aactgggggtc | 960 |
| ccaaatcctt aaggaacacc cagttgaaaa cacccagctt cagaatgaga agctctacct | 1020 |
| gtactacctg cagaacggca gggacatgta cgtggatcag gaactggaca tcaatcggct | 1080 |
| ctccgactac gacgtggatc atatcgtgcc ccagtctttt ctcaaagatg attctattga | 1140 |
| taataaagtg ttgacaagat ccgataaaaa tagagggaag agtgataacg tccccctcaga | 1200 |
| agaagttgtc aagaaaatga aaaattattg gcggcagctg ctgaacgcca aactgatcac | 1260 |
| acaacggaag ttcgataatc tgactaaggc tgaacgaggt ggcctgtctg agttggataa | 1320 |
| agccggcttc atcaaaaggc agcttgttga cacgccag atcaccaagc acgtggccca | 1380 |
| aattctcgat tcacgcatga acaccaagta cgatgaaaat gacaaactga ttcgagaggt | 1440 |
| gaaagttatt actctgaagt ctaagctggt ctcagatttc agaaaggact ttcagtttta | 1500 |
| taaggtgaga gagatcaaca attaccacca tgcgcatgat gcctacctga atgcagtggt | 1560 |
| aggcactgca cttatcaaaa aatatcccaa gcttgaatct gaatttgttt acggagacta | 1620 |
| taaagtgtac gatgttagga aaatgatcgc aaagtctgag caggaaatag caaggccac | 1680 |
| cgctaagtac ttcttttaca gcaatattat gaatttttc aagaccgaga ttacactggc | 1740 |
| caatggagag attcggaagc gaccacttat cgaaacaaac ggagaaacag agaaatcgt | 1800 |
| gtgggacaag ggtagggatt tcgcgacagt ccggaaggtc ctgtccatgc cgcaggtgaa | 1860 |

```
catcgttaaa aagaccgaag tacagaccgg aggcttctcc aaggaaagta tcctcccgaa    1920
aaggaacagc gacaagctga tcgcacgcaa aaaagattgg gaccccaaga aatacggcgg    1980
attcgattct cctacagtcg cttacagtgt actggttgtg gccaaagtgg agaaagggaa    2040
gtctaaaaaa ctcaaaagcg tcaaggaact gctgggcatc acaatcatgg agcgatcaag    2100
cttcgaaaaa aaccccatcg actttctcga ggcgaaagga tataagagg tcaaaaaga     2160 cctcatcatt aagcttccca agtactctct ctttgagctt gaaaacggcc ggaaacgaat    2220
gctcgctagt gcgggcgagc tgcagaaagg taacgagctg gcactgccct ctaaatacgt    2280
taatttcttg tatctggcca gccactatga aaagctcaaa gggtctcccg aagataatga    2340
gcagaagcag ctgttcgtgg aacaacacaa acactacctt gatgagatca tcgagcaaat    2400
aagcgaattc tccaaaagag tgatcctcgc cgacgctaac ctcgataagg tgctttctgc    2460
ttacaataag cacagggata agcccatcag ggagcaggca gaaaacatta tccacttgtt    2520
tactctgacc aacttgggcg cgcctgcagc cttcaagtac ttcgacacca ccatagacag    2580
aaagcggtac acctctacaa aggaggtcct ggacgccaca ctgattcatc agtcaattac    2640
ggggctctat gaaacaagaa tcgacctctc tcagctcggt ggagacagca gggctgaccc    2700
caagaagaag aggaaggtgt cgccagggat ccgtcgactt gacgcgttga tatcaacaag    2760
tttgtacaaa aaagcaggct acaaagagc cagcggttcc ggacgggctg acgcattgga    2820
cgattttgat ctggatatgc tgggaagtga cgccctcgat gattttgacc ttgacatgct    2880
tggttcggat gcccttgatg actttgacct cgacatgctc ggcagtgacg cccttgatga    2940
tttcgacctg gacatgctga ttaactctag aagttccgga tctccgaaaa agaaacgcaa    3000
agttggtagc cagtacctgc ccgacaccga cgaccggcac cggatcgagg aaaagcggaa    3060
gcggacctac gagacattca agagcatcat gaagaagtcc cccttcagcg cccaccga    3120 ccctagacct ccacctagaa gaatcgccgt gcccagcaga tccagcgcca gcgtgccaaa    3180
acctgccccc cagccttacc ccttcaccag cagcctgagc accatcaact acgacgagtt    3240
ccctaccatg gtgttcccca gcggccagat ctctcaggcc tctgctctgg ctccagcccc    3300
tcctcaggtg ctgcctcagg ctcctgctcc tgcaccagct ccagccatgg tgtctgcact    3360
ggctcaggca ccagcaccccg tgcctgtgct ggctcctgga cctccacagg ctgtggctcc    3420
accagcccct aaacctacac aggccggcga gggcacactg tctgaagctc tgctgcagct    3480
gcagttcgac gacgaggatc tgggagccct gctgggaaac agcaccgatc ctgccgtgtt    3540
caccgacctg gccagcgtgg acaacagcga gttccagcag ctgctgaacc agggcatccc    3600 tgtggccct cacaccaccg agcccatgct gatggaatac cccgaggcca tcacccggct    3660
cgtgacaggc gctcagaggc ctcctgatcc agctcctgcc cctctgggag caccaggcct    3720
gcctaatgga ctgctgtctg gcgacgagga cttcagctct atcgccgata tggatttctc    3780
agccttgctg ggtctggca gcggcagccg ggattccagg gaagggatgt ttttgccgaa    3840
gcctgaggcc ggctccgcta ttagtgacgt gtttgagggc gcgaggtgt gccagccaaa    3900 acgaatccgg ccatttcatc ctccaggaag tccatgggcc aaccgcccac tcccgccag    3960 cctcgcacca acaccaaccg gtccagtaca tgagccagtc gggtcactga ccccggcacc    4020
agtccctcag ccactggatc cagcgcccgc agtgactccc gaggccagtc acctgttgga    4080
ggatcccgat gaagagacga gccaggctgt caaagccctt cggagatgg ccgatactgt    4140 gattccccag aaggaagagg ctgcaatctg tggccaaatg gacctttccc atccgccccc    4200
```

```
aaggggccat ctggatgagc tgacaaccac acttgagtcc atgaccgagg atctgaacct    4260
ggactcaccc ctgaccccgg aattgaacga gattctggat accttcctga acgacgagtg    4320
cctcttgcat gccatgcata tcagcacagg actgtccatc ttcgacacat ctctgttttg    4380
acaataaaat atctttattt tcattacatc tgtgtgttgg ttttttgtgt              4430
```

<210> SEQ ID NO 39
<211> LENGTH: 4775
<212> TYPE: DNA
<213> ORGANISM: Artificial Sequence
<220> FEATURE:
<223> OTHER INFORMATION: Dual AAV vector-5ABCA4_w introns

<400> SEQUENCE: 39

```
ctgcgcgctc gctcgctcac tgaggccgcc cgggcaaagc ccgggcgtcg ggcgaccttt      60
ggtcgcccgg cctcagtgag cgagcgagcg cgcagagagg gagtggccaa ctccatcact     120
aggggttcct tgtagttaat gattaacccg ccatgctact tatctacgta gccatgctct     180
aggaagatcg gaattcgccc ttaagggcgc gccgtttaaa tagctagcga cattgattat     240
tgactagtta ttaatagtaa tcaattacgg ggtcattagt tcatagccca tatatggagt     300
tccgcgttac ataacttacg gtaaatggcc cgcctggctg accgcccaac gacccccgcc     360
cattgacgtc aataatgacg tatgttccca tagtaacgcc aatagggact ttccattgac     420
gtcaatgggt ggagtattta cggtaaactg cccacttggc agtacatcaa gtgtatcata     480
tgccaagtac gccccctatt gacgtcaatg acggtaaatg gcccgcctgg cattatgccc     540
agtacatgac cttatgggac tttcctactt ggcagtacat ctacgtatta gtcatcgcta     600
ttaccatggt gatgcggttt tggcagtaca tcaatgggcg tggatagcgg tttgactcac     660
ggggatttcc aagtctccac cccattgacg tcaatgggag tttgttttgg caccaaaatc     720
aacgggactt tccaaaatgt cgtaacaact ccgccccatt gacgcaaatg ggcggtaggc     780
gtgtacggtg ggaggtctat ataagcagag ctggtaccac cggtgccacc atgggcttcg     840
tgagacagat acagcttttg ctctggaaga actggaccct gcggaaaagg caaaagattc     900
gctttgtggt ggaactcgtg tggcctttat ctttatttct ggtcttgatc tggttaagga     960
atgccaaccc actctacagc catcatgaat gccatttccc caacaaggcg atgccctcag    1020
caggaatgct gccgtggctc caggggatct tctgcaatgt gaacaatccc tgttttcaaa    1080
gccccacccc aggagaatct cctggaattg tgtcaaacta taacaactcc atcttggcaa    1140
gggtatatcg agattttcaa gaactcctca tgaatgcacc agagagccag caccttggcc    1200
gtatttggac agagctacac atcttgtccc aattcatgga caccctccgg actcacccgg    1260
agagaattgc aggtaagtgg cgaccgtgcc ccacagccct agccgccctc cccactgccc    1320
gggcttaccc tggtcctgct cccgcaggaa gaggaatacg aataagggat atcttgaaag    1380
atgaagaaac actgacacta tttctcatta aaaacatcgg cctgtctgac tcagtggtct    1440
accttctgat caactctcaa gtccgtccag agcagttcgc tcatggagtc ccggacctgg    1500
cgctgaagga catcgcctgc agcgaggccc tcctggagcg cttcatcatc ttcagccaga    1560
gacgcgggga aaagacggtg cgctatgccc tgtgctccct ctcccagggc acctacagt     1620 ggatagaaga cactctgtat gccaacgtgg acttcttcaa gctcttccgt gtgcttccca    1680
cactcctaga cagccgttct caaggtatca atctgagatc ttggggagga atattatctg    1740
atatgtcacc aagaattcaa gagtttatcc atcggccgag tatgcaggac ttgctgtggg    1800
tgaccaggcc cctcatgcag aatggtggtc cagagacctt tacaaagctg atgggcatcc    1860
```

```
tgtctgacct cctgtgtggc taccccgagg gaggtggctc tcgggtgctc tccttcaact    1920
ggtatgaaga caataactat aaggcctttc tggggattga ctccacaagg aaggatccta    1980
tctattctta tgacagaaga acaacatcct tttgtaatgc attgatccag agcctggagt    2040
caaatccttt aaccaaaatc gcttggaggg cggcaaagcc tttgctgatg gaaaaatcc    2100
tgtacactcc tgattcacct gcagcacgaa ggatactgaa gaatgccaac tcaactttttg   2160
aagaactgga acacgttagg aagttggtca agcctgggga agaagtaggg ccccagatct    2220
ggtacttctt tgacaacagc acacagatga acatgatcag agataccctg gggaacccaa    2280
cagtaaaaga cttttttgaat aggcagcttg gtgaagaagg tattactgct gaagccatcc    2340
taaacttcct ctacaagggc cctcgggaaa gccaggctga cgacatggcc aacttcgact    2400
ggagggacat atttaacatc actgatcgca ccctccgcct ggtcaatcaa tacctggagt    2460
gcttggtcct ggataagttt gaaagctaca atgatgaaac tcagctcacc caacgtgccc    2520
tctctctact ggaggaaaac atgttctggg ccggagtggg attccctgac atgtatccct    2580
ggaccagctc tctaccaccc cacgtgaagt ataagatccg aatggacata acgtggtgg     2640
agaaaaccaa taagattaaa acaggtgagt ggactggag cctgggcacg aggtgtgggg    2700
tggcccctgc cctgccactt acaccacctg cctcttcctg caggtattgg gattctggtc    2760
ccagagctga tcccgtggaa gatttccggt acatctgggg cgggtttgcc tatctgcagg    2820
acatggttga cagggggatc acaaggagcc aggtgcaggc ggaggctcca gttggaatct    2880
acctccagca gatgccctac ccctgcttcg tggacgattc tttcatgatc atcctgaacc    2940
gctgtttccc tatcttcatg gtgctggcat ggatctactc tgtctccatg actgtgaaga    3000
gcatcgtctt ggagaaggag ttgcgactga aggagacctt gaaaaatcag ggtgtctcca    3060
atgcagtgat ttggtgtacc tggttcctgg acagcttctc catcatgtcg atgagcatct    3120
tcctcctgac gatattcatc atgcatgaaa gaatcctaca ttacagcgac ccattcatcc    3180
tcttcctgtt cttgttggct ttctccactg ccaccatcat gctgtgcttt ctgctcagca    3240
ccttcttctc caaggccagt ctggcagcag cctgtagtgg tgtcatctat ttcaccctct    3300
acctgccaca tcctgtgc ttcgcctggc aggaccgcat gaccgctgag ctgaagaagg    3360
ctgtgagctt actgtctccg gtggcatttg gatttggcac tgagtacctg gttcgctttg    3420
aagagcaagg cctggggctg cagtggagca acatcgggaa cagtcccacg gaaggggacg    3480
aattcagctt cctgctgtcc atgcagatga tgctccttga tgctgctgtc tatggcttac    3540
tcgcttggta ccttgatcag gtgttccag gagactatgg aacccacctt ccttggtact    3600
ttcttctaca agagtcgtat tggcttggcg gtgaaggtaa gtagtctgat tatacacaag    3660
atattgtcta gaacttgatg agactgtgga tatgaatatt tcactctttt ctcagggtgt    3720
tcaaccagag aagaaagagc cctggaaaag accgagcccc taacagagga aacggaggat    3780
ccagagcacc cagaaggaat acacgactcc ttctttgaac gtgagcatcc agggtgggtt    3840
cctggggtat gcgtgaagaa tctggtaaag attttttgagc cctgtggccg gccagctgtg    3900
gaccgtctga acatcacctt ctacgagaac cagatcaccg cattcctggg ccacaatgga    3960
gctgggaaaa ccaccacctt gtccatcctg acgggtctgt tgccaccaac ctctgggact    4020
gtgctcgttg ggggaaggga cattgaaacc agcctggatg cagtccggca gagccttggc    4080
atgtgtccac agcacaacat cctgttccac cacctcacgg tggctgagca catgctgttc    4140
tatgcccagc tgaaaggaaa gtcccaggag gaggcccagc tggagatgga agccatgttg    4200
```

| | |
|---|---|
| gaggacacag gcctccacca caagcggaat gaagaggctc aggacctatc aggtggcatg | 4260 |
| cagagaaagc tgtcggttgc cattgccttt gtgggagatg ccaaggtaag ggcactgagc | 4320 |
| agaagggaag aagctccggg ggctctttgt agggtaagct tagtgcatca aggcgatcac | 4380 |
| atcagtgaaa aaaagccaga caggcggtta accaacgca gattaaacag caggatgcaa | 4440 |
| aaattcgcag gtggtcagat gaagcttatt gtcgaggcag tgaaaaaaat gctttatttg | 4500 |
| tgaaatttgt gatgctattg ctttatttgt aaccattata agctgcaata aacaagttct | 4560 |
| cgagttaagg gcgaattccc gattaggatc ttcctagagc atggctacgt agataagtag | 4620 |
| catggcgggt taatcattaa ctacaaggaa ccccctagtga tggagttggc cactccctct | 4680 |
| ctgcgcgctc gctcgctcac tgaggccggg cgaccaaagg tcgcccgacg cccgggcttt | 4740 |
| gcccgggcgg cctcagtgag cgagcgagcg cgcag | 4775 |

<210> SEQ ID NO 40
<211> LENGTH: 5092
<212> TYPE: DNA
<213> ORGANISM: Artificial Sequence
<220> FEATURE:
<223> OTHER INFORMATION: Dual AAV vector-3ABCA4_w introns

<400> SEQUENCE: 40

| | |
|---|---|
| ctgcgcgctc gctcgctcac tgaggccgcc cgggcaaagc ccgggcgtcg ggcgaccttt | 60 |
| ggtcgcccgg cctcagtgag cgagcgagcg cgcagagagg gagtggccaa ctccatcact | 120 |
| aggggttcct tgtagttaat gattaacccg ccatgctact tatctacgta gccatgctct | 180 |
| aggaagatcg gaattcgccc ttaagggcgc gccgtttaaa tagctagcga cattgattat | 240 |
| tgactagtta ttaatagtaa tcaattacgg ggtcattagt tcatagccca tatatggagt | 300 |
| tccgcgttac ataacttacg gtaaatggcc cgcctggctg accgcccaac gacccccgcc | 360 |
| cattgacgtc aataatgacg tatgttccca tagtaacgcc aatagggact ttccattgac | 420 |
| gtcaatgggt ggagtattta cggtaaactg cccacttggc agtacatcaa gtgtatcata | 480 |
| tgccaagtac gccccctatt gacgtcaatg acggtaaatg gcccgcctgg cattatgccc | 540 |
| agtacatgac cttatgggac tttcctactt ggcagtacat ctacgtatta gtcatcgcta | 600 |
| ttaccatggt gatgcggttt tggcagtaca tcaatgggcg tggatagcgg tttgactcac | 660 |
| ggggatttcc aagtctccac cccattgacg tcaatgggag tttgttttgg caccaaaatc | 720 |
| aacgggactt tccaaaatgt cgtaacaact ccgccccatt gacgcaaatg ggcggtaggc | 780 |
| gtgtacggtg ggaggtctat ataagcagag ctggtaccac cggtagaaag cttcatctga | 840 |
| ccacctgcga atttttgcat cctgctgttt aatctgcgtt ggtttaaccg cctgtctggc | 900 |
| tttttttcac tgatgtgatc gccttgatgc actaagcttc aacgagtctt ttgtcatcta | 960 |
| caggtggtga ttctggacga acccaccct ggggtggacc cttactcgag acgctcaatc | 1020 |
| tgggatctgc tcctgaagta tcgctcaggc agaaccatca tcatgtccac tcaccacatg | 1080 |
| gacgaggccg acctccttgg ggaccgcatt gccatcattg cccagggaag gctctactgc | 1140 |
| tcaggcaccc cactcttcct gaagaactgc tttggcacag gcttgtactt aaccttggtg | 1200 |
| cgcaagatga aaacatcca gagccaaagg aaaggcagtg aggtgagtca ggctgggcgc | 1260 |
| ccccgccccc aggggccctc cctccccaag cccccggac gcgcctcacc cacgttcctc | 1320 |
| tgcaggggaa cctgcagctg ctcgtctaag ggtttctcca ccacgtgtcc agcccacgtc | 1380 |
| gatgacctaa ctccagaaca agtcctggat ggggatgtaa atgagctgat ggatgtagtt | 1440 |
| ctccaccatg ttccagaggc aaagctggtg gagtgcattg gtcaagaact tatcttcctt | 1500 |

```
cttccaaata agaacttcaa gcacagagca tatgccagcc ttttcagaga gctggaggag    1560
acgctggctg accttggtct cagcagtttt ggaatttctg acactcccct ggaagagatt    1620
tttctgaagg tcacggagga ttctgattca ggacctctgt ttgcgggtgg cgctcagcag    1680
aaaagagaaa acgtcaaccc ccgacacccc tgcttgggtc ccagagagaa ggctggacag    1740 acacccagg actccaatgt ctgctcccca ggggcgccgg ctgctcaccc agagggccag    1800
cctcccccag agccagagtg cccaggcccg cagctcaaca cggggacaca gctggtcctc    1860
cagcatgtgc aggcgctgct ggtcaagaga ttccaacaca ccatccgcag ccacaaggac    1920
ttcctggcgc agatcgtgct cccggctacc tttgtgtttt tggctctgat gctttctatt    1980
gttatccctc cttttggcga ataccccgct ttgacccttc accctggat atgggcag    2040 cagtacacct tcttcagcat ggatgaacca ggcagtgagc agttcacggt acttgcagac    2100
gtcctcctga ataagccagg ctttggcaac cgctgcctga aggaagggtg gcttccggag    2160 taccctgtg gcaactcaac accctggaag actccttctg tgtccccaaa catcacccag    2220
ctgttccaga agcagaaatg gacacaggtc aacccttcac catcctgcag gtgcagcacc    2280
agggagaagc tcaccatgct gccagagtgc cccgagggtg ccgggggcct ccgccccc    2340 cagagaacac agcgcagcac ggaaaattcta caagacctga cggacaggaa catctccgac    2400
ttcttggtaa aaacgtatcc tgctcttata agaagcagct taaagagcaa attctgggtc    2460
aatgaacaga ggtatggagg aatttccatt ggaggaaagc tcccagtcgt ccccatcacg    2520
ggggaagcac ttgttgggtt tttaagcgac cttggccgga tcatgaatgt gagcggggc    2580 cctatcacta gagaggcctc taaagaaata cctgatttcc ttaaacatct agaaactgaa    2640
gacaacatta aggtgtggtt taataacaaa ggctggcatg ccctggtcag ctttctcaat    2700
gtggcccaca acgccatctt gtaagtccta cctttttttgt tcctttgaaa gcctcctgga    2760
aagcttttcc tgaagtgttt gttctgtaat ttctttgcag acgggccagc ctgcctaagg    2820
acaggagccc cgaggagtat ggaatcaccg tcattagcca ccccctgaac ctgaccaagg    2880
agcagctctc agagattaca gtgctgacca cttcagtgga tgctgtggtt gccatctgcg    2940 tgatttctc catgtccttc gtcccagcca gctttgtcct ttatttgatc caggagcggg    3000
tgaacaaatc caagcacctc cagtttatca gtggagtgag ccccaccacc tactgggtga    3060
ccaacttcct ctgggacatc atgaattatt ccgtgagtgc tgggctggtg gtgggcatct    3120
tcatcgggtt tcagaagaaa gcctacactt ctccagaaaa ccttcctgcc cttgtggcac    3180
tgctcctgct gtatgatgg gcggtcattc ccatgatgta cccagcatcc ttcctgtttg    3240
atgtccccag cacagcctat gtggctttat cttgtgctaa tctgttcatc ggcatcaaca    3300
gcagtgctat taccttcatc ttggaattat ttgagaataa ccgacgctg ctcaggttca    3360 acgccgtgct gaggaagctg ctcattgtct tcccccactt ctgcctgggc cggggcctca    3420
ttgaccttgc actgagccag gctgtgacag atgtctatgc ccggtttggt gaggagcact    3480
ctgcaaatcc gttccactgg gacctgattg gaagaacct gtttgccatg tggtggaag    3540 gggtggtgta cttcctcctg acccctgctgg tccagcgcca cttcttcctc tcccaatgga    3600
ttgccgagcc cactaaggag cccattgttg atgaagatga tgatgtggct gaagaaagac    3660
aaagaattat tactggtgga aataaaactg acatcttaag gctacatgaa ctaaccaaga    3720
tttatccagg cacctccagc ccagcagtgg acaggctgtg tgtcggagtt cgccctggag    3780
agtgctttgg cctcctggga gtgaatggtg ccggcaaaac aaccacattc aagatgctca    3840
```

```
ctggggacac cacagtgacc tcaggggatg ccaccgtagc aggcaagagt attttaacca    3900
atatttctga agtccatcaa aatatgggct actgtcctca gtttgatgca attgatgagc    3960
tgctcacagg acgagaacat ctttaccttt atgcccggct tcgaggtgta ccagcagaag    4020
aaatcgaaaa ggtaagtgat tcctagggct ggggaaggtg ggtgggaatc ctctcctgct    4080
cacctcctct ctcctgcccc acaggttgca aactggagta ttaagagcct gggcctgact    4140
gtctacgccg actgcctggc tggcacgtac agtgggggca acaagcggaa actctccaca    4200
gccatcgcac tcattggctg cccaccgctg gtgctgctgg atgagcccac cacagggatg    4260 gaccccagg cacgccgcat gctgtggaac gtcatcgtga gcatcatcag agaagggagg    4320
gctgtggtcc tcacatccca cagcatggaa gaatgtgagg cactgtgtac ccggctggcc    4380
atcatggtaa agggcgcctt tcgatgtatg ggcaccattc agcatctcaa gtccaaattt    4440
ggagatggct atatcgtcac aatgaagatc aaatcccga aggacgacct gcttcctgac    4500
ctgaaccctg tggagcagtt cttccagggg aacttcccag gcagtgtgca gagggagagg    4560
cactacaaca tgctccagtt ccaggtctcc tcctcctccc tggcgaggat cttccagctc    4620
ctcctctccc acaaggacag cctgctcatc gaggagtact cagtcacaca gaccacactg    4680
gaccaggtgt ttgtaaattt tgctaaacag cagactgaaa gtcatgacct ccctctgcac    4740
cctcgagctg ctggagccag tcgacaagcc caggactgag tcgacgcggc cgcgcagtga    4800
aaaaaatgct ttatttgtga aatttgtgat gctattgctt tatttgtaac cattataagc    4860
tgcaataaac aagttctcga gttaagggcg aattcccgat taggatcttc ctagagcatg    4920
gctacgtaga taagtagcat ggcgggttaa tcattaacta caaggaaccc ctagtgatgg    4980
agttggccac tccctctctg cgcgctcgct cgctcactga ggccgggcga ccaaaggtcg    5040
cccgacgccc gggctttgcc cgggcggcct cagtgagcga gcgagcgcgc ag            5092
```